US012706345B2

(12) United States Patent
Mills et al.

(10) Patent No.: US 12,706,345 B2
(45) Date of Patent: Aug. 11, 2026

(54) LEAK CHECKING ENCLOSURES VIA VALVES FOR VENTING OR PRESSURE RELIEF

(71) Applicant: Eaton Intelligent Power Limited, Dublin (IE)

(72) Inventors: Vaughn Kevin Mills, Chealsea, MI (US); Sagar Pingale, Pune (IN); Jens Buhlinger, Iffezheim (DE); Sascha Hermann, Sinzheim (DE); Akash Gonjari, Solapur (IN); Daniel Lee Pifer, Mattawan, MI (US); Anuj Rajendrakumar Kankaria, Pune (IN); Nan Grady Creamer, Kalamazoo, MI (US); Shahajahan Desai-Danwade, Pune (IN); James K. Spring, Milford, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/975,572

(22) Filed: Dec. 10, 2024

(65) Prior Publication Data

US 2025/0105432 A1 Mar. 27, 2025

Related U.S. Application Data

(63) Continuation of application No. PCT/EP2023/025276, filed on Jun. 9, 2023.

(Continued)

(30) Foreign Application Priority Data

Mar. 4, 2023 (IN) ............................ 202311014566
Mar. 20, 2023 (IN) ............................ 202311018908
Apr. 14, 2023 (IN) ............................ 202311027580

(51) Int. Cl.
*H01M 50/333* (2021.01)
*H01M 50/367* (2021.01)
(Continued)

(52) U.S. Cl.
CPC ....... *H01M 50/333* (2021.01); *H01M 50/367* (2021.01); *H01M 50/325* (2021.01); *H01M 50/394* (2021.01)

(58) Field of Classification Search
CPC ............. H01M 50/325; H01M 50/333; H01M 50/367; H01M 50/394
See application file for complete search history.

(56) References Cited

U.S. PATENT DOCUMENTS 11,662,036 B2 5/2023 Zhang et al.
12,062,808 B2 8/2024 Zbiral et al.
(Continued)

FOREIGN PATENT DOCUMENTS

DE 102013209702 A1 11/2014
DE 102019215433 A1 4/2021
(Continued)

OTHER PUBLICATIONS

International Search Report and Written Opinion issued in International Application No. PCT/EP2023/025276, mailed Oct. 6, 2023, 11 pages.

(Continued)

*Primary Examiner* — Lingwen R Zeng
(74) *Attorney, Agent, or Firm* — Talem IP Law, LLP

(57) ABSTRACT

A valve arrangement for a battery case includes a valve body adapted for connection to the battery case; a valve member moveable along a valve axis relative to the valve body; a membrane carried with the valve member for allowing gas to move in and out of the battery case when the valve
(Continued)

member is in a closed position; and a cap adapted to be mounted to the valve body to inhibit fluid flow.

20 Claims, 82 Drawing Sheets

Related U.S. Application Data

(60) Provisional application No. 63/501,018, filed on May 9, 2023, provisional application No. 63/479,864, filed on Jan. 13, 2023, provisional application No. 63/380,783, filed on Oct. 25, 2022, provisional application No. 63/375,333, filed on Sep. 12, 2022, provisional application No. 63/390,899, filed on Jul. 20, 2022, provisional application No. 63/351,211, filed on Jun. 10, 2022, provisional application No. 63/351,185, filed on Jun. 10, 2022.

(51) Int. Cl.
*H01M 50/30* (2021.01)
*H01M 50/325* (2021.01)

(56) References Cited

U.S. PATENT DOCUMENTS

2016/0036025 A1* 2/2016 Hofer .................. H01M 50/325
429/56
2022/0090692 A1* 3/2022 Zhang ................. H01M 50/249

FOREIGN PATENT DOCUMENTS

EP 3906588 A1 11/2021
EP 3982021 A1 4/2022
WO 2022041847 A1 3/2022

OTHER PUBLICATIONS

Donaldson Company, Inc. "Donaldson Extends Battery Vent Range with Dual-Stage Jet; New Dual-Stage Jet Battery Vent Takes Degassing Rates to Unmatched Levels While Reducing Cost and Complexity for OEMs" Retrieved on Dec. 2, 2024, 4 pages, Retrieved from: https://www.donaldson.com/en-be/venting/news/dual-stage-jet-battery-vent/.

* cited by examiner

300
FP1
G
302
304
305
310
315
316
318
320
321
322
323
325
326
330
332
334
335
336
338
340
346
350
352
354
362
368
370
384

300
374
375
373
340
354
304
316
330
368
335
370
305
338
323
332
352
324,
358
346
325
320
306,
317
326
310
303
308,
312
322
390,
342
350
362
302

300
360
314
309
340
304
330
338
321
335
305
370
336
368
332
323
352
324,
358
325
346
320
334
316
306,
317
326
310
354
308,
312
322
390,
342
350
302
362
311
374

300
FP2
340
304
384
338
321
315
334
305
370
336
332
368
323
352
324,
358
325
346
320
330
316
336
335
310
326
306,
317
308,
312
354
350
322
390,
342
302
362

300
302
362
322
326
376
346
325
320
368
323
316
330
352
332
336
305
338
321
384
304
372
370
340
378
382
380
G
FP3
315
335
334

500
526
550
554
540
FP5
541
560
575
509
542
G
504
503
521
568
518
570
532
515
525
530
520
517
506
559
516
510
522
502
562
575
573
574

500
582
578
580
526
560
514
509
540
542
G
572
521
503
518
FP6
532
505,
535
515
530
504
576
524,
558
516
517
506
508,
512
520
559
522
510
541
502
562
529

900
924
942
948
940
927
930,
930a
928
956
934
932
958
933
904
915
922
936
952
929
954
910
908
912
925
920,
946
950
916
902
906
931
944

900
924
942
940
927
930, 930b
960
968
958
929
934
970
932
922
974
904
972
956
954
925
928
910
908
912
962
906
920
950
916
944
902

100
924
942
940
927
930,
930b
960
988
996
958
929
990
934
982
922
984
938,
976
932
904
978,
986
956
954
925
928
908
910
912
962
906
920
950
916
944
902

900
924
920
940
927
930,
930b
960
968
958
934
970
934
904
938,
964
972
956
954
925
928
910
908
912
950
916
906
902
944
CASE/ENCLOSURE 900
954
200
922
924
925
202
920
942
950
210
206
902
212
940
207
960
220
932
218
238
904
905
938,
964
232
934
910
914
908
912
962
929
FP16

LEAK CHECKING ENCLOSURES VIA VALVES FOR VENTING OR PRESSURE RELIEF

CROSS-REFERENCE TO RELATED APPLICATIONS

This application is a continuation of International Application No. PCT/EP2023/025276, filed Jun. 9, 2023, which claims priority to: U.S. Provisional Patent Application Ser. No. 63/351,211, filed Jun. 10, 2022; U.S. Provisional Patent Application Ser. No. 63/351,185, filed Jun. 10, 2022; U.S. Provisional Patent Application Ser. No. 63/390,899, filed Jul. 20, 2022; U.S. Provisional Patent Application Ser. No. 63/375,333, filed Sep. 12, 2022; U.S. Provisional Patent Application Ser. No. 63/380,783, filed Oct. 25, 2022; U.S. Provisional Patent Application Ser. No. 63/479,864, filed Jan. 13, 2023; Indian Provisional Patent Application Ser. No. 202311014566, filed Mar. 4, 2023; Indian Provisional Patent Application Ser. No. 202311018908, filed Mar. 20, 2023; Indian Provisional Patent Application Ser. No. 202311027580, filed Apr. 14, 2023; and U.S. Provisional Patent Application Ser. No. 63/501,018, filed May 9, 2023; all of the disclosures of which are incorporated herein by reference in their entirety.

BACKGROUND

An enclosure, such as a battery case enclosing a battery, may have a need to passively vent various gasses over the lifetime of the battery. Current battery ventilation modules may use a custom over molded seal and seat within the device. Additionally, a battery case may be subject to an overpressure scenario in which the battery causes the pressure in the battery case to rise above a safe level, which may result in damage to or rupture of the battery case. Further, during an overpressure scenario, relief fluids may come into contact with a membrane or element which facilitates the ventilation; the composition of the relief fluids may be damaging to the materials of the membrane.

The enclosure may need to be checked for leaks after or during manufacture. Current enclosures have a through hole which is used to perform an end of line leak check at the end of the manufacturing process of the enclosures. After the end of line leak check is performed, a passive vent is installed into the through hole of the enclosure. The through hole where this passive vent is installed cannot be leak checked. Instead, performing another leak check on the enclosure either would require the creation of another through hole or would add an additional step (for example, removing the passive vent, performing the leak check, and then reinstalling the passive vent after the leak check).

A device which can provide a way to ventilate the battery case, provide for pressure relief, provide for leak checking, and/or protect the membrane from relief fluids during pressure relief may be beneficial.

SUMMARY

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

Aspects of the present disclosure relate to a valve for a case (e.g., an electrical enclosure, a battery case, etc.) and method of leak checking the case through the valve. The valve enables a leak check to be performed on the case through the valve. For example, an end of line leak check can be performed on the case at the end of a manufacturing line for the case after the valve is installed. The leak check is performed by attaching and sealing a leak check fixture to the valve and moving a blocking member within the valve to an unblocking position to open a testing flow path through the valve. In some examples, the leak check pressurizes the case through the valve. In other examples, the leak check pulls a vacuum within the case through the valve.

In certain implementations, the blocking member is biased to the blocking position, which closes the testing flow path. In some examples, the blocking member includes a resilient member that has an inherent material bias to retain a position. For example, the resilient member may be an umbrella valve. In other examples, the blocking member is biased to the blocking position using a spring. In still other examples, the blocking member is attached to a valve cap or other component, which is itself biased by a spring.

In certain implementations, attachment of the test fixture to the valve depresses the valve cap, which pushes the blocking member within the valve to the unblocking position, thereby opening the testing flow path. In certain examples, the valve cap is biased to an undepressed position. In certain examples, the valve cap includes an actuation inhibitor that interacts with the valve body separate from the bias to inhibit depression of the valve cap absent a predetermined amount of force. The actuation inhibitor reduces the likelihood of opening the testing flow path accidentally.

In certain implementations, the valve also is configured to provide pressure relief during thermal runaway or another pressure spike event. For example, a gateway member is disposed within the valve to open and close a relief flow path through the valve. At least a portion of the relief flow path is different from the testing flow path. The relief flow path may include the testing flow path. The gateway member is movable between scaling and unsealing positions independent of the attachment of a test fixture. The gateway member is biased to the sealing position. The bias applied to the gateway member is set to be overcome by pressurized relief fluids during an explosion or other pressure spike event.

In certain implementations, the blocking member is mounted to and carried by the gateway member. In some examples, the gateway member includes a relief disc and the blocking member includes a poppet movable relative to the relief disc. In other examples, the gateway member includes a pivoting gate and the blocking member includes a door that pivots relative to the gate.

In certain implementations, a hydrophobic membrane is disposed within the valve to provide a vent flow path that is different than the testing flow path and the relief flow path. Both the testing flow path and the relief flow path allow at least some fluid to bypass the vent flow path through the valve. In certain examples, the vent flow path is restricted compared to the testing flow path. In certain examples, the vent flow path is restricted compared to the relief flow path.

In certain implementations, one or more valves can be mounted to a manifold. In certain examples, only one of the valves mounted to the manifold is configured to enable performance of a leak check therethrough. In certain examples, a connector (e.g., an electrical connector) also can be disposed at the manifold. In certain examples, the manifold can include a flame arrestor.

In some aspects, a valve arrangement for a battery case includes a valve body adapted for connection to the battery case; a valve member moveable along a valve axis relative to the valve body; a membrane carried with the valve member for allowing gas to move in and out of the battery case when the valve member is in a closed position; and a cap adapted to be mounted to the valve body to inhibit fluid flow.

In certain implementations, a membrane protective member is used for blocking fluid communication through the membrane during a pressure variation within the battery case.

In some aspects, the techniques described herein relate to a method for leak testing a case to which a valve is mounted, the method including: installing the valve to the case, wherein the blocking member blocks a first flow path through the valve when disposed in the blocking position and opens the first flow path when disposed in the unblocking position, the valve being installed while the blocking member is disposed in the blocking position; after installing the valve to the case, sealing a leak check fixture against an exterior of the valve body; after sealing the leak check fixture, opening the first flow path by moving the blocking member to the unblocking position; and after opening the first flow path, using the leak check fixture to perform a leak check of the case through the valve. In certain implementations, the method further includes, prior to leak testing the case, mounting a sealing cap over a second valve to close any apertures through the second valve, the sealing cap not covering a sealing interface between the second valve and the case.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and constitute a part of the description, illustrate several aspects of the present disclosure. A brief description of the drawings is as follows.

Non-limiting and non-exhaustive examples are described with reference to the following Figures.

DETAILED DESCRIPTION

Figure 2:
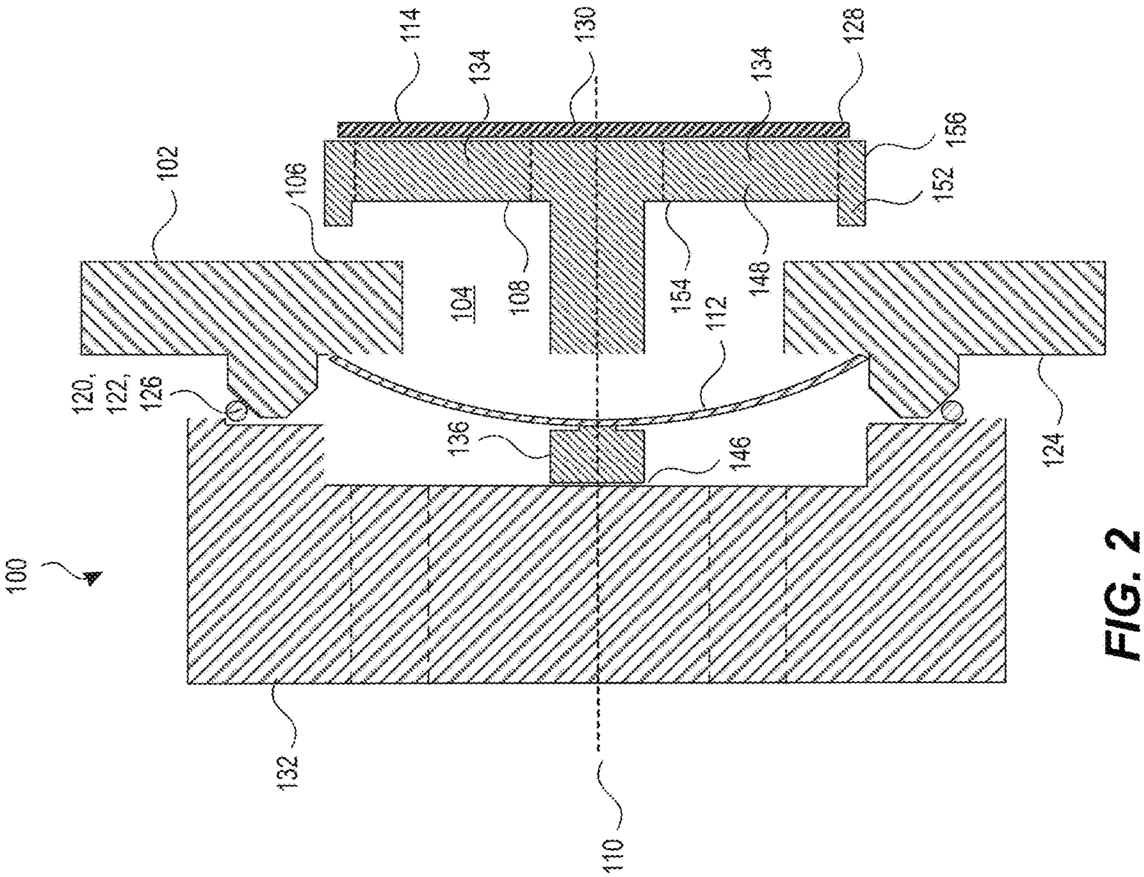
FIG. 2 illustrates a cross-sectional view of the valve arrangement of FIG. 1, showing the valve arrangement in an open position, including a test fixture, according to an example.

Reference will now be made in detail to exemplary aspects of the present disclosure that are illustrated in the accompanying drawings. Wherever possible, the same reference numbers will be used throughout the drawings to refer to the same or like parts.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. The following detailed description is therefore not to be taken in a limiting sense, and the scope of the present disclosure is defined by the appended claims and their equivalents.

The present disclosure relates to a valve through which a leak check (e.g., an end-of-line leak check) can be performed on a case (e.g., an electrical case or a battery case). The valve is attached to the case so that an exterior of the valve seals to the case. A blocking member disposed within the valve opens and closes a testing flow path through the valve. In certain implementations, the blocking member is biased to the blocking position, which closes the testing flow path.

A case (for example, a battery case enclosing a battery, an enclosure surrounding electrical components, or other similar case) may have a need to passively vent various gasses, e.g., air, over the lifetime of the battery or other electrical components. For example, changes in ambient temperatures in the environment around the case, exposure to sunlight, or exposure to heat from a machine or automobile, can cause the gas within the battery case to expand. The present disclosure relates to a valve which, as described herein, allows gas to move in and out of the case through the valve. In certain examples, the valve includes a gas-permeable membrane through which the gas may pass.

In certain implementations, the gas-permeable membrane (e.g., hydrophobic) is disposed within the valve to provide a vent flow path that is different than the testing flow path. The testing flow path allows at least some fluid to bypass the vent flow path through the valve when the testing flow path is open. In certain examples, the vent flow path is restricted compared to the testing flow path. The valve including the membrane (i.e., a vent valve) allows gas to move in and out of a case or enclosure onto which it is installed through the valve by way of the gas-permeable membrane. In some examples, the membrane is hydrophobic to prevent water from entering the case through the valve.

In certain implementations, the valve (e.g., a vent valve, a valve without a gas-permeable membrane, etc.) as described herein also provides a way to leak check the case after the valve has been installed without having to install an added vent or to remove the disclosed valve from the case. For example, the valve enables the performance of an end-of-line leak check at the end of the manufacturing process of the case. Performing the leak check using the valve allows for the valve itself as well as the case to be tested for integrity, thus ensuring a secure case/enclosure. In certain implementations, one or more additional valves also can be installed at the case during the leak check so that the integrity of those valves and the sealing interfaces between those valves and the case also can be checked.

These and other examples will be explained in more detail below with respect to FIG. 1-FIG. 82.

Figure 1:
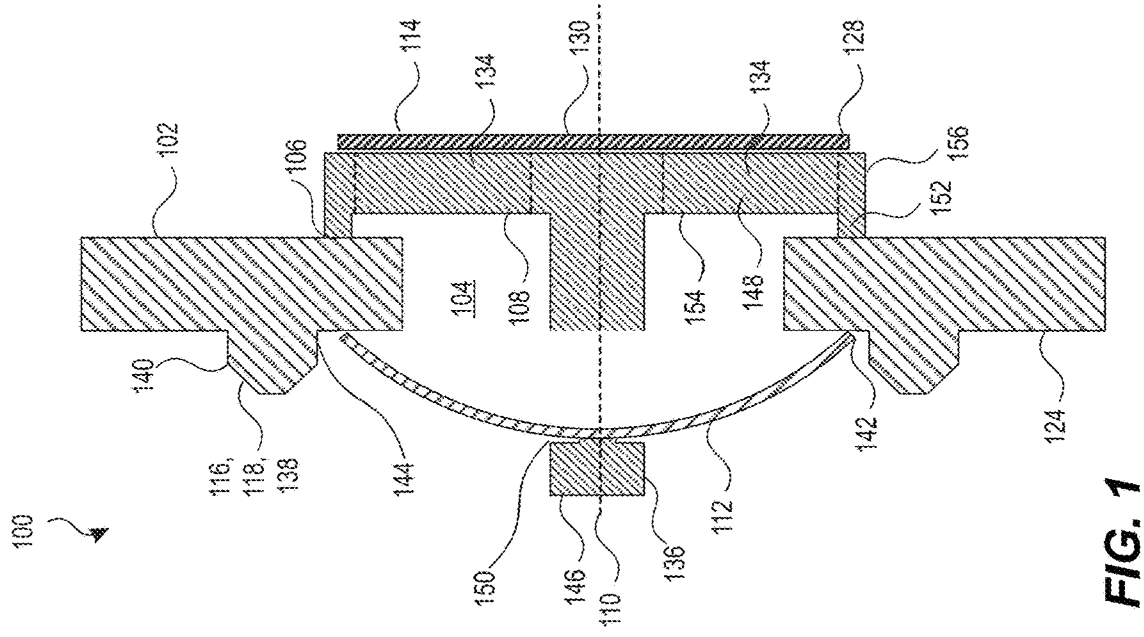
FIG. 1 illustrates a cross-sectional view of an embodiment of a valve arrangement usable with an enclosure, constructed in accordance with principles of this disclosure, according to an example.

In accordance with principles of this disclosure, a valve (e.g., a vent valve) usable with an enclosure or case is provided in FIG. 1 through FIG. 2. Preferably, the valve as shown is for leak testing an enclosure such as a battery case or a power electronic enclosure, and for allowing gasses to move (breathe) through the valve during normal operations of the battery or electronics within the enclosure. FIG. 1 illustrates a cross-section view of an embodiment of a valve 100 arrangement usable with an enclosure.

A valve arrangement 100 is configured to be mounted to a case/enclosure, such as a battery case or a power electronic enclosure. In some examples, installing the valve arrangement 100 to the case/enclosure includes installing the valve arrangement 100 to a connection port of the case/enclosure. The valve arrangement 100 includes a valve body 102, which is adapted for connection to the case.

The valve body 102 defines a valve passage 104. A valve seat 106 surrounds the valve passage 104. An exterior 124 of the valve body includes a leak check seal interface 116 having a first side 118. In some examples, the leak check seal interface 116 is on a beveled outer edge 138 of a raised wall 140. Raised wall 140 extends from an exterior 124 of valve body 102 and is concentric with valve passage 104.

Valve arrangement 100 includes a blocking member such as poppet valve member 108 which is moveable along a valve axis 110 relative to the valve body 102 between a closed position (FIG. 1) and an open position (FIG. 2). The poppet valve member 108 is configured to seal against the valve seat 106 to close the valve passage 104 when in the closed position; the valve passage 104 being open when the poppet valve member 108 is in the open position.

In this embodiment, poppet valve member 108 includes a stem portion 136 and a disc portion 148. Stem portion 136, extends from the disc portion 148 through valve passage 104, parallel (or, in some cases, co-axial) to valve axis 110. In some examples, stem portion 136 is cylindrical in shape.

In some examples, disc portion 148 of poppet valve member 108 includes a seal ring 152. Seal ring 152 extends from a biasing element-facing surface 154 of disc portion 148 at or near a disc perimeter 156 of disc portion 148. Seal ring 152 is configured to contact valve seat 106 when the valve poppet member 108 is in the closed position.

Valve arrangement 100 includes a biasing element 112 for biasing the poppet valve member 108 toward the closed position. In some examples, biasing element 112 is a spring, for example a leaf spring or a disc spring. In some examples, biasing element 112 is configured so that its outer perimeter

142 contacts exterior 124 or valve body 102 near an inner side 144 of raised wall 140. In some examples, biasing element 112 is connected to stem portion 136 of poppet valve member 108 at a perimeter groove 150 of stem portion 136.

Valve arrangement 100 includes a membrane 114 for allowing gas to move in and out of the case when the poppet valve member 108 is in the closed position. Membrane 114 is permeable or semi-permeable to air and other gasses or mixtures of gasses found within the case/enclosure. In some examples, membrane 114 is hydrophobic to prevent water from entering the case/enclosure from the environment external of the valve arrangement.

In some examples, membrane 114 is carried with the poppet valve member 108. In some examples, poppet valve member 108 includes air flow openings 134 or holes, to allow air and other gasses to pass from the case through the air flow openings 134 in the poppet valve member 108. In some examples, air flow openings 134 are spaced circumferentially around poppet valve member 108. In some examples, air flow openings are evenly spaced around poppet valve member 108.

In some examples, seal integrity between the poppet valve member 108 and the valve seat 106 and between the membrane 114 and the poppet valve member 108 are initially tested before the valve arrangement 100 is installed to the case. In some examples, the valve arrangement 100 is installed to the case after the initial testing of seal integrity.

In some examples, membrane 114 includes a layer of PTFE. In some examples, initially testing seal integrity includes testing seal integrity between the layer of PTFE and the poppet valve member 108. In some examples, initially testing seal integrity includes contacting the poppet valve member 108 with a perimeter region 128 and a center region 130 of the membrane 114.

Referring to FIG. 2, leak testing the case while the valve arrangement 100 is installed on the case includes moving the poppet valve member 108 to the open position, sealing against an exterior 124 of the valve body 102 with a test fixture 132, and using the test fixture 132 to pressurize an interior of the case through the valve passage 104 while the poppet valve member 108 is in the open position.

In some examples, the test fixture 132 contacts an external surface 146 of stem portion 136 of the poppet valve member 108 so that valve arrangement 100 is open.

The step of sealing against the exterior 124 of the valve body 102 can include contacting the first side 118 of the leak check seal interface 116 against a second side 120 of a sealing fixture 122. In some examples, sealing against the exterior 124 of the valve body includes scaling against sealing fixture 122.

The sealing fixture 122 can include an O-ring seal member 126, in which the O-ring 126 has a round cross section.

Leak testing the case further includes sealing the test fixture 132 and valve arrangement 100 when a predetermined target pressure is achieved within the interior of the case. Pressure within the case is monitored for a predetermined amount of time.

The predetermined target pressure and/or predetermined amount of time can be determined so as to prevent leakage, damage, rupture, explosion, or other damage to the case/enclosure and/or batteries/materials/electronics enclosed within the case/enclosure.

Based on the pressure within the case remaining within a predetermined threshold of the predetermined target pressure for the predetermined amount of time, pressure within the case can be released via the test fixture 132. Test fixture 132 is withdrawn so that it is removed from the exterior 124 of the valve body 102 and is no longer in contact with stem portion 136. Poppet valve member 108 returns to a closed position, with seal ring 152 contacting valve seat 106.

In accordance with aspects of the disclosure, a case may be subject to an overpressure scenario (e.g., during a thermal runaway of a battery within the case) in which the pressure in the case rises above a predetermined safe level, which may result in damage to or rupture of the case. In certain implementations, the valve is configured to provide for pressure relief during such a pressure spike/relief scenario by releasing relief fluids (i.e., the air and/or liquid exiting the case during the overpressure scenario). In some examples, the relief fluid includes excess gas, such as air. In other examples, the relief fluid may include liquids (e.g., battery acid), two-phase flow, or other flowable material. In certain implementations, a valve relief disc member is configured to move from a closed position to an open position as will be described in more detail herein to allow the relief fluids to flow out of the case.

During an overpressure scenario, relief fluids may come into contact with the membrane. The composition of the relief fluids can be damaging to the materials of the membrane. In certain examples, the valve includes a disc, plate, cage, or other protective member to protect the membrane in the event of a pressure spike/relief scenario.

An example valve suitable for use with an enclosure 374, 574 (e.g., a battery case, electronics enclosure, or another suitable case, enclosure, or container) is provided in FIG. 3 to FIG. 16. In certain implementations, the valve arrangement 300, 500 is configured to relieve excess pressure within the case 374, 574. In certain implementations, the valve arrangement 300, 500 is configured to allow gasses to move (e.g., breathe) through the valve arrangement 300, 500 during normal operation of the enclosure 374, 574 (e.g., during normal operation of the battery). In certain implementations, the valve arrangement 300, 500 is configured to enable leak testing of the enclosure 374, 574. In certain implementations, the valve arrangement 300, 500 also is configured to provide both excess pressure relief and leak testing.

Figure 6:
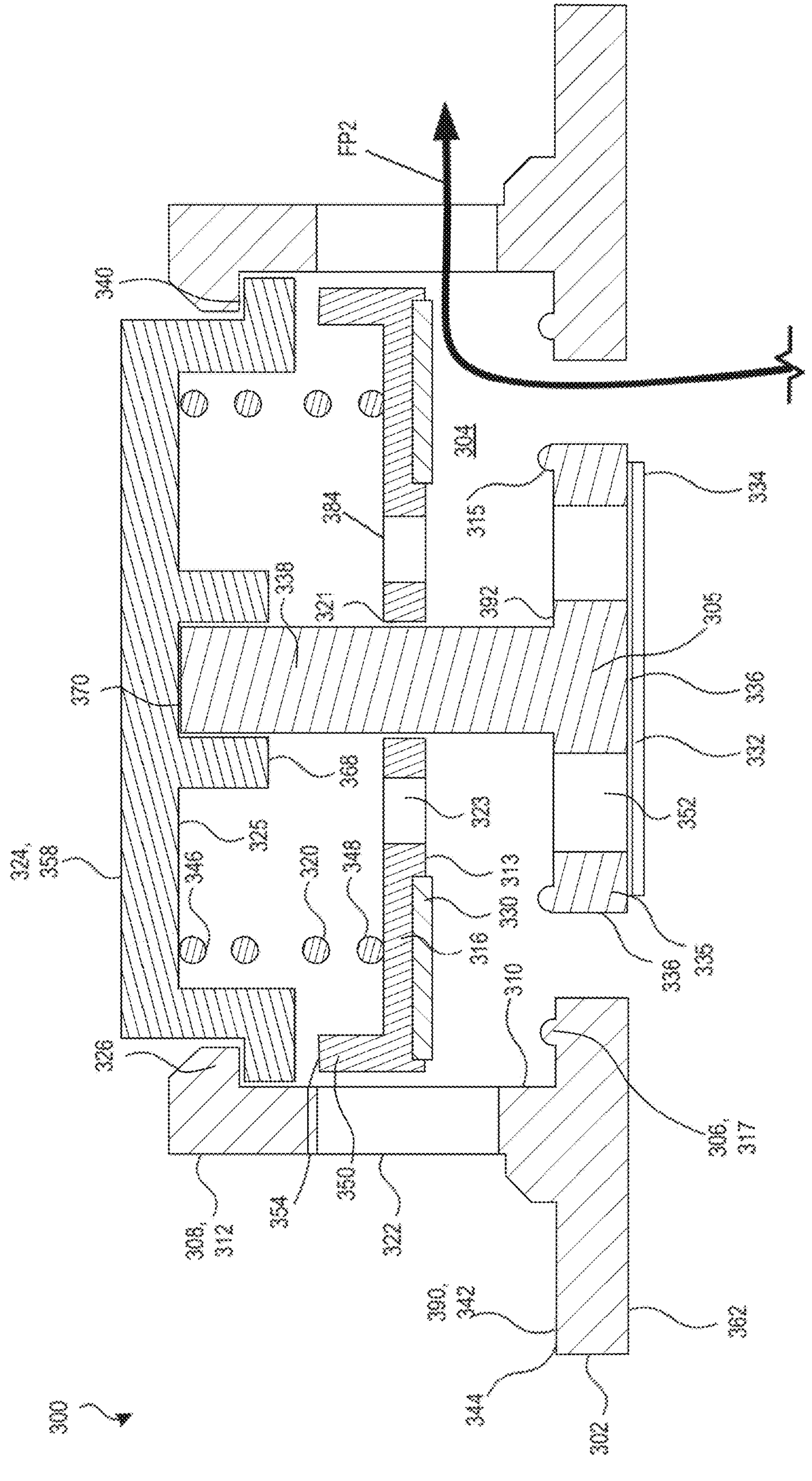
FIG. 6 illustrates a cross-sectional view of the valve arrangement of FIG. 3, showing the valve arrangement in an open relief position, according to an example, according to an example.
Figure 7:
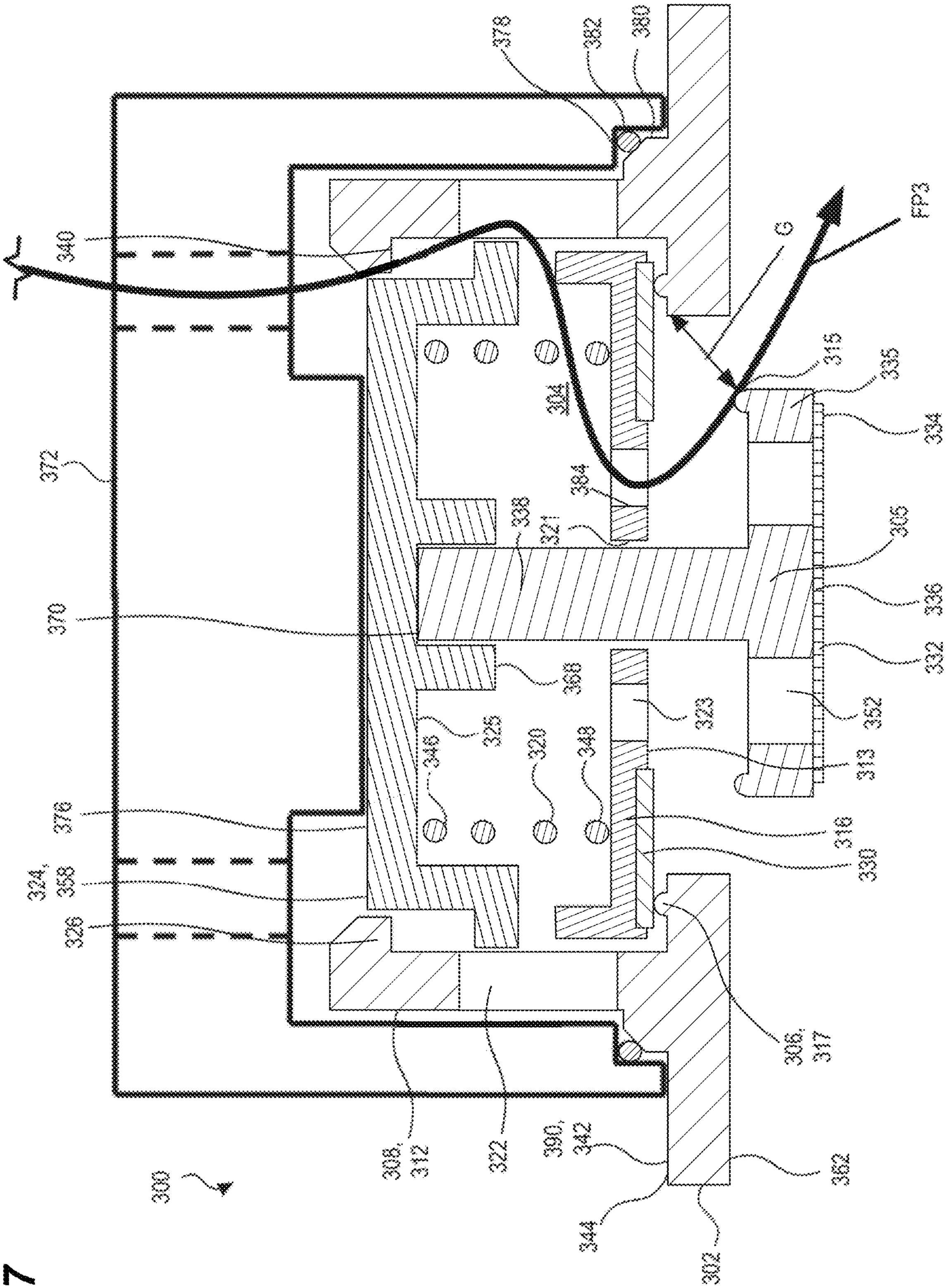
FIG. 7 illustrates a cross-sectional view of the valve arrangement of FIG. 3, showing the valve arrangement in an open test position, according to an example, according to an example.

In certain implementations, the valve arrangement 300 is configured to provide a first flow path FP1 (i.e., a vent flow path) for passive venting during normal operation (see FIG. 3), to provide a second flow path FP2 (i.e., a relief flow path) during an overpressure event (see FIG. 6), and/or to provide a third flow path FP3 (i.e., a testing flow path) during a leak check (see FIG. 7). The first, second, and third flow paths FP1, FP2, FP3 are different from each other. In certain examples, the flow paths FP1, FP2, FP3 have overlapping portions and have non-overlapping portions as will be described in more detail herein.

Figure 3:
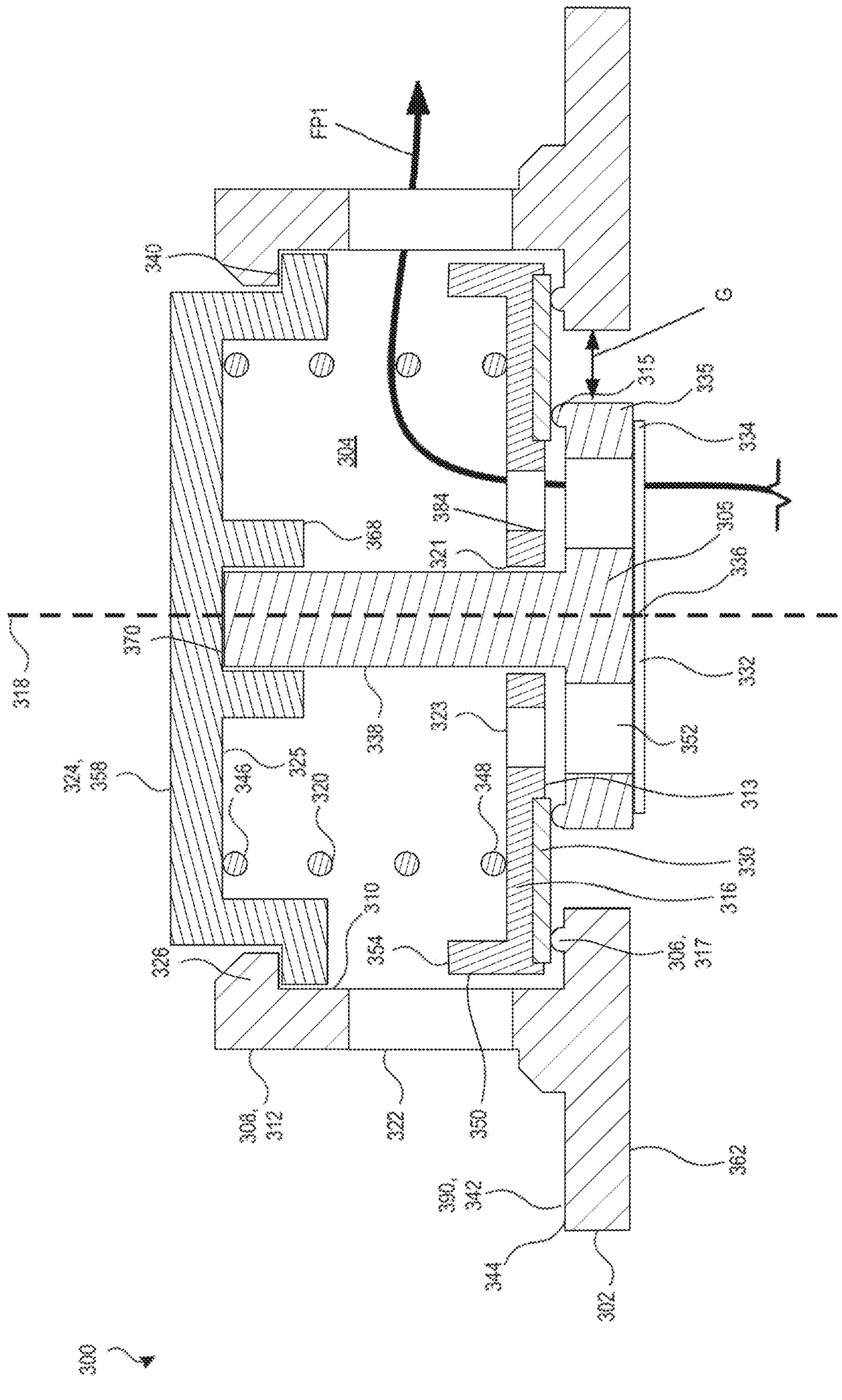
FIG. 3 illustrates a cross-sectional view of an embodiment of a valve arrangement usable with a case, shown in a closed position, constructed in accordance with principles of this disclosure, according to an example, according to an example.

FIG. 3 is a schematic diagram of an example valve arrangement 300 usable with an enclosure 374, such as a battery case. The valve arrangement 300 is mountable at an aperture 375 defined in an outer wall of the enclosure 374. The aperture 375 leads to an interior 373 of the enclosure 374, which houses one or more components such as a battery. The valve arrangement 300 includes a valve body 302 defining a port 303 that aligns with the aperture 375 of the enclosure 374 when the valve body 302 mounts to the enclosure 374. An outer wall 308 surrounds the port 303 and extends along a valve axis 318. The valve arrangement 300 defines an interior 304 extending between the port 303 and the outer wall 308. The interior 304 provides a path for gas (vented during normal operation) and relief fluids (vented during an overpressure event) to move between the enclosure 374 and the external environment outside of the enclosure 374. In some examples, the outer wall 308 is roughly cylindrical in shape but could be a variety of alternative shapes in other examples.

The wall 308 includes opposite interior and exterior surfaces 310, 312. At least a portion of the interior surface 310 is in communication with the vent interior 304. At least a portion of the outer wall 308 is permeable to fluids, such as gas and liquid. For example, in certain implementations, the outer wall 308 defines one or more openings 322 that extend between the interior and exterior surfaces 310, 312 of the outer wall to enable relief fluids to pass therethrough. The openings 322 connect the interior 304 of the valve arrangement 300 to an exterior of the vent arrangement 300. The openings 322 can be round, slotted, or any other desired shape. In certain examples, the openings 322 are circumferentially spaced around the surrounding wall 308. In an example, the openings 322 are evenly spaced around the surrounding wall 308. In an example, the openings 322 are equal in size to each other. In an example, the openings 322 differ in size from one another.

In certain implementations, a gateway member such as a valve relief disc member 316 is disposed within the vent interior 304 and is moveable relative to the outer wall 308 along the valve axis 318 between a first closed position and a first open position. The valve relief disc member 316 is configured to close the second flow path FP2 when in the first closed position and to open the second flow path FP2 when in the first open position. A biasing element 320 biases the valve relief disc member 316 toward the first closed position. The valve relief disc member 316 is configured to move from the first closed position to the first open position against the bias of the biasing element 320 when a pressure in the enclosure 374 exceeds a predetermined level. The predetermined level can be determined so as to prevent leakage, damage, rupture, explosion, or other damage to the battery case and/or battery enclosed within the case. High pressure in the battery case can be caused by warm external temperatures, battery malfunction, thermal runaway, or other causes.

In certain implementations, the valve relief disc member 316 defines one or more through-passages 384. Accordingly, when the valve relief disc member 316 is disposed in the closed position, fluid (e.g., gases) can pass through the through-passage(s) 384 to flow between the port 303 and the outer wall 308. As will be described in more detail with reference to FIG. 7, fluid flowing along the third flow path FP3 also may pass through the through-passage(s) 384 to pass through the valve disc relief member 316.

In certain implementations, a blocking member such as a valve test poppet member 305 is moveable along the valve axis 318 relative to the valve body 302 between a second closed position and a second open position. The valve test poppet member 305 is configured to seal against the valve relief disc member 316 when the valve relief disc member 316 is disposed in the first closed position and the valve test poppet member 305 is disposed in the second closed position. Moving the valve relief disc member 316 to the first open position opens the second flow path FP2 regardless of the position of the valve test poppet member 305. Moving the test poppet member 305 to the second open position while the valve relief disc member 316 is disposed in the first closed position opens the third flow path FP3. Moving both the valve disc relief member 316 and the test poppet to the respective open positions (e.g., if an overpressure event occurred during a leak test) would open the second flow path FP2.

In certain implementations, the valve test poppet member 305 includes a vent portion 335 that aligns with the port 303 of the valve housing 302. The vent portion 335 defines one or more through-passages 352. The through-passages 352 enable fluid to pass through the vent portion 335 of the valve test poppet member 305 even when the valve test poppet member 305 is disposed in the second closed position. Thereby, fluid can flow in and out of the enclosure 374 through the port 303 (e.g., along the first or third flow paths FP1, FP3) even when the valve test poppet member 305 is disposed in the second closed position. In certain examples, the one or more through-passages 352 of the valve test poppet member 305 align with the one or more through-passages 384 of the valve relief disc member 316 to enhance fluid flow therethrough.

In certain examples, the through-passages 384 of the disc 316 provide a more restricted flow path than the through-passages 352 of the test poppet 305. In certain examples, a cross-sectional area of each through-passage 384 is smaller than a cross-sectional area of each through-passage 352. In other examples, a total cross-sectional area of all of the through-passages 384 is smaller than a total cross-sectional area of all of the through-passages 352.

In certain examples, the first flow path FP1 extends through the through-passages 352 of the valve test poppet member 305 and the through-passages 384 of the valve relief disc member 316. In certain examples, the second flow path FP2 does not extend through either of the through-passages 352, 384. In certain examples, the third flow path FP3 extends through the through-passages 384 of the valve relief disc member 316, but does not extend through the through passages 384 of the valve test poppet member 305.

In certain implementations, the valve test poppet member 305 is biased to the second closed position by a biasing element. In certain examples, the valve test poppet member 305 is biased in an opposite direction from the valve relief disc member 316. In certain examples, the biasing element that biases the valve test poppet member 305 to the second closed position is the same biasing element 320 that biases the valve relief disc member 316 to the first closed position.

In certain implementations, a permeable element is carried with the valve test poppet member 305 between the second closed position and the second open position. In an example, the permeable element is a membrane 332. The membrane 332 may, in some embodiments, be a flat disc or sheet. The membrane 332 extends across the through-passages 352. The membrane 332 is permeable to air and to gases emitted by the battery or other components within the enclosure 374. Accordingly, the membrane 332 enables gas to move through the membrane 332 to pass through the through-passages 352 of the valve test poppet member 305. In some examples, the membrane 332 is hydrophobic. In certain examples, the membrane 332 includes polytetrafluoroethylene (PTFE). In certain examples, the membrane 332 includes a layer of PTFE calendared onto it. By the term "calendared", it is meant: two or more layers of similar or dissimilar materials joined together in a process using pistons/cylinders/rollers to apply pressure and/or heat. In some examples, the membrane 332 includes a layer of PTFE heat staked onto it.

In certain implementations, the test poppet member 305 is configured to support the membrane 332 around at least a perimeter 334 of the membrane 332. In some examples, test poppet member 305 is configured to support the membrane 332 at the center 336 of the membrane 332. The valve test poppet member 305 includes one or more openings 352 in it above membrane 332 to allow for the passage of gas up through the test poppet member 305 and through membrane 332, and the valve relief disc member 316 includes one or more openings 323 to allow for the passage of gas up through the valve relief disc member 316, while test poppet member 305 is in the closed position and valve relief disc member 316 is in the closed position. In some examples, the openings 323 are circumferentially spaced around the valve relief disc member 316. In the illustrated example, openings 323 are evenly spaced around the valve relief disc member 316. In some examples, the openings 352 are circumferentially spaced around the test poppet member 305. In the illustrated example, openings 352 are evenly spaced around the test poppet member 305.

In certain implementations, the vent portion 335 of the valve test poppet member 305 is configured to be disposed within the port 303 when in the second closed position and to be spaced from the port 303 along the axis 318 when in the second open position. In certain implementations, the vent portion 335 has a smaller cross-dimension (e.g., diameter) than the port 303 so that a gap G extends between an outer periphery of the vent portion 335 and the inner periphery of the port 303. In certain examples, the gap G is sealed when the valve relief disc member 316 is disposed in the first closed position and the valve test poppet member 305 is disposed in the second closed position. The first flow path FP1 does not flow through the gap G. Instead, the first flow path FP1 flows through the through-passages 384, 352. Moving either of the valve relief disc member 316 or the valve test poppet member 305 to the respective open position unseals the gap G. Both the second and third paths FP2, FP3 pass through the gap G. However, the second path FP2 does not require fluid to pass through the valve relief disc member 316 while the third path FP3 does require fluid to pass through the valve relief disc member 316 as will be described in more detail herein.

In certain implementations, a cap 324 attaches to the valve body 302 to close the interior 304. In certain examples, the cap 324 extends parallel with the valve relief disc member 316. In certain examples, the cap 324 is movable relative to the valve body 302 along the valve axis 318 between first and second positions to change the size of the interior 304. In certain examples, the valve test poppet member 305 attaches to the valve body 302 via the cap 324 and the cap 324 carries the valve test poppet member 305 therewith between the second open and second closed positions as the cap 324 moves relative to the valve body 302.

For example, the test poppet member 305 may include a stem portion 338 that extends upwardly from the disc portion 335. The stem portion 338 extends through the pressure relief disc 316 to reach the cap 324 so that the pressure relief disc 316 is disposed between the disc portion 335 of the test poppet member 305 and the cap 324. In certain examples, the stem portion 338 extends from the disc portion 335, through a stem opening 321 of valve relief disc member 316, through the interior of the valve body 302, to the cap 324. In certain examples, an inner surface 325 of the cap 324 includes a guide ring 368 which surrounds a stem end 370 of stem portion 338. In certain examples, guide ring 368 is a cylindrical wall, with its center at the center of cap 324. In certain examples, guide ring 368 is concentric with valve axis 318. In certain examples, stem opening 321 is in the center of valve relief disc member 316. In some examples, stem portion 338 extends parallel (or, in some cases, co-axial) to valve axis 318. In certain examples, stem portion 338 is cylindrical in shape. In certain examples, stem end 370 is connected to inner surface 325 of cap 324 (for example, by welding, soldering, bonding, or other appropriate connecting means). In some examples, stem end 370 is connected to guide ring 368 (for example, by welding, soldering, bonding, or other appropriate connecting means).

In certain examples, the biasing element 320 biases the cap 324 to the first position, thereby indirectly biasing the valve test poppet member 305 to the second closed position. In such examples, the valve test poppet member 305 can be moved to the second open position by moving the cap 324 against the bias of the biasing member 320. Movement of the cap 324 towards the second position (and the test poppet 305 towards the second open position) may increase the biasing force on the pressure relief disc 316 towards the first closed position. However, in certain examples, the biasing element 320 is configured so that positioning the cap 324 in the second position does not prevent movement of the pressure relief disc 316 towards the first open position.

In certain implementations, the cap 324 includes an extended portion 358 which extends over or across a cross-dimensional area of the valve body interior 304 to close the interior 304. In certain examples, the extended portion 358 defines a first spring stop configured to receive a first end of a spring type biasing element 320. In certain examples, the valve pressure relief disc 316 defines a second spring stop configured to receive an opposite second end of the spring type biasing element 320 so that the biasing element biases the cap 324 away from the pressure relief disc 316. In certain implementations, the valve body 302 is configured to limit movement of the cap 324 along the valve axis 318. For example, the valve body 302 may include an interior shoulder 340 or other stop surface (e.g., defined by a radially inwardly extending flange 326) and the cap 324 may include an outer flange or ring that abuts the interior shoulder 340 when the cap 324 is disposed in the first position to limit movement of the cap 324 out of the valve body 302 in a first direction. The cap 324 and/or pressure relief disc 316 may be sized larger than the port 303 to limit movement of the cap 324 and/or pressure relief disc 316 out of the valve body 302 in an opposite second direction.

In accordance with principles of this disclosure, valve body 302 of valve arrangement 300 includes a valve seat 306 surround the port 303. The valve seat 306 provides a surface against which the valve relief disc member 316 can seat when in the first closed position. The valve relief disc member 316 is biased by the biasing element 320 to seal against the valve seat 306. In certain examples, the valve seat 306 is molded to the top surface 342 of the valve body 302. In certain implementations, the valve test poppet member 305 defines a second valve seat (poppet seat) 315 that is concentric with the valve seat 306. The poppet seat 315 moves relative to the valve seat 306 as the valve test poppet member 305 moves along the valve axis 318. In certain examples, the poppet seat 315 radially aligns with the valve seat 306 when the valve test poppet member 305 is disposed in the second closed position and is spaced along the valve axis 318 from the valve seat 306 when the valve test poppet member 305 is disposed in the second open position.

In certain implementations, the pressure relief disc 316 carries a seal 330 that extends across the gap G. The seal 330 engages the valve seat 306 when the pressure relief disc 316 is disposed in the first closed position and is spaced from the valve seat 306 when the pressure relief disc 316 is disposed in the first open position. The seal 330 engages the poppet seat 315 when the test poppet member 305 is disposed in the second closed position and is spaced from the poppet seat 315 when the test poppet member 305 is disposed in the second open position. Accordingly, the seal 330 seals the gap G when both the pressure relief disc 316 and the test poppet 305 are disposed in the respective closed positions. Moving either of the pressure relief disc 316 or the test poppet 305 to their respective open positions unseals the gap G.

In certain implementations, valve relief disc member 316 of valve arrangement 300 includes a perimeter wall 350. Perimeter wall 350 extends upwards from the valve relief disc member 316 and is positioned concentric to the outer circumference of the valve relief disc member 316. In some examples, perimeter wall 350 includes cap-facing edge 354, which faces the cap 324 and sits at a plane substantially perpendicular to valve axis 318. In some examples, when the valve relief disc member 316 is in the open position and biasing element 320 is compressed, the cap-facing edge 354 of the valve relief disc member 316 will contact a portion of inner surface 325 of cap 324 (Refer to FIG. 6).

Figure 4:
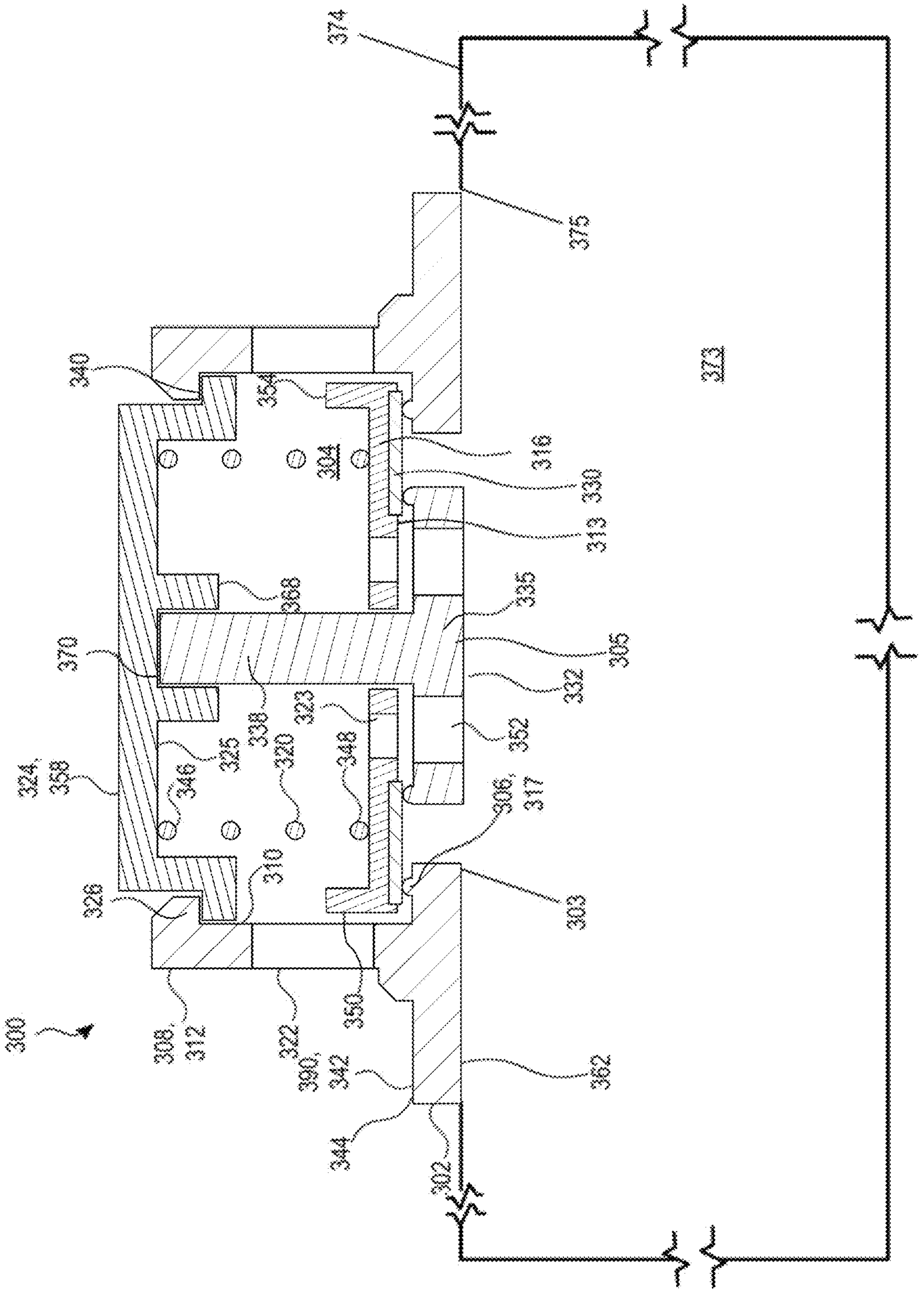
FIG. 4 illustrates a cross-sectional view of the valve arrangement of FIG. 3, showing the valve arrangement in a closed position and showing a representation of the case, according to an example, according to an example.
Figure 5:
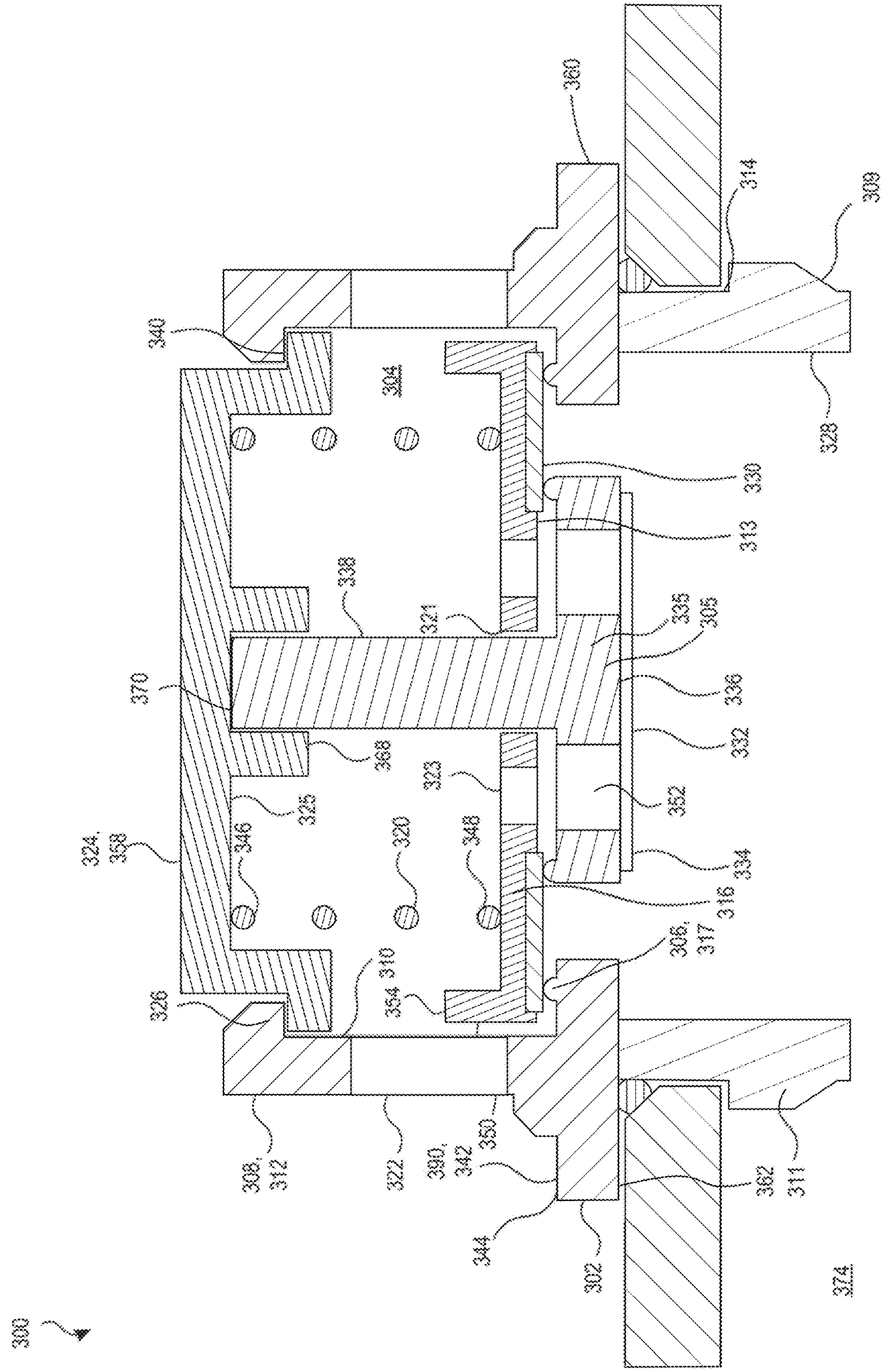
FIG. 5 illustrates a cross-sectional view of an alternative embodiment of the valve arrangement of FIG. 3, showing the valve arrangement in a closed position and illustrating an embodiment connected to a case, according to an example, according to an example.

Referring to FIG. 4 and FIG. 5, in accordance with principles of this disclosure, valve body 302 is adapted for connection to an enclosure 374. A variety of coupling arrangements can be used. In certain examples, a mounting surface 362 is configured to attach to a case exterior (see FIG. 4). In some examples, this connection is by welding, soldering, gluing, bonding, fastening, or another connection method. In certain examples, the valve body 302 snap-fits to the enclosure 374. In certain examples, the valve body 302 attaches to the enclosure 374 via a twist-to-lock connection (e.g., threads, cam-lock, etc.). For example, an attachment arrangement 314 extends outwardly from the valve body 302. In some examples, the attachment arrangement 314 includes one or more flexible latch arms 309 configured to extend into the opening 375 in the case 374 to secure the valve body 302 to the enclosure 374. In certain examples, the latch arms 309 define hooks 311 that latch over a wall of the enclosure 374. In some examples, fastening arrangement 314 includes a cam-lock or snap-fit type connection. In some examples, fastening arrangement 314 includes a bayonet slot in the exterior surface 329 of the protruding wall 309. The bayonet slot may be shaped to receive a projection from the battery case to releasably and selectively connect the valve body 302 and battery case. In other alternative arrangements, the valve body 302 can be connected to a battery case by screwing, popping, or other appropriate connectors or couplers.

In some examples, the valve housing 302 of the fastening arrangement 314 includes a connection seal member 360. The seal member 360 is configured to seal between the valve housing 302 and the enclosure 374, thereby selectively sealing the opening 375 of the enclosure 374 using the valve arrangement 300.

In some examples, connection seal member 360 (e.g., an O-ring of round, rectangular, square, or other cross-section) is included at the upper portion of the protruding wall 309, where protruding wall 309 intersects with the mount surface 362 of valve body 302, to provide a seal in the connection of valve body 302 with the enclosure 374. In the example shown, the connection seal member 360 circumscribes and is against the exterior surface 329 of the protruding wall 309.

In accordance with principles of this disclosure, gas is able to move in and out of the case when the valve relief disc member 316 is in the closed position and valve test poppet member 305 is in the closed position through a membrane 332. In some examples, the membrane 332 is hydrophobic, preventing water from entering the battery case from outside of the valve 300. In some examples, the membrane 332 is carried with the valve test poppet member 305. In accordance with principles of this disclosure, when the valve relief disc member 316 is in the closed position and gas is moving in and out of the case through the membrane 332, the gas is allowed to move in and out of openings 322 of surrounding wall 308 of valve body 302. In particular, when the valve relief disc member 316 is in a closed position and valve test poppet member 305 is in the closed position, gasses move from the case through the membrane 332, through openings 352 in the valve test poppet member 305, through openings 323 in the valve relief disc member 316, move through openings 322 in a surrounding wall 308 of the valve body 302, and exit into the environment surrounding the valve 300. In some examples, gas moves in the opposite path, starting in the external environment and moving through the valve arrangement to enter the battery case.

With reference to FIG. 6, when a pressure in the case 374 reaches or exceeds a predetermined level, relief fluid passes out of the case 374 via the port 303 and presses against the membrane 332 and against the pressure relief disc 316 via the gap G. In some examples, some of the relief fluid may pass through the membrane 332 and through passages 352. In other examples, relief fluid is blocked from fluid communication (e.g., contact) with the membrane 332 using a membrane protective member. The cap 324 is already biased on the first position by the biasing element 320 and cannot move further along the valve axis 318 away from the port 303. Accordingly, the test poppet 305 remains in the second closed position. However, the relief fluid can push the pressure relief disc 316 against the bias of the biasing element 320 to the first open position, thereby unsealing the gap G. The gap G provides a less restricted path than the membrane 332 so most of the relief fluid will pass through the gap G along the second flow path FP2 to flow from the port 303 to an exterior of the valve arrangement 300 through openings 322 in a surrounding wall 308 of the valve body 302. Because the pressure relief disc 316 is moved to the first open position, the relief fluids need not pass through the through-passages 384.

After a relieving event (e.g., after the pressure in the case has decreased to a reset pressure below the predetermined level), the valve relief disc member 316 is moved via the force of the biasing element 320 to return the valve relief disc member 316 into the closed position. Accordingly, the pressure relief disc 316 again brings the seal 330 into contact with the valve seat 306 and poppet seat 315 to seal the gap G. Fluid returns to passing along the first flow path FP1.

Referring to FIG. 7, in accordance with principles of this disclosure for leak testing a case to which the valve arrangement 300 is mounted. In certain implementations, the seal integrity between the valve relief disc member 316 and the valve seat 306 is initially tested before the valve arrangement 300 is installed to the case 374. In some examples, seal integrity between membrane 332 and the valve test poppet member 305 is initially tested before the valve arrangement 300 is installed to the case 374. In certain examples, the valve arrangement 300 is installed to the case 374 after the initial testing of seal integrity.

In some examples, membrane 332 includes a layer of PTFE. In some examples, initially testing seal integrity includes testing seal integrity between the layer of PTFE and the valve test poppet member 305. In some examples, initially testing seal integrity includes contacting the valve test poppet member 305 with a perimeter region 334 and a center region 336 of the membrane 332.

Leak testing the case 374 while the valve arrangement 300 is installed on the case 374 includes moving the valve test poppet member 305 to the second open position, scaling against an exterior 390 of the valve body 302 with a test fixture 372, and using the test fixture 372 to pressurize an interior of the case 374 through the valve interior 304 while the valve test poppet member 305 is in the second open position.

In some examples, the test fixture 372 contacts an external surface 376 of cap 324. The pushing force applied to cap 324 by the test fixture 372 is transferred to stem portion 338 of the valve test poppet member 305 (against the bias of biasing element 320) to move the valve test poppet member 305 into the second open position so that the poppet seat 315 is no longer in contact with valve relief disc member 316 (e.g., with the seal 330 of the pressure relief disc member 316).

The step of sealing against the exterior 390 of the valve body 302 can include contacting the fixture seal interface 378 against valve seal interface 380. Fixture seal interface 378 can include an O-ring seal member 382, in which the O-ring seal member 382 has a round cross section.

Leak testing the case further includes sealing the test fixture 372 and valve 300 when a predetermined target pressure is achieved within the interior of the case. Pressure within the case is monitored for a predetermined amount of time.

The predetermined target pressure and/or predetermined amount of time can be determined so as to prevent leakage, damage, rupture, explosion, or other damage to the case/enclosure and/or batteries/materials/electronics enclosed within the case/enclosure.

Based on the pressure within the case remaining within a predetermined threshold of the predetermined target pressure for the predetermined amount of time, pressure within the case can be released via the test fixture 372. Test fixture 372 is withdrawn so that it is removed from the exterior 390 of the valve body 302 and is no longer in contact with cap 324. Valve test poppet member 305 returns to a closed position, with poppet seat 315 contacting valve relief disc member 316.

In some examples, the valve 300 is configured to transition between a testing state, an operating state, and a pressure relief state.

When the valve 300 is in the operating state (refer to FIG. 3), the valve defines a vent flow path between the surrounding wall 308 and the pressure relief passage 304, the vent flow path passing through the restricted passage 384 of the valve relief disc member 316 and through the membrane 332 of the valve test poppet member 305. In some examples, this includes through openings 323 and openings 352.

When the valve is in the testing state (refer to FIG. 7), the valve 300 defines a testing flow path between the surrounding wall 308 and the pressure relief passage 304, the testing flow path passing through the restricted passage 384 and passing through a gap G extending between the valve test poppet member 305 and the valve body 302.

When the valve is in the pressure relief state (refer to FIG. 6), the valve 300 defines a relief flow path extending between the surrounding wall 308 and the pressure relief passage 304, the relief flow path bypassing the restricted passage 384 and passing through the gap G.

In some examples, restricted passage 384 provides a greater flow restriction than the gap G. In some examples, the membrane 332 provides a greater flow restriction than the restricted passage 384.

In some examples, the valve relief disc member 316 is movably mounted within the valve body 302, and wherein the valve 300 is transitioned between the operating state and the pressure relief state by moving the valve relief disc member relative 316 to the valve body 302 and relative to the valve test poppet member 305.

In some examples, the valve test poppet member 305 is movably mounted within the valve body 302, and wherein the valve 300 is transitioned between the operating state and the testing state by moving the valve test poppet member 305 relative to the valve body 302 and relative to the valve relief disc member 316.

In some examples, each of the valve relief disc member 316 and the valve test poppet member 305 is movable between a respective closed position and a respective open position, wherein the valve relief disc member 316 moves in a first direction when moving from the respective closed position to the respective open position, and wherein the valve test poppet member 305 moves in an opposite, second direction when moving from the respective closed position to the respective open position.

In some examples, the gap G is sealed when the valve 300 is in the operating state. In some examples, the valve relief disc member 316 carries a seal member 330 that seals the gap G when the valve 300 is in the operating state.

In accordance with principles of this disclosure, valve 300 includes a valve body 302 defining a surrounding wall 308 and a pressure relief passage 304 in fluid communication with the interior of the case 374 (refer to FIG. 4).

In some examples, valve 300 includes a valve test poppet member 305 movably coupled to the valve body 302. In some examples, the valve test poppet member 305 includes a disc portion 335 carrying a membrane 332. In some examples, the valve 300 includes a valve relief disc member 316 movably coupled to the valve body 302, the valve relief disc member 316 carrying a seal member 330 and defining a bypass passage 388.

In some examples, the valve 300 is configured to transition between a testing state, an operating state, and a pressure relief state. When the valve 300 is in the operating state (refer to FIG. 3), the valve 300 defines a vent flow path between the surrounding wall 308 and the pressure relief passage 304, the vent flow path passing through the bypass passage 388 of the valve relief disc member 316 and through the membrane 332 of the valve test poppet member 305. When the valve 300 is in the testing state (refer to FIG. 7), the valve 300 defines a testing flow path between the surrounding wall 308 and the pressure relief passage 304, the testing flow path passing through the bypass passage 388 and passing through a gap G extending between the valve test poppet member 305 and the valve body 302. When the valve 300 is in the pressure relief state (refer to FIG. 6), the valve 300 defines a relief flow path extending between the surrounding wall 308 and the pressure relief passage 304, the relief flow path passing between the gap G and not passing through the bypass passage 388.

In accordance with principles of this disclosure, valve arrangement 300 includes a membrane protective member which is configured to prevent/block fluid communication/contact between the membrane 332 and relieving fluid from the battery case during a pressure spike within the battery case (for example, when relief fluid has entered pressure relief passage 304). The membrane protective member is also configured to allow passage of the gas moving in and out of the battery case through the membrane 332 when the test poppet member 305 is in the closed position. In some examples, the membrane protective member is a disc which is configured to sit between the membrane 332 and the test poppet member 305.

Figure 9:
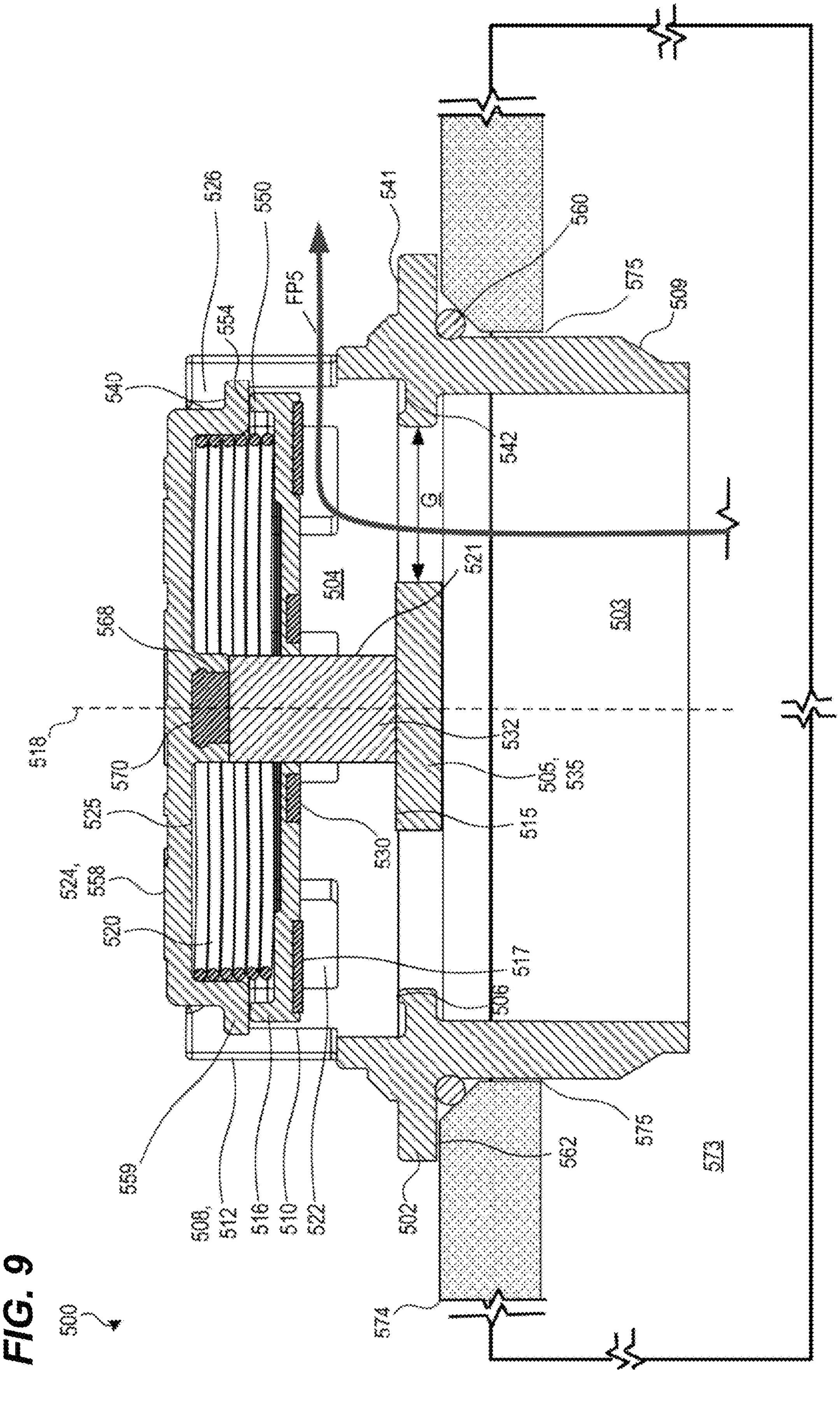
FIG. 9 illustrates a cross-sectional view of the valve arrangement of FIG. 8, showing the valve arrangement in an open relief position and showing a representation of the case, according to an example, according to an example.
Figure 10:
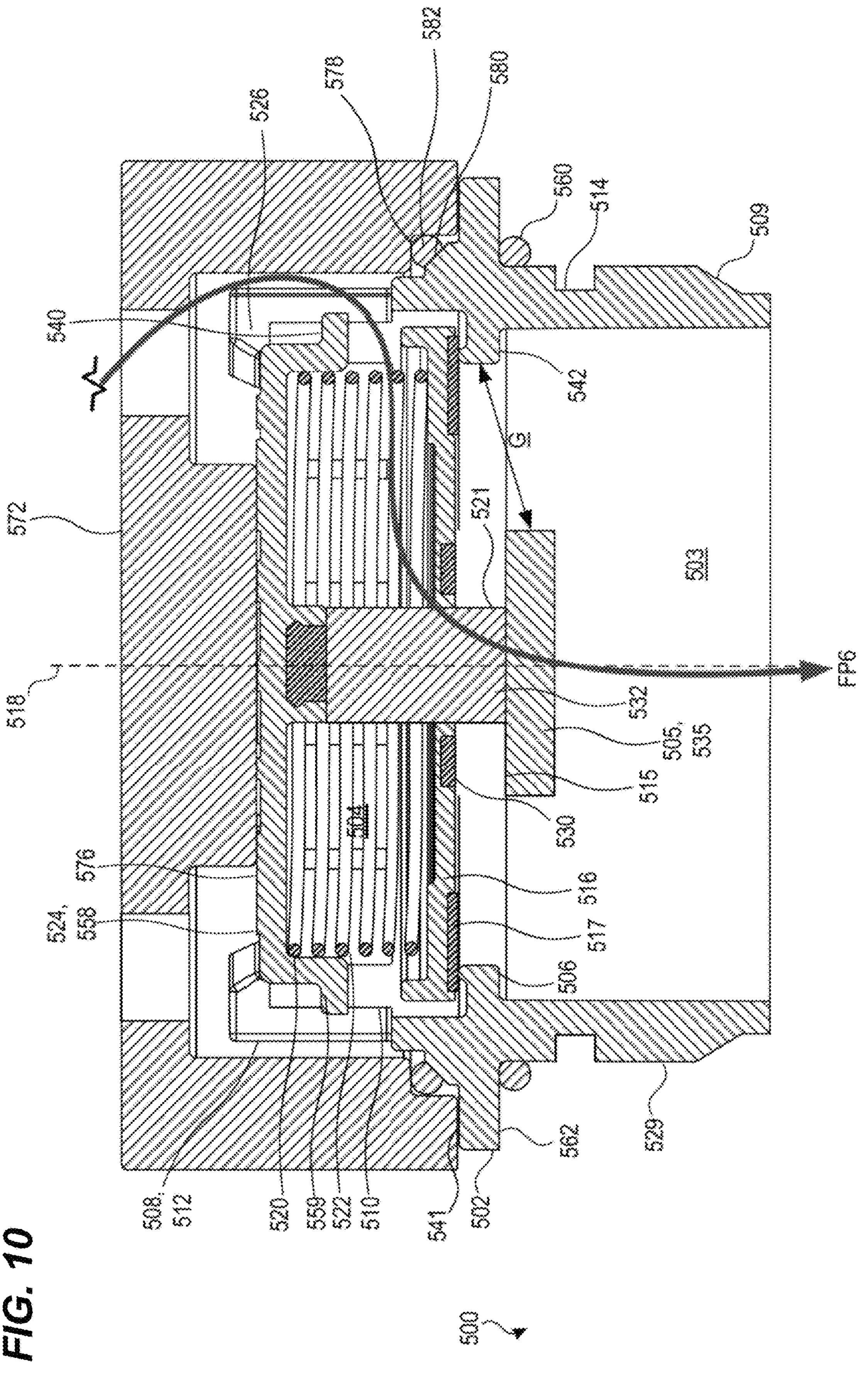
FIG. 10 illustrates a cross-sectional view of the valve arrangement of FIG. 8, showing the valve arrangement in an open test position, according to an example, according to an example.
Figure 13:
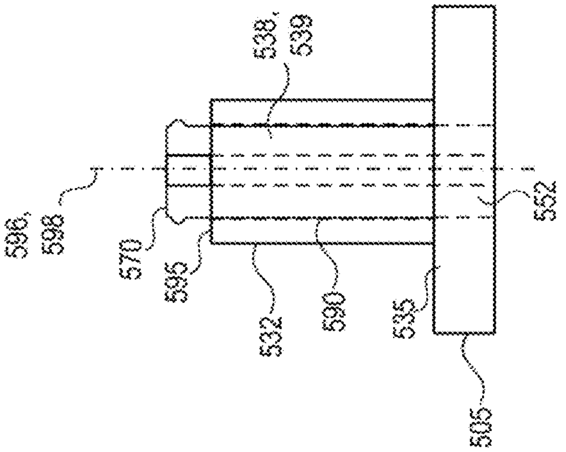
FIG. 13 illustrates a side view of venting components of the valve arrangement of FIG. 8, according to an example, according to an example.
Figure 12:
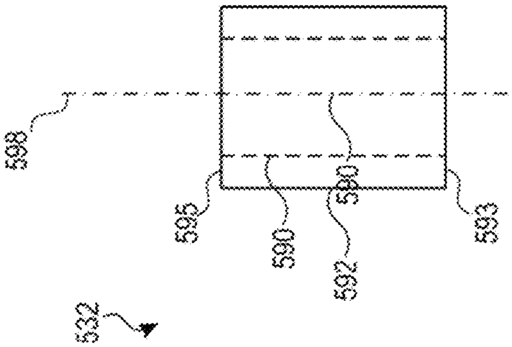
FIG. 12 illustrates a side view of a porous element of the valve arrangement of FIG. 8, according to an example, according to an example.

In certain implementations, the valve arrangement 500 is configured to provide a vent flow path FP4 for passive venting during normal operation (see FIG. 8), to provide a relief flow path FP5 during an overpressure event (see FIG. 9), and/or to provide a testing flow path FP6 during a leak check (see FIG. 10). The flow paths FP4, FP5, FP6 are different from each other. In certain examples, the flow paths FP4, FP5, FP6 have overlapping portions and have non-overlapping portions as will be described in more detail herein.

Figure 8:
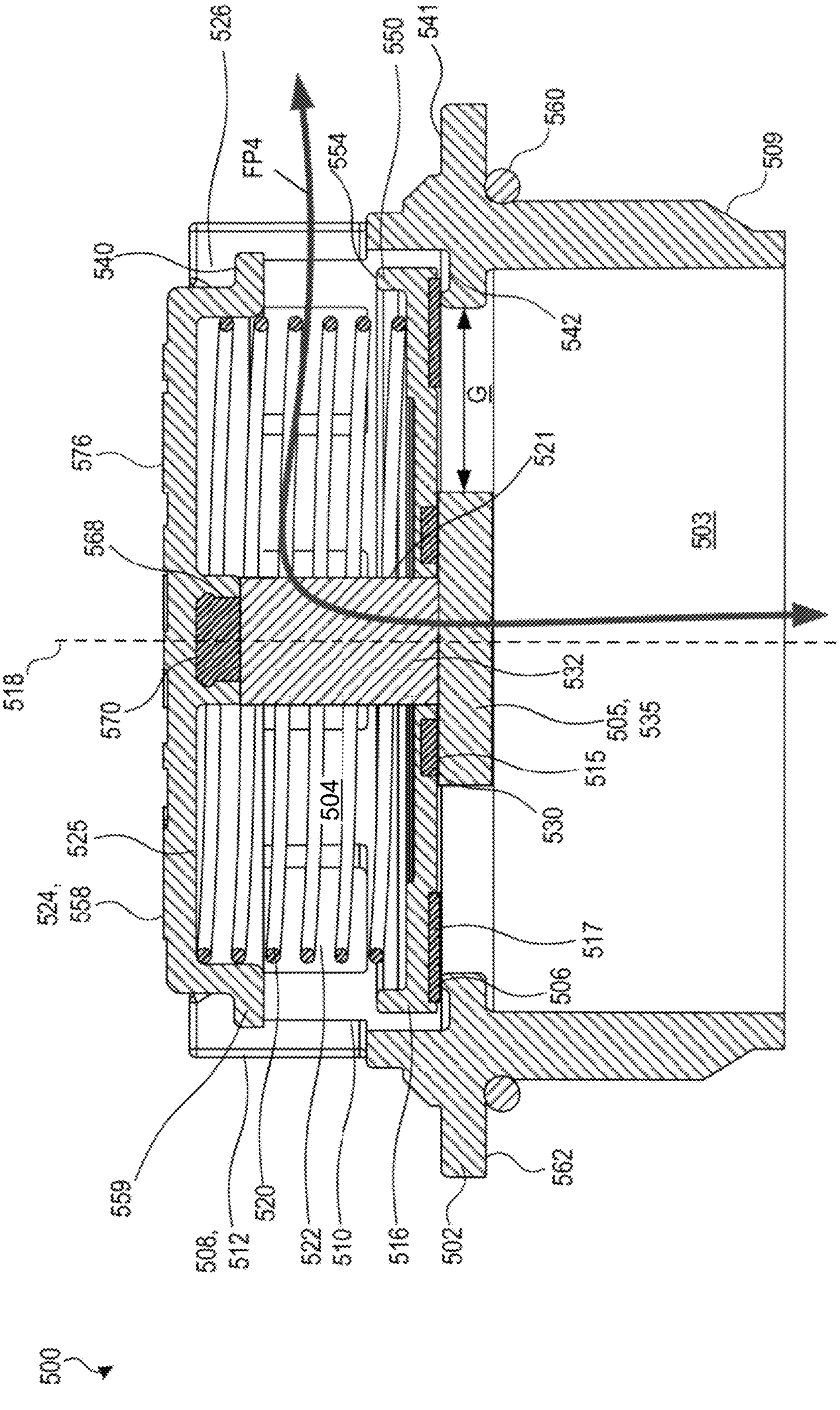
FIG. 8 illustrates a cross-sectional view of an embodiment of a valve arrangement usable with a case, shown in a closed position, constructed in accordance with principles of this disclosure, according to an example, according to an example.

FIG. 8 is a schematic diagram of an example valve arrangement 500 usable with an enclosure 574, such as a battery case (refer also to FIG. 9). The valve arrangement 500 is mountable at an aperture 575 defined in an outer wall of the enclosure 574. The aperture 575 leads to an interior 573 of the enclosure 574, which houses one or more components (for example, a battery). The valve arrangement 500 includes a valve body 502 defining a port 503 that aligns with the aperture 575 of the enclosure 574 when the valve body 502 mounts to the enclosure 574. An outer wall 508 surrounds the port 503 and extends along a valve axis 518. The valve arrangement 500 defines an interior 504 extending between the port 503 and the outer wall 508. The interior 504 provides a path for gas (vented during normal operation or passed through during testing) and relief fluids (vented during an overpressure event) to move between the enclosure 574 and the external environment outside of the enclosure 574. In some examples, the outer wall 508 is roughly cylindrical in shape but could be a variety of alternative shapes in other examples.

The wall 508 includes opposite interior and exterior surfaces 510, 512. At least a portion of the interior surface 510 is in communication with the vent interior 504. At least a portion of the outer wall 508 is permeable to fluids, such as gas and liquid. For example, in certain implementations, the outer wall 508 defines one or more openings 522 that extend between the interior and exterior surfaces 510, 512 of the outer wall to enable relief fluids to pass therethrough. The openings 522 connect the interior 504 of the valve arrangement 500 to an exterior of the valve arrangement 500. The openings 522 can be rectangular, round, slotted, or any other desired shape. In certain examples, the openings 522 are circumferentially spaced around the surrounding wall 508. In an example, the openings 522 are evenly spaced around the surrounding wall 508. In an example, the openings 522 are equal in size to each other. In an example, the openings 522 differ in size from one another.

In certain implementations, a valve relief disc member 516 is disposed within the vent interior 504 and is moveable relative to the outer wall 508 along the valve axis 518 between a first closed position and a first open position. The valve relief disc member 516 is configured to close the relief flow path FP5 when in the first closed position (refer to FIG. 8) and to open the relief flow path FP5 when in the first open position (refer to FIG. 9). A biasing element 520 biases the valve relief disc member 516 toward the first closed position. The valve relief disc member 516 is configured to move from the first closed position to the first open position against the bias of the biasing element 520 when a pressure in the enclosure 574 exceeds a predetermined level. The predetermined level can be determined so as to prevent leakage, damage, rupture, explosion, or other damage to the battery case and/or battery enclosed within the case. High pressure in the battery case can be caused by warm external temperatures, battery malfunction, thermal runaway, or other causes.

In certain implementations, a blocking member such as a valve test poppet member 505 is moveable along the valve axis 518 relative to the valve body 502 between a second closed position and a second open position. The valve test poppet member 505 is configured to seal against the valve relief disc member 516 when the valve relief disc member 516 is disposed in the first closed position and the valve test poppet member 505 is disposed in the second closed position (see FIG. 8). Moving the valve relief disc member 516 to the first open position opens the relief flow path FP5 regardless of the position of the valve test poppet member 505 (see FIG. 9). Moving the test poppet member 505 to the second open position while the valve relief disc member 516 is disposed in the first closed position opens the testing flow path FP6 (see FIG. 10). Moving both the valve disc relief member 516 and the test poppet to the respective open positions (e.g., if an overpressure event occurred during a leak test) would open the relief flow path FP5.

In certain implementations, the valve test poppet member 505 includes a disc portion 535 that aligns with the port 503 of the valve housing 502. The disc portion 535 defines one or more through-openings or flow-through passages 552 (see FIGS. 11 and 14). The through-passages 552 enable fluid to pass through the disc portion 535 of the valve test poppet member 505 even when the valve test poppet member 505 is disposed in the second closed position. Thereby, fluid can flow in and out of the enclosure 574 through the port 503 (e.g., along the vent or testing flow paths FP4, FP6) even when the valve test poppet member 505 is disposed in the second closed position. In certain examples, the one or more through-passages 552 of the valve test poppet member 505 are located in a center portion of the disc portion 535. In some examples, the one or more through-passages 552 of the valve test poppet member 505 include a cylindrical opening in disc portion 535 which is coaxial with valve axis 518 and concentric with an outer perimeter of the disc portion 535.

For example, the test poppet member 505 may include a stem portion 538 that extends upwardly from the disc portion 535. The stem portion 538 extends through the pressure relief disc 516 to reach the cap 524 so that the pressure relief disc 516 is disposed between the disc portion 535 of the test poppet member 505 and the cap 524. In certain examples, the stem portion 538 extends from the disc portion 535, through a stem opening 521 of valve relief disc member 516, through the interior of the valve body 502, to the cap 524.

In certain examples, an inner surface 525 of the cap 524 includes an attachment portion 568 which at least partially surrounds or contacts a stem end 570 of stem portion 538. In certain examples, attachment portion 568 is a substantially cylindrical wall, with its center at the center of cap 524. In certain examples, attachment portion 568 is concentric with valve axis 518. In certain examples, stem opening 521 is in the center of valve relief disc member 516. In some examples, stem portion 538 extends parallel (or, in some cases, co-axial) to valve axis 518. In certain examples, stem end 570 is connected to inner surface 525 of cap 524 (for example, by welding, soldering, bonding, by one or more fasteners, or other appropriate connecting means). In some examples, stem end 570 is connected to attachment portion 568 (for example, by welding, soldering, bonding, by one or more fasteners, or other appropriate connecting means). In some examples, attachment portion 568 includes a detent, threads, or other catching features to contact and/or connect to a corresponding feature on stem portion 538 (including on ribs 539, described below). In some examples, stem portion 538 is removably connected to attachment portion 568. In some examples, a lower surface of attachment portion 568 may contact an upper surface 595 of porous element 532.

In certain examples, stem portion 538 includes one or more ribs 539. In certain examples, ribs 539 extend the length of stem portion 538 to a first end in contact with a cap 524 (described in more detail below). In certain examples, ribs 539 extend the length of stem portion 538 to a second end in contact with an upper surface of disc portion 535 and sit on top at least a portion of through-passages 552 (refer to FIG. 14), the second end being substantially co-planar with the upper surface of the disc portion 535. In certain examples, ribs 539 extend the length of stem portion 538 to a second end and extend through at least a portion of through-passages 552 (refer to FIG. 14), the second end being substantially co-planar with a lower surface of the disc portion 535.

In the example shown, four ribs 539 make up the ribs of stem portion 538 (refer to FIGS. 11, 13, 14, and 16) and are arranged in a cross or "X" shape. However, it should be understood that more or fewer than four ribs 539 may make up the ribs of stem portion 538, and any ribs 539 may be arranged in a different orientation (for example, a star, line, "Y," or other suitable shape).

In some examples, stem portion 538 may include features other than ribs 539, such as channels, a body with holes or other flow-through passages, a mesh, or other suitable structures or features.

In certain examples, the vent flow path FP4 extends through the through-passages 552 of the valve test poppet member 505 and the openings 522 of the outer wall 508 (refer to FIG. 3). In certain examples, the relief flow path FP5 does not extend through the through-passages 552. In certain examples, the relief flow path FP5 may include a lesser, additional flow which flows through the through-passages 552. In certain examples, the testing flow path FP6 extends through the through passages 552 of the valve test poppet member 305 (and openings 522) (refer to FIG. 10).

In certain implementations, the valve test poppet member 505 is biased to the second closed position by a biasing element. In certain examples, the valve test poppet member 505 is biased in an opposite direction from the valve relief disc member 516. In certain examples, the biasing element that biases the valve test poppet member 505 to the second closed position is the same biasing element 520 that biases the valve relief disc member 516 to the first closed position.

In certain implementations, a permeable member is carried with the valve test poppet member 505 between the second closed position and the second open position. In an example, the permeable member is a porous element 532 (Refer to FIGS. 12 and 15). In some examples, the porous element 532 is cylindrical (tubular) in shape and has an inner surface 590 of a diameter which enables porous element 532 to be fit around stem portion 538 of the valve test poppet member 505 (refer to FIGS. 13 and 16) so that a porous element axis 598 is co-axial with a valve test poppet member axis 596 and valve axis 518. In an example, a bottom surface 593 of the porous element 532 is in contact with an upper surface of the disc portion 535. In certain examples, porous element 532 further defines flow paths FP4 and FP6 through passages between the ribs 539 and the inner surface 590 of porous element 532. In some examples, porous element 532 is removably fit around stem portion 538, and so may be replaceable or removable.

The porous element 532 is permeable to air and to gases emitted by the battery or other components within the enclosure 574. Accordingly, the porous element 532 enables gas to move through the porous element 532 from or toward (depending on the direction of flow) the through-passages 552 of the valve test poppet member 505. In some examples, the porous element 532 is hydrophobic.

In certain implementations, the disc portion 535 of the valve test poppet member 505 is configured to be disposed within the port 503 when in the second closed position and to be spaced from the port 503 along the axis 518 when in the second open position. In certain implementations, the disc portion 535 has a smaller cross-dimension (e.g., diameter) than the port 503 so that a gap G extends between an outer periphery of the vent portion 535 and the inner periphery of the port 503. In certain examples, the gap G is sealed when the valve relief disc member 516 is disposed in the first closed position and the valve test poppet member 505 is disposed in the second closed position. The vent flow path FP4 does not flow through the gap G. Instead, the vent flow path FP4 flows through the through-passages 552. Moving the valve relief disc member 516 to the first open position unseals the gap G. The relief path FP5 passes through the gap G.

In certain implementations, the tubular shape of the porous element 532 provides for an increased flow-through surface area of porous element 532 compared to the flat or disc-shaped porous membranes disclosed herein. In certain implementations, the tubular shape of the porous element 532 may allow for configurations of the valve arrangement 500 to include a relatively small (compared to other implementations) valve test poppet member 505 (or disc portion 535 thereof). Reducing the size of the disc portion 535 may increase the size of the gap G, thereby increasing the size of the relief flow path FP5 to allow a larger flow rate therethrough.

In certain implementations, a cap 524 attaches to the valve body 502 to close the interior 504. In certain examples, the cap 524 extends substantially parallel with the valve pressure relief disc 516. In certain examples, the cap 524 is movable relative to the valve body 502 along the valve axis 518 between first and second positions to change the size of the interior 504. In certain examples, the valve test poppet member 505 attaches to the valve body 502 via the cap 524 and the cap 524 carries the valve test poppet member 505 therewith between the second open and second closed positions as the cap 524 moves relative to the valve body 502.

In certain examples, the biasing element 520 biases the cap 524 to the first position, thereby indirectly biasing the valve test poppet member 505 to the second closed position. In such examples, the valve test poppet member 505 can be moved to the second open position by moving the cap 524 against the bias of the biasing member 520 (for example, movement via a test fixture 572 as described below). Movement of the cap 524 towards the second position (and the test poppet 505 towards the second open position) may increase the biasing force on the pressure relief disc 516 towards the first closed position. However, in certain examples, the biasing element 520 is configured so that positioning the cap 524 in the second position does not prevent movement of the pressure relief disc 516 towards the first open position.

In certain implementations, the cap 524 includes an extended portion 558 which extends over or across a cross-dimensional area of the valve body interior 504 to close the interior 504. In certain examples, the extended portion 558 defines a first spring stop configured to receive a first end of a spring type biasing element 520. In certain examples, the valve pressure relief disc 516 defines a second spring stop configured to receive an opposite second end of the spring type biasing element 520 so that the biasing element biases the cap 524 away from the pressure relief disc 516. In certain implementations, the valve body 502 is configured to limit movement of the cap 524 along the valve axis 518. For example, the valve body 502 may include an interior shoulder 540 or other stop surface (e.g., defined by a radially inwardly extending flange 526) and the cap 524 may include an outer flange 559 or ring that abuts the interior shoulder 540 when the cap 524 is disposed in the first position to limit movement of the cap 524 out of the valve body 502 in a first direction. In some examples, the cap 524 and/or pressure relief disc 516 may be sized larger than the port 503 to limit movement of the cap 524 and/or pressure relief disc 516 out of the valve body 502 in an opposite second direction.

In accordance with principles of this disclosure, valve body 502 of valve arrangement 500 includes a valve seat 506 surround the port 303. The valve seat 506 provides a surface against which the valve relief disc member 516 can seat when in the first closed position. The valve relief disc member 516 is biased by the biasing element 520 to seal against the valve seat 506. In certain examples, the valve seat 506 is raised. In certain examples, the valve seat 506 is molded to the top surface 542 of the valve body 502.

In certain implementations, the valve test poppet member 505 defines a second valve seat (poppet seat) 515 that is concentric with the valve seat 506. The poppet seat 515 moves relative to the valve seat 506 as the valve test poppet member 505 moves along the valve axis 518. In certain examples, the poppet seat 515 radially (in some examples, in substantially the same plane) aligns with the valve seat 506 when the valve test poppet member 505 is disposed in the second closed position and is spaced along the valve axis 518 from the valve seat 506 when the valve test poppet member 505 is disposed in the second open position. In certain examples, the poppet seat 515 is raised. In certain examples, the poppet seat 515 is molded to the top surface 543 of the disc portion 535.

In certain implementations, the pressure relief disc 516 carries a valve seal member 517 that engages the valve seat 506 when the pressure relief disc 516 is disposed in the first closed position and is spaced from the valve seat 506 when the pressure relief disc 516 is disposed in the first open position. In certain implementations, the valve test poppet member 505 carries a poppet seal member 530 that engages the poppet seat 515 when the valve test poppet member 505 is disposed in the second closed position and is spaced from the poppet seat 515 when the test poppet member 505 is disposed in the second open position. Accordingly, the valve seal member 517 and poppet seal member 530 seal the gap G when both the pressure relief disc 516 and the valve test poppet member 505 are disposed in the respective closed positions. Moving the pressure relief disc 516 to its open position unseals the gap G.

In certain implementations, the pressure relief disc 516 carries a singular seal that extends across the gap G. The singular seal engages the valve seat 506 when the pressure relief disc 516 is disposed in the first closed position and is spaced from the valve seat 506 when the pressure relief disc 516 is disposed in the first open position. The singular seal engages the poppet seat 515 when the valve test poppet member 505 is disposed in the second closed position and is spaced from the poppet seat 515 when the test poppet member 505 is disposed in the second open position. Accordingly, the singular seal seals the gap G when both the pressure relief disc 516 and the valve test poppet member 505 are disposed in the respective closed positions. Moving the pressure relief disc 516 to its open position unseals the gap G.

In certain implementations, valve relief disc member 516 of valve arrangement 500 includes a perimeter wall 550. Perimeter wall 550 extends upwards from the valve relief disc member 516 and is positioned concentric to the outer circumference of the valve relief disc member 516. In some examples, perimeter wall 550 includes cap-facing edge 554, which faces the cap 524 and sits at a plane substantially perpendicular to valve axis 518. In some examples, when the valve relief disc member 516 is in the open position and biasing element 520 is compressed, the cap-facing edge 554 of the valve relief disc member 516 will contact a portion of inner surface 525 of cap 524 (refer to FIG. 9).

Referring to FIG. 9, in accordance with principles of this disclosure, valve body 502 is adapted for connection to an enclosure 574. A variety of coupling arrangements can be used. In certain examples, a mounting surface 562 is configured to attach to a case exterior (see FIG. 9). In some examples, this connection is by welding, soldering, gluing, bonding, fastening, or another connection method. In certain examples, the valve body 502 snap-fits to the enclosure 574. In certain examples, the valve body 502 attaches to the enclosure 574 via a twist-to-lock connection (e.g., threads, cam-lock, etc.). For example, an attachment arrangement 514 extends outwardly from the valve body 502. In some examples, the attachment arrangement 514 includes one or more flexible latch arms 509 configured to extend into the aperture 575 in the case 574 to secure the valve body 502 to the enclosure 574. In certain examples, the latch arms 509 define hooks that latch over a wall of the enclosure 574. In some examples, fastening arrangement 514 includes a cam-lock, threaded, or snap-fit type connection. In some examples, fastening arrangement 514 includes a bayonet slot in the exterior surface 529 of the latch arms 509. The bayonet slot or other fastening arrangement may be shaped to receive a projection from the battery case to releasably and selectively connect the valve body 502 and battery case. In other alternative arrangements, the valve body 502 can be connected to a battery case by screwing, popping, detents, or other appropriate connectors or couplers.

In some examples, the valve body 502 at the fastening arrangement 514 includes a connection seal member 560. The connection seal member 560 is configured to seal between the valve housing 502 and the enclosure 574, thereby selectively sealing the aperture 575 of the enclosure 574 using the valve arrangement 500.

In some examples, connection seal member 560 (e.g., an O-ring of round, rectangular, square, or other cross-section) is included at the upper portion of the flexible latch arms 509, where flexible latch arm 509 intersects with the mounting surface 562 of valve body 502, to provide a seal in the connection of valve body 502 with the enclosure 574. In the example shown, the connection seal member 560 circumscribes and is against the exterior surface 529 of the flexible latch arm (or protruding wall) 509.

In accordance with principles of this disclosure (see FIG. 8), gas is able to move in and out of the case when the valve relief disc member 516 is in the closed position and valve test poppet member 505 is in the closed position through a porous element 532. In some examples, the porous element 532 is hydrophobic, preventing water from entering the battery case from outside of the valve 500. In some examples, the porous element 532 is carried with the valve test poppet member 505. In accordance with principles of this disclosure, when the valve relief disc member 516 is in the closed position and gas is moving in and out of the case through the porous element 532, the gas is allowed to move in and out of openings 522 of surrounding wall 508 of valve body 502. In particular, when the valve relief disc member 516 is in a closed position and valve test poppet member 505 is in the closed position, gasses move from the case through flow-through passages 552 in the valve test poppet member 505, through the porous element 532, move through openings 522 in a surrounding wall 508 of the valve body 502, and exit into the environment surrounding the valve 500. In some examples, gas moves in the opposite path, starting in the external environment and moving through the valve arrangement to enter the battery case. Refer to vent flow path FP4.

With reference to FIG. 9, when a pressure in the case 574 reaches or exceeds a predetermined level, relief fluid passes out of the case 574 via the port 503 and presses against the valve relief disc member 516 via the gap G. In some examples, some of the relief fluid may pass through the flow-through passages 552 and through porous element 532. The cap 524 is already biased on the first position by the biasing element 520 and cannot move further along the valve axis 518 away from the port 503. Accordingly, the test poppet 505 remains in the second closed position. However, the relief fluid can push the valve relief disc member 516 against the bias of the biasing element 520 to the first open position, thereby unsealing the gap G. The gap G provides a less restricted path than the porous element 532 so most of the relief fluid will pass through the gap G along the relief flow path FP5 to flow from the port 503 to an exterior of the valve arrangement 500 through openings 522 in the surrounding wall 508 of the valve body 502.

After a relieving event (e.g., after the pressure in the case has decreased to a reset pressure below the predetermined level), the valve relief disc member 516 is moved via the force of the biasing element 520 to return the valve relief disc member 516 into the first closed position. Accordingly, the valve relief disc member 516 again brings the valve seal 517 and poppet seal 530 into contact with the valve seat 506 and poppet seat 515 to seal the gap G. Fluid returns to passing along the vent flow path FP4.

Referring to FIG. 10, in accordance with principles of this disclosure for leak testing a case to which the valve arrangement 500 is mounted. In certain implementations, the seal integrity between the valve relief disc member 516 and the valve seat 506 is initially tested before the valve arrangement 500 is installed to the case 574. In some examples, seal integrity between valve relief disc member 516 and the valve test poppet member 505 is initially tested before the valve arrangement 500 is installed to the case 574. In certain examples, the valve arrangement 500 is installed to the case 574 after the initial testing of seal integrity.

Leak testing the case 574 while the valve arrangement 500 is installed on the case 574 includes moving the valve test poppet member 505 to the second open position, sealing against an exterior 541 of the valve body 502 with a test fixture 572, and using the test fixture 572 to pressurize an interior of the case 574 through the valve interior 504 while the valve test poppet member 505 is in the second open position.

In some examples, the test fixture 572 contacts an external surface 576 of cap 524. The pushing force applied to cap 524 by the test fixture 572 is transferred to stem portion 538 of the valve test poppet member 505 (against the bias of biasing element 520) to move the valve test poppet member 505 into the second open position so that the poppet seat 515 is no longer in contact with valve relief disc member 516 (e.g., with the poppet seal 530 of the valve relief disc member 516).

The step of sealing against the exterior 541 of the valve body 502 can include contacting the fixture seal interface 578 against valve seal interface 580. Fixture seal interface 578 can, in some examples, include an O-ring seal member 582, in which the O-ring seal member 582 has a round cross section.

Leak testing the case further includes sealing the test fixture 572 and valve arrangement 500 when a predetermined target pressure is achieved within the interior of the case. Pressure within the case is monitored for a predetermined amount of time.

The predetermined target pressure and/or predetermined amount of time can be determined so as to prevent leakage, damage, rupture, explosion, or other damage to the case/enclosure and/or batteries/materials/electronics enclosed within the case/enclosure.

Based on the pressure within the case remaining within a predetermined threshold of the predetermined target pressure for the predetermined amount of time, pressure within the case can be released via the test fixture 572. Test fixture 572 is withdrawn so that it is removed from the exterior 541 of the valve body 502 and is no longer in contact with cap 524. Valve test poppet member 505 returns to a closed position, with poppet seal 515 contacting valve relief disc member 516.

In some examples, the valve arrangement 500 is configured to transition between a testing state, an operating state, and a pressure relief state.

When the valve arrangement 500 is in the operating state (refer to FIG. 8), the valve defines the vent flow path FP4 between the outer surrounding wall 508 and the pressure relief passage interior 504, passing through the porous element 532 of the valve test poppet member 505, and passing through flow through passages 552 of the valve test poppet member 505.

When the valve is in the testing state (refer to FIG. 10), the valve arrangement 500 defines a testing flow path FP6 between the surrounding wall 508 and the pressure relief passage interior 504, passing through the porous element 532 of the valve test poppet member 505, and passing through flow through passages 552 of the valve test poppet member 505.

When the valve is in the pressure relief state (refer to FIG. 9), the valve arrangement 500 defines a relief flow path FP5 extending between the surrounding wall 508 and the pressure relief passage 504, and passing (majority) through the gap G.

In some examples, flow through passages 552 provides a greater flow restriction than the gap G. In some examples, the porous element 522 provides a greater flow restriction than the flow through passages 552 alone.

In some examples, the valve relief disc member 516 is movably mounted within the valve body 502, and wherein the valve arrangement 500 is transitioned between the operating state and the pressure relief state by moving the valve relief disc member relative 516 to the valve body 502 and relative to the valve test poppet member 505.

In some examples, the valve test poppet member 505 is movably mounted within the valve body 502, and wherein the valve arrangement 500 is transitioned between the operating state and the testing state by moving the valve test poppet member 505 relative to the valve body 502 and relative to the valve relief disc member 516.

In some examples, each of the valve relief disc member 516 and the valve test poppet member 505 is movable between a respective closed position and a respective open position, wherein the valve relief disc member 516 moves in a first direction when moving from the respective closed position to the respective open position, and wherein the valve test poppet member 505 moves in an opposite, second direction when moving from the respective closed position to the respective open position.

In some examples, the gap G is sealed when the valve arrangement 500 is in the operating state. In some examples, the valve relief disc member 516 carries at least one seal member that seals the gap G when the valve arrangement 500 is in the operating state.

In accordance with principles of this disclosure, valve arrangement 500 includes a valve body 502 defining a surrounding wall 508 and a pressure relief passage 504 in fluid communication with the interior of the case 574 (refer to FIG. 9).

In some examples, valve arrangement 500 includes a valve test poppet member 505 movably coupled to the valve body 502. In some examples, the valve test poppet member 505 includes a disc portion 535 carrying a porous element 532. In some examples, the valve test poppet member 505 defines at least one flow through passages 552. In some examples, the valve arrangement 500 includes a valve relief disc member 516 movably coupled to the valve body 502, the valve relief disc member 516 carrying at least one seal member.

In some examples, the valve arrangement 500 is configured to transition between a testing state, an operating state, and a pressure relief state. When the valve 500 is in the operating state (refer to FIG. 8), the valve 500 defines a vent flow path between the surrounding wall 508 and the pressure relief passage 504, FP4 passing through flow through passages 552 of the valve test poppet member 505 and through the porous element 532 of the valve test poppet member 505. When the valve arrangement 500 is in the testing state (refer to FIG. 10), the valve 500 defines a testing flow path between the surrounding wall 508 and the pressure relief passage 504, FP6 passing through flow through passages 552 of the valve test poppet member 505 and through the porous element 532 of the valve test poppet member 505. When the valve arrangement 500 is in the pressure relief state (refer to FIG. 9), the valve 500 defines a relief flow path extending between the surrounding wall 508 and the pressure relief passage 504, FP5 passing between the gap G.

In some examples, the valve arrangement 300, 500 can be incorporated into a connector manifold 400 to facilitate mounting at an enclosure 374, 574, such as a battery case. FIGS. 17 to 21 illustrate the valve arrangement 300 incorporated into an example connector manifold 400. It will be understood, however, that the valve arrangement 500 alternatively or additionally could be so incorporated. The connector manifold 400 includes a body 402 configured to mount to a battery case or other enclosure 374, 574. The body 402 includes a connector station 404 and a valve station 406. One or more connectors 408 (e.g., a power connection interface, a data connection interface, etc.) are disposed at the connector station 404. In the example shown, the connector 408 is a high voltage connector for power. Other types of connectors are possible. A valve arrangement 410, such as valve arrangement 300, 500, is disposed at the valve station 406. Accordingly, the one or more connectors 408 can be carried as a unit with the valve arrangement 410.

In certain implementations, the manifold body 402 defines a portion of the valve arrangement 410, such as defining an outer wall 308, 508, of the valve arrangement 300, 500. For example, the outer wall 308, 508 may be defined by a raised ring 412 extending upwardly from the manifold body 402. The raised ring 412 surround the port 303. The raised ring 412 defines a plurality of openings 322, 522 through which fluid (e.g., air, liquid, etc.) may flow. In some examples, the wall 412 is integrally formed with the manifold body 402 (e.g., see FIG. 18). In other examples, the wall 412 may be snap-fit or otherwise secured to the manifold body 402. In still other examples, the outer wall 308, 508 of the valve arrangement 300, 500 may be carried with the valve arrangement 300, 500 as a unit and attached to the connector manifold body 402 at the port 303, 503.

In certain implementations, the connector manifold body 402 has a top surface 414 and a bottom surface 416. The bottom surface 416 is configured to face towards the enclosure 374, 574 and the top surface 414 is configured to face away from the enclosure 374, 574. In certain examples, the manifold body 402 has a rectangular shape when viewed from above with the valve arrangement 300, 500 and one or more connectors 408 extending through a thickness of the body 402 (e.g., see FIG. 9). In other examples, the manifold body 402 may have any desired shape (e.g., round, oblong, triangular, etc.) when viewed from above. In the example shown, the manifold body 402 includes fastener openings 418 at which a bolt, screw, or other fastener may be inserted to secure the manifold body 402 to the enclosure 374, 574. In other examples, however, the manifold body 402 can be welded, adhesively affixed, or otherwise secured to the enclosure 374, 574. In certain implementations, a gasket 420 or other seal surrounds the port 303, 503 at the bottom surface 416 to seal the connector manifold body 402 to the battery case or other enclosure 374, 574 (e.g., see FIG. 18). In certain examples, the gasket 420 includes an O-ring. In certain examples, a gasket or other seal 420 also surrounds the connector station 408 at the bottom surface 416.

Figure 11:
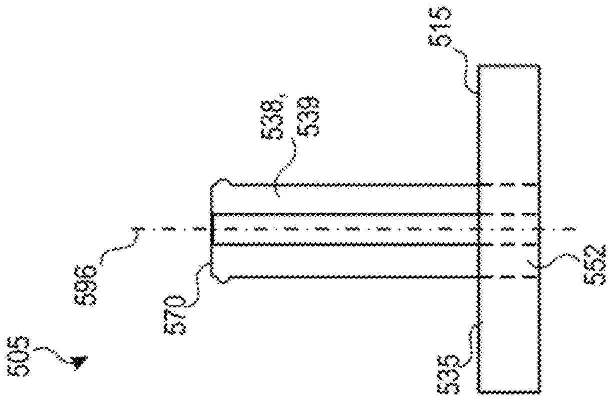
FIG. 11 illustrates a side view of a valve test poppet member of the valve arrangement of FIG. 8, according to an example, according to an example.
Figure 16:
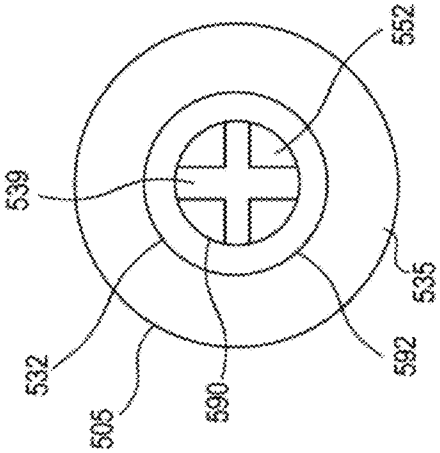
FIG. 16 illustrates a top view of venting components of the valve arrangement of FIG. 8, according to an example, according to an example.
Figure 15:
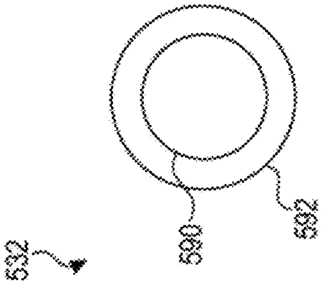
FIG. 15 illustrates a top view of a porous element of the valve arrangement of FIG. 8, according to an example, according to an example.
Figure 14:
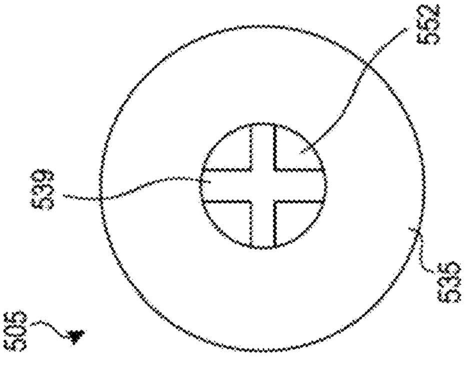
FIG. 14 illustrates a top view of a valve test poppet member of the valve arrangement of FIG. 8, according to an example, according to an example.
Figure 17:
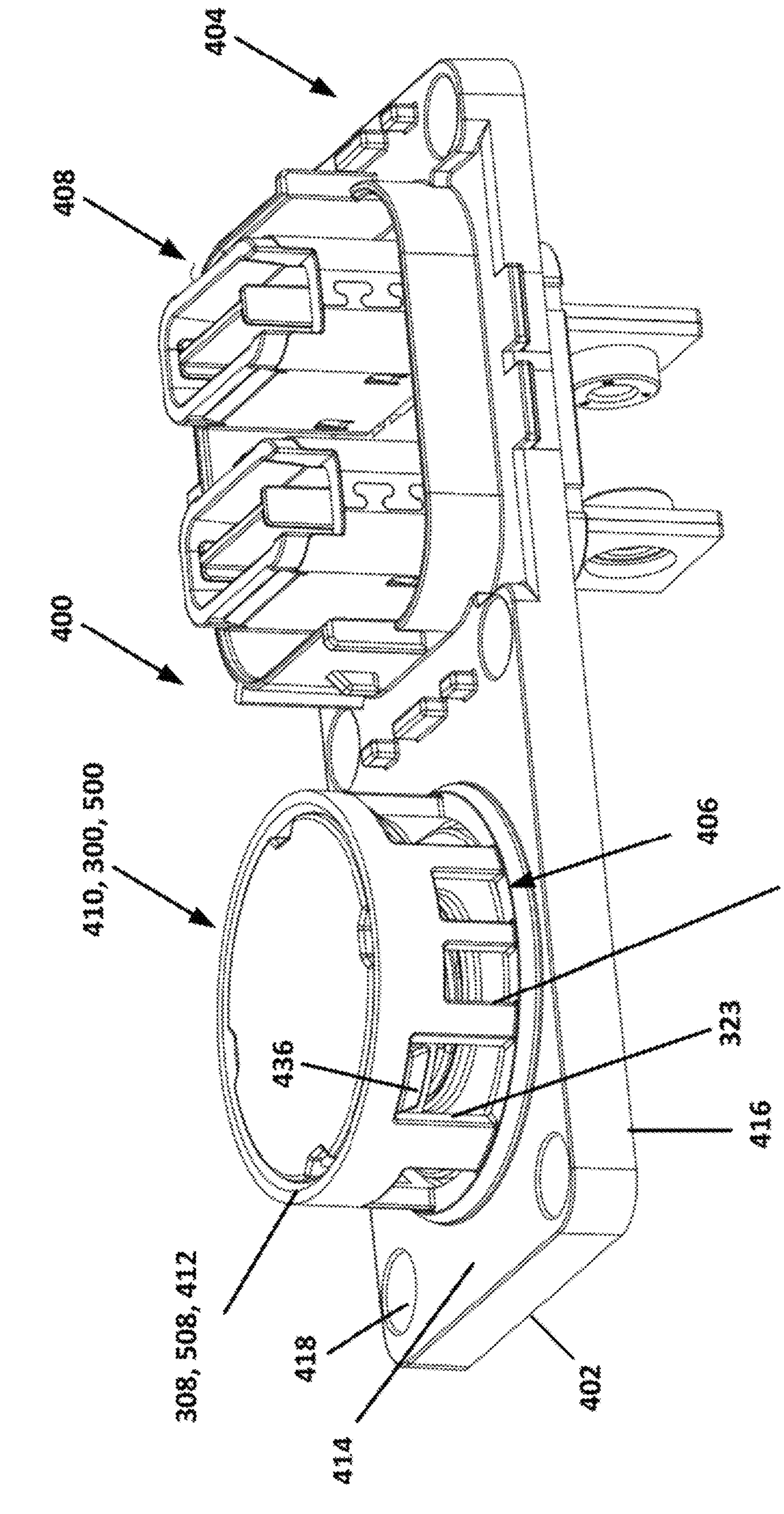
FIG. 17 is a perspective view of an example connector manifold arrangement including a valve station and a connector station, according to an example.

FIGS. 10 and 11 illustrate components of an example valve arrangement 410 exploded from each other. The example valve arrangement 410 is suitable for mounting at the valve station 410 of the connector manifold 400. In the example shown, the outer wall 308, 508 of the valve arrangement is defined by the connector manifold body 402 so the valve arrangement 410 includes the cap 324, 524, the biasing member 320, 520, the valve relief disc member 316, 516, and the valve test poppet member 305, 505. In certain implementations, the seal 330, 530 is carried by the valve relief disc member 316, 516. In certain examples, the valve relief disc member 316, 516 defines a recessed channel 434 in which the seal 330, 530 is disposed. In certain examples the seal 330, 530 has a ring shape. In certain implementations, the membrane 332 or porous element 532 is carried by the valve test poppet member 305, 505. In some examples, the membrane 332 is disc shaped. In other examples, the porous element 532 is tubular and disposed around a stem 538 of the valve test poppet member 505.

In certain examples, the valve relief disc member 316, 516 and the cap 324, 524 define respective stop surfaces 430, 432 that hold the biasing member 320, 520 is position. For example, each stop surface 430, 432 may include a raised ring within which an end of the biasing member 320, 520 may be disposed. In certain examples, the biasing member 320, 520 is a spring. In the example shown, the biasing member 320, 520 includes a coil spring. In certain implementations, the biasing member 320, 520 surrounds the stem 338, 538 of the valve test poppet member 305, 505. In certain examples, the guide ring 368 of the cap 324, 524 also extends at least partially through the biasing member 320, 520.

In certain implementations, the valve test poppet member 305, 505 is fixedly secured to the cap 324, 524. For example, the stem 338, 538 of the valve test poppet member 305, 505 may be fixedly secured to the guide ring 368 of the cap 324, 524. In various examples, the stem 338, 538 is welded, snap-fit, pinned, or otherwise mechanically coupled to the guide ring 368 so that the cap 324, 524 and valve test poppet member 305, 505 move together as a unit. In certain examples, the guide ring 368 of the cap 324, 524 extends along a majority of a length of the stem 338, 538 of the valve test poppet member 305, 505. In certain examples, the stem 338, 538 fits telescopically within the guide ring 368. The valve relief disc member 316, 516 moves relative to the unit against the force of the biasing member 320, 520.

In certain implementations, the cap 324, 524 includes one or more stop members 436 configured to engage the outer wall 308, 508 (e.g., the raised ring 412) to hold the cap 324, 524 at the valve station 406. The stop members 436 of the cap 324, 524 are configured to snap-fit with apertures defined by the surrounding wall 308, 508. Interaction between the stop members 436 and the outer wall 308, 508 inhibits removal of the vent arrangement 410 from the vent station 406 in at least a first direction. In some examples, the stop members 436 snap-fit into the openings 322, 522 through which fluid flows. In other examples, the apertures engaged by the stop members 436 are separate from the openings 322, 522 through which fluid flows. In still other examples, the outer wall 308, 508 defines first apertures 322*a* sized to receive the stop members 436 while still allowing fluid to flow and second openings 322*b* size to allow fluid to flow, but not sized to receive the stop members 436. In certain examples, the stop members 436 define ramped surfaces 438 and stop surfaces 440. In the example shown, the ramped surfaces face partially towards the valve test poppet member and the stop surfaces 440 face away from the valve test poppet member 305, 505. In certain examples, each stop member 436 slides along the respective aperture 323 when the cap 324, 524 is depressed during leak testing. In certain examples, at least portions of the aperture 323 are circumferentially aligned with at least portions of the openings 322.

In certain implementations, the cap 324, 524 defines grooves or recesses 448 through which fluid may flow during a leak check. For example, a test fixture 372, 572 may be fitted over the cap 324, 524 and around the outer ring 412 so that the test fixture 372, 572 seals to the manifold body 402. In some implementations, some fluid (e.g., air) may be introduced from the test fixture 372, 572 and into the enclosure 374, 574 via the valve arrangement 410 through the grooves or recesses 448. In other implementations, some or all fluid is introduced via the apertures 322, 522 in the outer wall 308, 508.

Figure 18:
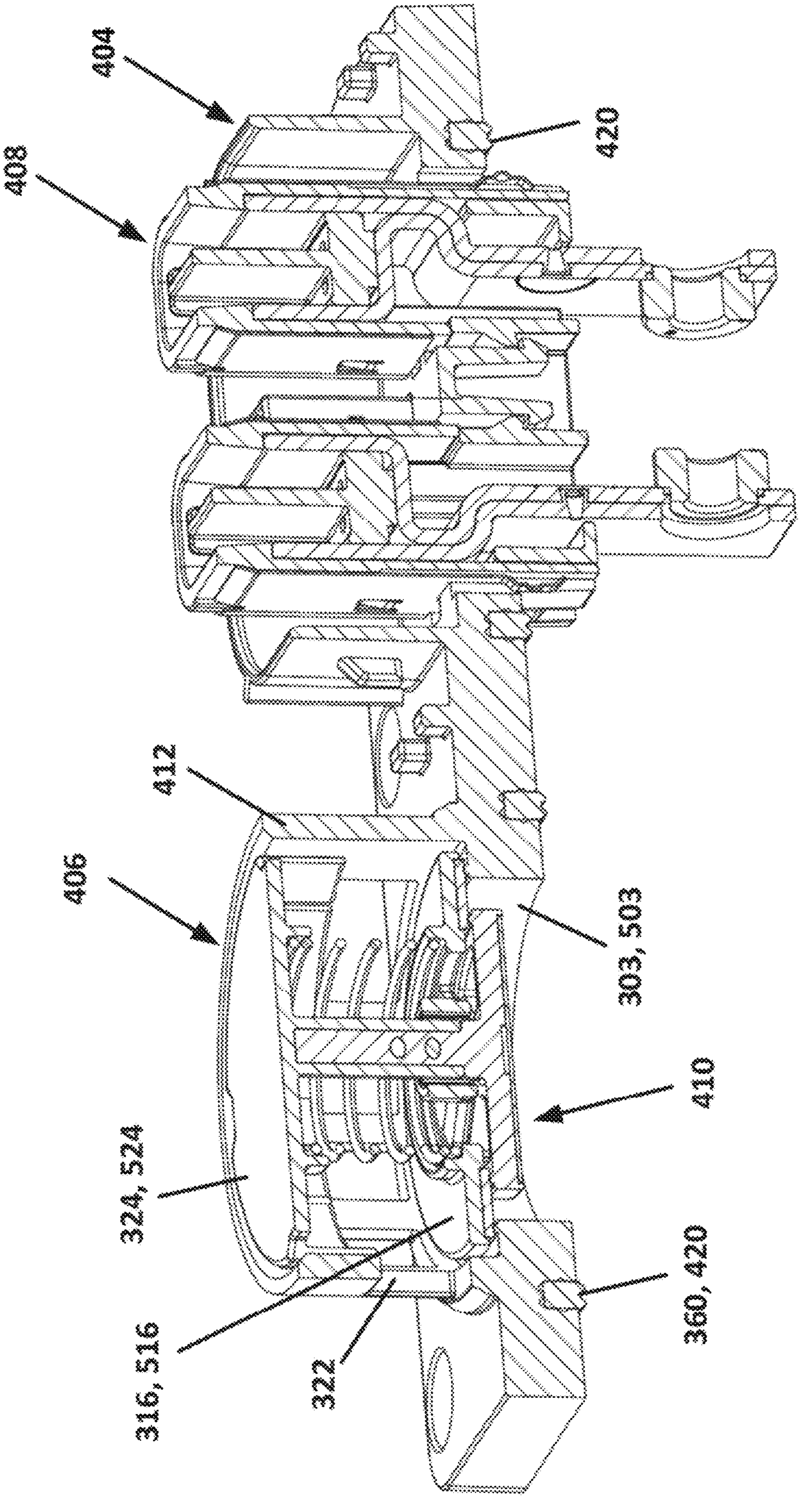
FIG. 18 is a cross-sectional view of the connector manifold arrangement of FIG. 17, according to an example.
Figure 19:
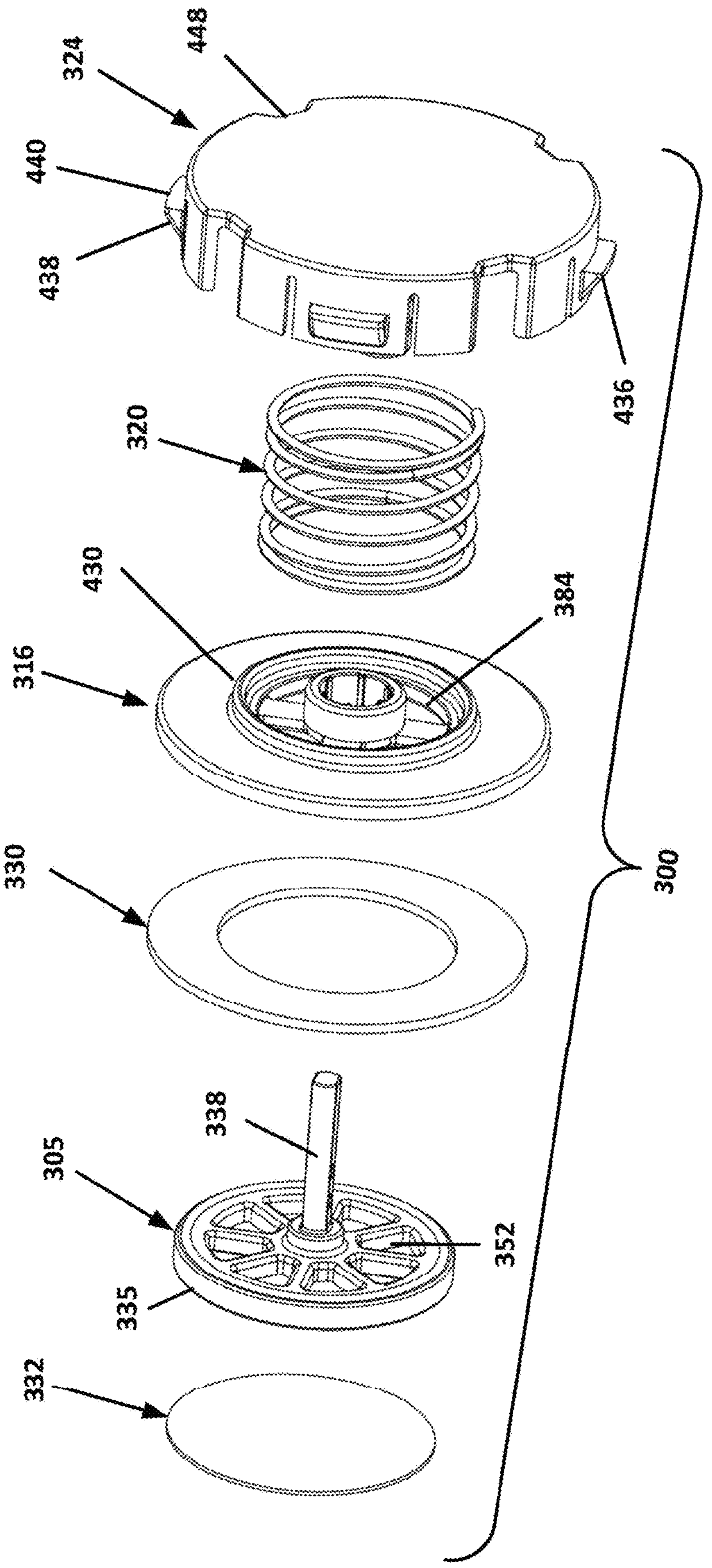
FIG. 19 is a first perspective view of an example valve arrangement suitable for mounting at the valve station of the connector manifold arrangement of FIG. 17 with the components shown exploded from each other for case in viewing, according to an example.
Figure 20:
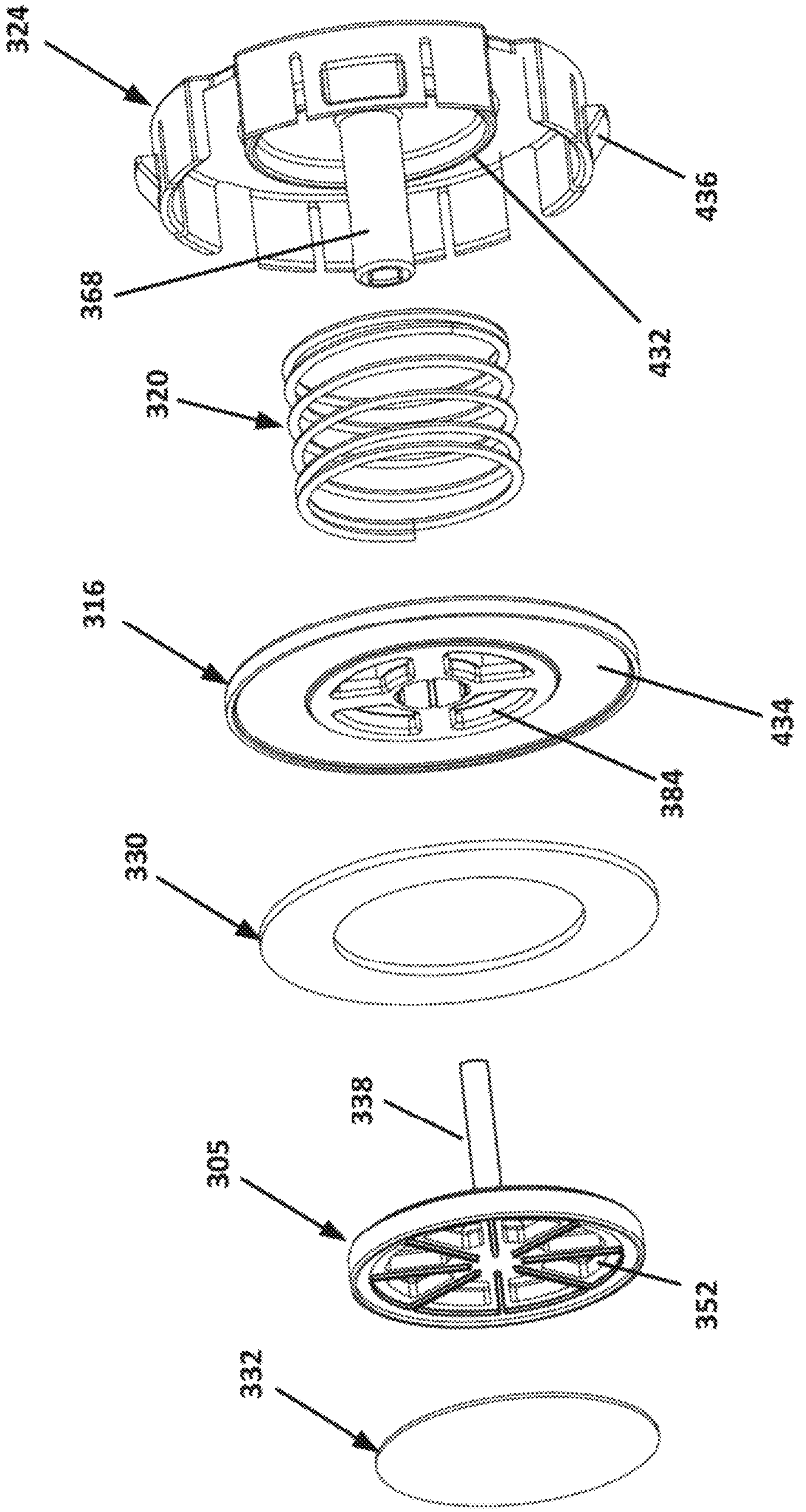
FIG. 20 is a second perspective view of the valve arrangement of FIG. 19.
Figure 21:
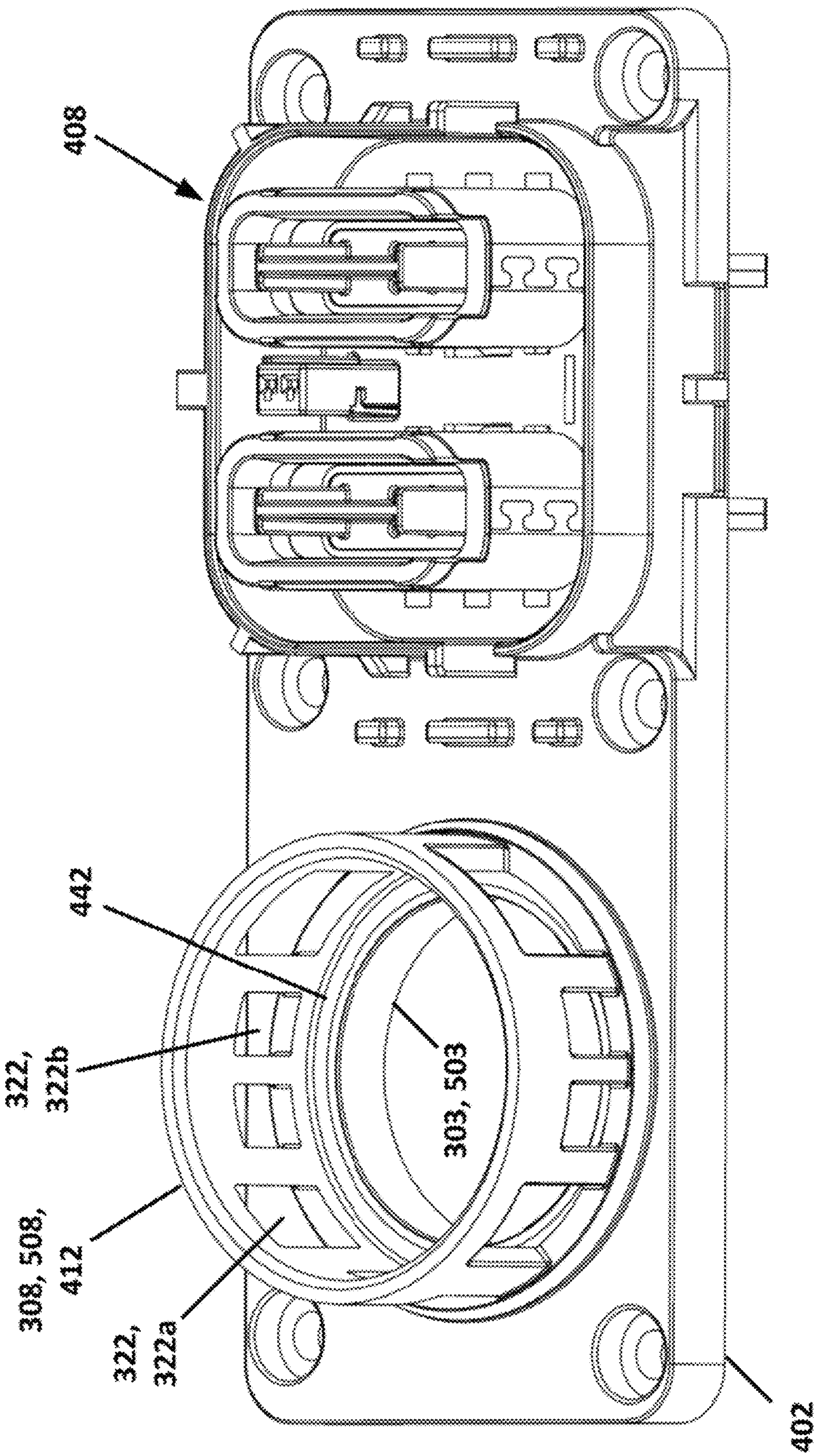
FIG. 21 is a perspective view of the connector manifold of FIG. 17 with the valve arrangement removed for case in viewing the valve station, according to an example.

In certain implementations, the manifold body 402 defines a ledge or shelf 442 surrounding the port 303, 503 (e.g., see FIG. 21). The ledge or shelf 442 extends radially inwardly from the raised ring 412 or other outer wall 308, 508. The valve relief disc member 316, 516 is sized to seat on the ledge or shelf 442 when disposed in the closed position. Interaction between the valve relief disc member 316, 516 and the ledge or shelf 442 inhibits removal of the valve arrangement 410 from the valve station 406 in a second direction opposite the first direction. As shown in FIG. 18, the disc portion 335, 535 of the valve test poppet member 305, 505 is disposed within the port 303, 503 (e.g., see FIG. 21). In some implementations, the manifold body 402 is sufficiently thick that the disc portion 335, 535 remains within the port 303, 503 while moving between the closed position and the open position. In other implementations, the disc portion 335, 535 passes through the port 303, 503 and into the enclosure 374 when in the open position.

Figure 22:
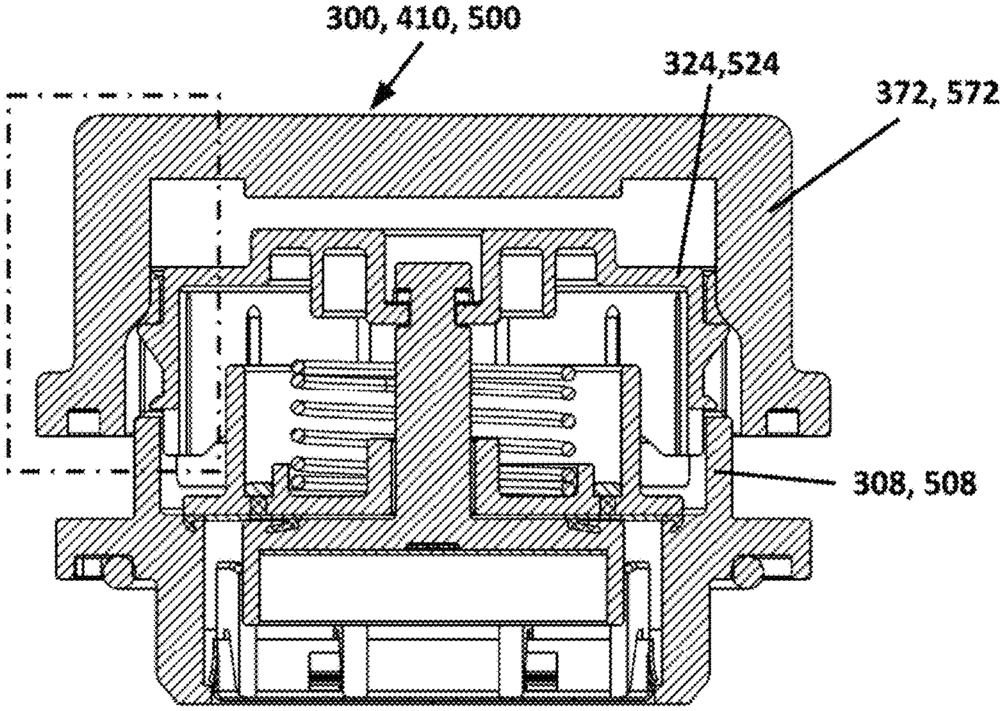
FIG. 22 is a cross-sectional view of another example valve arrangement configured in accordance with the principles of the present disclosure, the valve arrangement having a first example leak check actuation inhibitor arrangement, according to an example.
Figure 22A:
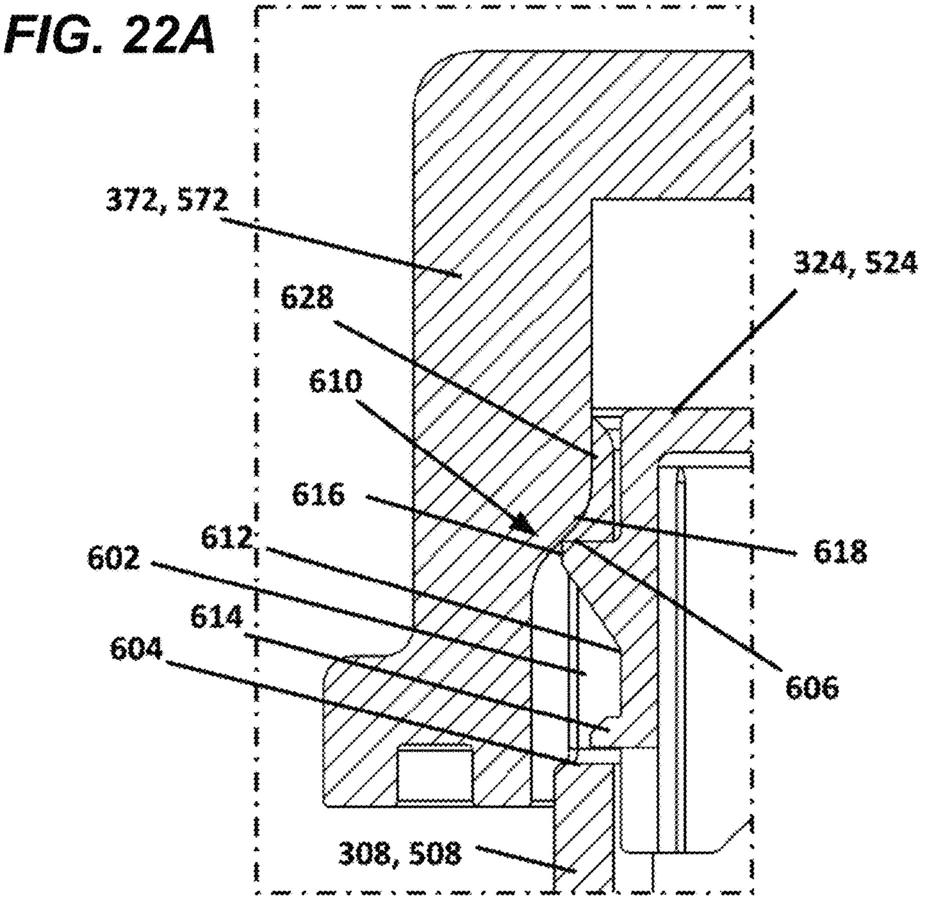
FIG. 22A is an enlarged view of a portion of FIG. 22, according to an example.
Figure 23:
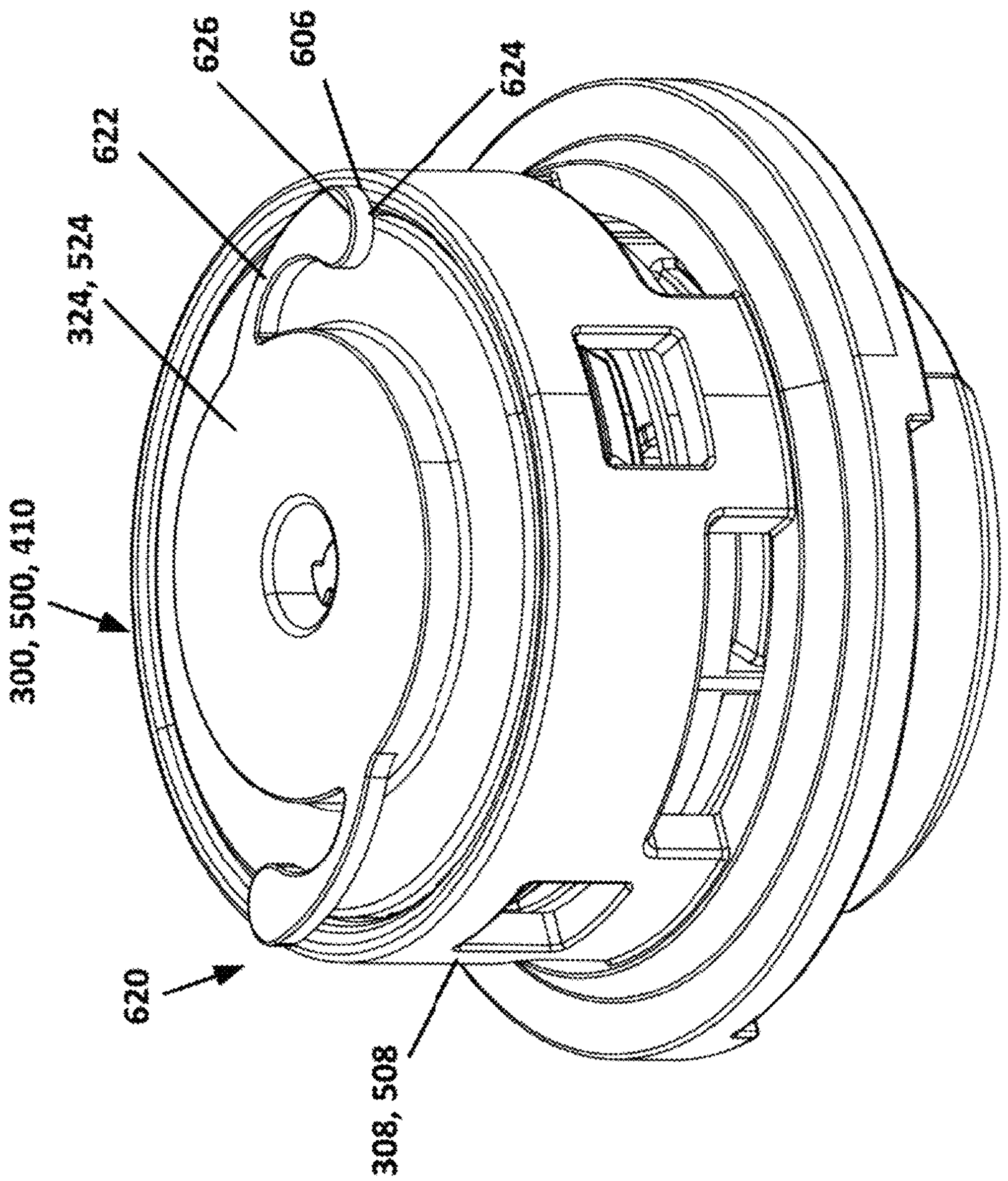
FIG. 23 is a cross-sectional view of another example valve arrangement configured in accordance with the principles of the present disclosure, the valve arrangement having a second example leak check actuation inhibitor arrangement, according to an example.
Figure 24A:
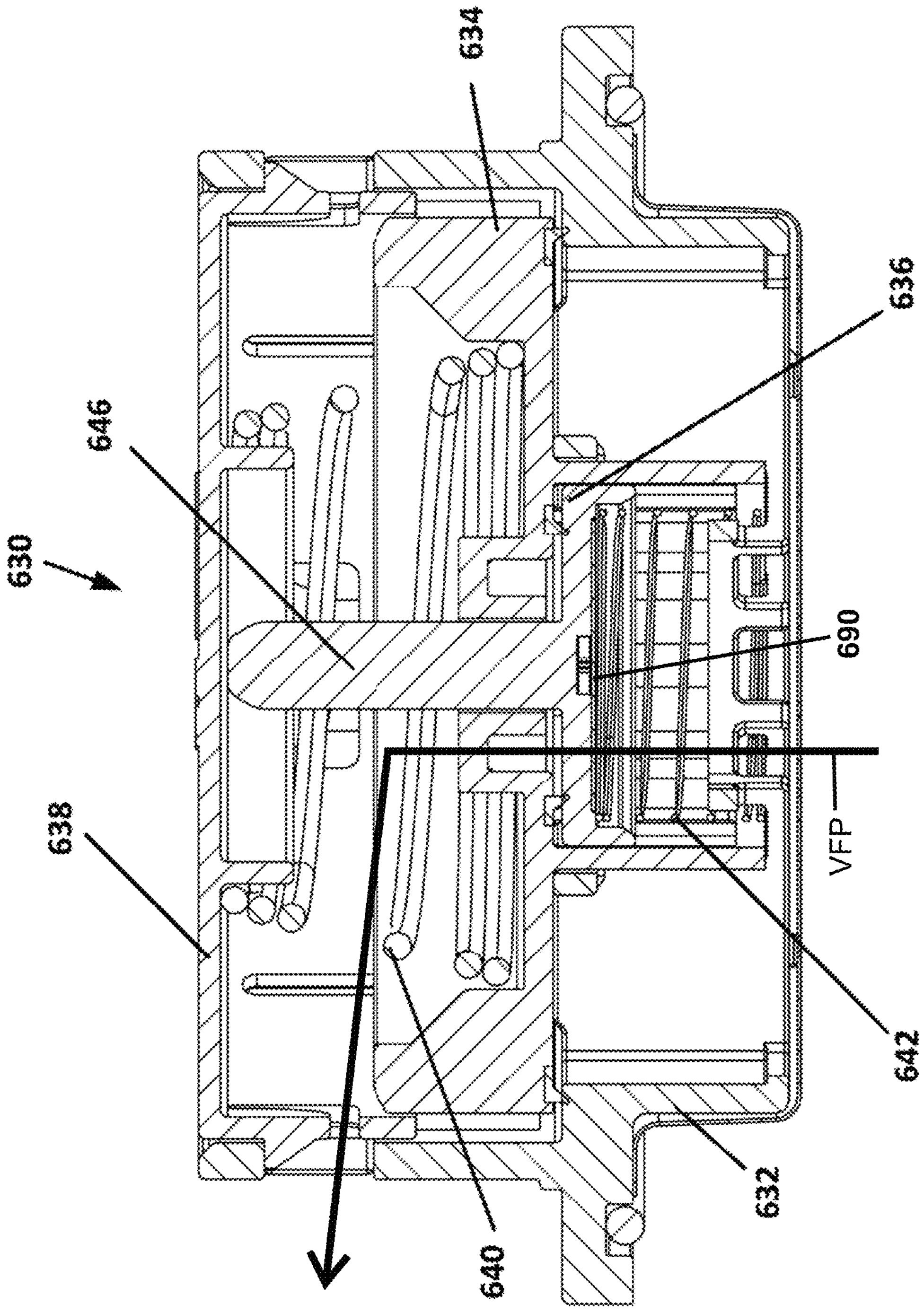
FIG. 24A is a cross-sectional view of another example valve arrangement configured in accordance with the principles of the present disclosure, the valve arrangement having a dual spring design, according to an example, the valve arrangement being disposed in the operation state.
Figure 24B:
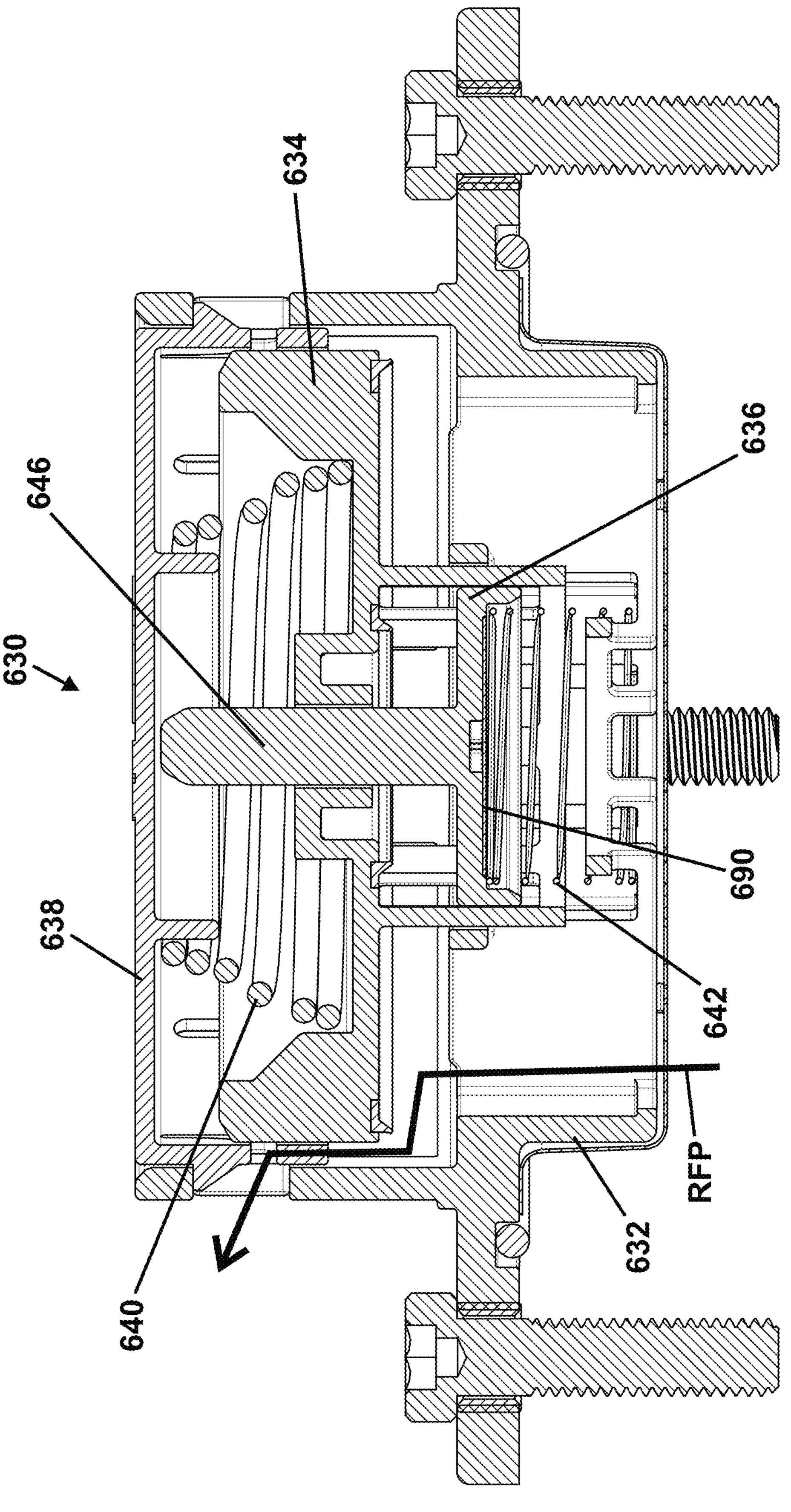
FIG. 24B is a cross-sectional view of the valve arrangement of FIG. 24A with the valve arrangement disposed in the relief state.
Figure 24C:
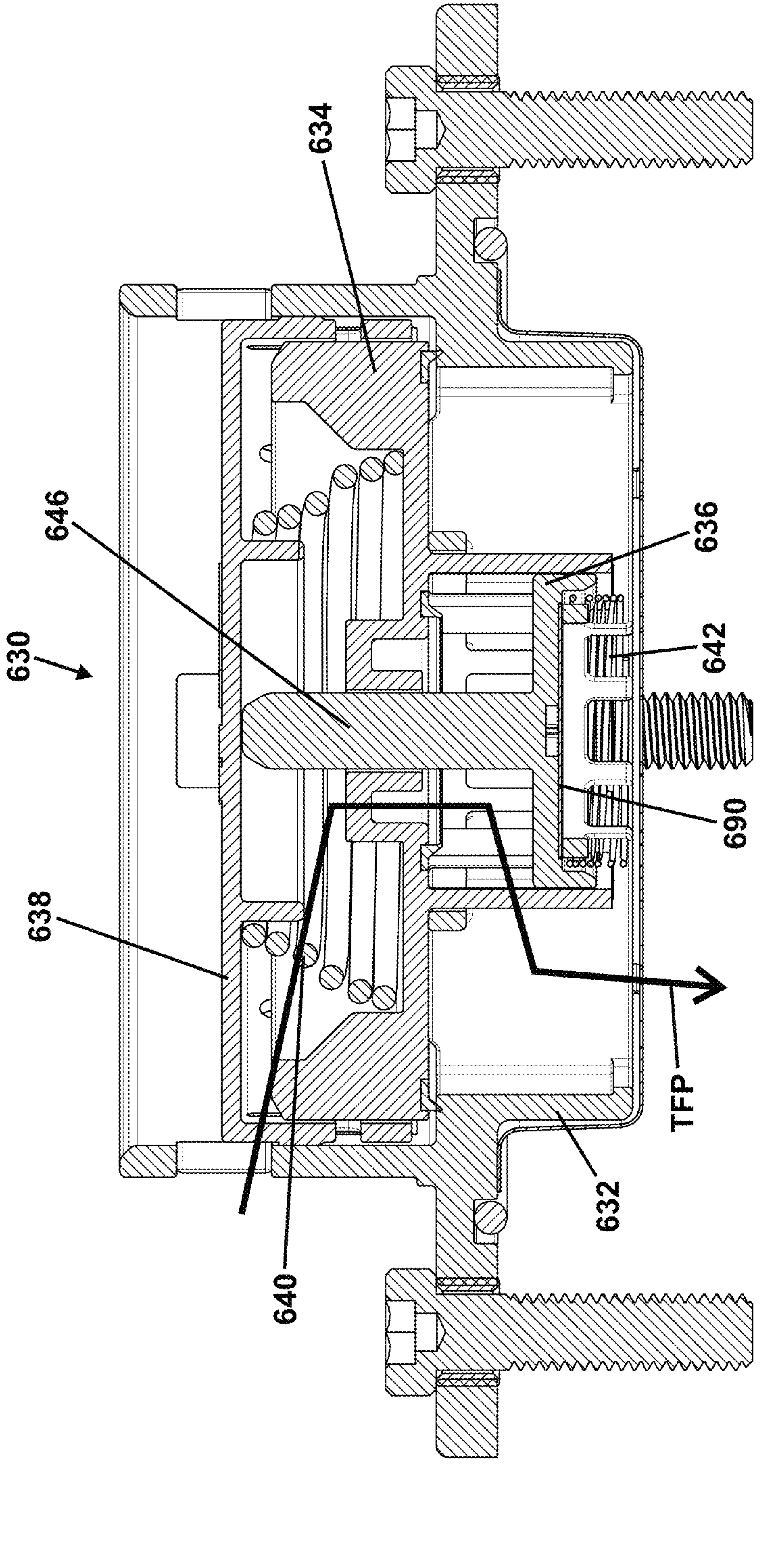
FIG. 24C is a cross-sectional view of the valve arrangement of FIG. 24A with the valve arrangement disposed in the testing state, the valve cap being shown depressed but the testing fixture being omitted from the figure for ease in viewing.
Figure 24D:
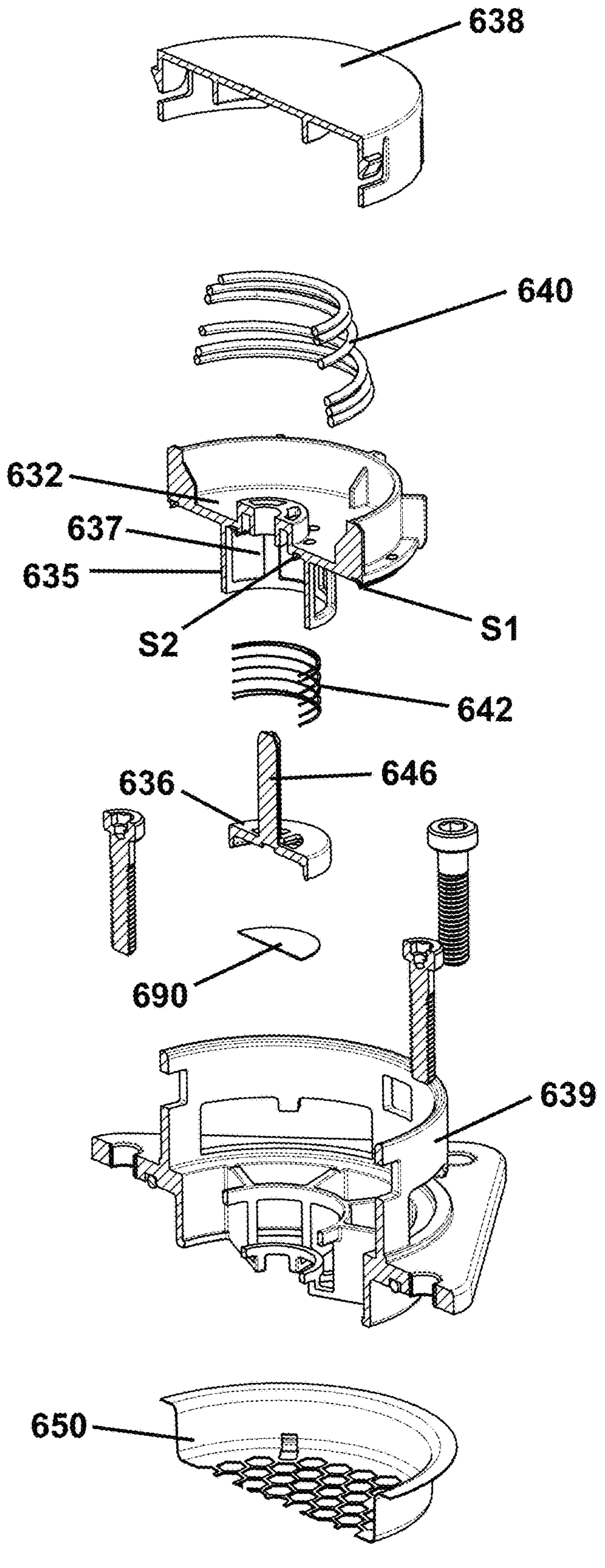
FIG. 24D is a perspective view of a cross-section of the valve arrangement of FIG. 24A with the components exploded away from each other for ease in viewing.
Figure 24E:
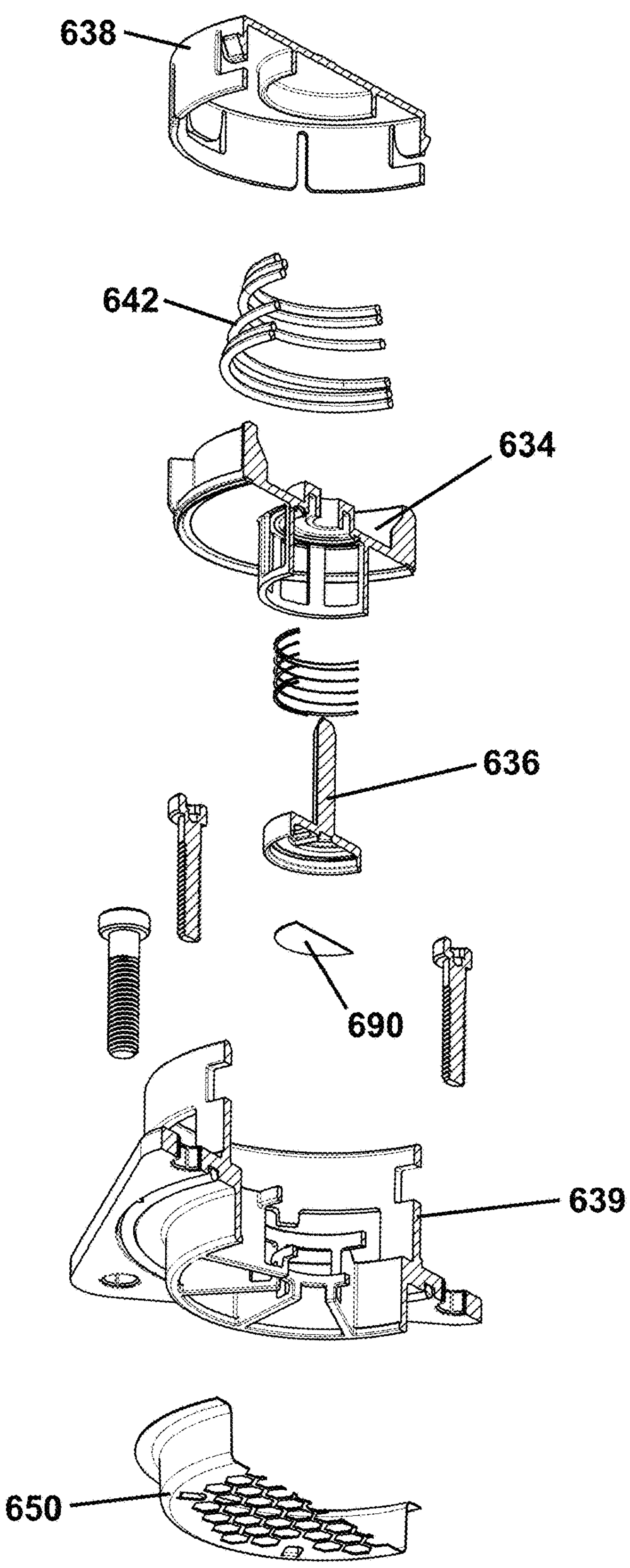
FIG. 24E is another perspective view of a cross-section of the valve arrangement of FIG. 24D.

Referring now to FIGS. 22, 22A, and 23, a leak check actuation inhibiting arrangement 610, 620 can be added to any of valve arrangements 300, 500, 410 disclosed herein. The leak check actuation inhibiting arrangement 610, 620 inhibits opening of the testing flow path FP3, FP6 when a leak check is not being performed. For example, the inhibiting arrangement 610, 620 may inhibit movement of the cap 324, 524 relative to the valve body (e.g., outer wall 308, 508) absent the presence of a leak check fixture 372, 572. Accordingly, the inhibiting arrangement 310, 620 helps to prevent unintentional (e.g., accidental) opening of the valve arrangement 300, 500, 410 during normal operation.

In certain implementations, the cap 324, 524 of the valve arrangement 300, 500, 410 can be configured to engage with the valve body (e.g., outer wall 308, 508) to inhibit movement of the cap 324, 524 relative to the valve body. The leak check fixture 372, 572 can include internal structure configured to engage or otherwise interact with the cap 324, 524 to disengage the cap 324, 524 from the valve body 300, 500. In certain implementations, interaction between the leak check fixture 372, 572 and the cap 324, 524 may release the cap 324, 524 for movement relative to the valve body, thereby allowing performance of a leak check.

In certain implementations, the inhibiting arrangement 610 includes one or more catch surfaces 604, 606 defined by the valve body (e.g., the outer wall 308, 508) and one or more retention members 612, 622 defined by the cap 324, 524. Each retention member 612, 622 includes a stop 614, 624 configured to abut the catch surface 604, 606 to inhibit travel of the cap 324, 524 to the depressed position relative to the valve body. To release the cap 324, 524 for movement to the depressed position, a first engagement feature 618 (e.g., a ramped surface) on the leak check fixture 372, 572 engages a second engagement feature 616, 626 (e.g., a cam follower) to flex, pivot, or deform the retention members 612, 622 to move the stop 614, 624 out of engagement with the catch surface 604, 606. Moving the stop 614, 624 out of alignment with the catch surface 604, 606 allows the cap 324, 524 to be moved to the depressed position so that the leak check can be performed.

As shown in FIG. 22, in certain implementations, the valve body has one or more windows 602 defining the catch surfaces 604. In certain examples, each retention member 612 is received in one of the windows 602 when the cap 324, 524 is mounted to the valve body. In certain examples, only some of the windows 602 receive retention members 612. In other examples, each window 602 receives a retention member 612. In certain implementations, the stop 614 protrudes through the window 602 to engage the catch surfaces 604 (e.g., see FIG. 22A). In certain examples, the second engagement feature 616 also protrudes through the window 602. In certain examples, the second engagement feature 616 engages another catch surface of the window 602 to inhibit removal of the cap 324, 524 from the valve body.

As further shown in FIG. 22A, the valve body may define slots 628 extending between the windows 602 and an exterior of the body. The slots 628 provide a path along which the first engagement feature 618 of the leak check fixture 372, 572 slides to reach the second engagement feature 616. In certain examples, the first engagement feature 618 includes a rib having a tapered or ramped surface that extends into the slot 628 when the fixture 372, 572 is mounted over the vent arrangement 300, 410, 500. Depression of the fixture towards the vent arrangement 300, 410, 500 moves the first engagement feature 618 against the second engagement feature 616 to flex the retention member 612 inwardly, thereby moving the stop 614 away from the catch surface 604.

FIG. 23 shows another example implementation of an actuation inhibitor 620. In FIG. 23, the inhibit 620 includes flexible arms 622 that extend radially outwardly from the cap 324, 524 so that stop members 624 engage a catch surface 606 of the valve body. In the depicted example, the catch surface 606 is located at a top of the valve body. To free the cap 324, 524 for movement to the depressed position, the leak check fixture 372, 572 would be lowered over the vent 300, 500, 410 so that internal engagement features rotationally aligned with the flexible arms 622. The leak check fixture 372, 572 would then be rotated so that the internal engagement features cammed or otherwise engaged the arms 622 to flex, pivot, or deform the arms 622 radially inwardly, thereby moving the stop members 624 out of alignment with a catch surface 606 of the valve body.

FIGS. 24A-24E and 25 illustrate two-spring designs for example valve arrangements 630 configured in accordance with the principles of the present disclosure. For example, the valve arrangements 630 also are configured to provide passive venting along a venting flow path VFP (see FIG. 24A), thermal runaway relief along a relief flow path RFP (see FIG. 24B), and leak check functionality along a testing flow path TFP (see FIG. 24C). In certain examples, the valve arrangements 630 can be formed with an inhibiting arrangement (e.g., inhibiting arrangement 610 of FIG. 22 or inhibiting arrangement 620 of FIG. 23). Each of the valve arrangements 630 includes a valve body 632, a gateway member such as a valve relief disc member 634, a blocking member such as a valve test poppet member 636, and a cap 638.

In certain implementations, the valve test poppet member 636 carries a membrane 690. In some examples, the membrane 690 is disc shaped and carried by a disc section of the test valve poppet member 636. In other examples, the membrane 690 is tubular and disposed about a stem 648 of the test valve poppet member 636. In the example shown in FIG. 24A, the membrane 690 is disposed between a disc-section of the valve test poppet member 636 and the valve passage to the interior of the enclosure. In the example shown in FIG. 25, the disc-section of the valve test poppet member 636 is disposed between the membrane 690 and the valve passage to the interior of the enclosure.

In FIGS. 24A-24E and 25, a first biasing element 640 is provided between the valve relief disc member 634 and the cap 638 while a second biasing element 642 is provided between the valve body 632 and the valve test poppet member 636. In certain implementations, the first biasing element 640 biases the valve relief disc member 634 to the sealing position to close the relief flow path RFP. In certain implementations, the first biasing element 640 also biases the valve cap 638 to the undepressed position. In certain implementations, the second biasing element 642 biases the valve test poppet member 636 to the sealing position to close the testing flow path TFP. Separating out the biasing elements 640, 642 decouples the tolerance of the valve seal member 317, 517 and the poppet seal member 330, 530.

In certain examples, the first biasing element 640 is a conical spring. In the depicted example, the conical spring tapers inwardly as the conical spring 640 extends towards the cap 638. The conical shape of the first biasing element 640 allows the biasing element 640 to compress more fully compared to a coil spring. Accordingly, the conical shape enhances the travel distance over which the cap 324, 524 can travel relative to the valve body, which increases the distance between the poppet seat 315, 515 and the poppet seal 330, 530. Increasing the distance between the poppet seat 315, 515 and the poppet seal 330, 530 may increase the size of the testing flow path during the leak check.

In FIGS. 24A-24E and 25, interaction between the cap 638 and the valve test poppet member 636 limits movement of the valve test poppet member 636 relative to the valve relief disc member 634. For example, during thermal runaway, the valve relief disc member 634 moves upwardly towards the cap 638 to an open position to open a pressure relief flow path (e.g., relief flow path FP2 of FIG. 6 or relief flow path FP5 of FIG. 9). In certain examples, the valve relief disc member 634 also is moved away from the valve test poppet member 636. The interaction between the cap 638 and the poppet portion 646 may space the valve relief disc member 634 from the valve test poppet member 636, thereby opening a leak check path FP3 in addition to the pressure relief path FP2.

In FIG. 24A-24E, the second biasing element 646 biases the test valve poppet member 636 against a stop surface of the valve relief disc member 634. The cap 638 has a generally flat central region at the inner side. A stem 646 of the valve test poppet member 636 extends upwardly towards the cap 638 to interact with the central region of the cap 638. When the cap 638 is not depressed, the stem 646 of the valve test poppet member 636 may be free floating relative to the cap 638. Depressing the cap 638 brings the inner side of the cap 638 into contact with the stem 646. Movement of the cap 638 may press the valve test poppet member 636 against the bias of the second biasing element 642 to press the valve test poppet member 636 away from the valve relief disc member 634.

Figure 25:
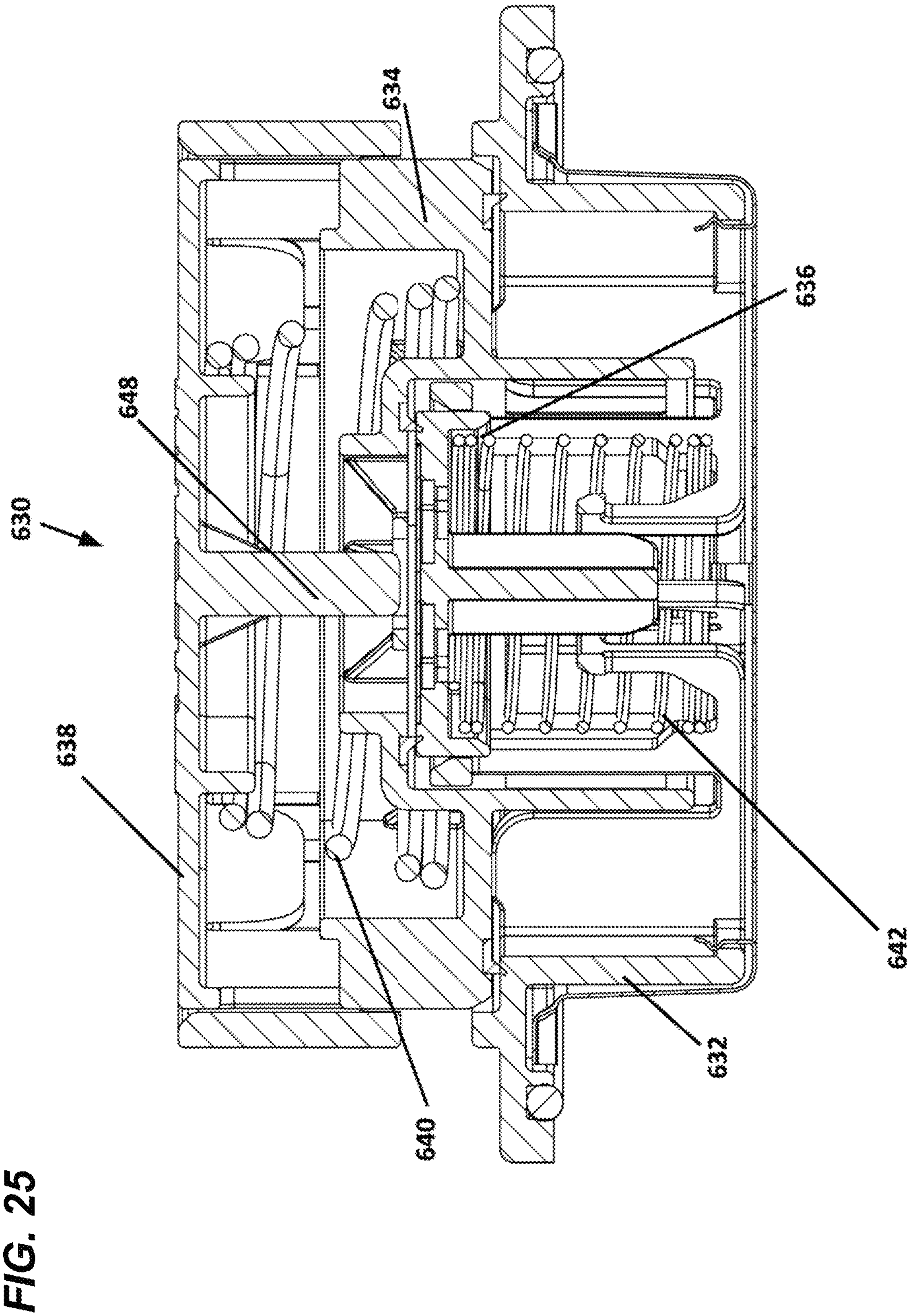
FIG. 25 is a cross-sectional view of another example valve arrangement configured in accordance with the principles of the present disclosure, the valve arrangement also having a dual spring design, according to an example.

In FIG. 25, the cap 638 includes a downwardly extending stem 648 that engages a top of the valve test poppet member 636. When the cap 638 is not depressed, the stem 648 of the cap 638 may be free floating relative to the valve test poppet member 636. Depressing the cap 638 brings the stem 648 into contact with the valve test poppet member 636. Movement of the cap 638 may press the valve test poppet member 636 against the bias of the second biasing element 642 to press the valve test poppet member 636 away from the valve relief disc member 634.

In certain implementations, the valve relief disc member 634 carries a first seal member S1 configured to seal between the valve relief disc member 634 and a vent housing 639. In certain examples, the valve relief disc member 634 also carries a second seal member S2 configured to seal between the valve relief disc member 634 and the valve test poppet member 636. In certain examples, the first seal member S1 and the second seal S2 are carried at a common side of the valve relief disc member 634. In certain examples, the first seal member S1 is radially aligned with the second seal member S2.

In certain implementations, the valve relief disc member 634 includes a cage 635 that surrounds at least the disc section of the valve test poppet member 636 as the poppet member 636 moves between the blocking and unblocking positions. The cage 635 defines windows 637 through which fluid passing along the testing flow path TFP flows when the valve 630 is configured in the testing state (see FIG. 24C). In certain examples, the cage 635 extends downwardly from a disc section carrying the first and second seals S1, S2. In certain examples, the cage 635 inhibits tilting of the test valve poppet member 636 as the poppet member transitions between the blocking and unblocking positions.

Figure 26:
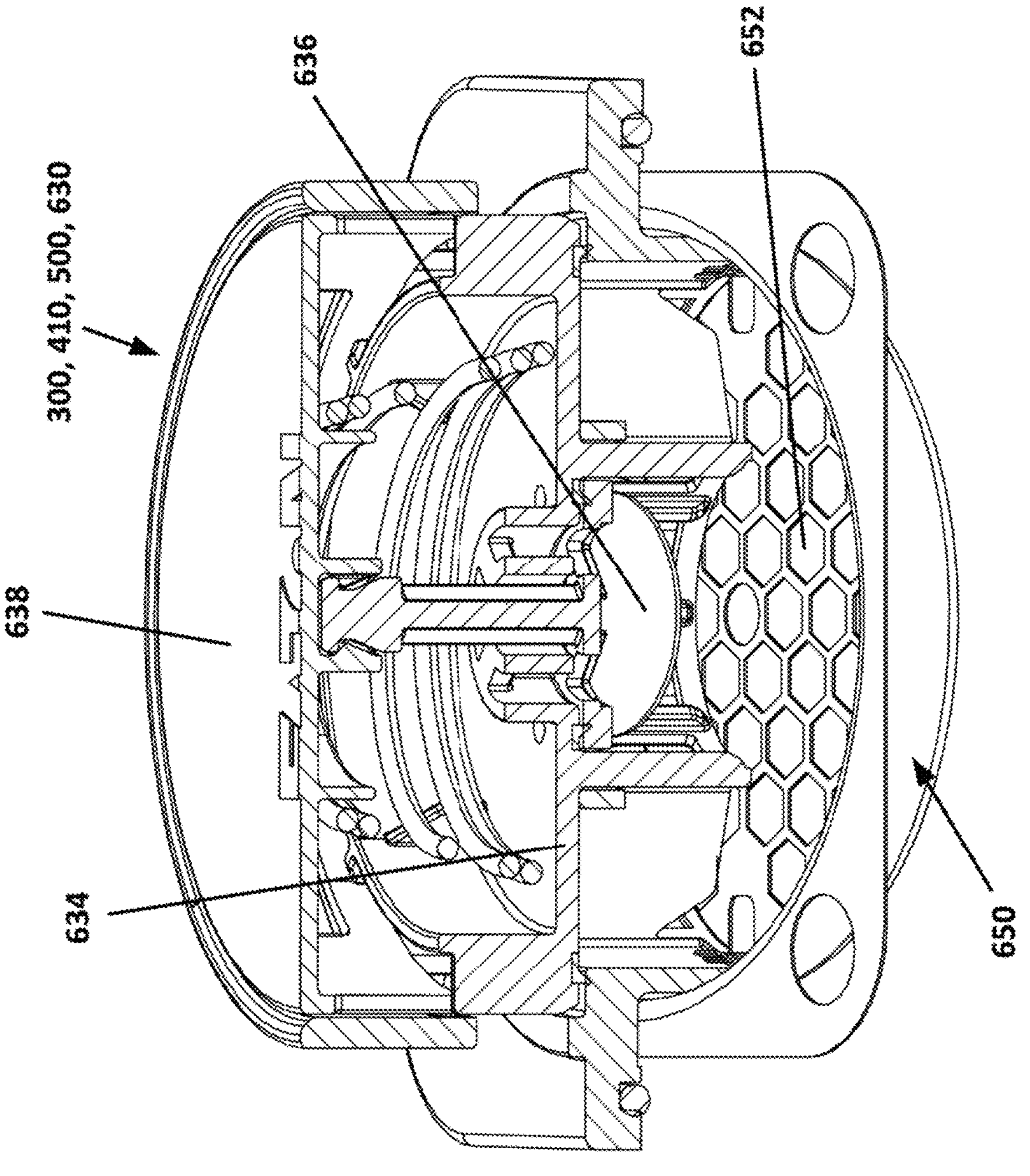
FIG. 26 is a first perspective view of a partial cross-section of another example valve arrangement configured in accordance with the principles of the present disclosure, the valve arrangement including a flame/particle arrester, according to an example.

Referring now to FIG. 26, a flame/particle arrester 650 may be mounted to any of the valve arrangements 300, 410, 500, 630 disclosed herein. The flame/particle arrester 650 extends across the port (e.g., port 303, 503) of the valve arrangement 300, 410, 500, 630 to separate the interior of the valve arrangement 300, 410, 500, 630 from the interior of the battery case 374, 574. The flame/particle arrester 650 inhibits particles of a predetermined size from leaving the battery case 372, 572. For example, the flame/particle arrester 650 may protect against shrapnel or debris formed within the battery case 372, 572 during thermal runaway.

In certain implementations, the flame/particle arrester 650 includes a metal mesh. In certain examples, the flame/particle arrester 650 defines a plurality of holes (e.g., in a honeycomb pattern) or slots through which fluid (e.g., gas or liquid) may pass. The flame/particle arrester 650 has a higher melting point than the valve body and so will continue to inhibit particles within the enclosure from leaving the enclosure with the relief fluid even after the valve melts. In some examples, the flame/particle arrester 650 secures to the vent arrangement 300, 410, 500, 630 so that the flame/particle arrester 650 and the vent arrangement 300, 410, 500, 630 can be mounted to the battery case 372, 572 as a unit. In other examples, the flame/particle arrester 650 is sandwiched between the vent arrangement 300, 410, 500, 630 and the battery case 372, 572 when the vent arrangement 300, 410, 500, 630 is mounted to the battery case 372, 572.

Figure 27:
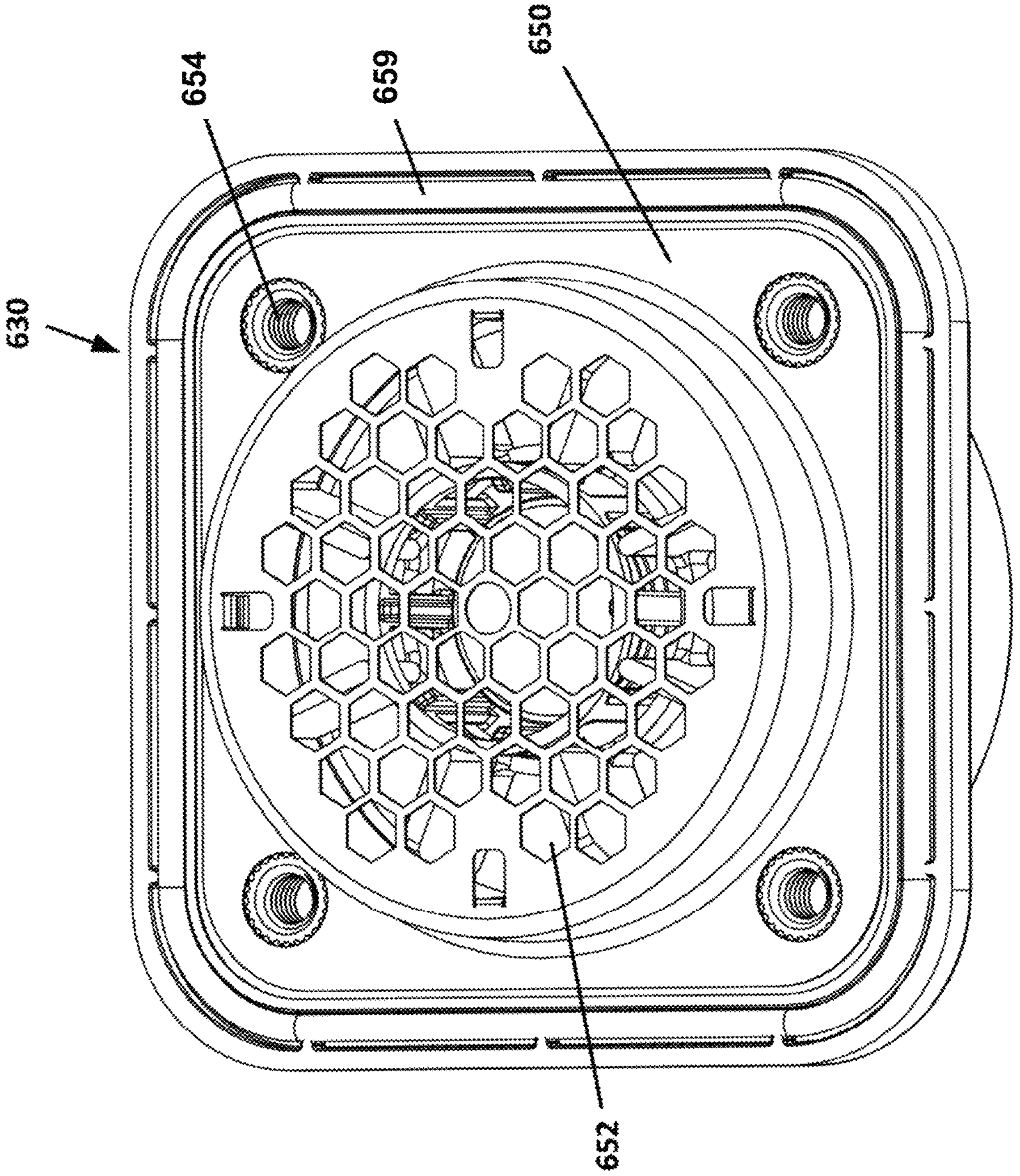
FIG. 27 is a second perspective view of the valve arrangement of FIG. 26, according to an example.

FIG. 27 shows the portion of the valve arrangement of FIG. 26 configured to interface with the enclosure (e.g., enclosure 372, 572 above). A seal member 659 is configured to seal between the valve housing and the enclosure, thereby selectively sealing the opening of the enclosure using the valve arrangement. In certain implementations, the flame/particle arrester 650 is disposed within the seal member 659. The flame/particle arrester 650 can be bolted or otherwise coupled to the vent arrangement 630. In certain examples, the flame/particle arrester 650 is bolted between the vent arrangement 630 and the enclosure.

In certain examples, torque limiters 654 are disposed within fastener openings extending through the valve body. In certain examples, the torque limiters 654 are rigid rings or c-shaped members that fit within the fastener openings. The torque limiters 654 are stronger than the valve body. Accordingly, the torque limiters 654 inhibit breaking of the valve body during the process of mounting the vent arrangement 630 to the battery case 374, 574. For example, the torque limiters 654 may protect against over tightening of the bolts when mounting the vent arrangement 300, 410, 500, 630 to the enclosure 372, 572. In certain examples, the torque limiters 654 are metal (e.g., brass) while the valve body may be formed of plastic.

Figure 28:
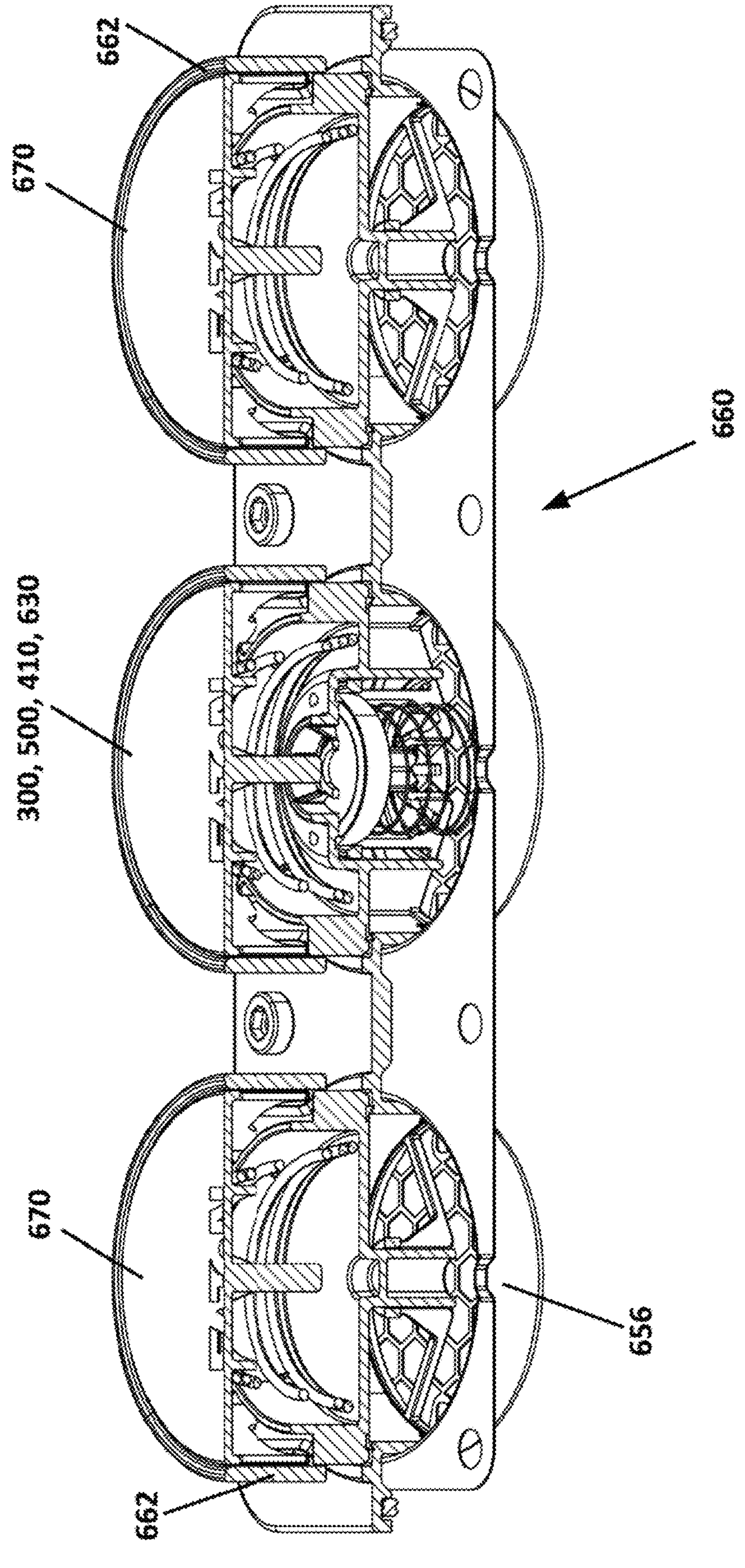
FIG. 28 is a first perspective view of an example manifold holding a plurality of valves arrangements including a valve arrangement configured in accordance with the principles of the present disclosure, the valve arrangement being any of the valve arrangements being disclosed herein, according to an example.
Figure 29:
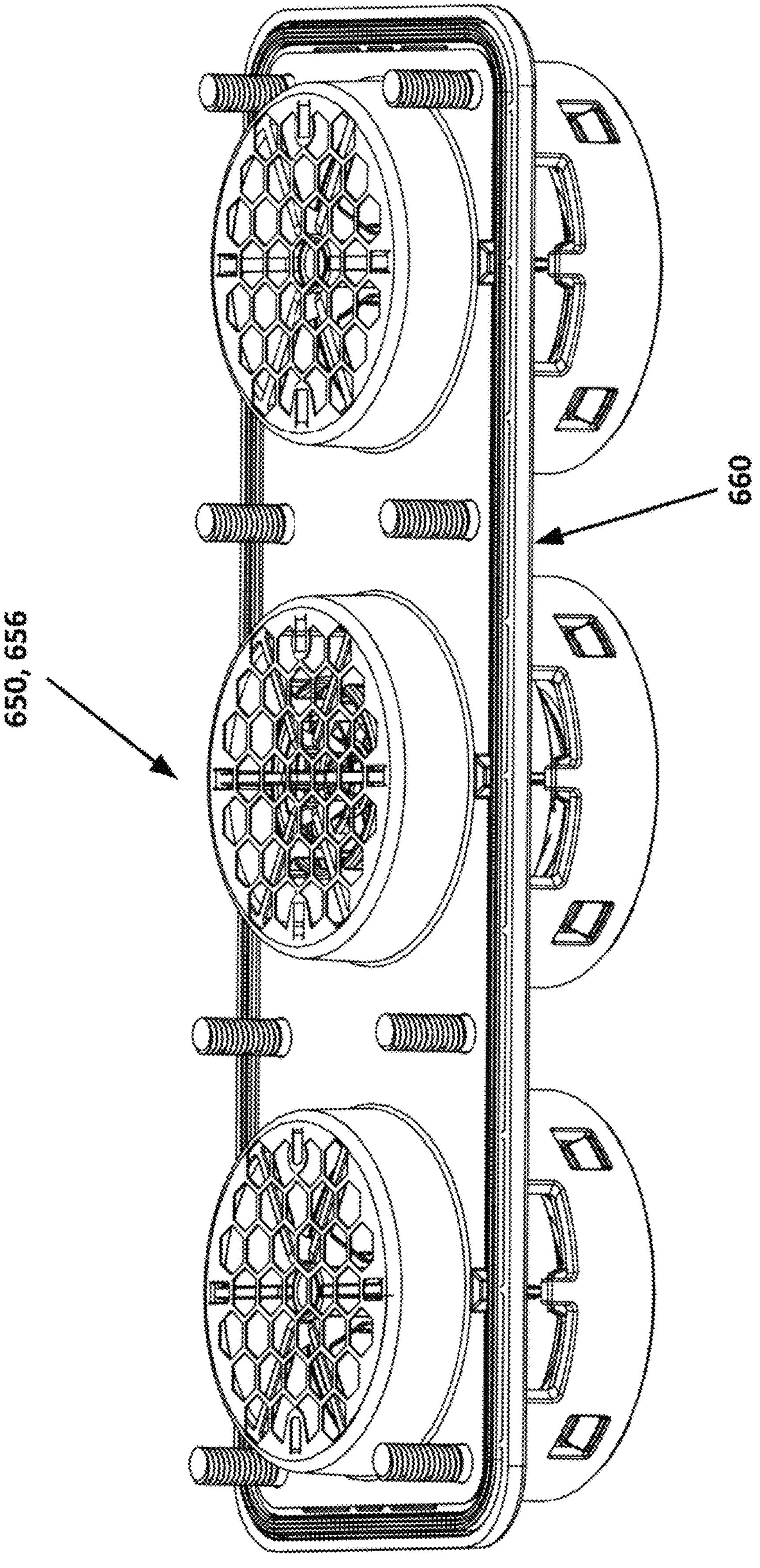
FIG. 29 is a second perspective view of the manifold of FIG. 28 showing a multi-valve flame/particle arrester, according to an example.

FIGS. 28 and 29 show an example manifold 660 defining a plurality of valve stations 662. Each valve station 662 is configured to hold a valve arrangement configured in accordance with the principles of the present disclosure (e.g., any of the valve arrangements 100, 300, 410, 500, 630 disclosed herein). In some implementations, the manifold station 662 defines a portion of the valve arrangement, such as an outer wall 308, 508 of the valve housing. In other implementations, a separate valve arrangement 300, 410, 500, 630 may be mounted at the valve station 662.

The manifold 660 seals to the enclosure 374, 574. The manifold 660 exposes interior portions of one or more vent arrangements to the interior of the enclosure. In certain implementations, a valve station 662 of the manifold 660 may hold one or more of any of the valve arrangements 100, 300, 500, 410, 630 described herein. For example, the manifold 660 may hold a three-stage valve arrangement that provides (1) passive venting, (2) thermal runaway relief, and (3) leak check functionality.

In certain implementations, the manifold 660 may hold one or more single-stage valve arrangements 670 at corresponding valve stations 662 in addition to holding the one or more three-stage valve arrangements 300, 410, 500, 630. For example, in the depicted example, the three-stage valve arrangement 300, 500, 410, 630 is disposed between two single-stage valve arrangements 670 that each provide only thermal run-away relief. Accordingly, the manifold 660 allows for a greater thermal run-away relief than would be possible through only one three-stage valve arrangement 300, 500, 410, 630. Further, using one-stage valve arrangements 670 reduces the cost of the manifold assembly compared to using all three-stage valve arrangements 300, 410, 500, 630.

In certain implementations, a flame/particle arrester 650 can be disposed at the valve arrangements (e.g., the single stage valve arrangement 670 and/or the three-stage valve arrangement 300, 500, 410, 630, etc.) held at the manifold 660. In some implementations, a respective flame/particle arrester 650 (e.g., see FIGS. 26 and 27) can be separately mounted at each valve station 662. In other implementations, a joint flame/particle arrester 656 can be mounted to the manifold 660 to extend over each valve station 662. The joint flame/particle arrester 656 defines a plurality of groupings of holes or slots at each valve station connecting each valve arrangement 100, 300, 410, 500, 630, 670 to the interior of the enclosure 372, 572. The flame/particle arrester 656 can act as a filter to inhibit larger chunks of internal battery components from being propelled out of the case by the relief fluid.

Figure 30:
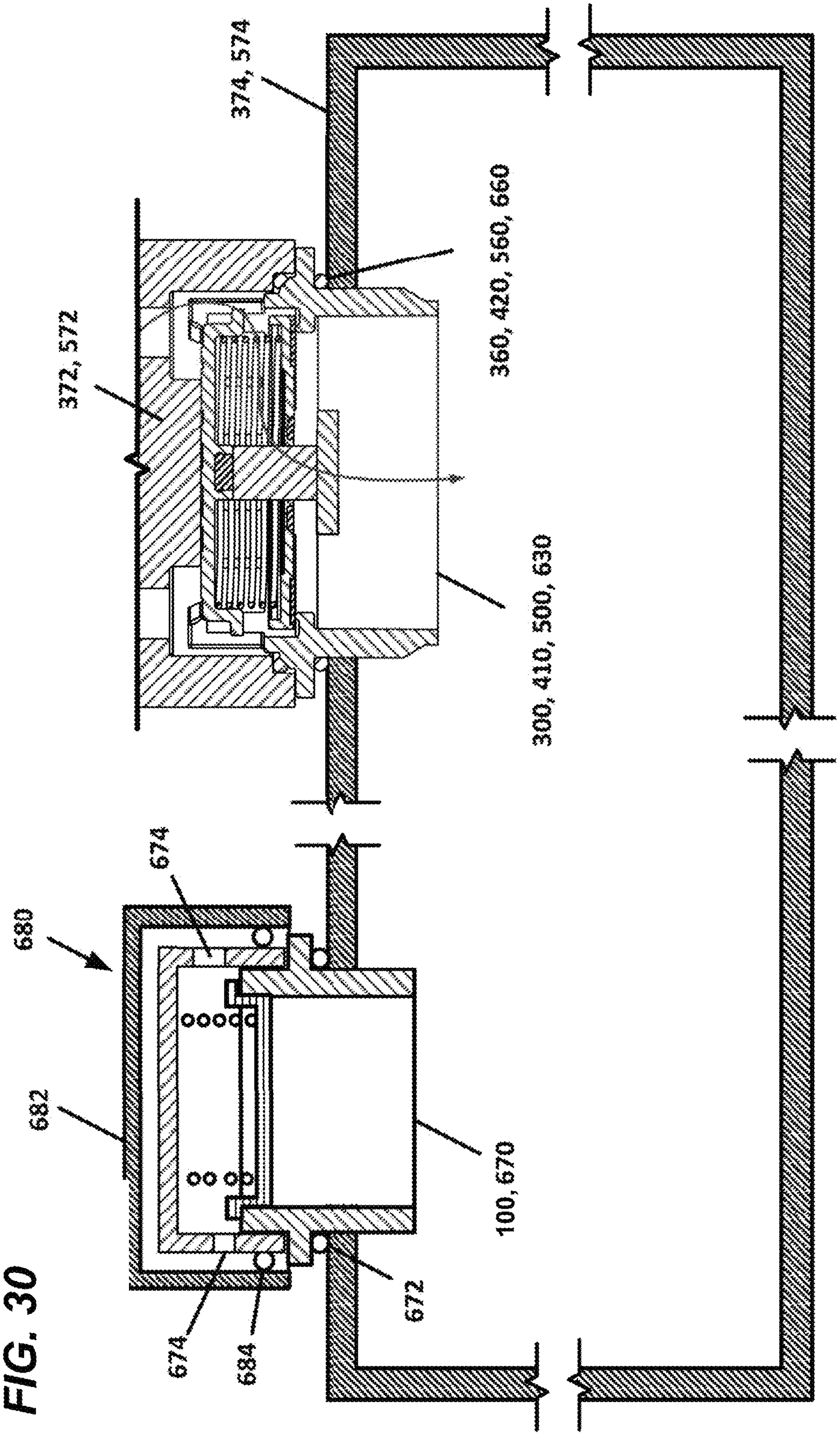
FIG. 30 illustrates a cross-section of a three-stage valve and another type of valve mounted at an enclosure during a leak check, the three-stage valve being fitted with a test fixture, and the other type of valve being fitted with a sealing cap, according to an example.

Referring to FIG. 30, a leak check (e.g., an end-of-line leak check) can be performed on the battery case 374, 574 or other enclosure with one or more valves 100, 300, 410, 500, 630, 670 installed thereat. For example, one or more three-stage valves 300, 410, 500, 630 and/or one or more other types of valves 670 can be sealingly installed at the enclosure 374, 574. The other valves 670 can be single-stage valves (e.g., providing thermal runaway or other pressure spike relief) and/or dual-stage valves (e.g., providing passive venting along with pressure relief). In certain examples, all valves intended to be installed at the enclosure are installed prior to the leak check. In some examples, the valves are installed as a unit (e.g., mounted to a common manifold 660 as shown in FIGS. 28 and 29). In other examples, the valves can be mounted to the enclosure 374, 574 separately or in multiple groups.

In the example shown in FIG. 30, a valve 670 is mounted to the enclosure. A gasket 672 seals between the valve 670 and the enclosure. To help test this seal, the valve 670 is mounted to the enclosure before the leak check is performed. In accordance with aspects of the disclosure, a sealing cap 680 is mounted to the valve 670 to inhibit fluid flow through one or more apertures 674 defined in the valve 670. The sealing cap 680 includes a cover 682 that seals to the valve 670 (e.g., to an exterior of the valve 670). In certain examples, the cover 682 carries a seal 684 (e.g., a gasket) at an interior of the cover 682. The apertures 674 of the valve 670 are sealingly enclosed within the cover 682 when the sealing cap 680 is mounted to the valve 670. However, the seal 672 between the valve 670 and the enclosure 374, 574 is not enclosed within the sealing cap 680.

In operation, fluid (e.g., gas) is pumped into the enclosure (e.g., through a three-stage valve 300, 410, 500, 630) during the leak check via a test fixture 372, 572 to check the enclosure 374, 574 for leaks. The scaling cap 680 inhibits any fluid from escaping from the enclosure via the valve 670 unless the valve 670 has not been sufficiently sealed to the enclosure 374, 574. Absent a sufficient seal 672, fluid may escape from the enclosure at the interface between the enclosure 374, 574 and the valve 670. If such a leak is found, corrections to the seal 672 can be made and the enclosure 374, 574 can be re-tested. By enabling the valve 670 to be disposed at the enclosure during performance of the leak check, the viability of the seal 672 as well as a remainder of the enclosure can be tested during the leak check.

Similarly, in certain implementations, the test fixture 372, 572 is configured to seal to the three-stage valve 300, 410, 500, 630 without covering the seal 360, 420, 560, 660 between the valve 300, 410, 500, 630 and the enclosure 374, 574. Accordingly, the seal 360, 420, 560, 660 can be tested along with a remainder of the enclosure during the leak check. In still other implementations, the enclosure 374, 574 includes only single or dual stage valves 670 through which a leak check cannot be directly performed. In certain such implementations, most or all of the valves 670 are installed at the enclosure 374, 574 and covered with a sealing cap 680. A test fixture can then be attached to the enclosure (e.g., through an valve aperture or other aperture) and the leak check be performed.

Figure 31:
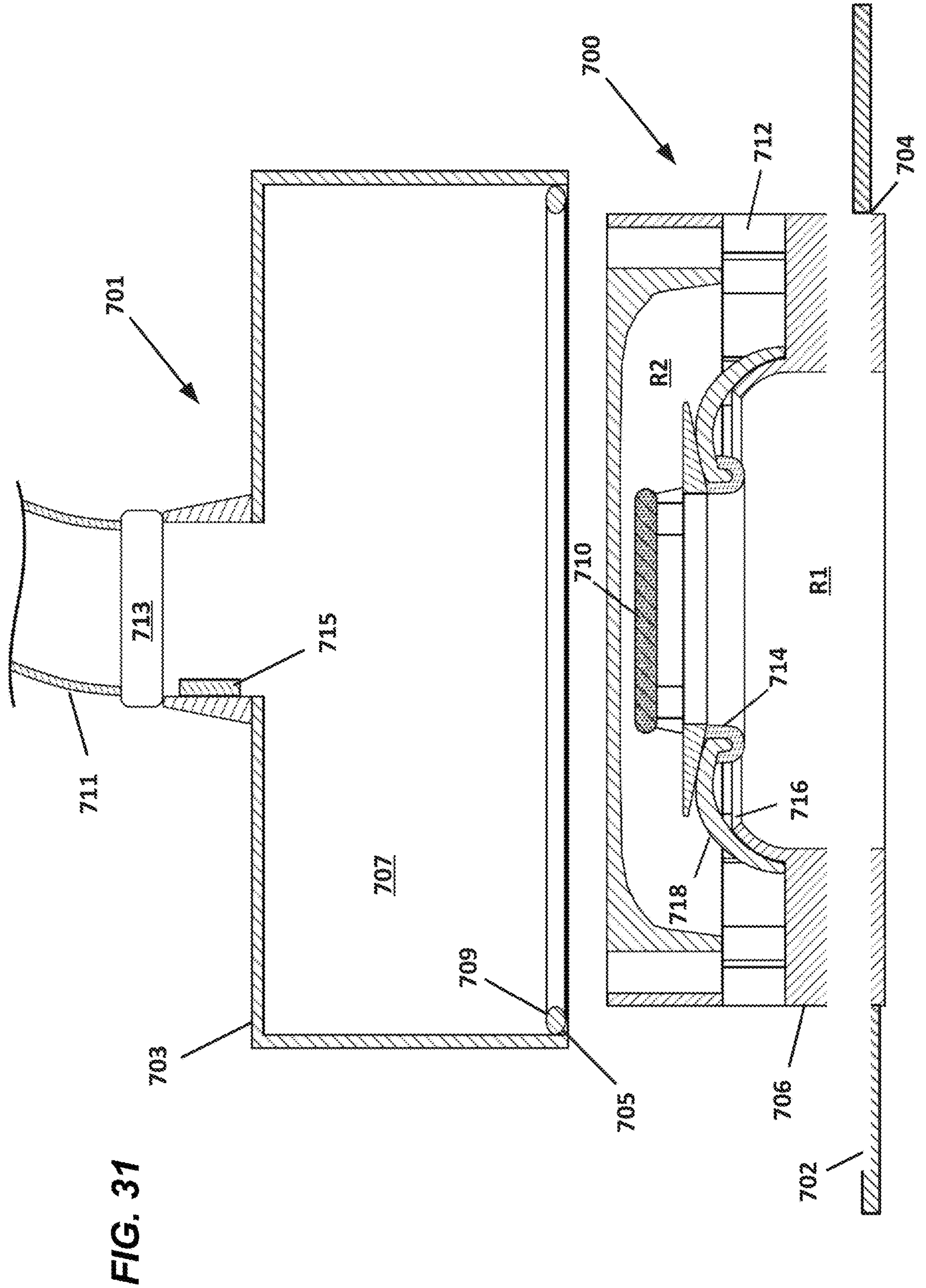
FIG. 31 shows a first valve, which is configured to provide passive venting and thermal runaway relief, mounted to an enclosure and an example test fixture configured to facilitate leak checking of the enclosure through the valve, according to an example.

Referring to FIG. 31, a valve 700 is shown mounted to an enclosure 702 at a port 704. The valve 700 includes a housing 706 defining a gas opening 708 leading to an internal porous membrane 710 separating the interior of the valve 700 into a first region R1 and a second region R2. The first region R1 is disposed between the porous membrane 710 and the interior of the enclosure 702. The second region R2 is disposed between the porous membrane 710 and one or more windows 712 or other openings leading to an exterior of the housing 706. Fluid (e.g., gas) can be passively vented from within the enclosure to an exterior of the enclosure 702 through the porous membrane 710.

In the case of thermal runaway, fluid within the enclosure 702 can bypass the porous membrane 710 to escape. The housing 706 includes an internal support structure 714 to hold the porous membrane 710 within the housing 706. One or more openings 716 extend through the support structure 714 to also connect the first region R1 and the second region R2 in parallel with the porous membrane 710. A gateway member 718 (e.g., a screen) is disposed within the housing 706 to move between a closed position and an open position. When disposed in the closed position, the gateway member 718 extends over and closes the openings 716 of the support structure, thereby blocking fluid flow between the first and second regions R1, R2 except for through the porous membrane 710. When the gateway member 718 is disposed in the open position, however, the openings 716 are uncovered (e.g., by the pressure of the relief fluid) so that the relief fluid can pass between the first and second regions R1, R2 without passing through the porous membrane 710.

To provide a leak check on the enclosure 702, a test fixture 701 configured in accordance with the principles of the present disclosure can be mounted over the valve 700. In some implementations, the test fixture 701 is used to draw a vacuum within the enclosure 702 through the valve 700 and vacuum decay is monitored (e.g., see FIGS. 31 and 32). In other implementations, the test fixture 701 is used to apply positive pressure to the enclosure 702 through the valve 700 and pressure decay is monitored. In the absence of such decay (e.g., if the decay stays below a predetermined threshold), then the enclosure 702 is considered to not leak.

The test fixture 701 includes an adapter body 703 sized to fit around the housing 706 of the valve 700. The adapter body 703 includes an open end 705 leading to an interior 707 of the test fixture 701. A hose 711 or other conduit extends from the adapter body 703 to either a pressure tank or to a vacuum pump. A vent arrangement 713 controls when fluid flows between the adapter body interior 707 and the hose 711.

A sensor arrangement 715 also is disposed at the adapter body 703. In some implementations, the sensor arrangement 715 is disposed within the interior 707 of the adapter body 703. In other implementations, the sensor arrangement 715 may be disposed external of the adapter body 703 at a port 717 of the adapter body 703. In still other implementations, the sensor arrangement 715 may be disposed along the hose 711 or other conduit. In some examples, the sensor arrangement 715 is configured to measure pressure decay. In other examples, the sensor arrangement 715 is configured to measure vacuum decay. In certain examples, the sensor arrangement 715 is electrically connected to a processor that receives data signals from the sensor arrangement 715 to determine whether the pressure or vacuum decay remains below a predetermined threshold. For example, a data line may extend from the sensor arrangement along the hose 711 to a connection at an opposite end of the hose 711 from the adapter body 703. Alternatively, the data line may extend through the adapter body to a connector or other interface at an exterior of the adapter body 703.

Figure 32:
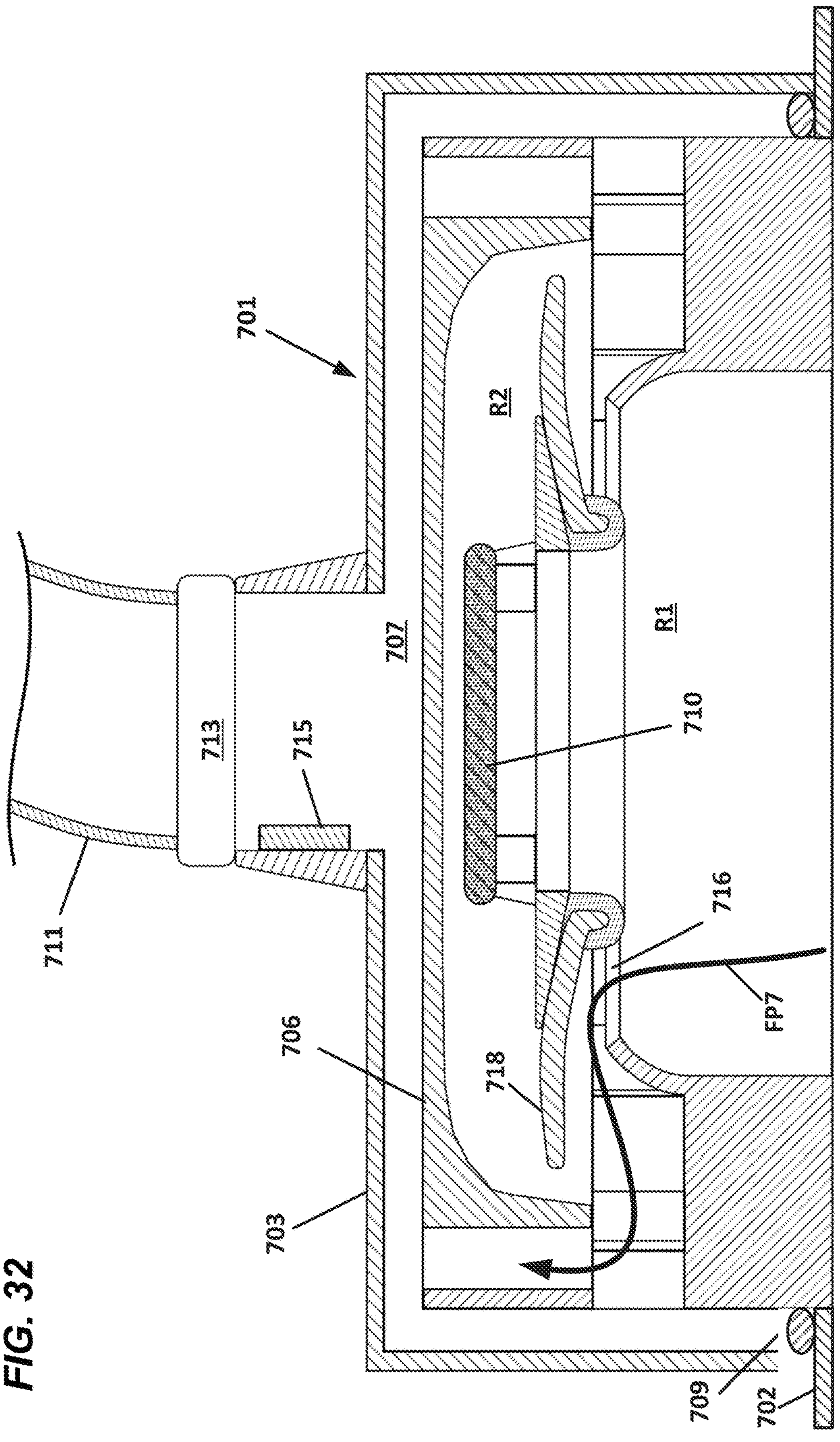
FIG. 32 shows the adapter mounted to the first valve of FIG. 31 during a leak check, according to an example.

In certain implementations, the adapter body 703 is configured to seal over the valve 700 (e.g., see FIG. 32). For example, the adapter body 703 may be sized to fit around the housing 706 of the valve 700 so that the windows and other holes 712 are disposed within the interior 707 of the adapter body 703. Further, the adapter body 703 may include a gasket 709 configured to seal the adapter body 703 to the housing 706 of the valve 700. In the example shown, the gasket 709 includes an O-ring or other annular seal contacting an inner surface of the adapter body 703 and an outer surface of the valve housing 706. Accordingly, the test fixture 701 forms a closed system with the valve 700 and the interior of the enclosure 702.

In the example shown in FIG. 32, a vacuum can be drawn within the enclosure 702 by applying a negative pressure through the valve 700 via the test fixture 701. When suction is applied through the test fixture 701, the pressure of the second region R2 will initially diminish faster than the pressure of the first region R1 as only a limited amount of fluid can pass through the porous membrane 710 at a time. As the pressure differential between the regions R1, R2 increases, the pressure within the first region R1 will become sufficient to lift or otherwise flex the gateway member 718 to open the one or more openings 716. A vacuum flow will then flow via testing flow path FP7 from the first region R1, through the one or more openings 716, to the second region R2, through the windows 712, and into the test fixture interior 707. When the pressure has been equalized again between the first and second regions R1, R2, the gateway member 718 will return to covering the one or more openings 716.

After the vacuum has been drawn, the sensor arrangement 715 will monitor the internal pressure within the test fixture 701 throughout the leak check. For example, in the event of a leak, fluid such as gas may leak into the enclosure 702, into the first region R1 of the valve 700 through the gas opening 708, into the second region R2 through the porous membrane 710, and then into the test fixture interior 707 via the one or more windows 712 of the housing 706. The data signals from the sensor arrangement 715 are processed to detect whether or not the vacuum decays. Vacuum decay may indicate a leak in the enclosure 702. A lack of vacuum decay indicates that the enclosure 702 is devoid of leaks.

FIGS. 33 to 38 illustrate alternative implementations of a valve 720, 740, 760 configured in accordance with the principles of the present disclosure. The valves 720, 740, 760 are suitable for use in a leak check process that applies positive pressure to the enclosure through the valve and monitors the internal pressure for pressure decay. The valves 720, 740, 760 includes the porous membrane 710, one or more openings 716, and gateway member 718 of the valve 700 of FIGS. 31 and 32. These components function as they do in the valve 700

In addition, the valves 720, 740 760 also define a third path between the first and second regions R1, R2 that bypasses the porous membrane 710 and bypasses the one or more openings 716. The testing flow path FP8 is closed during normal operation of passive venting through the porous membrane 710. The testing path also is closed during a thermal runaway relief event (e.g., when the gateway member 718 is open). Instead, the testing path FP8 is configured to open only upon the application of positive pressure (e.g., via the test fixture 701, 721) to the second region R2 to allow fluid to pass through the third path to the first region R1 and then to the interior of the enclosure 702.

Figure 33:
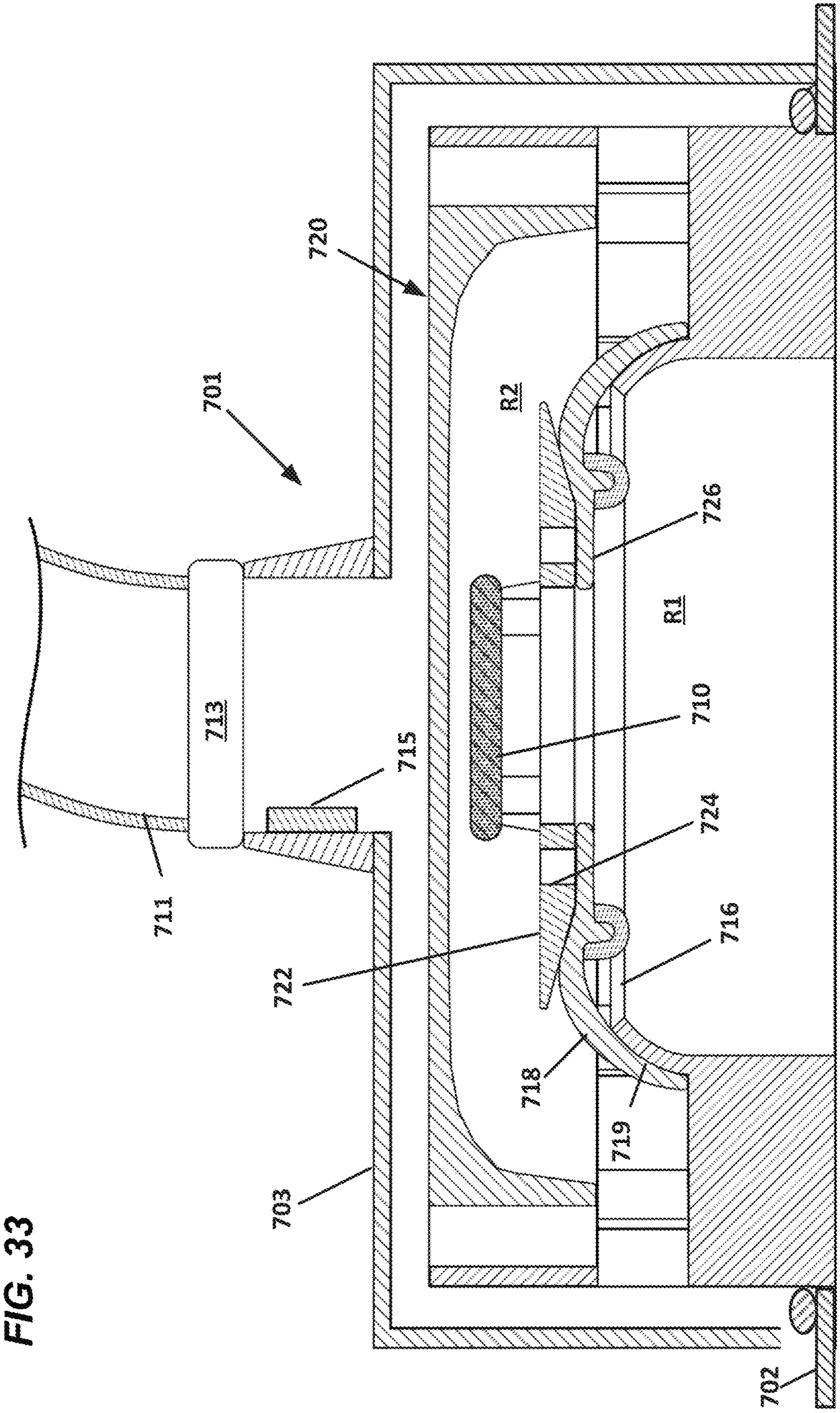
FIG. 33 shows a second valve defining a passive venting path, a thermal runaway relief path, and a leak check path, according to an example.
Figure 34:
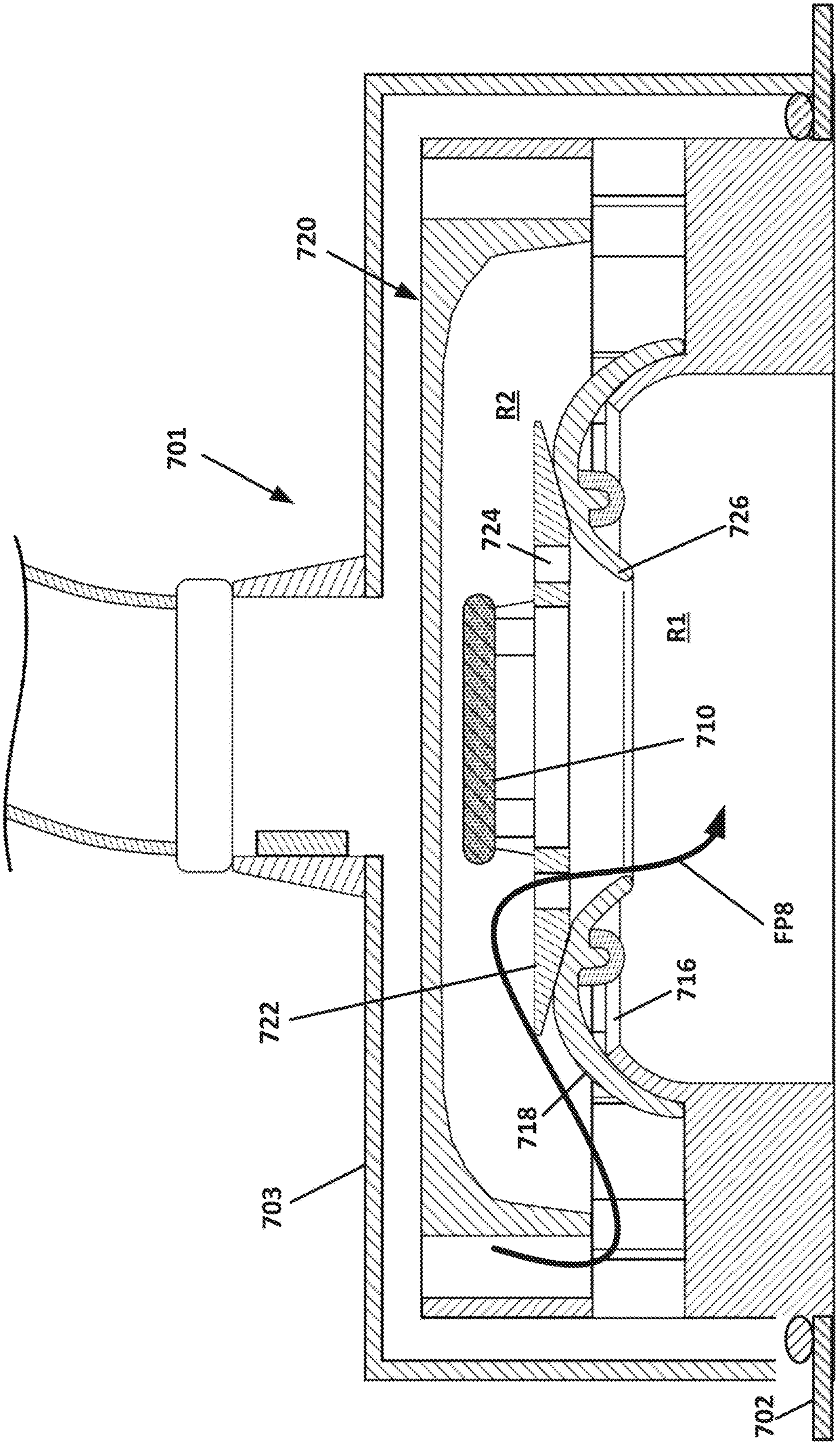
FIG. 34 shows the adapter mounted to the second valve of FIG. 33 during a leak check, according to an example.

In the second valve 720 of FIGS. 33 and 34, the testing path is defined at a location between the porous membrane 710 and the one or more openings 716. For example, as will be discussed herein, the testing path FP8 can be provided via one or more openings defined through a support structure disposed between the porous membrane 710 and the one or more openings 716. In the second and third valves 740, 760 of FIGS. 35 to 38, the membrane 710 forms a ring surrounding a support structure and the third path is defined through the support structure. Accordingly, the porous membrane is disposed between the testing path and the one or more openings 716 in FIGS. 35 to 38.

Referring now to FIGS. 33 and 34, the valve 720 is substantially similar to the valve 100 of FIGS. 31 and 32, except as otherwise indicated. A support structure 722 is disposed between the gateway member 718 and the porous membrane 710. The support structure 722 defines one or more openings 724 therethrough. The one or more openings 724 connect the first and second regions R1, R2. A blocking member 726 is movable (e.g., flexible, deformable, etc.) between blocking (i.e., closed) and unblocking (i.e., open) positions. When in the closed position, the blocking member 726 extends across the one or more openings 724 to block fluid passage therethrough. When in the open position, the blocking member 726 allows fluid passage therethrough.

In certain implementations, the blocking member 726 travels in a different direction than the gateway member 718 when moved between the blocking and unblocking positions. For example, the gateway member 718 in FIG. 33 is disposed to lay over the one or more openings 716 so that an outer portion of the gateway member 718 rests on a ledge 719 or other support surface. When transitioning to the open position, the outer portion of the gateway member 718 lifts off the ledge 719 in a direction moving away from the first region R1. The blocking member 726, however, extends beneath the one or more openings 724. When transitioning to the open position, an inner portion of the blocking member 726 drops down from the support structure 722 in a direction moving away from the second region R2.

In some implementations, the blocking member 726 is integrally formed with the gateway member 718. For example, the gateway member 718 and blocking member 726 can be formed at outer and inner portions of a deformable, non-porous membrane. In other implementations, the gateway member 718 and blocking member 726 can be separate components. In certain implementations, the blocking member 726 is biased to the closed position. In certain examples, the blocking member 726 is biased by a natural material resiliency.

During a leak check, the test fixture 701 can be sealingly mounted over the housing 706 of the second valve 720. Positive pressure can be applied to the second region R2 of the second valve 720 via the test fixture 701. For example, pressurized fluid can be provided along the hose 711, through the valve 713, and into the interior of the adapter body 703 from which the fluid passes through the windows 712 in the body 102 of the second valve 720 to enter the second region R2. A pressure differential between the second and first regions R2, R1 causes deflection or other movement of the blocking member 726 to the open position until the pressure is equalized between the first and second regions R1, R2. The sensor arrangement 715 monitors the internal pressure within the test fixture 701. In the event of an enclosure leak, fluid such as gas may leak into the enclosure 702, into the first region R1 of the valve 700 through the gas opening 708, into the second region R2 through the porous membrane 710, and then into the test fixture interior 707 via the one or more windows 712 in the housing 706. Data signals from the sensor arrangement 715 are processed to check for pressure decay, which may indicate a leak in the enclosure 702.

Figure 35:
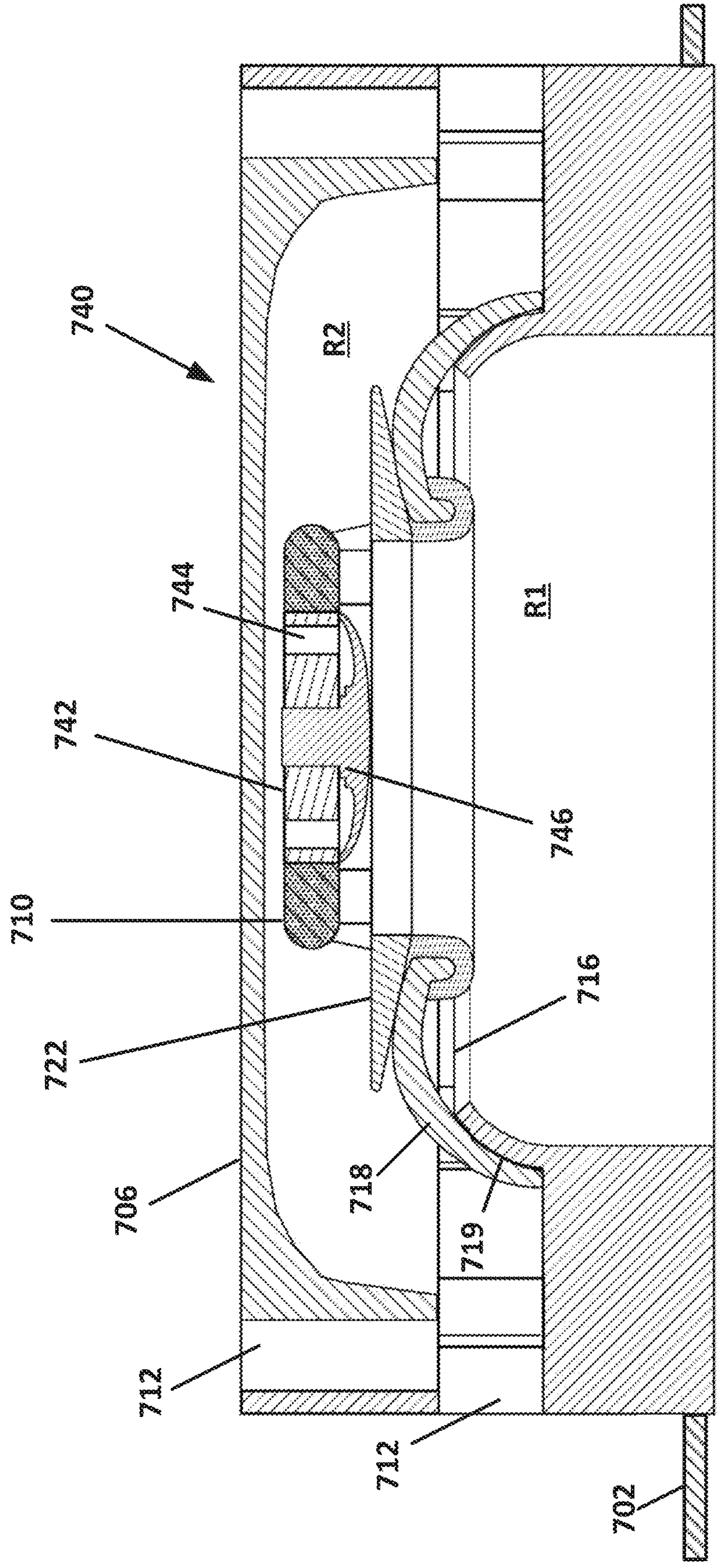
FIG. 35 shows a third valve defining a passive venting path, a thermal runaway relief path, and a leak check path, according to an example.
Figure 36:
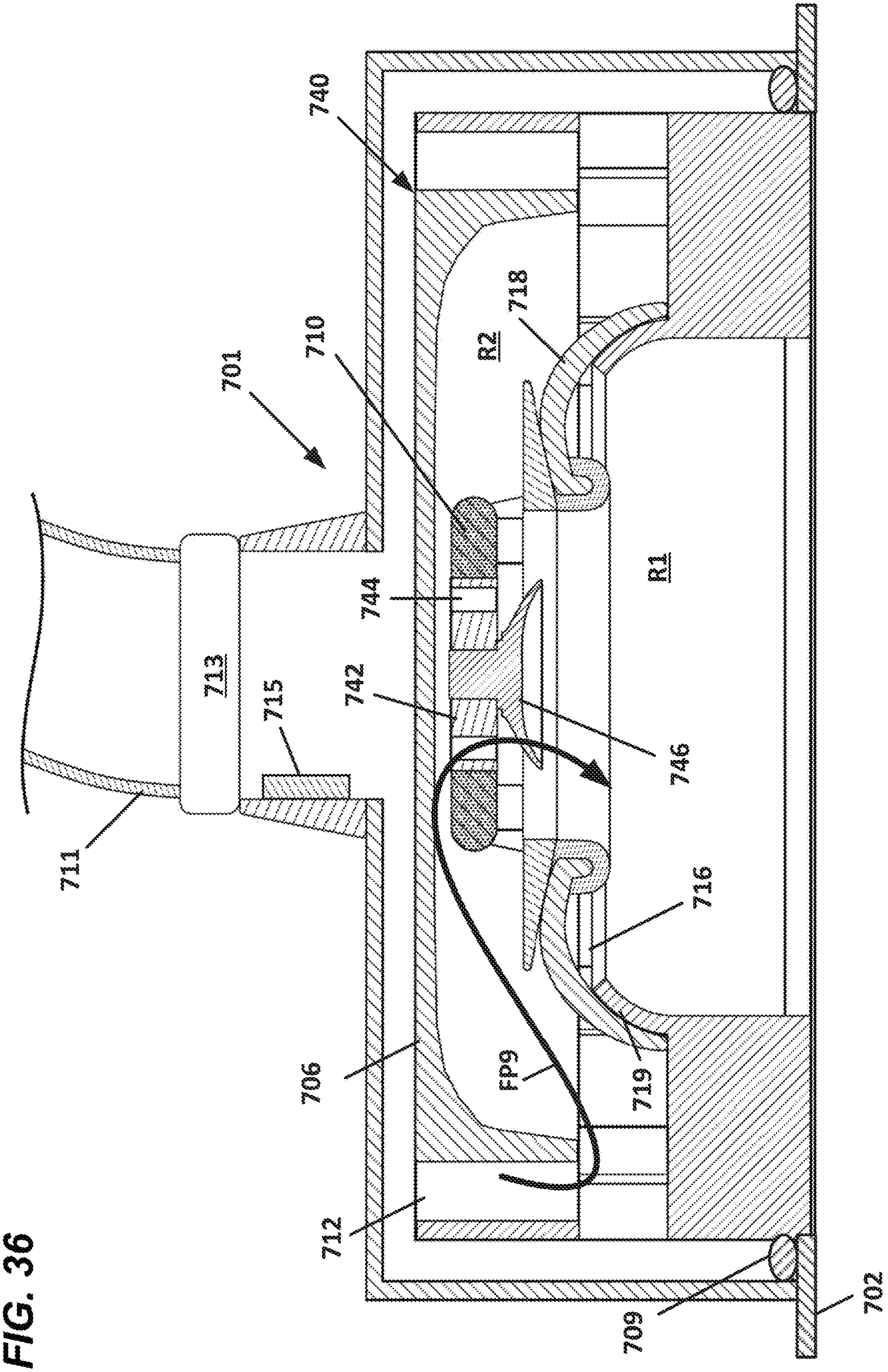
FIG. 36 shows the test fixture mounted to the third valve of FIG. 35 during a leak check, according to an example.

Referring now to FIGS. 35 and 36, the third valve 740 is substantially similar to the valve 100 of FIGS. 31 and 32, except as otherwise indicated. The porous membrane 710 forms a ring around a support structure 742. The support structure 742 defines one or more openings 744 therethrough that connect the first and second regions R1, R2 and form part of testing flow path FP9. In certain examples, the one or more openings 744 extend parallel with a thickness of the porous membrane 710. Another implementation of a blocking member 746 is movable (e.g., flexible, deformable, etc.) between closed and open positions. When in the closed position, the blocking member 746 extends across the one or more openings 744 to block fluid passage therethrough. When in the open position, the blocking member 746 allows fluid passage through the one or more openings 744.

In certain implementations, the blocking member 746 travels in a different direction than the first gateway member 718 when moved between the closed and open positions. For example, the first gateway member 718 in FIG. 35 is disposed to lay over the one or more openings 716 so that an outer portion of the first gateway member 718 rests on a ledge 719 or other support surface. When transitioning to the open position, the outer portion of the first gateway member 718 lifts off the ledge 719 in a direction moving away from the first region R1. The blocking member 746, however, extends beneath the one or more openings 744. When transitioning to the open position, a portion of the second gateway member 746 drops down from the support structure 742 in a direction moving away from the second region R2 and into the first region R1.

In certain implementations, the blocking member 746 is a separate component from the first gateway member 718. In certain examples, the blocking member 746 includes an umbrella valve. In certain examples, the blocking member 746 is mounted to the support structure 742 so that a deformable or flexible portion of the blocking member 746 extends beneath the support structure 742 and across the one or more openings 744. In certain implementations, the blocking member 746 is biased to the closed position. In certain examples, the blocking member 746 is biased by a natural material resiliency.

During a leak check, the test fixture 701 can be sealingly mounted over the housing 706 of the third valve 740. Positive pressure can be applied to the second region R2 of the third valve 740 via the test fixture 701. For example, pressurized fluid can be provided along the hose 711, through the valve 713, and into the interior of the adapter body 703 from which the fluid passes through the windows 712 in the body 102 of the third valve 740 to enter the second region R2. A pressure differential between the second and first regions R2, R1 causes deflection or other movement of the blocking member 746 to the open position until the pressure is equalized between the first and second regions R1, R2. In the event of an enclosure leak, fluid such as gas may leak into the enclosure 702, into the first region R1 of the valve 700 through the gas opening 708, into the second region R2 through the porous membrane 710, and then into the test fixture interior 707 via the one or more windows 712 in the housing 706. The sensor arrangement 715 monitors the internal pressure within the test fixture 701. Data signals from the sensor arrangement 715 are processed to check for pressure decay, which may indicate a leak in the enclosure 703.

Figure 37:
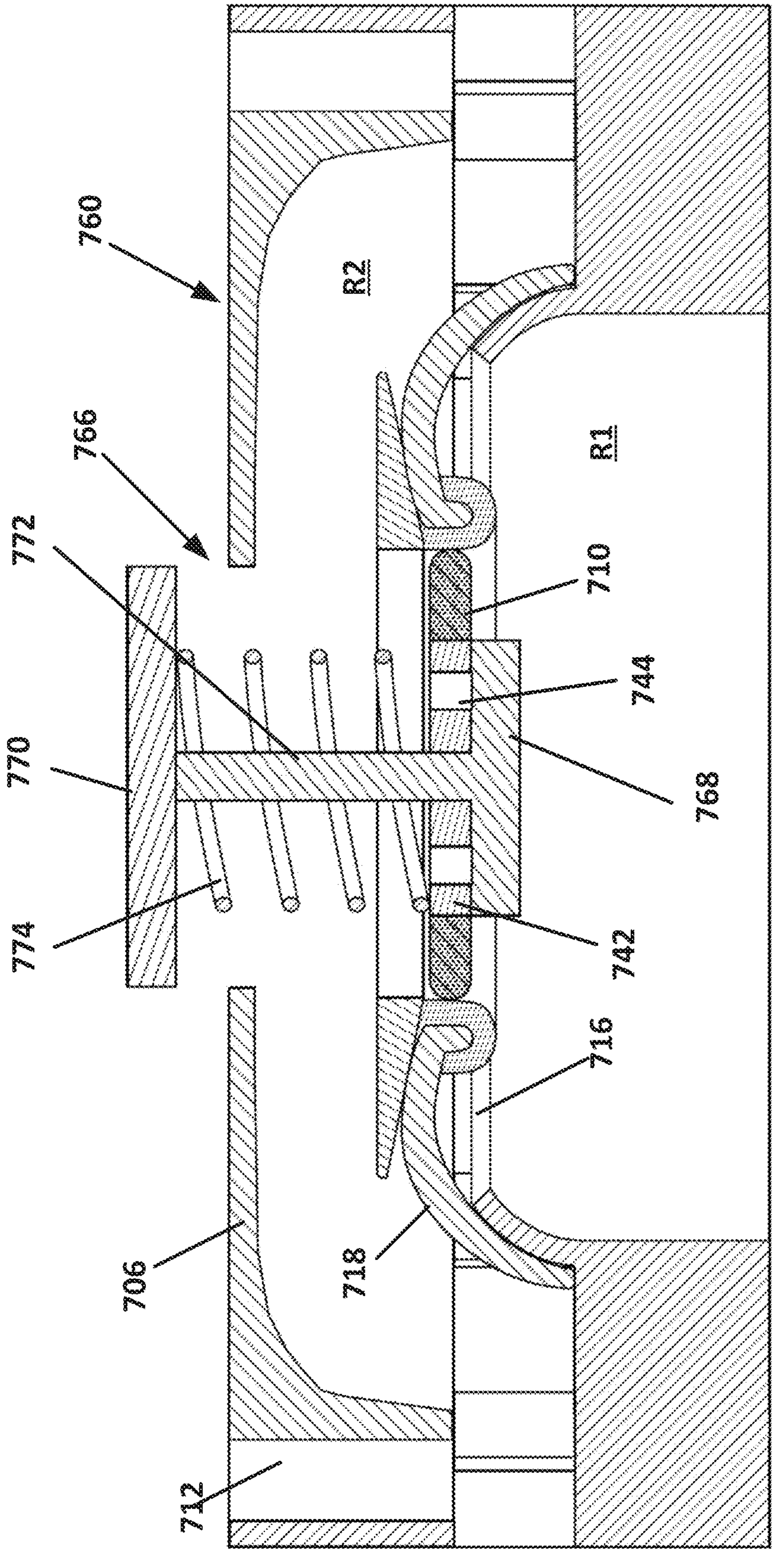
FIG. 37 shows a fourth valve defining a passive venting path, a thermal runaway relief path, and a leak check path, according to an example.
Figure 38:
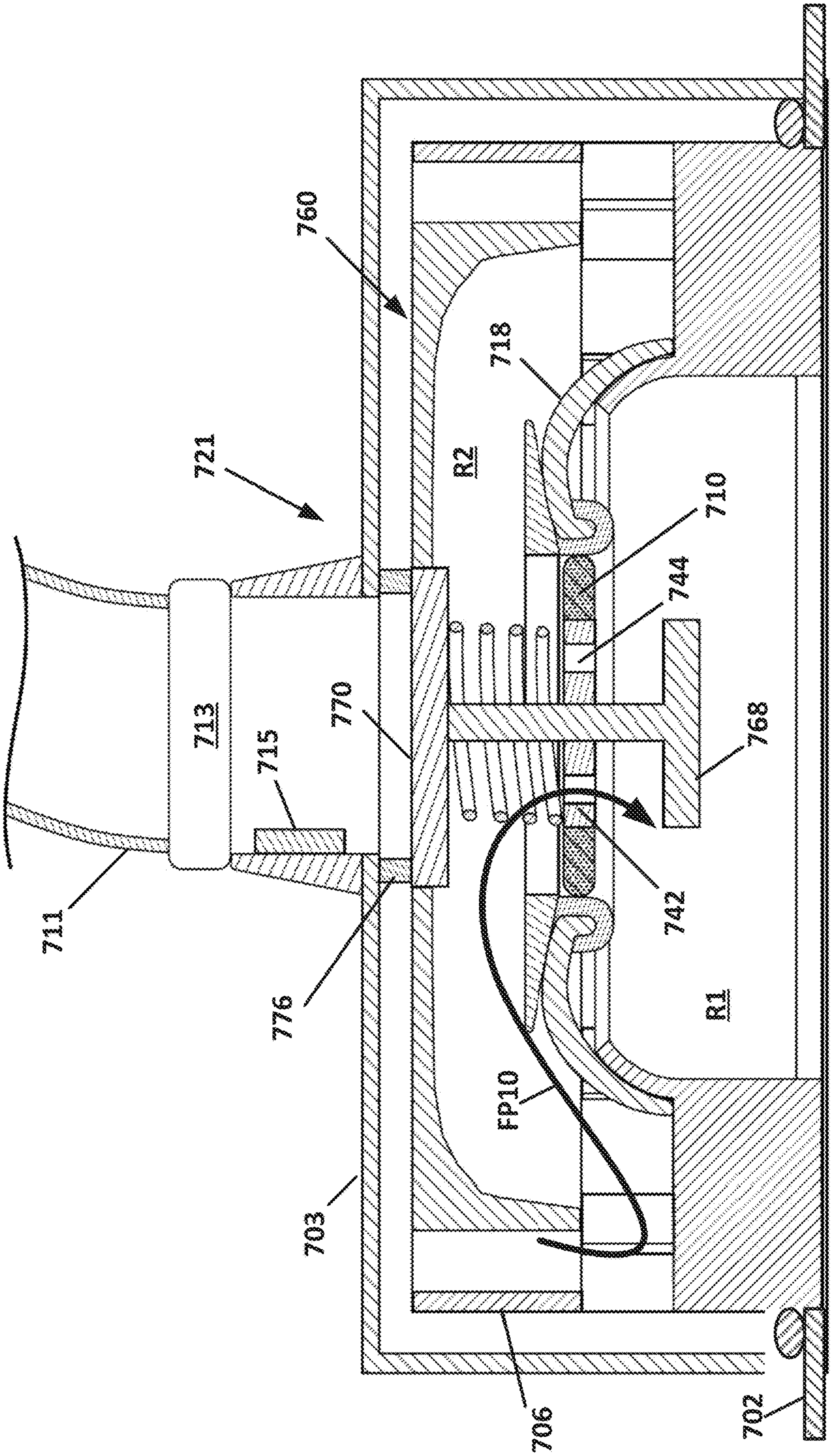
FIG. 38 shows another example test fixture mounted to the fourth valve of FIG. 37 during a leak check, according to an example.
Figure 39:
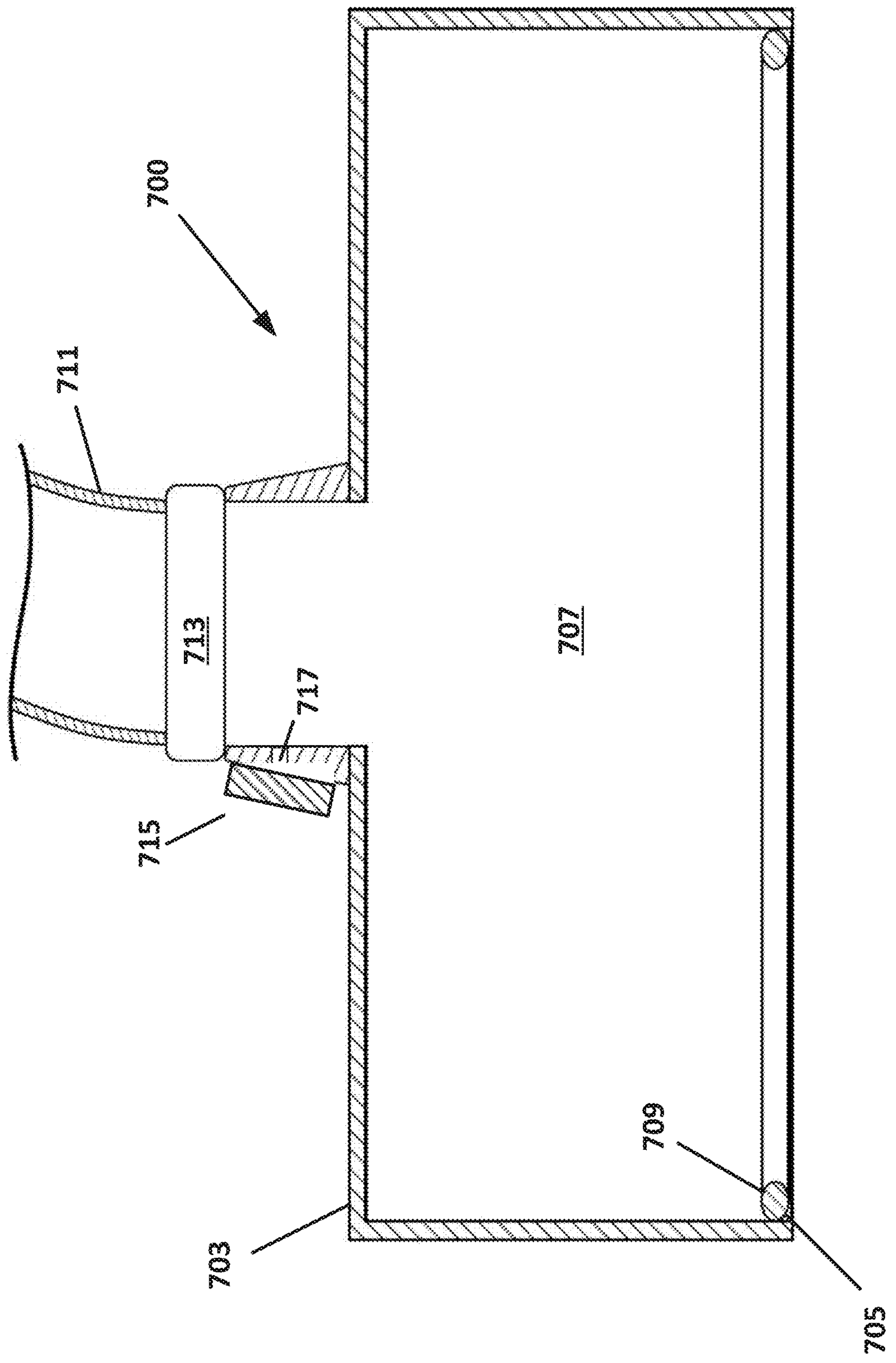
FIG. 39 shows an example test fixture suitable for use with any of the valves disclosed herein, the test fixture having an exteriorly located sensor arrangement, according to an example.

Referring now to FIGS. 37 and 38, the fourth valve 760 is substantially similar to the valve 700 of FIGS. 31 and 32, except as otherwise indicated. As in the third valve 740, the porous membrane 710 forms a ring around a support structure 742 defining one or more openings 744. The one or more openings 744 connect the first and second regions R1, R2. In certain examples, the one or more openings 744 extend parallel with a thickness of the porous membrane 710.

A blocking member such as a poppet valve 766 is disposed at the support structure 742 and is movable (e.g., slidable) relative to the support structure 742 between closed and open positions. When in the closed position, the poppet valve 766 extends across the one or more openings 744 to block fluid passage therethrough. When in the open position, the poppet valve 766 allows fluid passage testing flow path FP10 through the one or more openings 744. The poppet valve 766 includes a blocking member 768 that extends across a passage axis defined by the one or more openings 744. The poppet valve 766 also includes an actuation member 770 with which the test fixture 761 will interact to open the poppet valve 766 as will be discussed herein. A stem 772 connects the blocking member 768 and the actuation member 770.

In certain implementations, the poppet valve 766 is biased to the closed position, thereby blocking fluid access between the first and second regions R1, R2. Accordingly, the poppet valve 766 remains closed during normal operation of passive venting. In certain examples, a spring 774 extends between the support structure 742 and the actuation member 770 to bias the actuation member 770 away from the support structure 742. Biasing the actuation member 770 away from the support surface 742 pulls the blocking member 768 against the support surface 742 so that the blocking member 768 covers the one or more opening 744. During thermal runaway, pressure within the first region R1 will press the blocking member 768 firmly against the support structure 742, thereby maintaining the poppet valve 766 in the closed position. In some examples, the blocking member 768 carries a gasket or other seal that engages the support structure 742 to seal the one or more openings 744. In other examples, a gasket or seal can be mounted to the support structure 742 and engage the blocking member 768 when the poppet valve 766 is disposed in the closed position.

FIG. 38 shows another example test fixture 721 suitable for use in pressurizing the enclosure 702 through the fourth valve 760. The test fixture 721 also is configured to actuate the poppet valve 766 without actuating the thermal runaway relief gateway 718. In certain implementations, the test fixture 721 includes engagement structure 776 configured to contact the actuation member 770 of the poppet valve 766 and to transition the poppet valve 766 to the open position. In certain examples, the engagement structure 776 includes an inwardly protrusion that depresses the actuation surface 770 against the bias of the spring 774 when the test fixture 721 is mounted over the housing 706 of the fourth valve 760.

During a leak check, the test fixture 721 is sealingly mounted over the housing 706 of the fourth valve 760. Positive pressure is applied to the second region R2 of the fourth valve 760 via the test fixture 721. For example, pressurized fluid can be provided along the hose 711, through the valve 713, and into the interior of the adapter body 703 from which the fluid passes through the windows 712 in the body 706 of the fourth valve 760 to enter the second region R2. Because the engagement structure 776 moves the poppet valve to the open position, the pressurized fluid can flow from the second region R2 into the first region R1 and then into the enclosure interior. In the event of an enclosure leak, fluid such as gas may leak into the enclosure 702, into the first region R1 of the valve 700 through the gas opening 708, into the second region R2 through the porous membrane 710, and then into the test fixture interior 707 via the one or more windows 712 in the housing 706. The sensor arrangement 715 monitors the internal pressure within the test fixture 721. Data signals from the sensor arrangement 715 are processed to check for pressure decay, which may indicate a leak in the enclosure 703.

Figure 40:
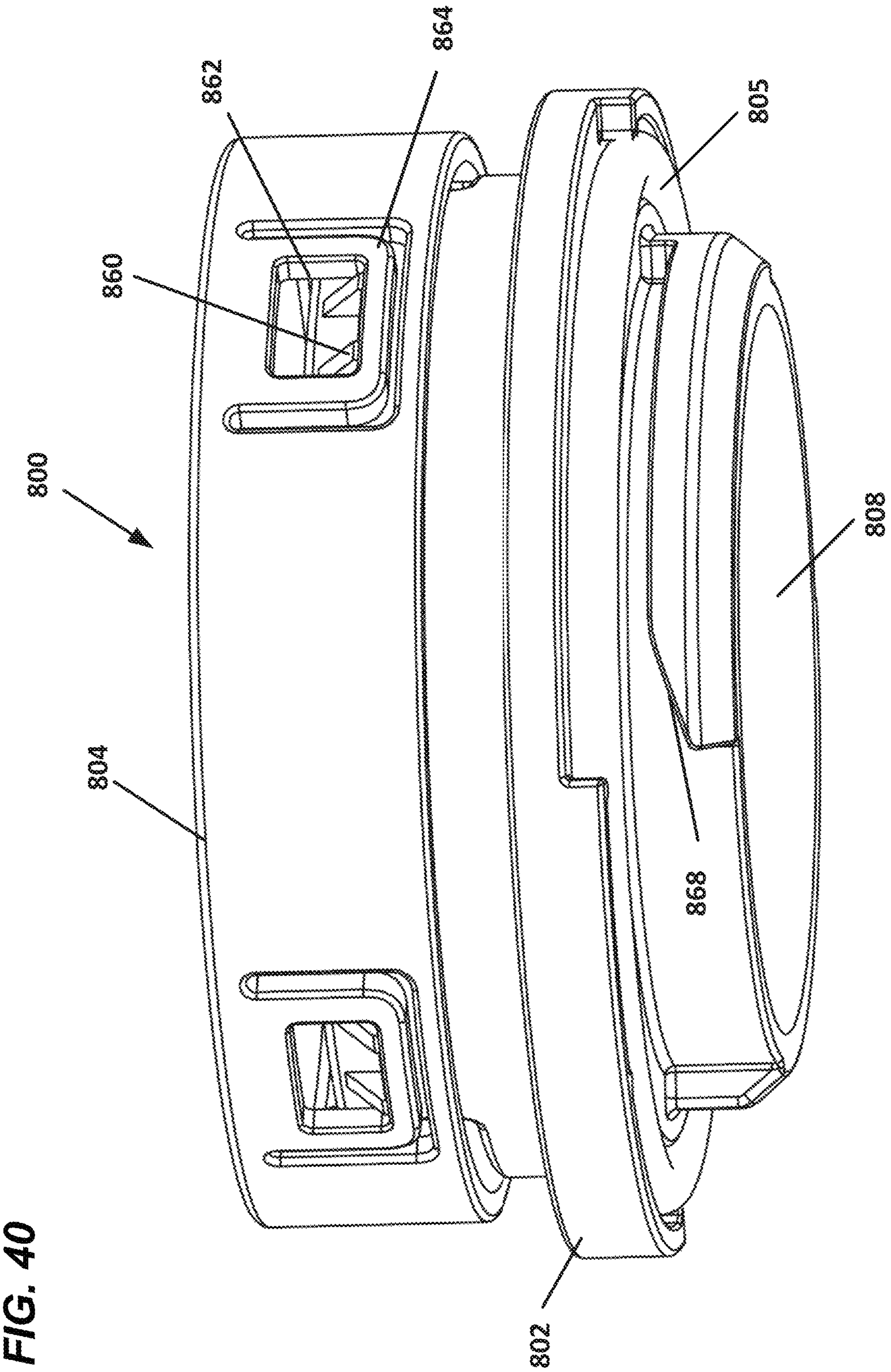
FIG. 40 is a perspective view of a valve configured in accordance with the principles of the present disclosure, according to an example.
Figure 41:
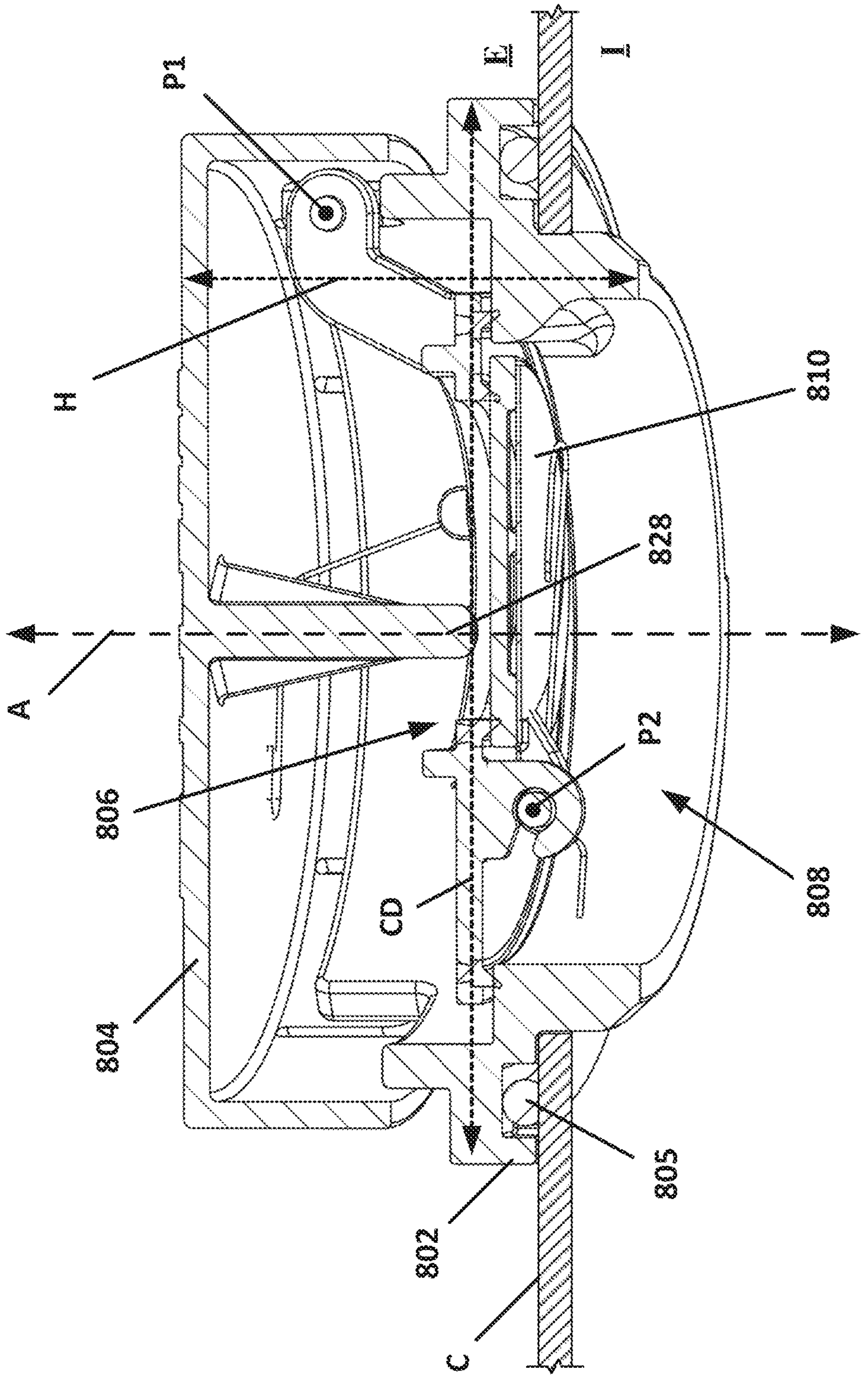
FIG. 41 is a cross-sectional view of the valve of FIG. 40 in which a platform assembly is visible, the valve being shown with a cap in an undepressed position, a gate in a closed position, and a door in a closed position, according to an example.
Figure 49:
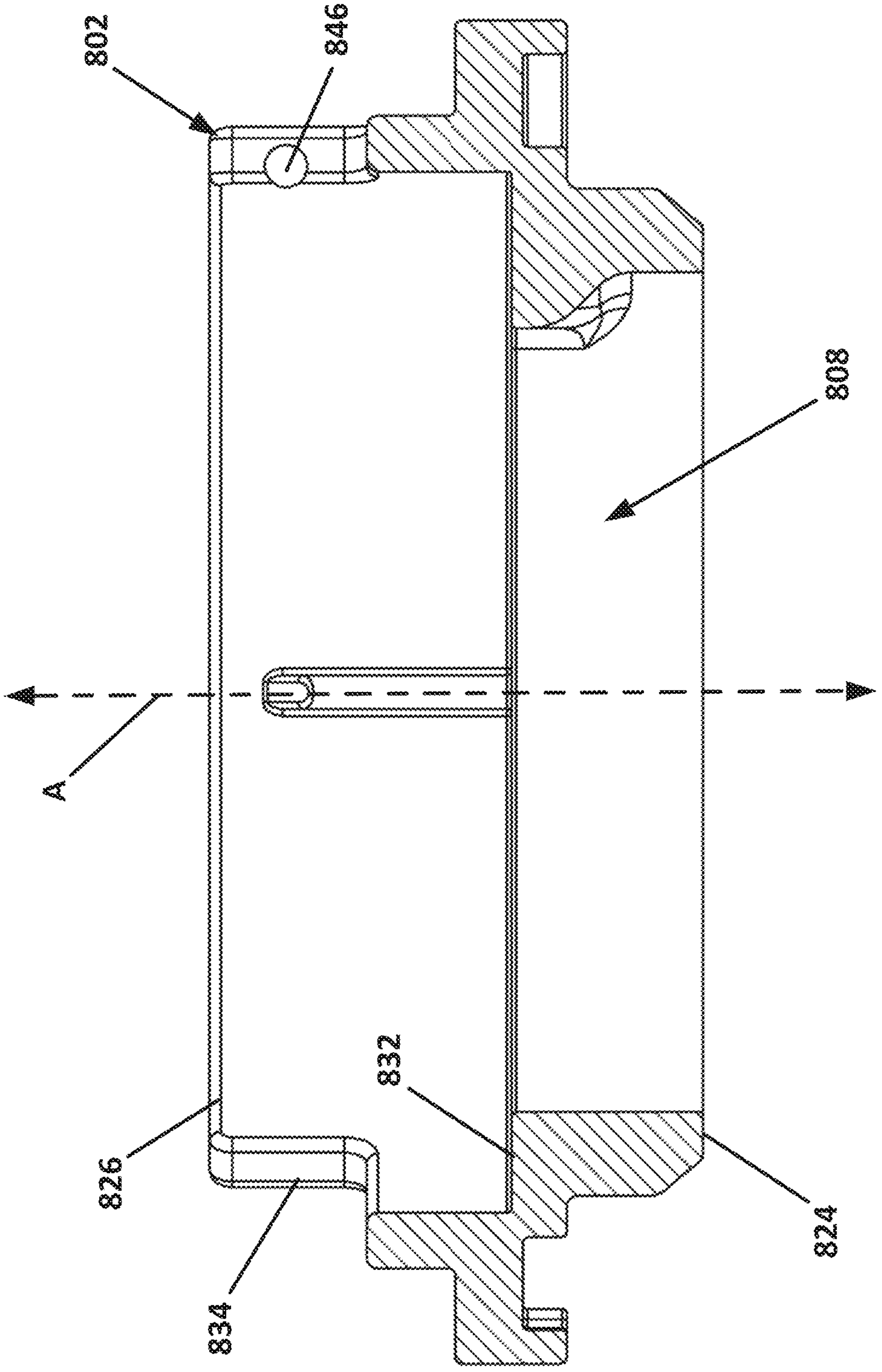
FIG. 49 is a cross-sectional view of the valve body of the valve of FIG. 40, according to an example.

Referring now to FIG. 40, a valve 800 is mounted at a hole in a case C (see FIG. 41). The valve 800 includes a valve body 802, a cap 804, and a platform assembly 806 disposed within the valve body 802. The valve body 802 extends between opposite first and second ends 824, 826, respectively (see FIG. 49). The first end 824 is disposed at the interior I of the case C and the second end 826 is disposed at the exterior E of the case C. The valve body 802 is mechanically secured to the case C. In certain examples, the valve body 802 seals to the case C using a gasket 805. The valve body 802 defines a through-passage 808 extending along an axis A of the valve body 802 from an interior I of the case C to an exterior E of the case C. An internal ledge 832 is disposed within the valve body 802 at an intermediate location along the through-passage 808 (e.g., see FIG. 49).

In certain implementations, the cap 804 is mounted to the valve body 802 to extends across the through-passage 808 at the second end 826 of the valve body 802. The cap 804 has a peripheral side spaced sufficiently from a periphery of the valve body 802 to provide space for gas to flow into and out of the valve body 802 past the cap 804 (e.g., see FIGS. 43 to 45). In certain implementations, the cap 804 includes an actuator 828 protruding inwardly towards the platform assembly 806. The actuator 828 is aligned with the membrane 810 carried by the platform assembly 806. The cap 804 is configured to move (e.g., slide) relative to the valve body 802 along the axis A between an undepressed position (e.g., see FIGS. 43 and 44) and a depressed position (e.g., see FIG. 45). In certain examples, the cap 804 is biased to the undepressed position.

In certain implementations, the valve 800 has a height H measured between the first end 824 of the valve body 802 and the cap 804 when the cap 804 is disposed in the undepressed position. In certain examples, the height H of the valve 800 is about 20 mm. In certain examples, the height H of the valve 800 is no more than 25 mm. In certain examples, the height H of the valve 800 is no more than 24 mm. In certain examples, the height H of the valve 800 is no more than 23 mm. In certain examples, the height H of the valve 800 is no more than 22 mm. In certain examples, the height H of the valve 800 is no more than 21 mm. In certain examples, the height H of the valve 800 is no more than 20 mm.

In certain implementations, the valve 800 has a cross-dimension (e.g., diameter) CD measured between opposite sides of the valve 800 at a widest point of the valve 800. In certain examples, the cross-dimension CD of the valve 800 is about 60 mm. In certain examples, the cross-dimension CD of the valve 800 is no more than 65 mm. In certain examples, the cross-dimension CD of the valve 800 is no more than 64 mm. In certain examples, the cross-dimension CD of the valve 800 is no more than 63 mm. In certain examples, the cross-dimension CD of the valve 800 is no more than 62 mm. In certain examples, the height H of the valve 800 is no more than 61 mm. In certain examples, the cross-dimension CD of the valve 800 is no more than 60 mm.

The platform assembly 806 is disposed within the through-passage 808 (e.g., at the internal ledge 832) to selectively open and close various flow paths along the through-passage 808 between the interior I and exterior E of the case C. Fluid can exit the case C along one or more flow paths during operation of the valve 800. In certain examples, fluid also can enter the case C along one of the flow paths. In certain implementations, the platform assembly 806 selectively seals to the valve body 802 to inhibit liquid from entering the interior I of the case C from the exterior E of the case C during operation of the valve 800. For example, the platform assembly 806 may carry a gasket 830 that can be pressed against a recessed ledge 832 defined by the valve body 802 to create the seal.

Figure 43:
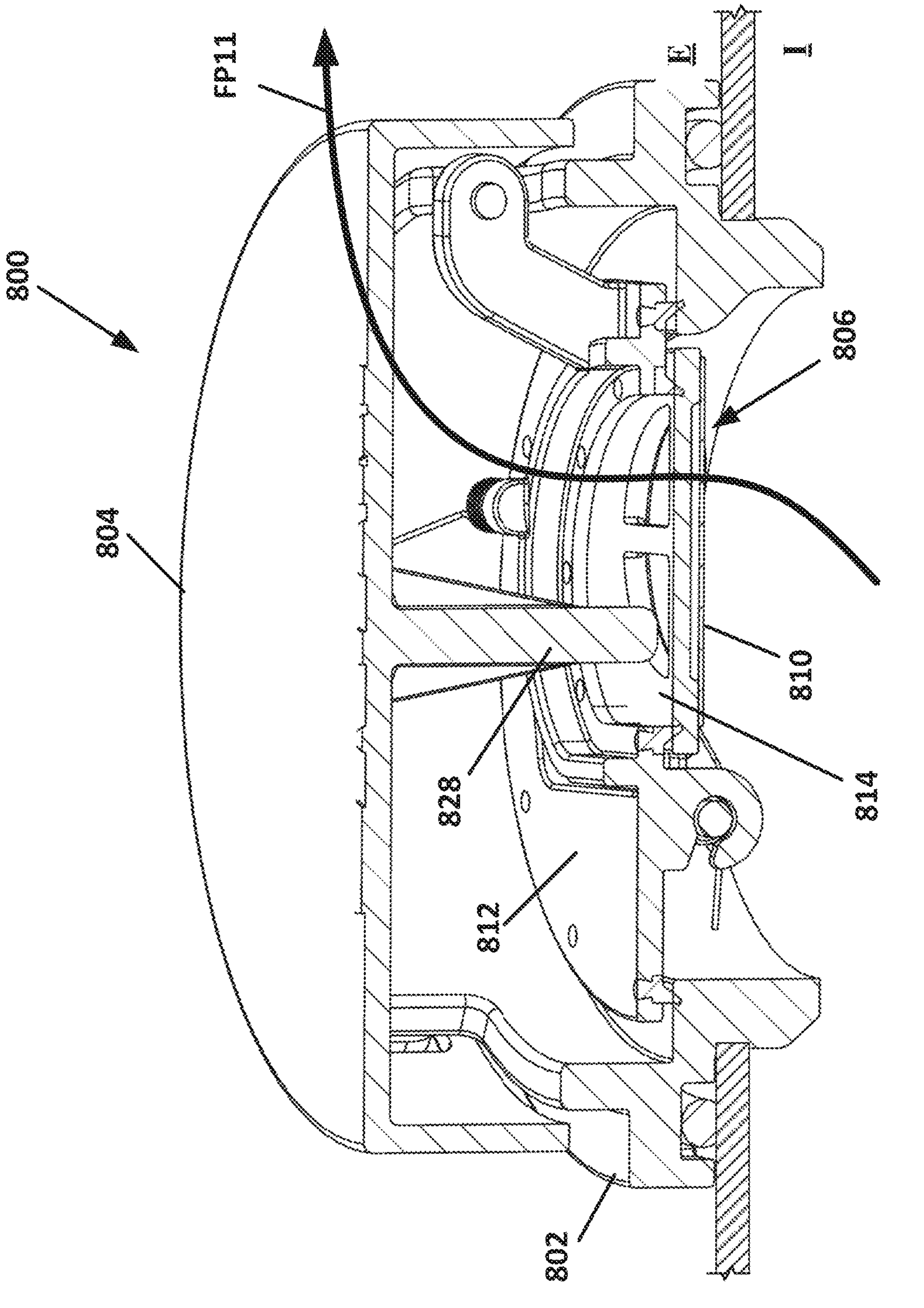
FIG. 43 is a cross-sectional view of the valve of FIG. 40 showing a vent flow path through the platform assembly providing passive venting/degassing of a case to which the valve is mounted, according to an example.

In certain implementations, the platform assembly 806 includes a porous membrane 810 through which gas may flow along a vent flow path FP11 (e.g., see FIG. 43). Accordingly, in such implementations, the platform assembly 806 provides passive venting (breathing/degassing) to an enclosure to which the valve 800 is mounted. In certain examples, the membrane 810 is a hydrophobic membrane. Accordingly, the membrane 810 inhibits liquid from entering the interior I of the case C through the membrane 810. In certain implementations, the porous membrane 810 is moved relative to the valve body 802 as the platform assembly 806 selectively opens and closes the various flow paths.

Figure 42:
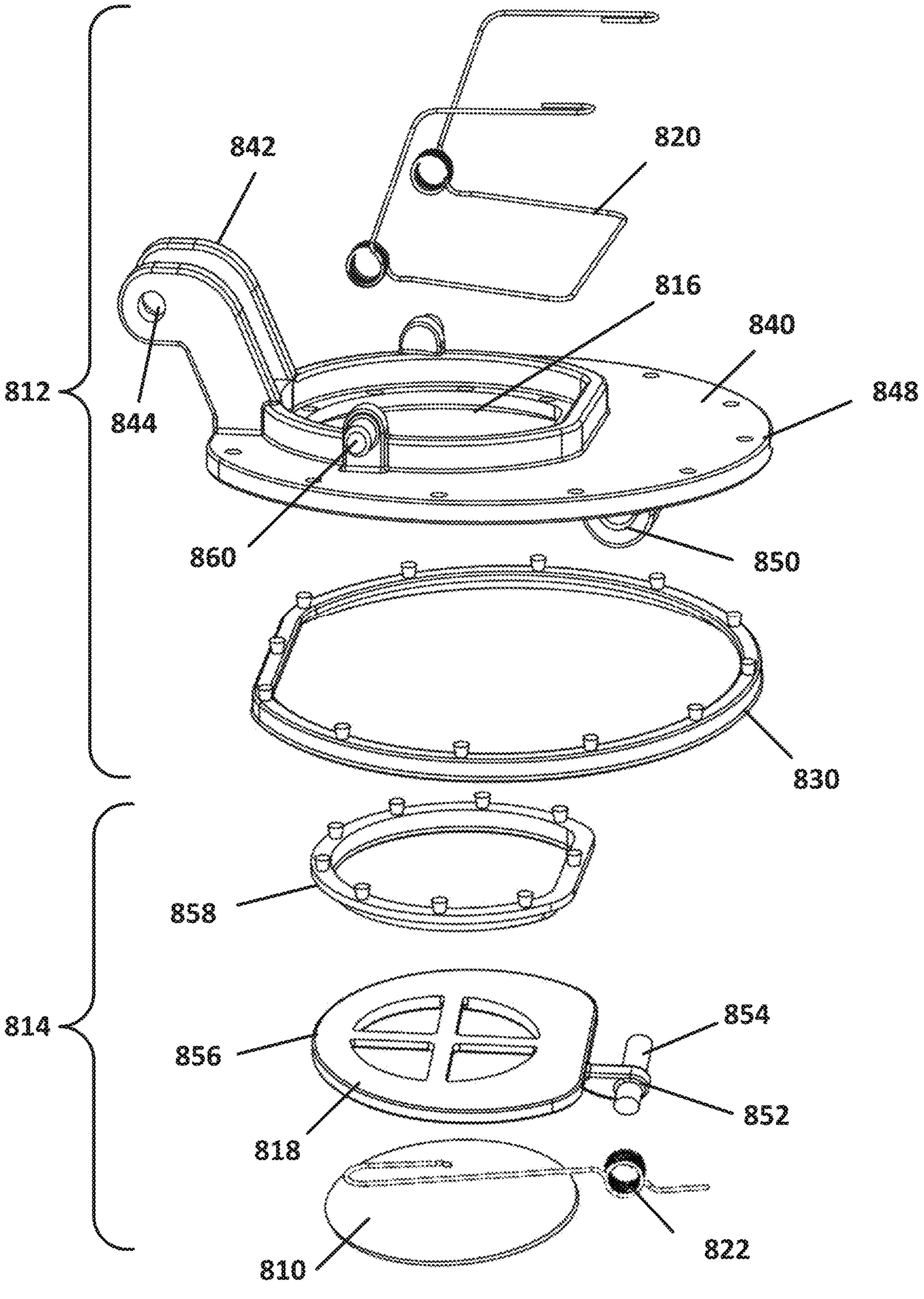
FIG. 42 is a perspective view of the platform assembly of FIG. 41 with components thereof exploded from each other, according to an example.

In certain implementations, the platform assembly 806 includes a gateway member such as a gate 812 and a blocking member such as a door 814 (e.g., see FIG. 42). The gate 812 is coupled to the valve body 802 to move relative to the valve body 802 between a closed position (e.g., see FIG. 41) and an open position (e.g., see FIG. 44). The gate 812 extends across the through-passage 808 when disposed in the closed position. In certain examples, the gate 812 is sealed to the valve body 802 when disposed in the closed position. The gate 812 opens a relief flow path FP12 along the through-passage 808 between the valve body 802 and the gate 812 when the gate 812 is disposed in the open position. The gate 812 defines an opening 816 therethrough.

The door 814 is mounted to the gate 812 at the opening 816. The door 814 includes a support body 818 that holds the membrane 810. The support body 818 is coupled to the gate 812 to move relative to the gate 812 between a closed position (e.g., see FIG. 43) and an open position (e.g., see FIGS. 44 and 45). The membrane 810 is carried with the support body 818 between the closed and open positions. The support body 818 is sealed to the gate 812 when the door 814 is disposed in the closed position to inhibit liquid from passing through the opening 816. The membrane 810 is aligned with the opening 816 defined by the gate 812 when the door 814 is disposed in the closed position to allow gas to pass through the door 814 and the gate 812 via the membrane 810 (e.g., see FIG. 43). The door 814 opens a testing flow path FP13 along the through-passage 808 between the door 814 and the gate 812 when the door 814 is disposed in the open position (e.g., see FIGS. 44 and 45). In the example shown in FIG. 45, edges of the cap 804 seat on an outer ledge 836 of the valve body 802 when the cap 804 is depressed.

In certain implementations, the gate 812 and/or the door 814 are biased to the closed position. In certain examples, the gate 812 is biased to its closed position independently of the door 814 being biased to its closed position. In certain examples, the gate 812 is biased to its closed position using a first spring 820 (e.g., a torsion spring). In certain examples, the door 814 is biased to its closed position using a second spring 822 (e.g., a torsion spring). In certain examples, the first spring 820 biases the gate 812 in a first direction (e.g., towards the interior I of the case C, away from the cap 804, etc.) and the second spring 822 biases the door 814 in a different second direction (e.g., towards an exterior of the case C, towards the cap 804, etc.). In certain examples, the first spring 820 also biases the cap 804 to the undepressed position.

As shown in FIG. 43, during normal operation, the cap 804 is disposed in the undepressed position. The actuator 828 is spaced from the door 814 when the cap 804 is disposed in the undepressed position and the gate 812 is disposed in the closed position. Accordingly, the door 814 remains biased to its closed position. Gas can freely pass through the membrane 810 along the vent flow path FP11 so that the gas can be vented from the interior I of the case C through the door 814 and through the gate 812 of the platform assembly 806.

Figure 44:
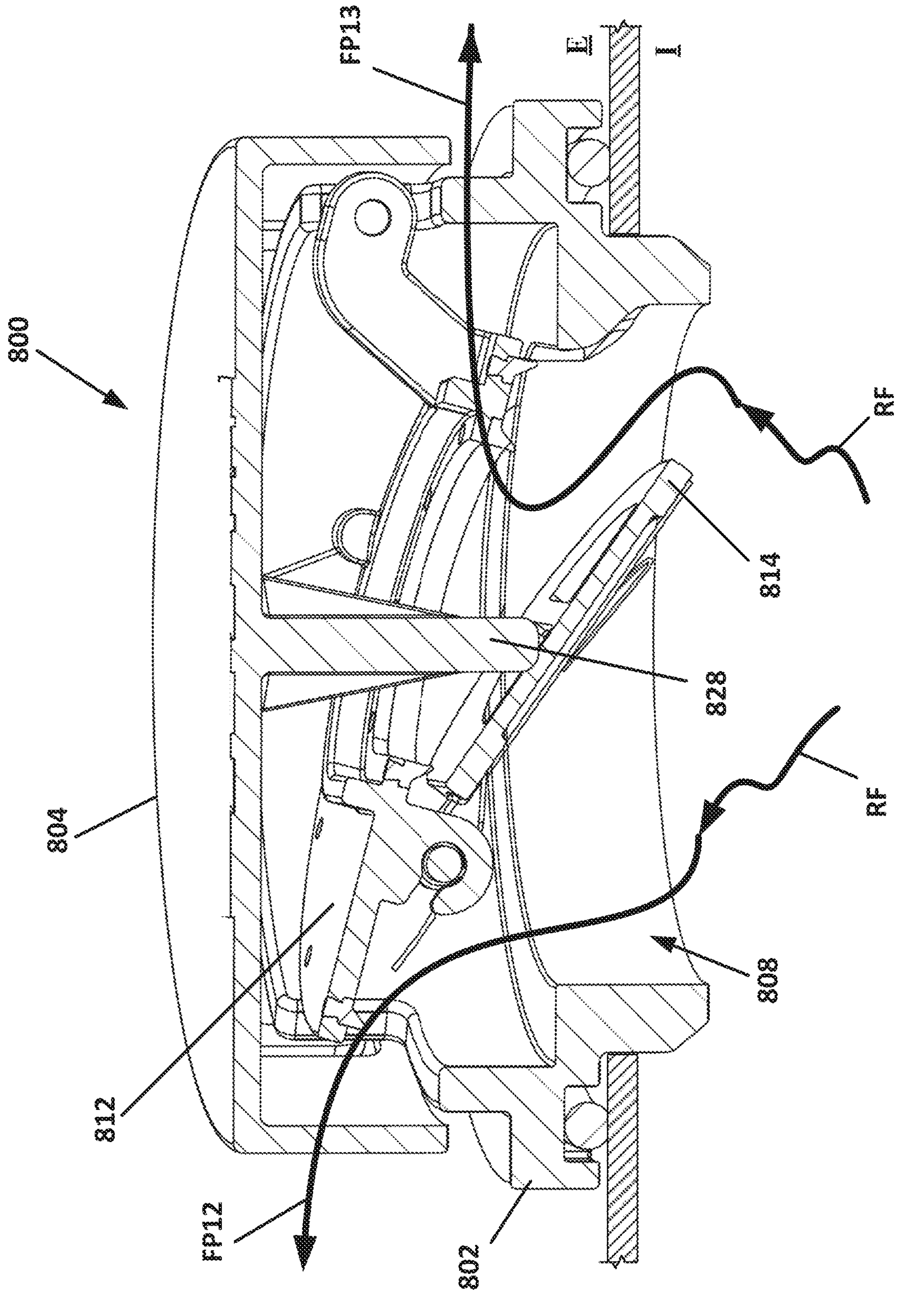
FIG. 44 is a cross-sectional view of the valve of FIG. 40 showing relief fluids passing out of the case through the platform assembly along relief and testing flow paths, according to an example.

FIG. 44 illustrate the valve 800 during a pressure spike situation in which pressure within the interior I of the case C reaches a predetermined threshold. The cap 804 is still disposed in the undepressed position. The gate 812, however, has been moved to its open position by the force of relief fluids RF flow out of the interior I of the case C. For example, the gate 812 moves when the pressure of the relief fluids RF exceeds the bias of the first spring 820. A relief flow path FP12 extends from the interior I of the case C, between the gate 812 and the valve body 802, and out of the valve body 802 (e.g., between the valve body 802 and the cap 804). In certain implementations, the valve body 802 defines one or more notches or apertures 834 that align with the relief flow path FP12 to facilitate relief fluids RF leaving the valve body 802 after passing between the gate 812 and the valve body 802.

In certain implementations, the gate 812 carries the door 814 as the gate 812 moves to its open position. Moving the gate 812 to the open position brings the door 814 into contact with the actuator 828 of the cap 804. As the gate 812 moves towards the open position, the actuator 828 depresses the door 814 towards the open position of the door 814. Accordingly, the door 814 is automatically opened when the gate 812 is opened regardless of the position of the cap 804. Moving the door 814 to its open position opens the testing flow path FP13 between the door 814 and the gate 812. Relief fluid also can exit the interior I of the case C along the testing flow path FP13. The combination of the relief flow path FP12 and testing flow path FP13 provide a larger volume through which the relief fluid may pass compared to just the relief flow path FP12, thereby allowing a greater amount of relief fluid to exit the case C at one time.

Figure 45:
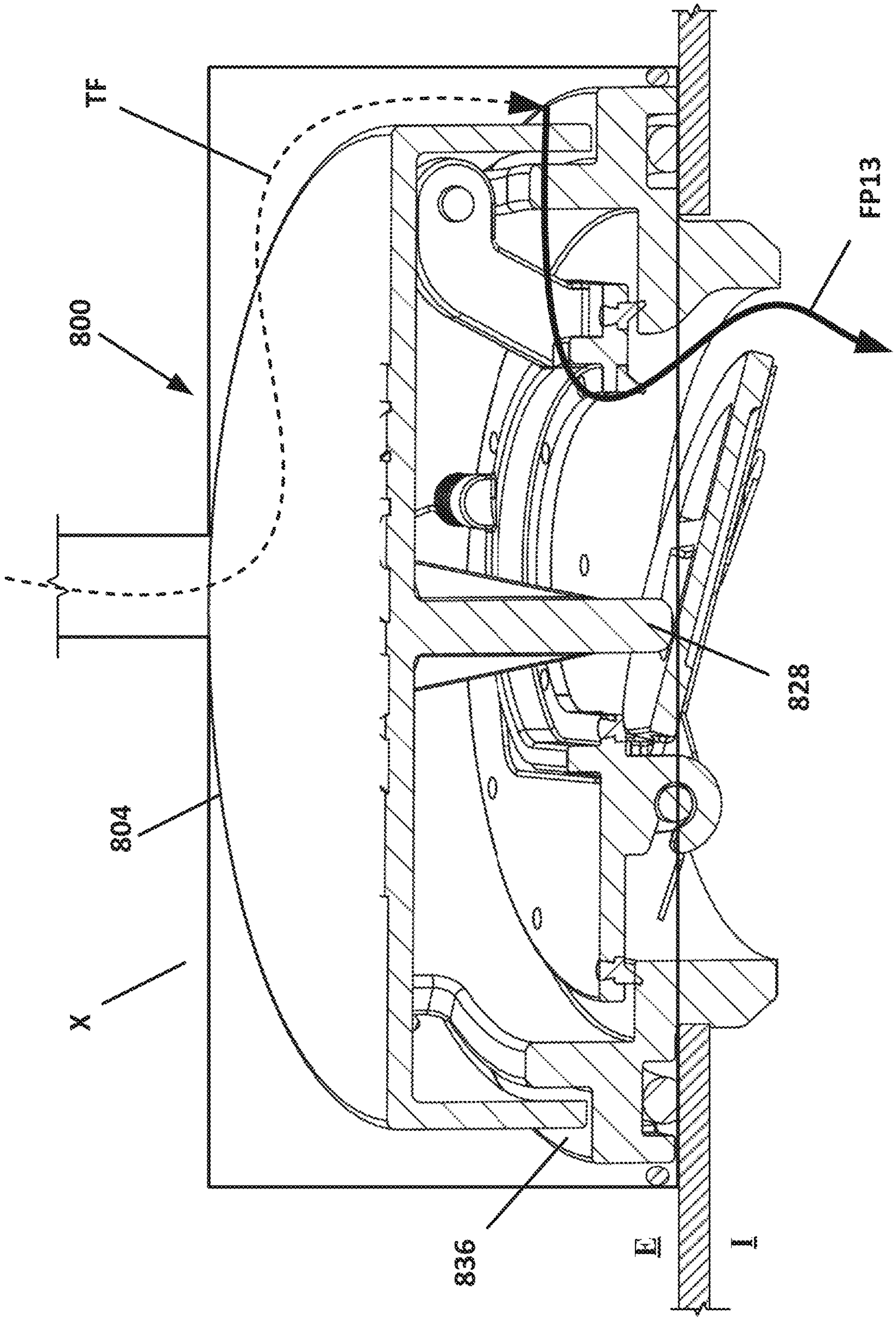
FIG. 45 is a cross-sectional view of the valve of FIG. 40 showing test fluid passing into the case through the platform assembly along the testing flow path, according to an example.

FIG. 45 illustrates the valve 800 during a leak check (e.g., an end of line leak check after being manufactured). During a leak check, the cap 804 is moved to the depressed position. For example, a leak check test fixture X may be mounted over the cap 804 and sealed to the valve 800 (e.g., to the valve body 802). The test fixture X may be pressed towards the valve 800 to depress the cap 804. Test fluid TF flows from the test fixture X, to an exterior of the valve 800, to an interior of the valve 800 (e.g., flows between the cap 804 and the valve body 802), and to the platform assembly 802.

The test fluid TF presses against the gate 812 to further bias the gate 812 to its closed position. The test fluid TF also presses against the door 814 and membrane 810. In some examples, the pressure of the test fluid TF is sufficient to overcome the bias of the second spring 812 and open the door 814. In other examples, however, the pressure of the test fluid TF is not sufficient to overcome the bias of the second spring 822. Rather, the actuator 828 of the cap 804 extends sufficiently into the valve body 802 to contact and press against the door 814 as the cap 804 is depressed. The actuator 828 pushes the door 814 towards its open position against the bias of the second spring 822 as the gate 812 remains closed relative to the valve body 802. Accordingly, the test fluid TF enters the case C along the testing flow path FP13, but not along the relief flow path FP12.

Referring back to FIGS. 41 and 42, in certain implementations, the gate 812 is configured to pivot relative to the valve body 802 between the open and closed positions. For example, the gate 812 shown in FIG. 42 includes a base 840 from which one or more arms 842 extend to define a hinge pin opening 844. The gate 812 attaches to a hinge pin 846 (e.g., see FIG. 49) of the valve body 802. A free end 848 of the base 840 opposite the arms 842 pivots relative to the valve body 802 about the first pivot axis P1 (see FIG. 41) extending along the hinge pin 846. In certain examples, the free end 848 of the gate 812 pivots towards the cap 804 when the gate 812 moves to the open position.

In certain implementations, the door 814 is configured to pivot relative to the gate 812 between its open and closed positions. For example, the door 814 includes an arm 852 extending outwardly from the support body 818. One or more arms 852 defines a hinge pin 854. The gate 812 defines a pivot mount 850 at which the hinge pin 854 is received. A free end 856 of the support body 818 opposite the arm 852 pivots relative to the gate 812 about a second pivot axis P2 (see FIG. 41) extending along the hinge pin 854. In certain examples, the second pin axis P2 is parallel to the first pivot axis P1. In certain examples, the second pivot axis P2 is laterally offset from the first pivot axis P1. In certain examples, the second pivot axis P2 is disposed at an opposite side of the gate opening 816 from the first pivot axis P1. In certain examples, the door 814 opens away from the cap 804 while the gate 812 opens towards the cap 804.

As further shown in FIG. 42, the first gasket 830 mounts (e.g., welds, snap fits, is heat staked, etc.) to the base 840 of the gate 812. For example, the first gasket 830 can mount to a first major surface of the base 840 at a periphery of the base 840. In certain examples, the first gasket 830 is positioned so that the base 840 is disposed between the first gasket 830 and the cap 804. In other examples, the first gasket 830 can be mounted to the valve body 802 at the internal ledge 832. In certain examples, a second gasket 858 also can be mounted (e.g., welds, snap fits, is heat staked, etc.) to the base 840. The second gasket 858 provides the seal between the gate 812 and the door 814. In certain examples, the second gasket 858 is mounted to the base 840 at a periphery of the opening 816. In certain examples, the second gasket 858 is mounted to the same major side of the base 840 as the first gasket 830. In other examples, the second gasket 858 can be carried by the support body 818 of the door 814.

In certain implementations, the base 840 of the gate 812 includes one or more mounting arms 860 for the first spring 820. In certain examples, the first spring 820 is a torsion spring having a first portion that contacts the base 840 of the gate 812 and a second portion that contacts the cap 804. Accordingly, the first spring 820 biases the gate 812 away from the cap 804. In certain examples, the first portion of the first spring 820 extends across the base 840 between two torsional portions. In such examples, a respective second portion of the first spring 820 extends from each torsional portion towards the cap 804. Further, each torsional portion may be mounted to a respective one of the mounting arms 860.

In certain implementations, the second spring 822 can be mounted to the hinge pin 854 of the door 814. For example, the second spring 822 may include a torsional portion that mounts over the hinge pin 854, a first portion that extends over or otherwise engages the support body 818 of the door 814, and a second portion that extends over or otherwise engages the base 840 of the gate 812.

Figure 46:
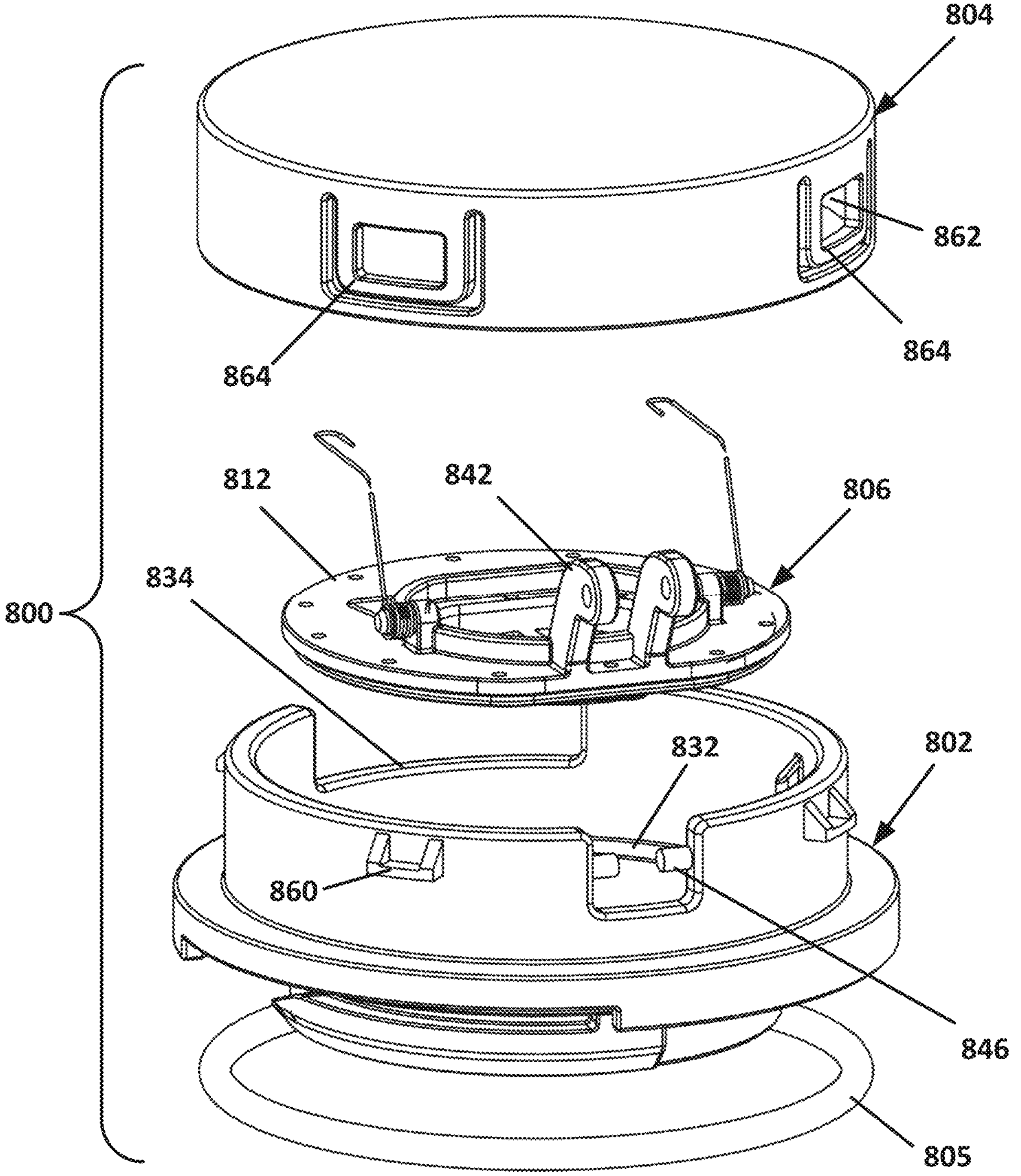
FIG. 46 is a first perspective view of the valve of FIG. 40 showing the cap, valve body, platform assembly, and an external gasket exploded outwardly from each other, according to an example.
Figure 47:
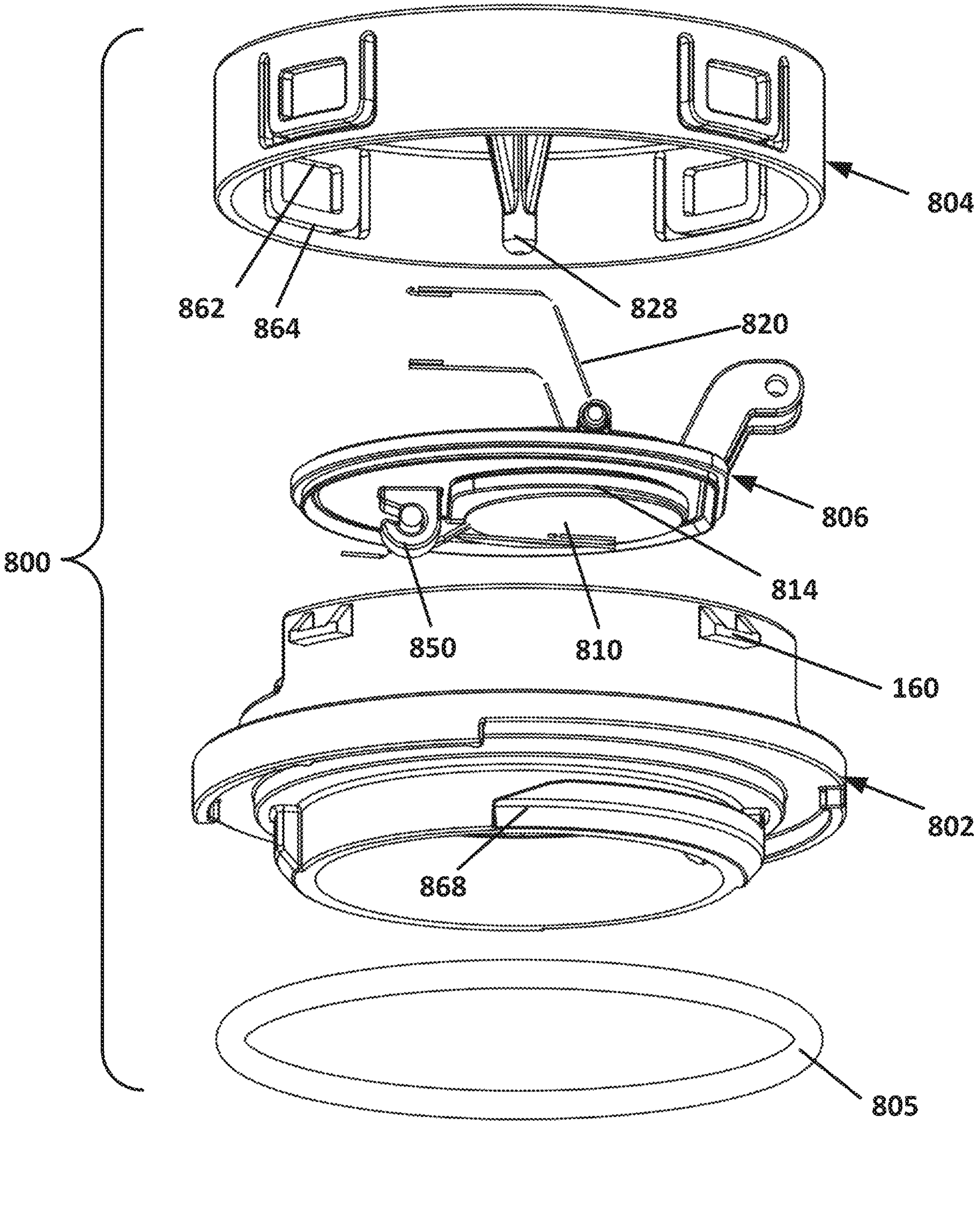
FIG. 47 is a second perspective view of the exploded components of the valve of FIG. 46, according to an example.
Figure 48:
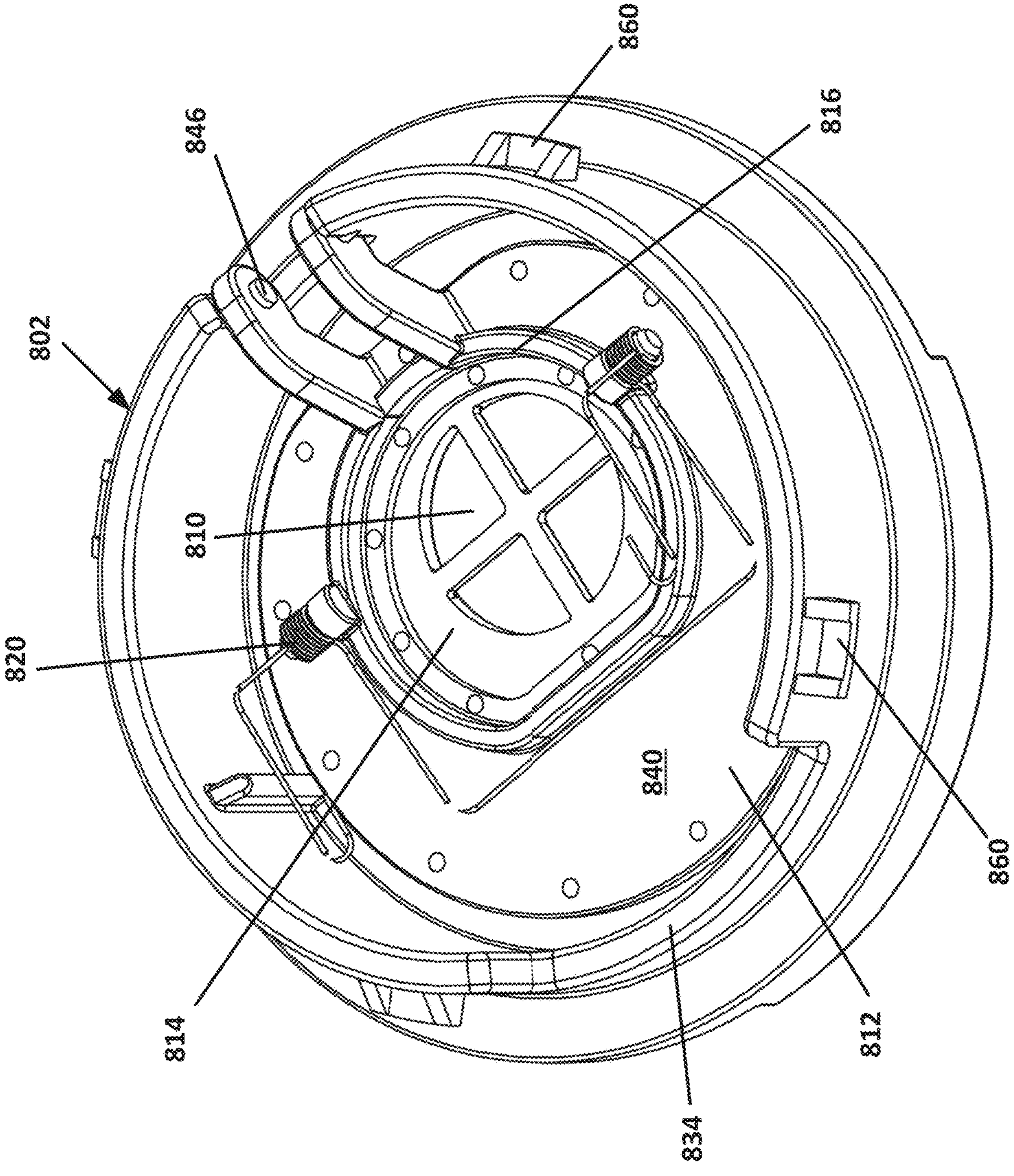
FIG. 48 is a perspective view of the valve of FIG. 40 with the cap removed for ease in viewing an interior of the valve body, according to an example.

Referring to FIGS. 40, 46, and 47, one example mounting mechanism for attaching the cap 804 to the valve body 802 is shown. In certain examples, the valve body 802 includes stop members 860 circumferentially spaced along an external periphery of the valve body 802 at the second end 826 of the valve body 802. The cap 804 defines windows 862 circumferentially spaced along the periphery of the cap 804. The stop members 860 are sized to fit within the windows 862. In certain examples, the stop members 860 are sized to slide within the windows 862 as the cap 804 is moved between the undepressed and depressed positions. In certain examples, the stop members 860 are ramped to facilitate insertion of the stop members 860 into the windows 862. In certain examples, the windows 862 are define through tabs 864 configured to flex relative to a remainder of the cap 804 to further facilitate insertion of the stop members 860 into the windows 862.

In certain implementations, the valve body 802 is configured to mount to the case C using a twist-to-lock mechanism. In some examples, the valve body 802 includes a bayonet 868. In other examples, the valve body 802 may define a thread. In still other implementations, the valve body 802 may be latched, fastened, welded, friction-fit, or otherwise mounted to the case C.

Figure 50:
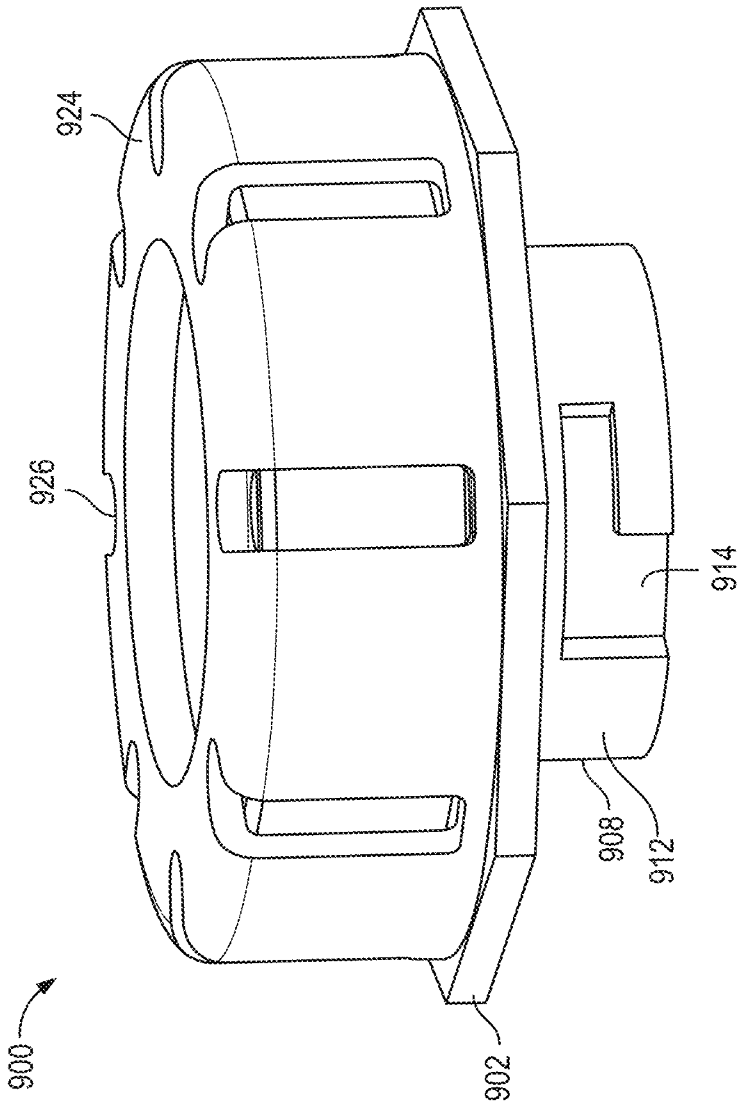
FIG. 50 illustrates a perspective view of an embodiment of a valve arrangement usable with a battery case, constructed in accordance with principles of this disclosure, according to an example.

Other example valves usable with an enclosure (for example, a battery case) and including inventive aspects suitable for use in any of the above-described valves are provided in FIG. 50 to FIG. 80. Preferably, the valve is for relieving excess pressure within the enclosure, and for allowing gasses to move (e.g., breathe) through the valve during normal operation of the enclosure. FIG. 50 illustrates a perspective view of an embodiment of a valve 900 arrangement usable with a battery case.

The valve 900 includes a valve body 902 which defines a pressure relief passage 904. Pressure relief passage 904 provides a path for gas and relief fluids to move between the battery case and the external environment outside of valve 900. In some examples, the pressure relief passage 904 is in cylindrical in shape but could be a variety of alternative shapes in other examples.

The valve body 902 includes a surrounding wall 908 around the pressure relief passage 904. The surrounding wall 908 includes opposite interior and exterior surfaces 910, 912. The interior surface 910 is in communication with the pressure relief passage 904.

In reference now to FIGS. 51 and 52, the valve body 902 has a cap-side surface 940 which is substantially perpendicular to a valve axis B (described below), configured to contact a cap 924. Valve body 902 has a vertical ring 942 which is positioned concentric to an opening of pressure relief passage 904. Vertical ring 942 is located between an outer edge 944 of the cap-side surface 940 of valve body 902 and a valve seat 906. Vertical ring 942 extends upward from the cap-side surface 940 of valve body 902 and defines a cylindrical area within itself.

Figure 53:
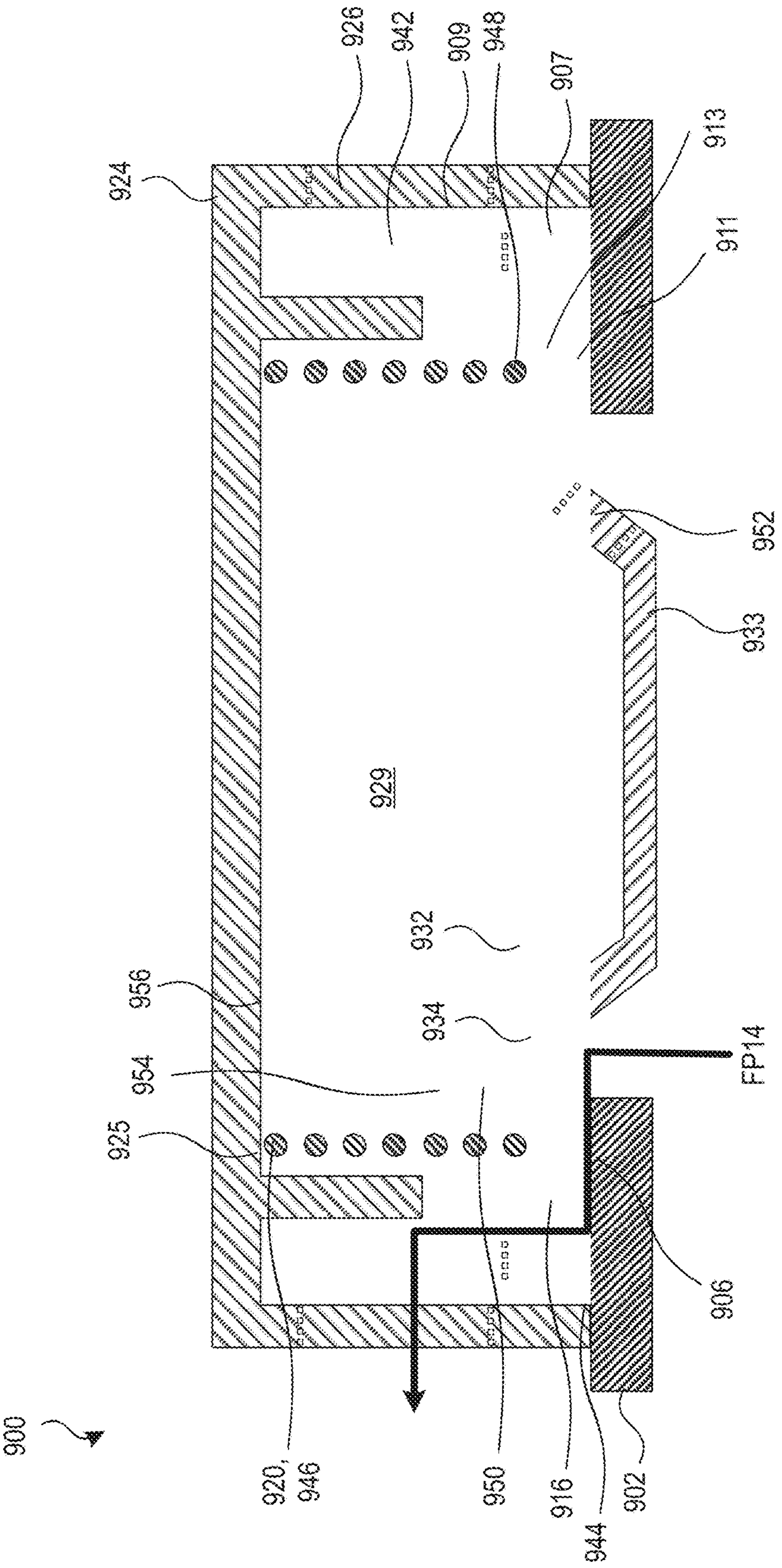
FIG. 53 illustrates a cross-sectional view of an alternative embodiment of the valve arrangement of FIG. 50, showing the valve arrangement in a closed position, including a molded seal ring, according to an example.
Figure 54:
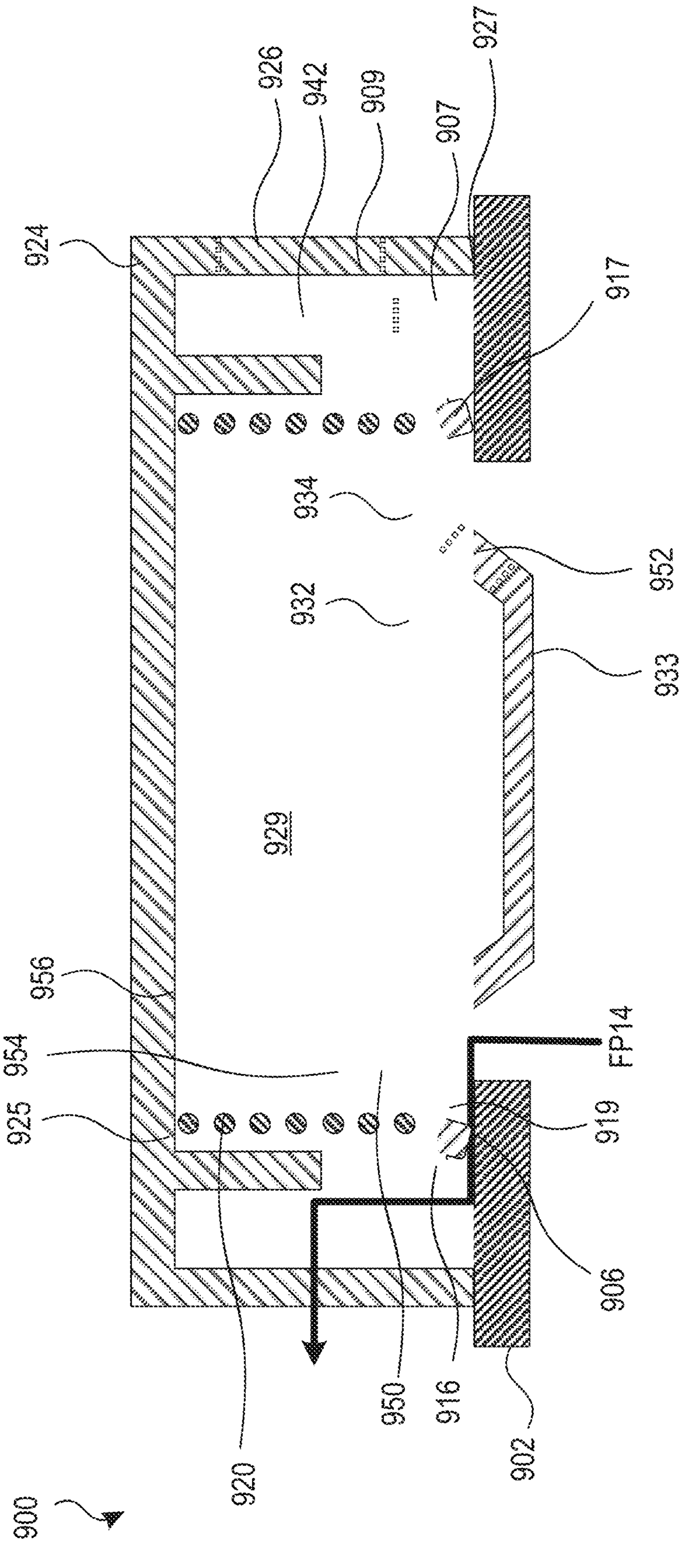
FIG. 54 illustrates a cross-sectional view of an alternative embodiment of the valve arrangement of FIG. 50, showing the valve arrangement in a closed position, including a molded plastic seal, according to an example.
Figure 61:
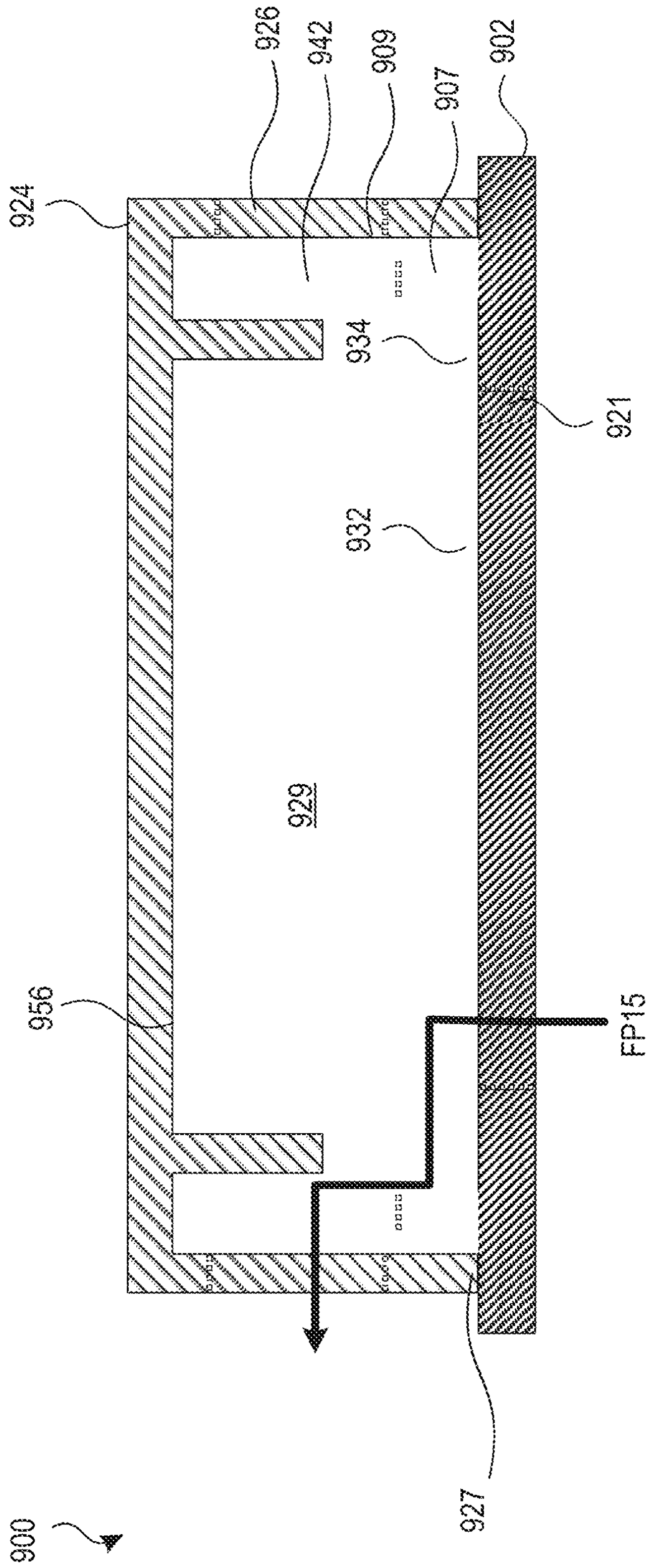
FIG. 61 illustrates a cross-sectional view of an alternative embodiment of the valve arrangement of FIG. 50, showing the valve arrangement in a closed position, including a membrane configured to burst to relieve pressure over a predetermined pressure, according to an example.
Figure 62:
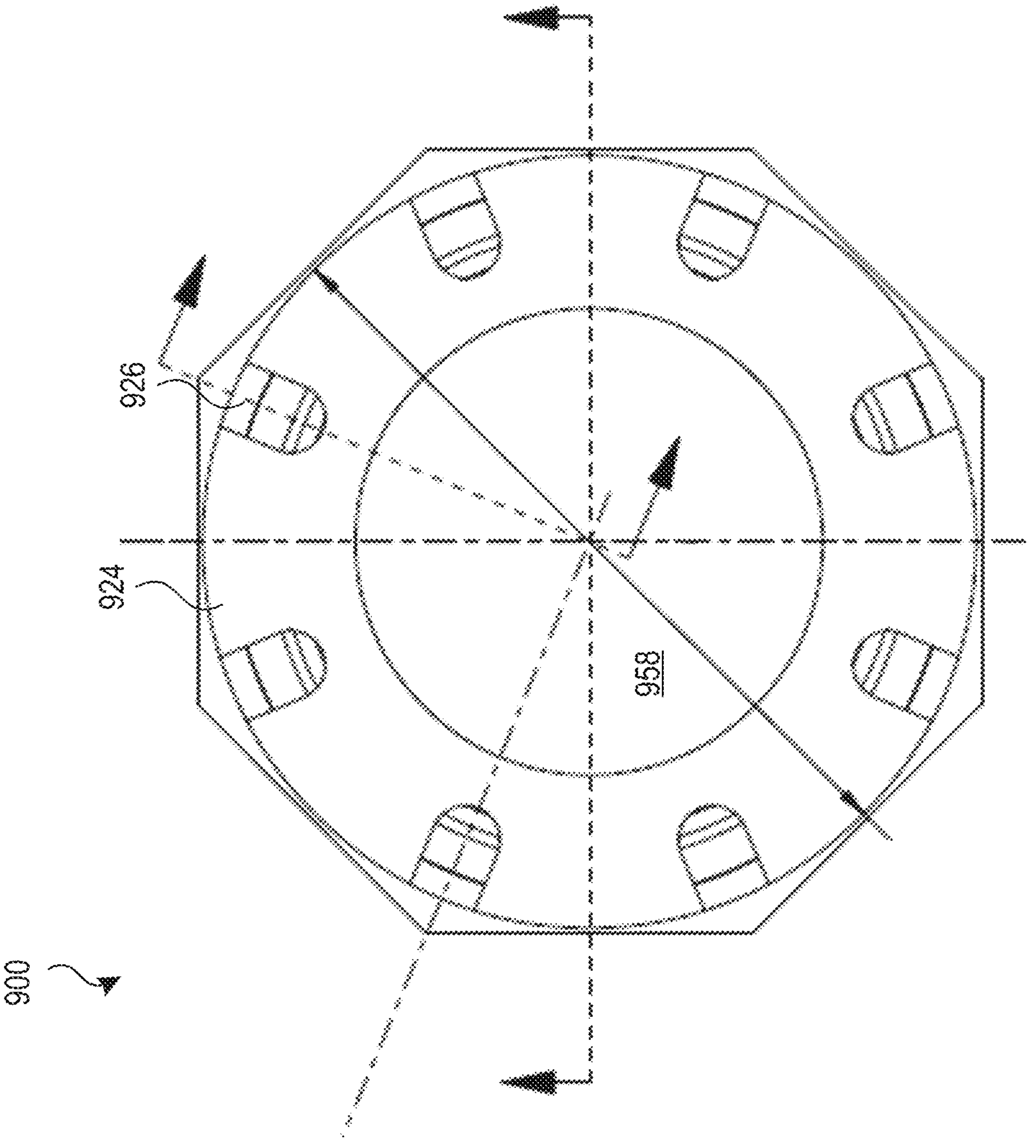
FIG. 62 illustrates a top view of the valve arrangement of FIG. 50, according to an example.

In some examples, vertical ring 942 includes a plurality of ribs 907 which extend to contact an inner face 909 of cap 924, to guide cap 924 to sit on the valve body 902 an equal distance from vertical ring 942 on all sides (see FIGS. 53, 54, and 61).

In accordance with principles of this disclosure, valve body 902 of valve 900 includes a valve seat 906. The valve seat 906 is for providing a surface against which a valve member (discussed below) can rest when in a closed position. In the example embodiment shown, the valve seat 906 surrounds the pressure relief passage 904.

In this example embodiment, valve seat 906 includes a seat groove 928 which circumscribes the pressure relief passage 904 and is set into the upper surface of valve body 902. A seal member 930 is positioned in the seat groove 928. In some examples, the seal member 930 includes an O-ring. In some examples, the seal member 930 (for example, the O-ring) has a round (930*a*) (see FIG. 51), square, or rectangular (930*b*) (see FIG. 52) cross-sectional shape. Other shapes are possible.

In an alternative example, as shown in FIG. 53, the seal member 930 is a circular molded seal ring 911. Circular molded seal ring 911 is inserted or molded into a circular ring notch 913 of poppet valve member 916 at one or more locations. The cross-sectional shape of the portion of the molded seal ring 911 which sits within the circular ring notch 913 is configured so that the molded seal ring 911 fits securely in the circular ring notch 913. Molded seal ring 911 contacts valve body 902 at the valve seat 906.

In another alternative example, as shown in FIG. 54, the seal member 930 is a circular molded plastic seal 917, which is molded to an underside 919 of poppet valve member 916. In some examples, molded plastic seal 917 is a ring-shaped seal which is concentric with the opening of the pressure relief passage 904. Molded plastic seal 917 contacts valve body 902 at the valve seat 906. When molded plastic seal 917 is not in contact with valve seat 906, fluid may flow along relief flow path FP14 out of the valve.

In accordance with principles of this disclosure, valve body 902 is adapted for connection to a battery case. Exterior surface 912 of the surrounding wall 908 includes a fastening arrangement 914 adapted to connect or couple to the battery case (see FIGS. 50 and 63). A variety of coupling arrangements can be used. In the example shown in the drawings, the fastening arrangement 914 includes a bayonet slot 923 in the exterior surface 912 of the surrounding wall 908. The bayonet slot 923 is shaped to receive a projection from the battery case to releasably and selectively connect the valve body 902 and battery case. Of course, in alternative arrangements, the bayonet slot 923 can be on the battery case, while the projection can be on the valve body 902. In other alternative arrangements, the valve body 902 can be connected to a battery case by screwing, popping, or other appropriate connectors or couplers.

In some examples, a connection seal member 960 (FIG. 55) (for example, an O-ring of round, rectangular, or square cross-section) is included at the upper portion of the surrounding wall 908, where surrounding wall 908 intersects with a case-side surface 962 of valve body 902, to provide a seal in the connection of valve-body 902 with the case. In the example shown, the seal member 960 circumscribes and is against the exterior surface 912 of the surrounding wall 908.

In accordance with principles of this disclosure, valve 900 includes a poppet valve member 916. The poppet valve member 916 is moveable between a closed position (FIG. 52) and an open position (FIG. 64) along a valve axis B relative to the valve body 902. The poppet valve member 916 is configured to seal against the valve seat 906 to close the pressure relief passage 904 when in a closed position, preventing fluids (e.g., a liquid or gas) from exiting through the pressure relief passage 904. The poppet valve member 916 engages the seal member 930 when the poppet valve member 916 is in the closed position. When the poppet valve member 916 is in the open position (not sealed against the valve seat 906), pressure within the battery case can be relieved, as relief fluid can flow through the pressure relief passage 904. In some examples, the relief fluid is typically gas, such as air, but in some applications, it may be in other forms such as a liquid, two-phase flow, or other flowable material.

In accordance with principles of this disclosure, valve 900 includes a biasing element 920 which biases poppet valve member 916 toward the closed position. In some examples, biasing element 920 is a spring. Biasing element 920 is located inside of vertical ring 942, so that a first biasing element end 946 is substantially at the same height as the height of vertical ring 942 and so that a second biasing element end 948 contacts poppet valve member 916. Poppet valve member 916 is configured to move from the closed position to the open position against the bias of biasing element 920 when a pressure in the battery case exceeds a predetermined level (a set pressure). The predetermined level can be determined so as to prevent leakage, damage, rupture, explosion, or other damage to the battery case and/or battery enclosed within the case. High pressure in the battery case can be caused by warm external temperatures, battery malfunction, thermal runaway, or other causes.

Figure 51:
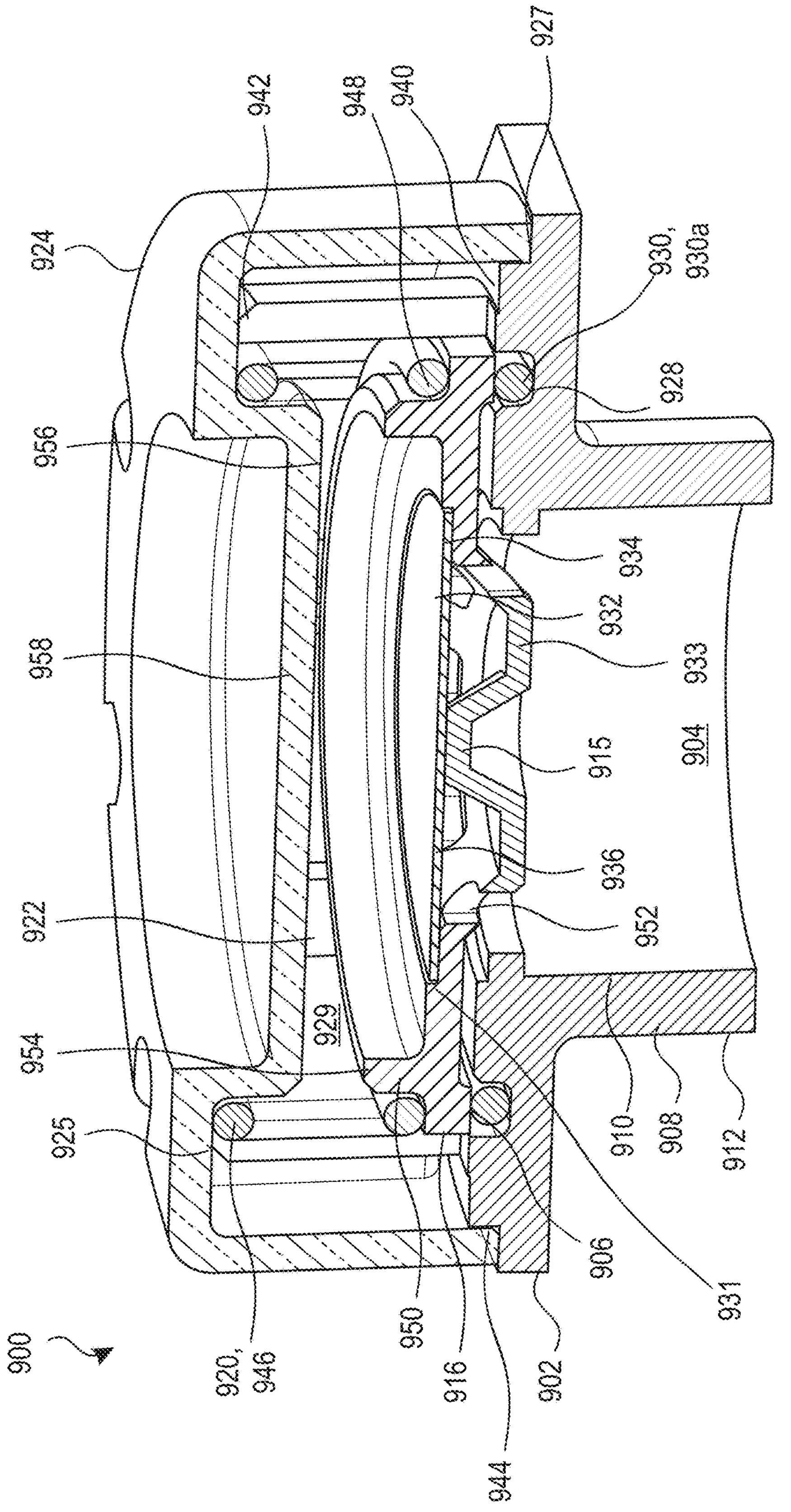
FIG. 51 illustrates a cross-sectional perspective view of the valve arrangement of FIG. 50, showing the valve arrangement in a closed position, according to an example.
Figure 52:
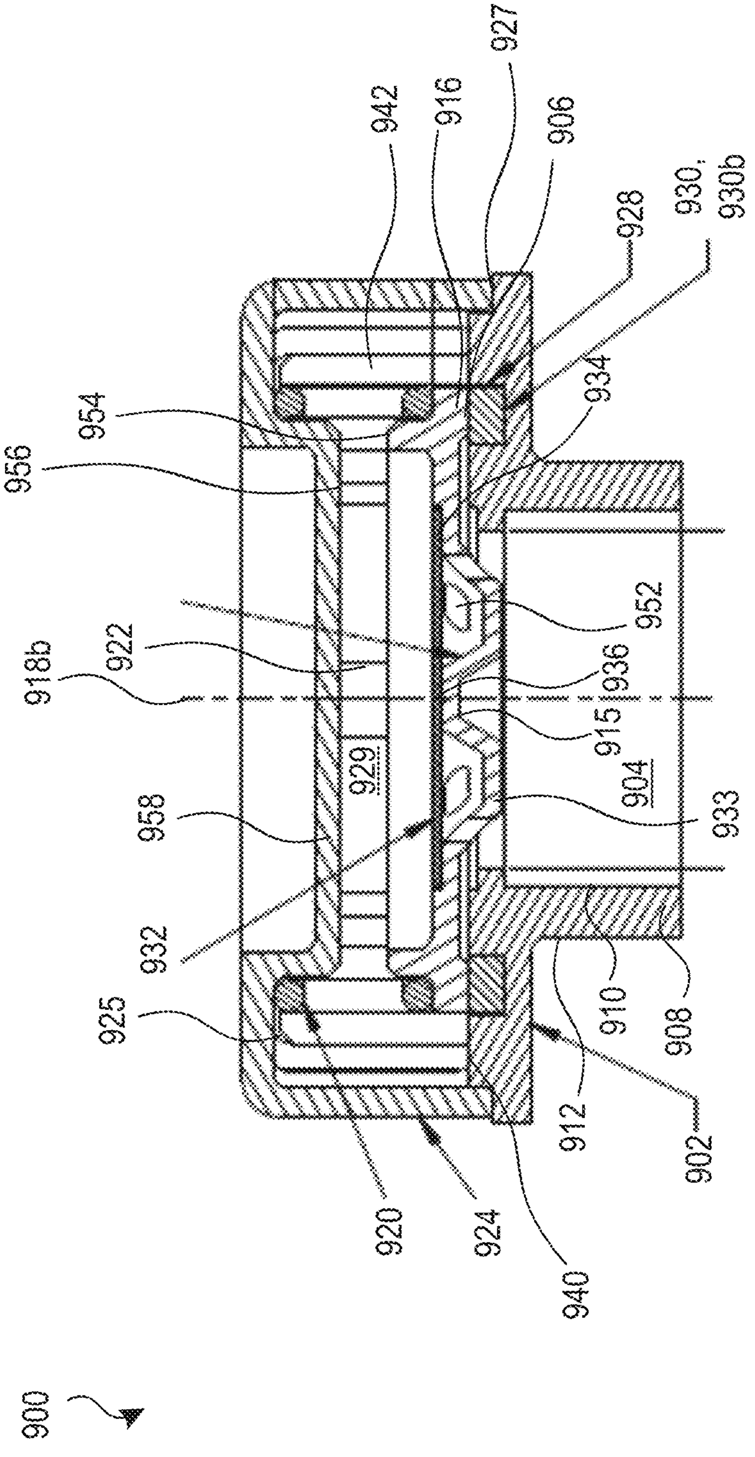
FIG. 52 illustrates a cross-sectional view of an alternative embodiment of the valve arrangement of FIG. 50, showing the valve arrangement in a closed position, including a non-round O-ring, according to an example.

Referring to FIG. 51, in the example shown, the first biasing element end 946 of biasing element 920 engages against an inner surface 925 of cap 924. The second biasing element end 948 of biasing element 920 engages against a poppet valve member 916. In the example shown, the biasing element 920 engages around a perimeter of the poppet valve member 916.

In the example embodiment shown, the valve body 902 includes openings, such as the illustrated slots 922 in vertical ring 942. The slots 922 can include, for example, vertical or horizontal vents, holes, or channels for relief fluids to pass through when the poppet valve member 916 is in the open position. In some examples, the slots 922 are circumferentially spaced around the vertical ring 942. In the illustrated example, the slots 922 are evenly spaced around the vertical ring 942.

Figure 63:
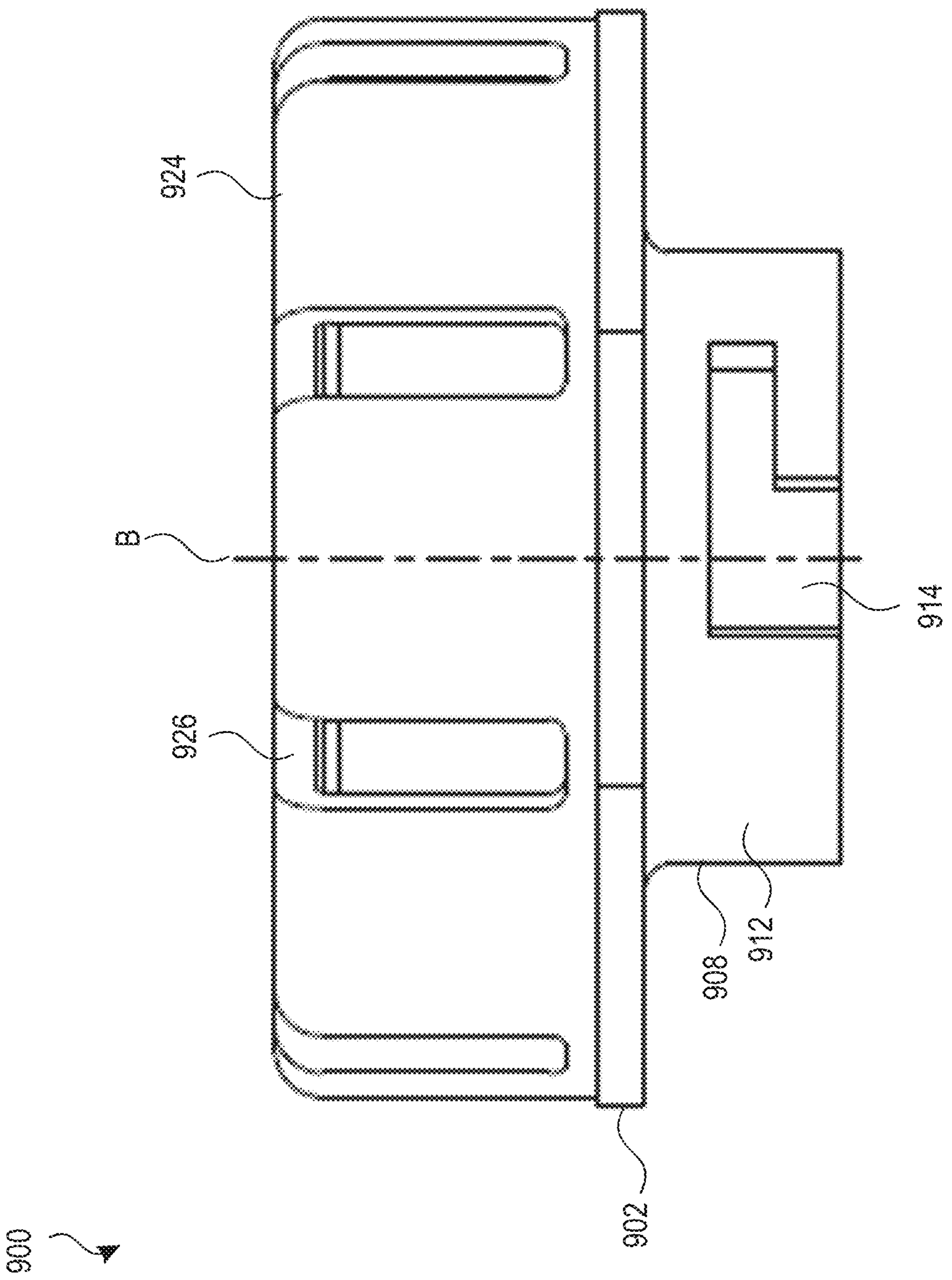
FIG. 63 illustrates a side view of the valve arrangement of FIG. 50, according to an example.
Figure 64:
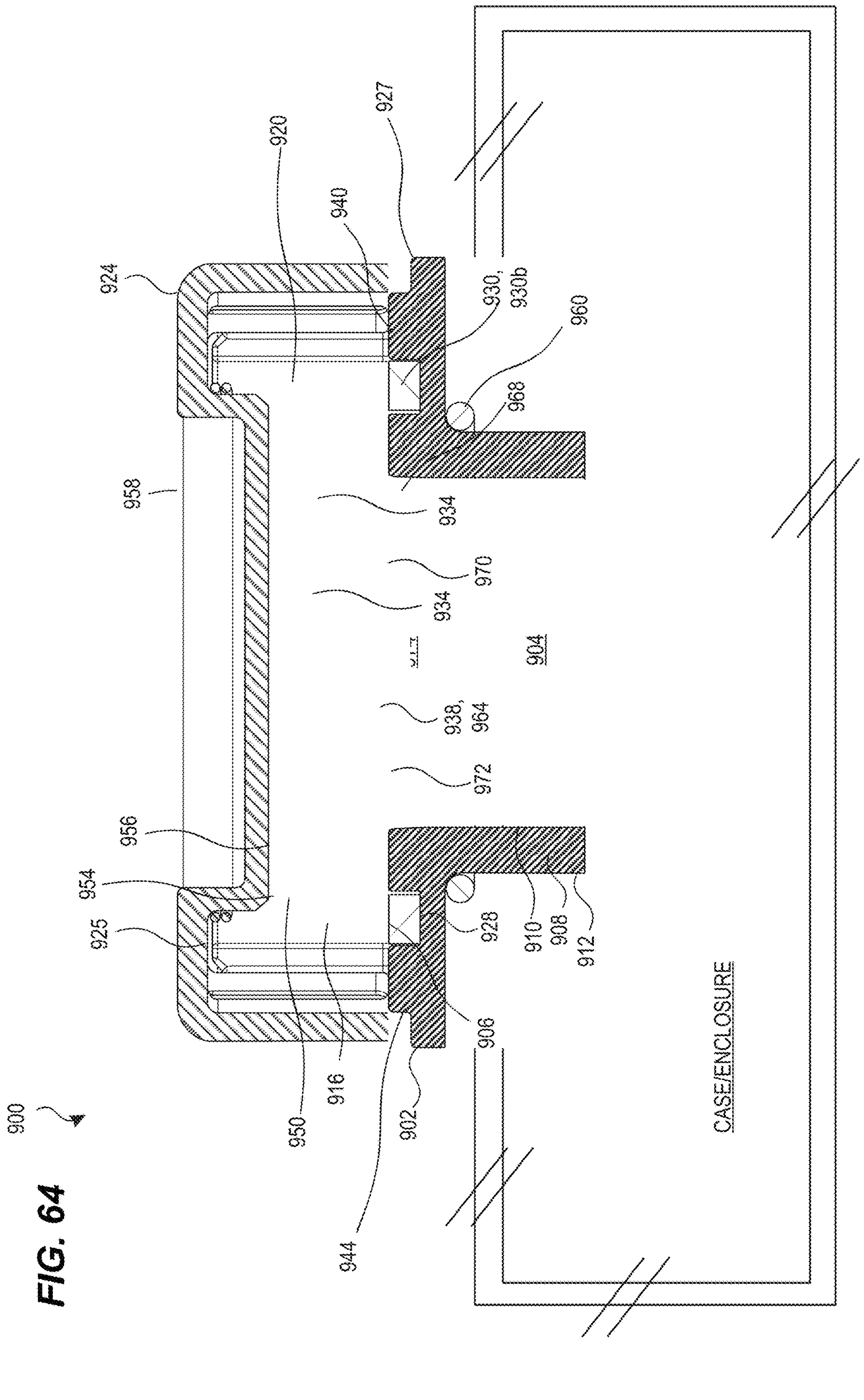
FIG. 64 illustrates a cross-sectional perspective view of the valve arrangement of FIG. 50, showing the valve arrangement in an open position, according to an example

In accordance with principles of this disclosure, valve 900 includes a cap 924, which is adapted for connection to the valve body 902 (see also FIGS. 50, 61, and 63). Cap 924 surrounds, encloses, or partially encloses the valve body 902. Cap 924 includes one or more vents 926. The vents 926 can include, for example, vertical or horizontal vents, holes, windows, or channels configured to allow for relief fluids to pass through when the poppet valve member 916 is in the open position. In some examples, the vents 926 are circumferentially spaced around cap 924. In the illustrated example, vents 926 are evenly spaced around the cap 924.

Cap 924 is positioned to contact the cap-side surface 940 of valve body 902 at or near an outer circumference/rim 927 of the cap-side surface 940. Cap 924 is configured to be of a height to extend over the top of vertical ring 942. In some examples, cap 924 includes a recessed portion 958 which recesses into a central space 929 within a cylindrical area defined by vertical ring 942. The recessed portion 958 is positioned to assist in maintaining the position of a first biasing element end 946 of biasing element 920.

In accordance with principles of this disclosure, poppet valve member 916 of valve 900 includes a guide wall 950. Guide wall ring 950 extends upwards from the poppet valve member 916 and is positioned concentric to the outer circumference of the poppet valve member 916. Guide wall ring 950 is positioned to assist in maintaining the position of a second biasing element end 948 of biasing element 920. In some examples, guide wall ring 950 includes cap-facing edge 954, which faces the cap 924 and sits at a plane substantially perpendicular to valve axis B. In some examples, when the poppet valve member 916 is in the open position and biasing element 920 is compressed, the cap-facing edge 954 of the poppet valve member 916 will contact a recess face 956 of a recessed portion 958 of cap 924 (see to FIG. 64).

In accordance with principles of this disclosure, valve 900 includes a membrane 932 which allows gas to move in and out of the battery case through the membrane 932 when the poppet valve member 916 is in the closed position.

In some examples, the membrane 932 is hydrophobic. The membrane 932 is permeable to air and to gasses emitted by the battery. In some examples, the membrane 932 includes polytetrafluoroethylene (PTFE). In some examples, the membrane 932 includes a layer of PTFE calendared onto it. In some examples, the membrane 932 includes the layer of PTFE heat staked onto it.

Preferably, the membrane 932 is carried with the poppet valve member 916. The poppet valve member 916 is configured to support the membrane 932 around at least a perimeter 934 of the membrane 932. As shown in FIG. 51, the membrane 932 sits within a recess 931 in poppet valve member 916. The poppet valve member 916 includes one or more openings 952 in it beneath membrane 932 to allow for the passage of gas up through the poppet valve member 916 and through membrane 932 while poppet valve member 916 is in the closed position. In some examples, the openings 952 are circumferentially spaced around the poppet valve member 916. In the illustrated example, openings 952 are evenly spaced around the poppet valve member 916.

In some examples, the poppet valve member 916 includes a ridge 915 to further support the membrane 932 at a center region 936 of the membrane 932. The ridge 915 projects from a base 933 of poppet valve member 916, which protrudes into the pressure relief passage 904. In some examples, base 933 is substantially perpendicular to valve axis B. In the example shown in FIG. 51, ridge 915 is frustoconical or cylindrical in shape, and the bottom circular area of ridge 915 is concentric with the perimeter of base 933.

In accordance with principles of this disclosure, valve 900 includes a membrane protective member 938 which is configured to prevent/block fluid communication/contact between the membrane 932 and relieving fluid from the battery case during a pressure spike within the battery case (for example, when relief fluid has entered pressure relief passage 904). Membrane protective member 938 is also configured to allow passage of the gas moving in and out of the battery case through the membrane 932 when the poppet valve member 916 is in the closed position. In some examples, the membrane protective member 938 is a disc which is configured to sit between the membrane 932 and the poppet valve member 916.

Figure 55:
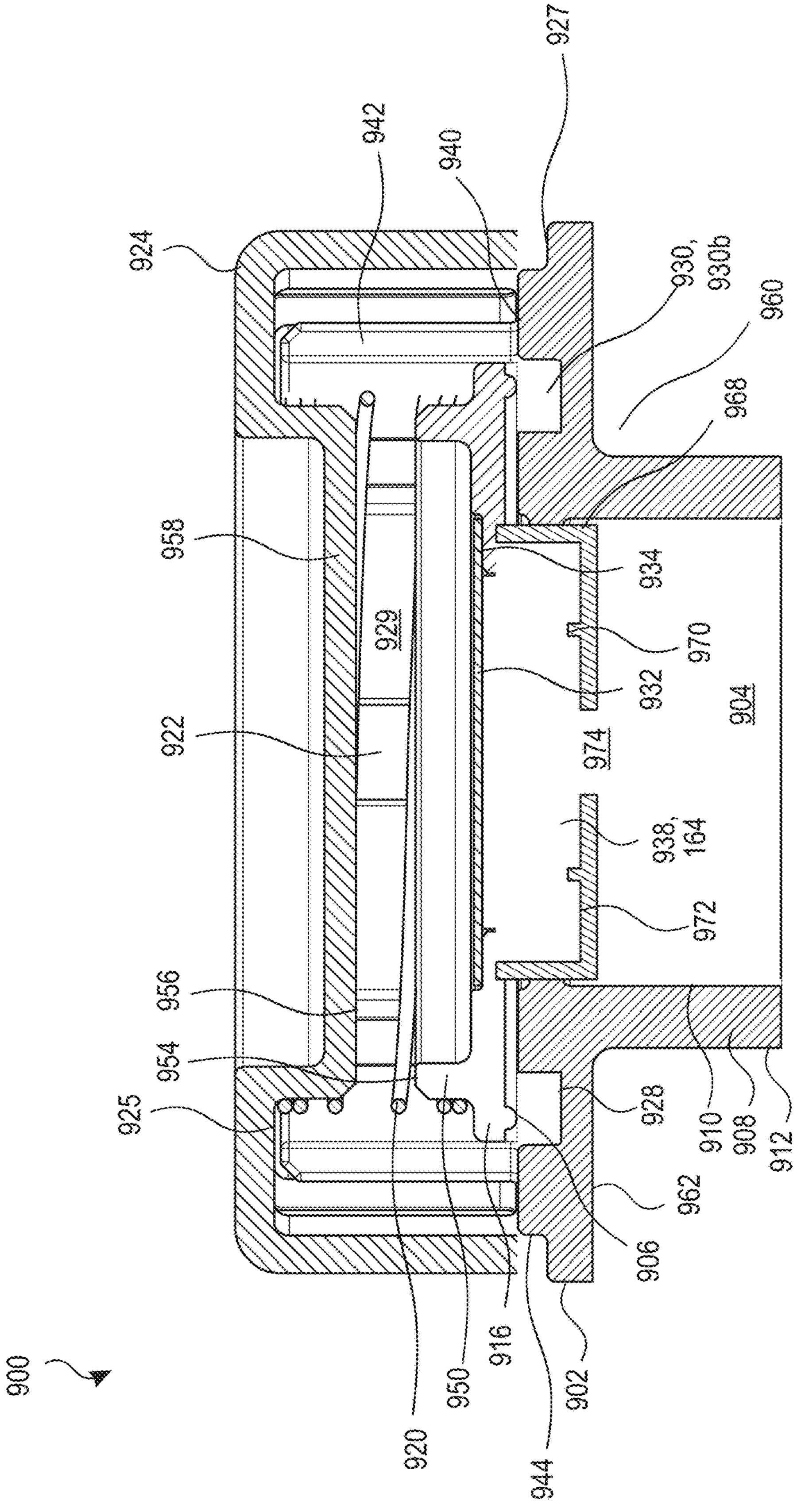
FIG. 55 illustrates a cross-sectional view of an alternative embodiment of the valve arrangement of FIG. 50, showing the valve arrangement in a closed position, including a biased membrane protective member disc, according to an example.

In some examples, as shown in FIG. 55, the membrane protective member 938 includes a disc 964, which is configured to sit between the membrane 932 and the poppet valve member 916. In some examples, the disc 964 is biased into a flow position when the pressure in the battery case is below the predetermined pressure by a protective member biasing element 966 when the poppet valve member 916 is in the closed position.

In some examples, the poppet valve member 916 includes a cage 968, which extends within the area of pressure relief passage 904, and in the orientation of FIG. 55 is shown to be below the poppet valve member 916 to support the disc 964. In some examples, the cage 968 supports the disc 964 around at least a perimeter of the disc 964.

In some examples, the disc 964 is supported by support structures/members 970 on a disc-facing surface 972 of cage 968. In some examples, cage 968 includes one or more cage openings 974 through which gasses and relief fluids can flow.

In some examples, protective member biasing element 966 is a protective member biasing spring 935. In some examples, protective member biasing element 966 applies biasing pressure to the disc 964 around at least a perimeter of the disc 964.

In some examples, during a pressure spike within the battery case, the membrane protective member 938 is pushed by the mass of the relieving fluid flow against the force of the protective member biasing element 966, to contact a protective sealing surface 996 of the poppet valve member 916. The contact acts to prevent relieving fluids from contacting the membrane 932. In some examples, the protective sealing surface 996 includes one or more bleed notches to dissipate pressure and allow for reopening of the membrane protective member 938 (for example, the disc 964). After the pressure within the battery case is relieved to below the predetermined level, the membrane protective member 938 (for example, disc 964) is moved away from the protective scaling surface 996 by the protective member biasing element 966.

Figure 56:
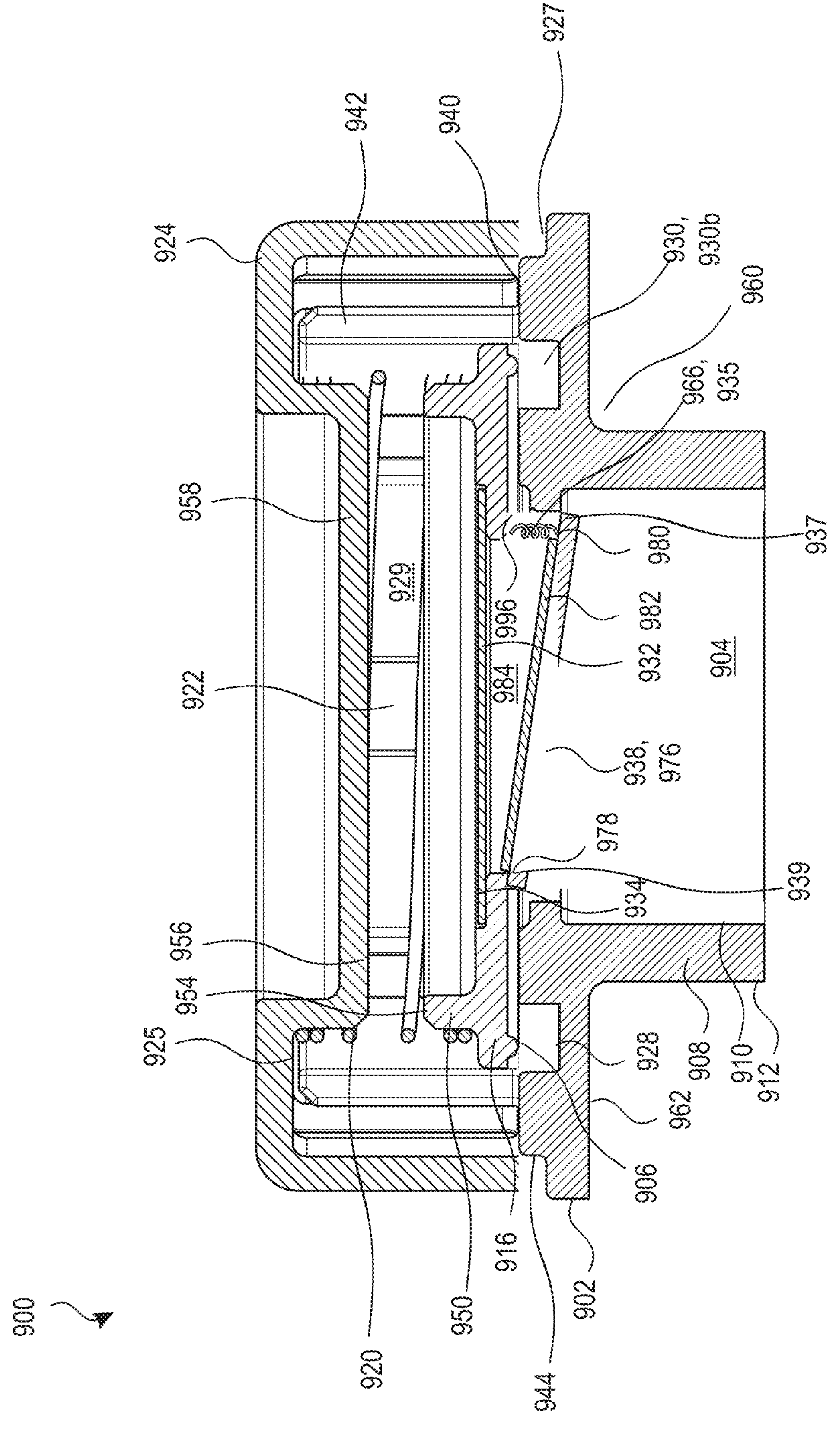
FIG. 56 illustrates a cross-sectional view of an alternative embodiment of the valve arrangement of FIG. 50, showing the valve arrangement in a closed position, including a biased membrane protective member plate, according to an example.

In some examples, as shown in FIG. 56, the membrane protective member 938 includes a plate 976. Plate 976 as shown is configured to set between membrane 932 and the poppet valve member 916. In some examples, when the pressure in the battery case is below the predetermined pressure, the plate 976 is biased into a flow position by a protective member biasing element 966 when the poppet valve member 916 is in the closed position.

In some examples, the plate 976 is pivotably connected to the poppet valve member 916 at a pivot point 978. In some examples, the plate 976 is pivoted into a blocking position to protect membrane 932 when the poppet valve member 916 is in the open position. In some examples, protective member biasing element 166 applies biasing pressure to the plate 976 at a biasing point 980. In some examples, biasing point 980 is on a first side 937 of plate 976, pivot point 978 is on a second side 939 of plate 976, and the first side and second sides are opposite each other.

In some examples, plate 976 includes a blocking insert portion 982 which fits into a blocking recess 984 of poppet valve member 916 when the plate 976 is pivoted into the blocking position. After the pressure within the battery case is relieved to below the predetermined level, the membrane protective member 916 (for example, plate 976) is moved away from the blocking recess 984 by the protective member biasing element 966.

Figure 57:
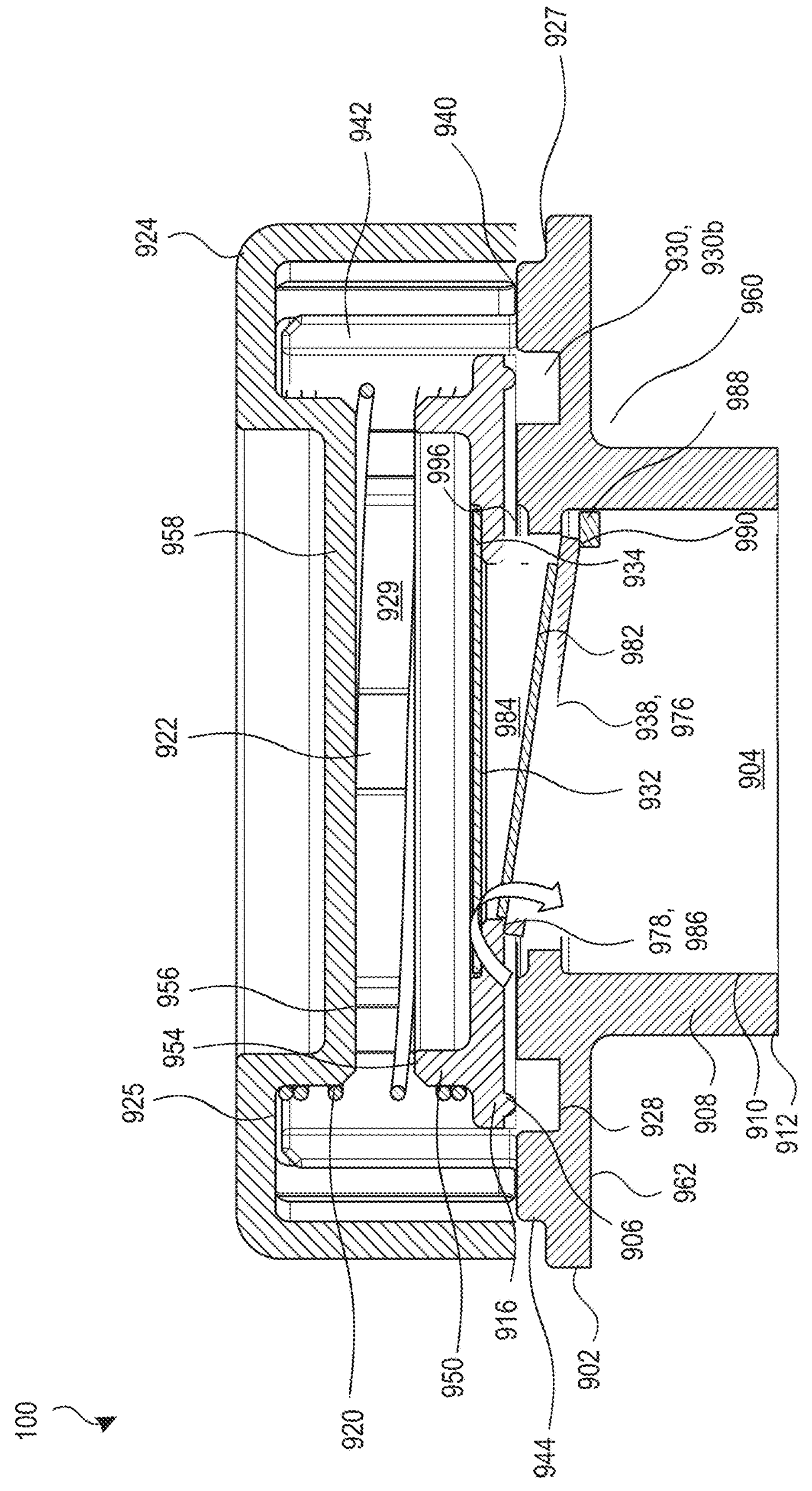
FIG. 57 illustrates a cross-sectional view of an alternative embodiment of the valve arrangement of FIG. 50, showing the valve arrangement in a closed position, including a torsional biased membrane protective member plate, according to an example.

In some examples, as shown in FIG. 57, plate 976 includes a torsional protective member biasing element 986 (for example, a spring or an elastic element) at the pivot point 978 to bias the plate 976 into the flow position. In some examples, the pressure relief passage 904 includes a stopper 988, against which a stop portion 990 of the plate 976 is biased by the torsional protective member biasing element 986 when the plate 976 is in the flow position.

Figure 58:
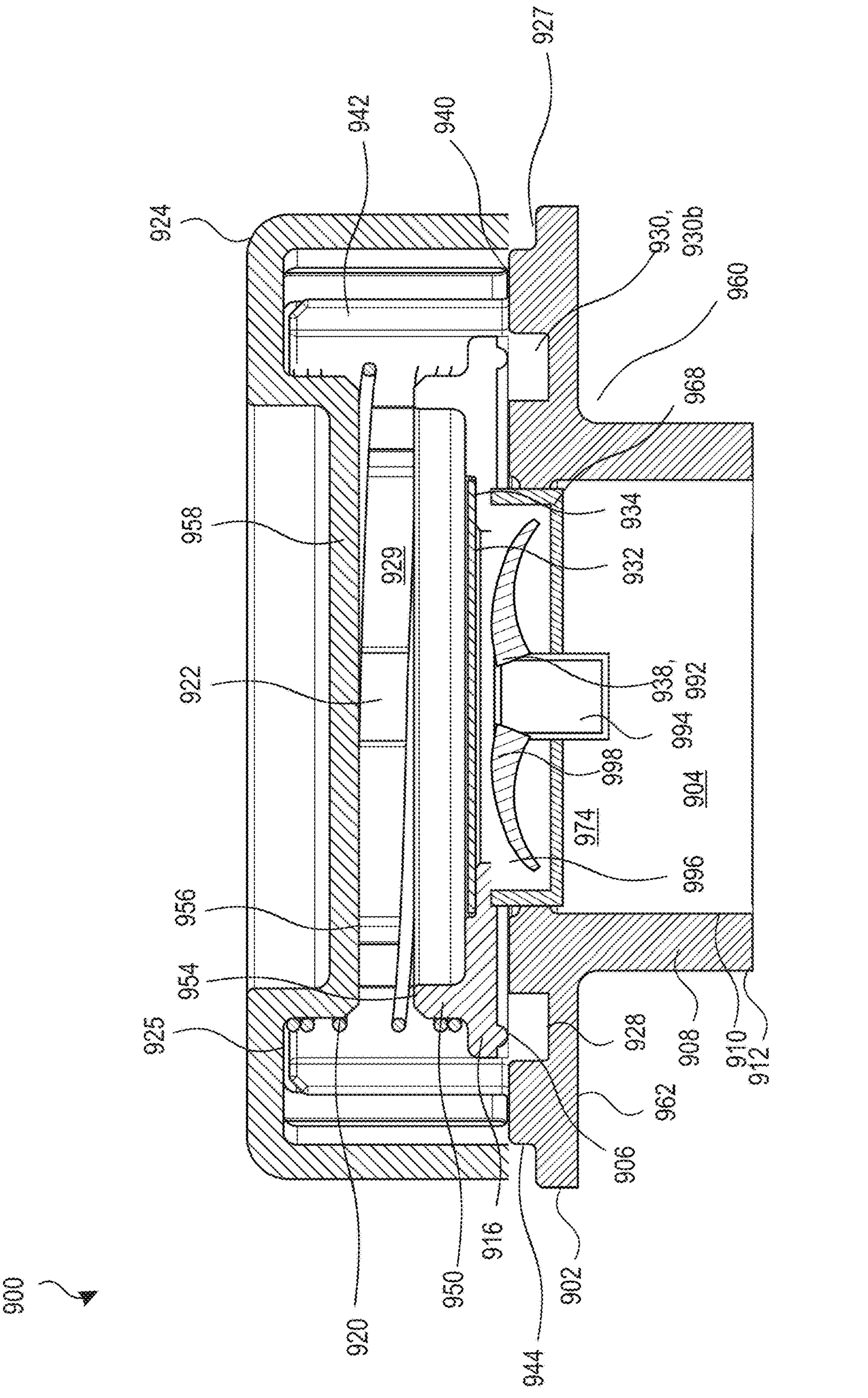
FIG. 58 illustrates a cross-sectional view of an alternative embodiment of the valve arrangement of FIG. 50, showing the valve arrangement in a closed position, including a butterfly valve, according to an example.

In some examples, as shown in FIG. 58, the membrane protective member 938 includes a butterfly valve 992 (for example, an elastic one-way butterfly valve) configured to sit between the membrane 932 and the poppet valve member 916. The butterfly valve 992 is configured to allow gas to move in and out of the battery case through the membrane 932 when the poppet valve member 916 is in the closed position. In some examples, butterfly valve 992 is supported by a support element 994 on a cage 968. In some examples, cage 968 includes one or more cage openings 174 through which gasses and relief fluids can flow. In some examples, poppet valve member 916 includes a protective sealing surface 996, which faces the cage 968.

In some examples, during a pressure spike within the battery case, one or more blocking disks 998 of butterfly valve 992 are moved by the mass of the relieving fluid flow to contact the protective sealing surface 996 of the poppet valve member 916, to prevent relieving fluids from contacting the membrane 932. After the pressure within the battery case is relieved to below the predetermined level, the one or more blocking disks 998 are moved away from the protective sealing surface 996.

Figure 59:
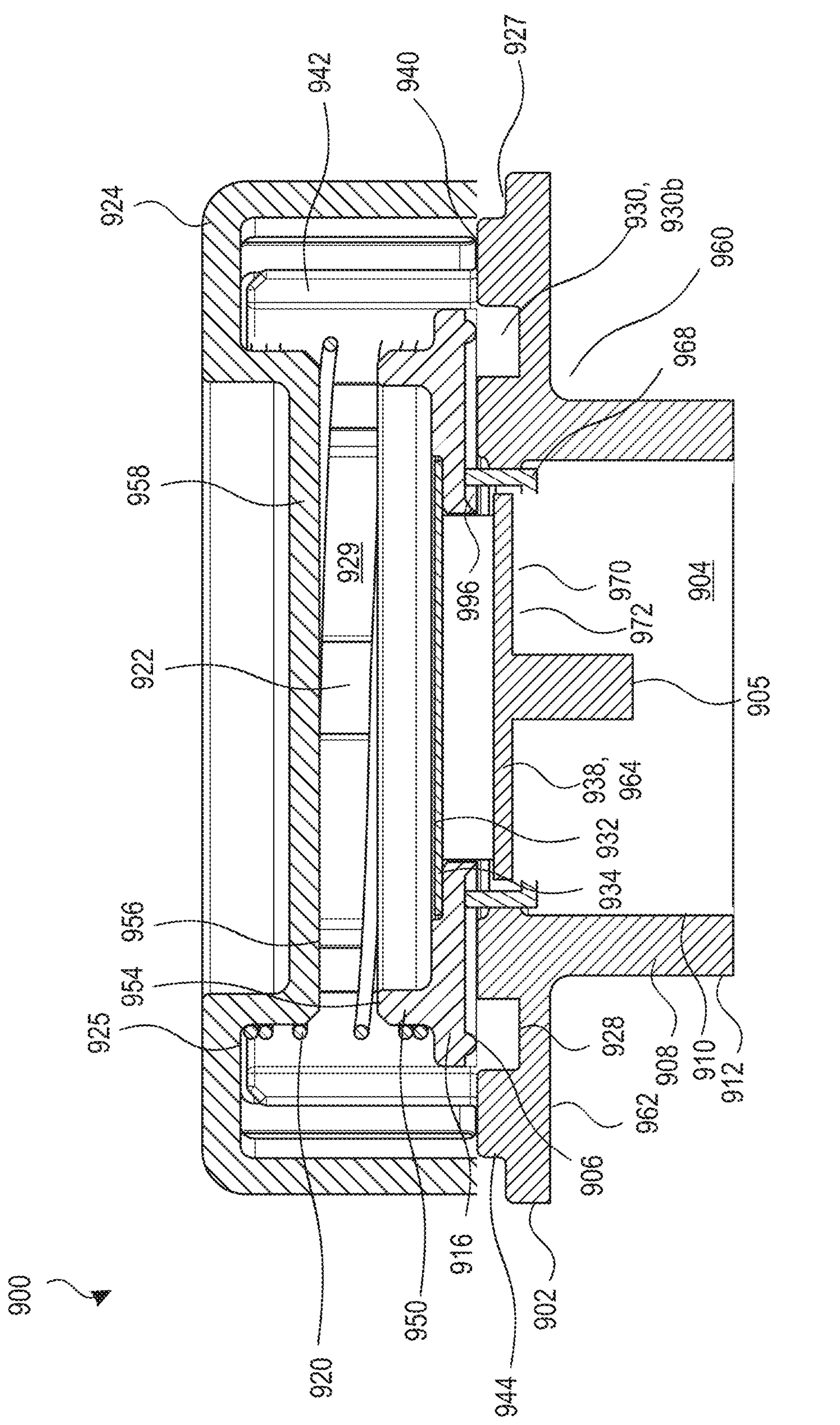
FIG. 59 illustrates a cross-sectional view of an alternative embodiment of the valve arrangement of FIG. 50, showing the valve arrangement in a closed position, including a tip-weighted membrane protective member disc, according to an example.

In some examples, as shown in FIG. 59, a flow-side surface 903 of disc 964 includes a tail 905. Tail 905 extends through a central cage opening 974 of cage 968 and adds a tip weight, which pulls disc 964 into the flow position. When in the flow position, the disc 964 rests on one or more support structures/members 970.

In some examples, during a pressure spike within the battery case, the disc 964 is pushed against the tip weight of the tail 905 by the mass of the relieving fluid flow, to contact a protective sealing surface 996 of the poppet valve member 916, to prevent relieving fluids from contacting the membrane 932. In some examples, the protective sealing surface 996 includes one or more bleed notches to dissipate pressure and allow for reopening of the disc 964.

After the pressure within the battery case is relieved to below the predetermined level, the disc 964 is moved away from the protective sealing surface 996 by the weight of tail 905.

Figure 60:
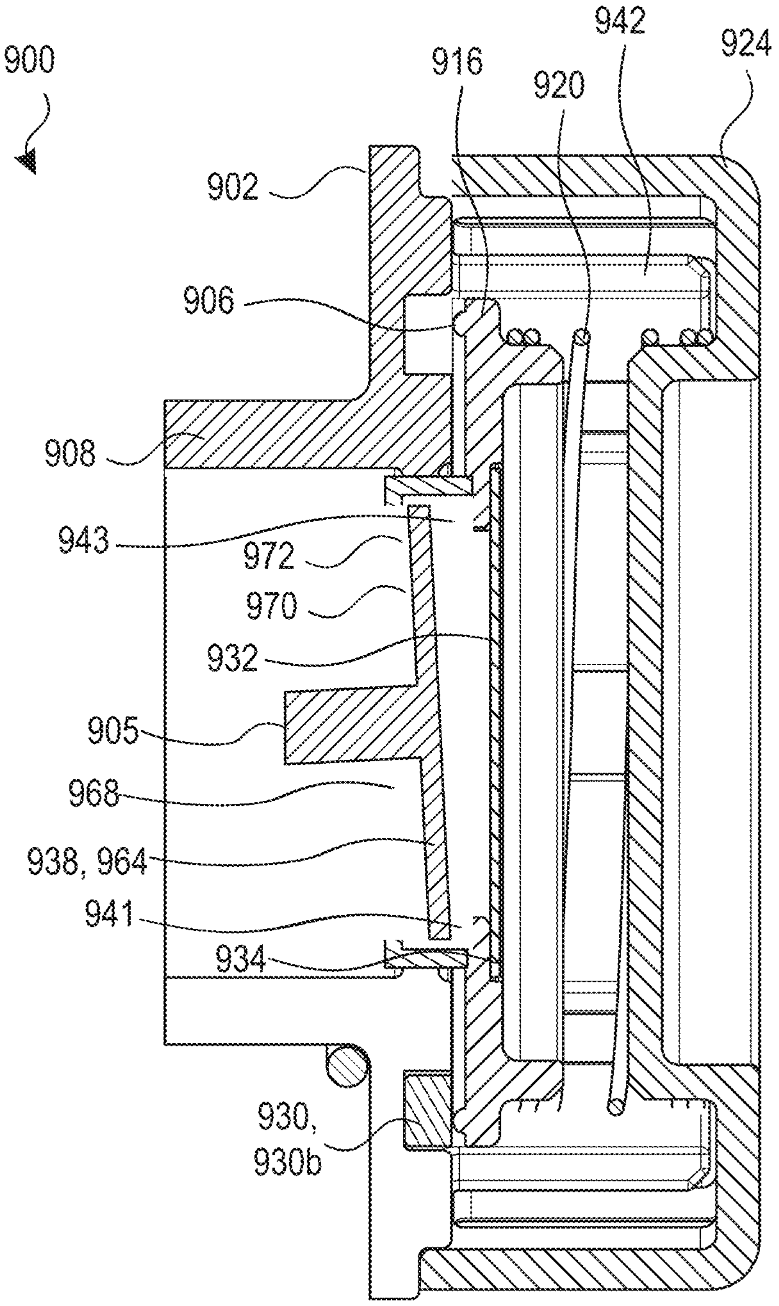
FIG. 60 illustrates a cross-sectional view of an alternative embodiment of the valve arrangement of FIG. 59, showing the valve arrangement in a vertical position, according to an example.

In some examples, as shown in FIG. 60, valve 900 is mounted in a vertical orientation, and tail 905 will cause disc 964 to seal at a first seal end 941 of the protective sealing surface 996, but to remain in the flow position and resting against the support surface(s) 970 at a second seal end 943 of the protective sealing surface 996. During a pressure spike within the battery case, disc 964 is moved so that the disc 964 contacts the entire perimeter of the protective sealing surface 996.

In accordance with principles of this disclosure, in an alternative example as shown in FIG. 61, valve 900 includes a membrane 932 which allows gas to move in and out of the battery case through the membrane 932. In some examples, valve body 902 includes one or more windows 921 beneath membrane 932 to allow for the passage of gas up through the valve body 902 and through membrane 932 along vent flow path FP15. In some examples, membrane 932 is supported by the cap-side surface 940 of valve body 902 (for example, the cap-side surface 940 of portions of valve body 902 located between windows 921). In some examples, the windows 921 are circumferentially spaced around the valve body 902. In the illustrated example, the windows 921 are evenly spaced around the valve body 902.

In some examples, during a pressure spike within the battery case, the membrane 932 is configured to burst or rupture when the pressure exceeds a predetermined pressure to allow relief fluid to flow. Once membrane 932 has ruptured/burst, relief fluid can flow from the battery case and pressure relief passage 904 through the windows 921, through the burst membrane 932, through slots 922, and finally through vents 926 and to exit into the environment surrounding the valve 900.

Figure 65:
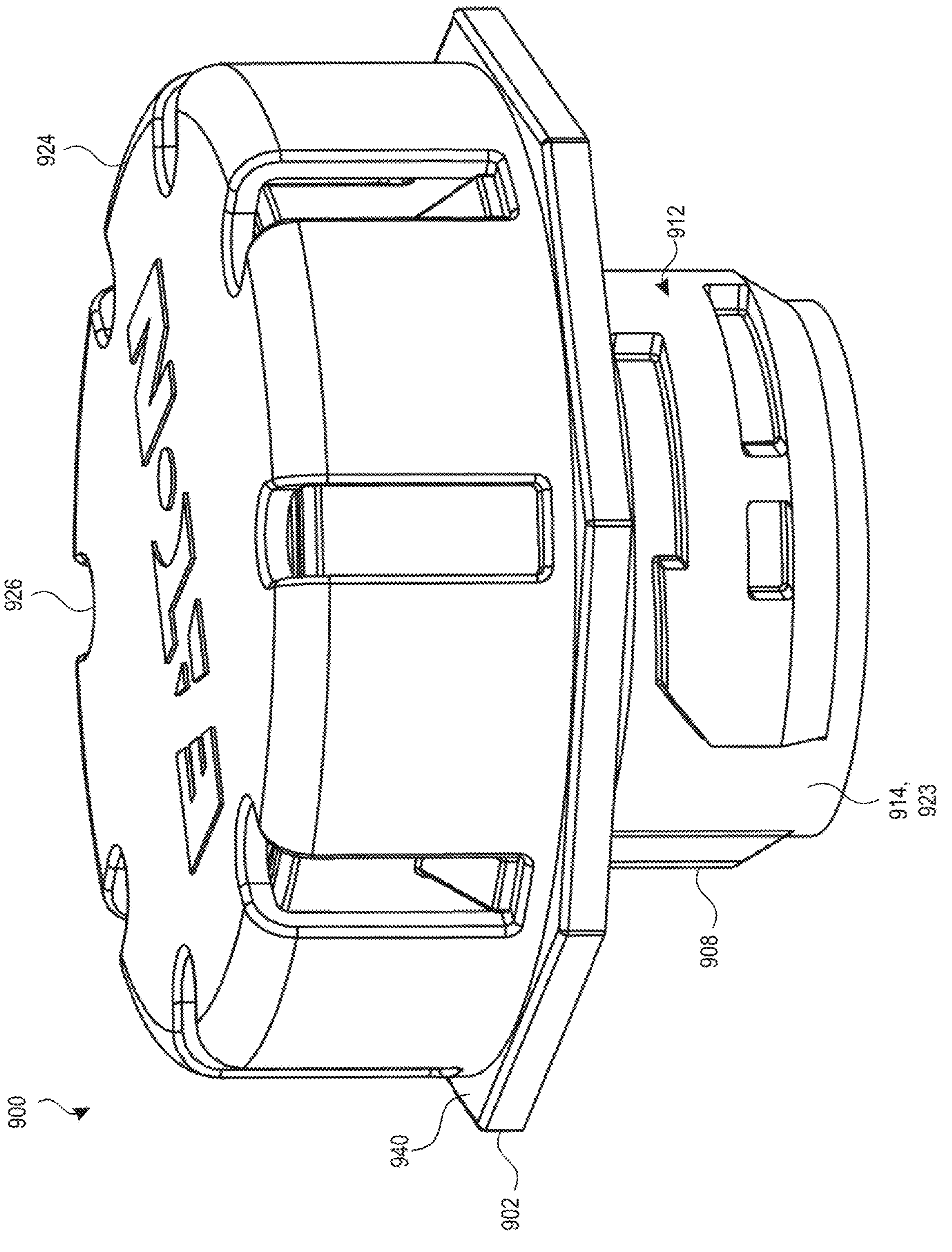
FIG. 65 illustrates a perspective view of an embodiment of a valve arrangement usable with a battery case, constructed in accordance with principles of this disclosure, according to an example.

In accordance with principles of this disclosure, an alternative embodiment of a valve 900 usable with an enclosure is provided in FIG. 65 to FIG. 82. In some examples, the valve is useful for relieving excess pressure within a battery case, and for allowing gasses to move (e.g., breathe) through the valve during normal operation of the battery. FIG. 65 illustrates a perspective view of an embodiment of a valve 900 arrangement usable with a battery case. In some examples, features and functions of the valve 900 and its parts as shown in FIGS. 65 to 82 may be similar to those described above relating to the valve 900 as shown in the previous figures, and vice versa.

Figure 66:
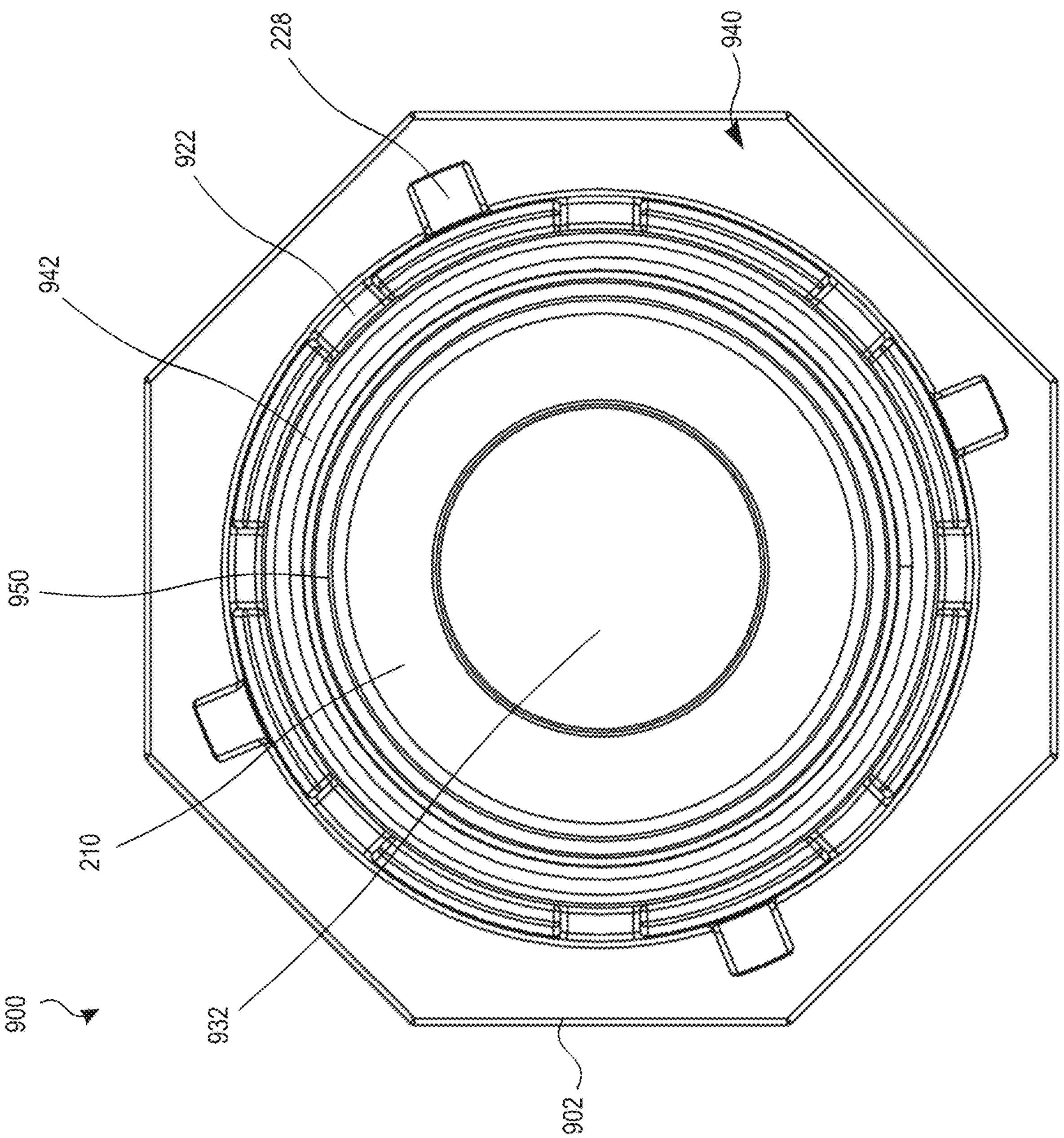
FIG. 66 illustrates top view of the valve arrangement of FIG. 65, with a cap removed, according to an example.
Figure 67:
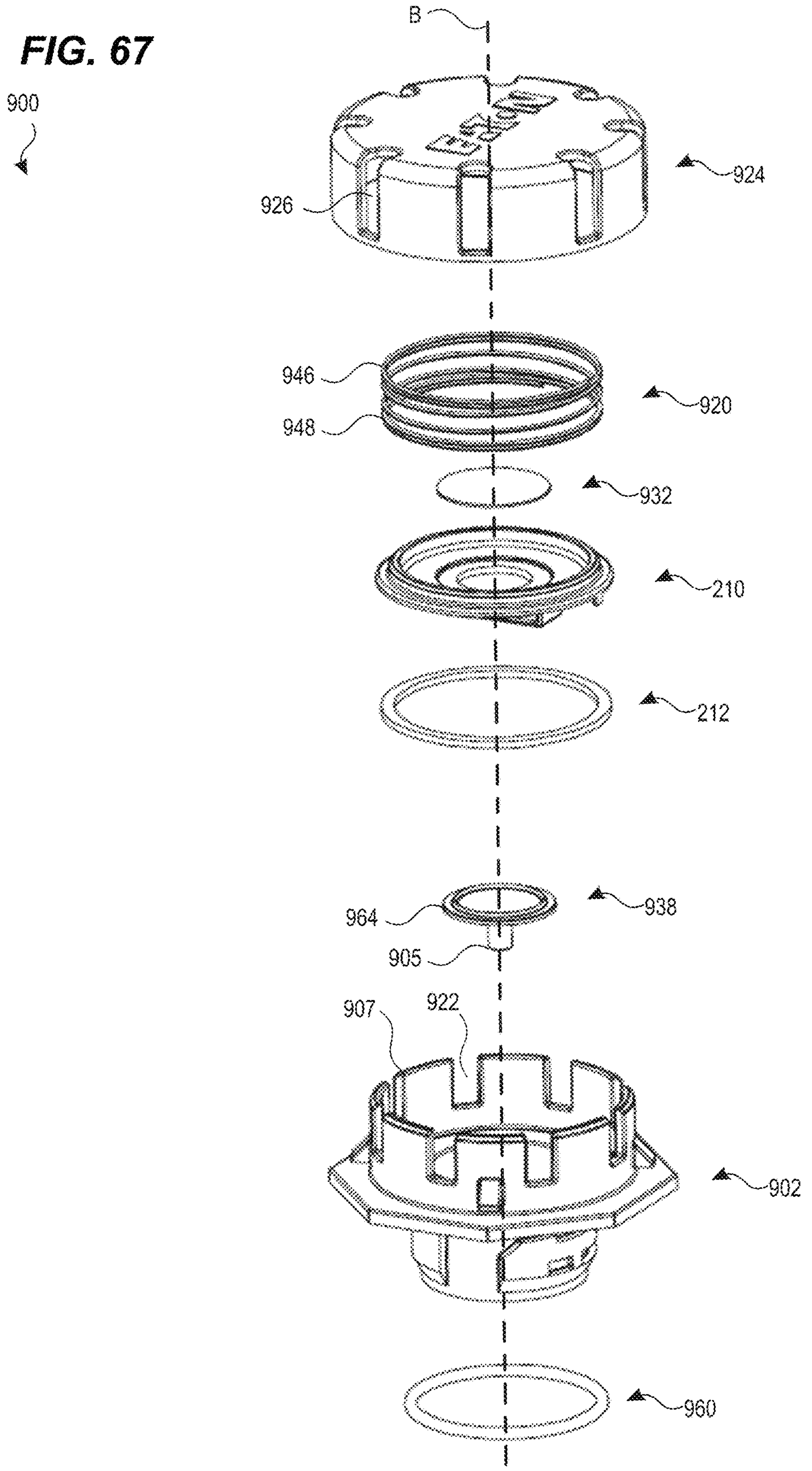
FIG. 67 illustrates a top perspective exploded view of the valve arrangement of FIG. 65, according to an example.
Figure 68:
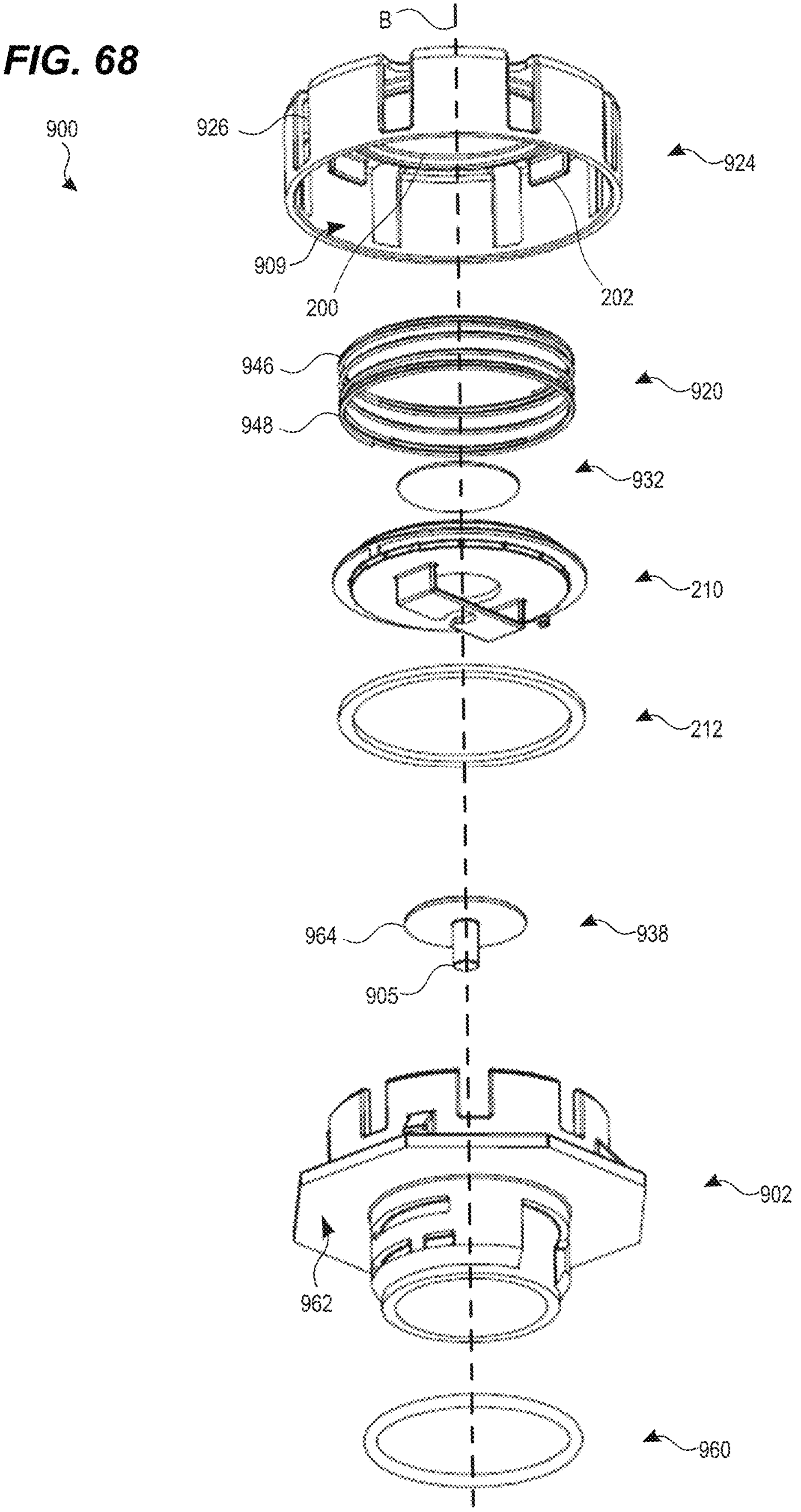
FIG. 68 illustrates a bottom perspective exploded view of the valve arrangement of FIG. 65, according to an example.
Figure 69:
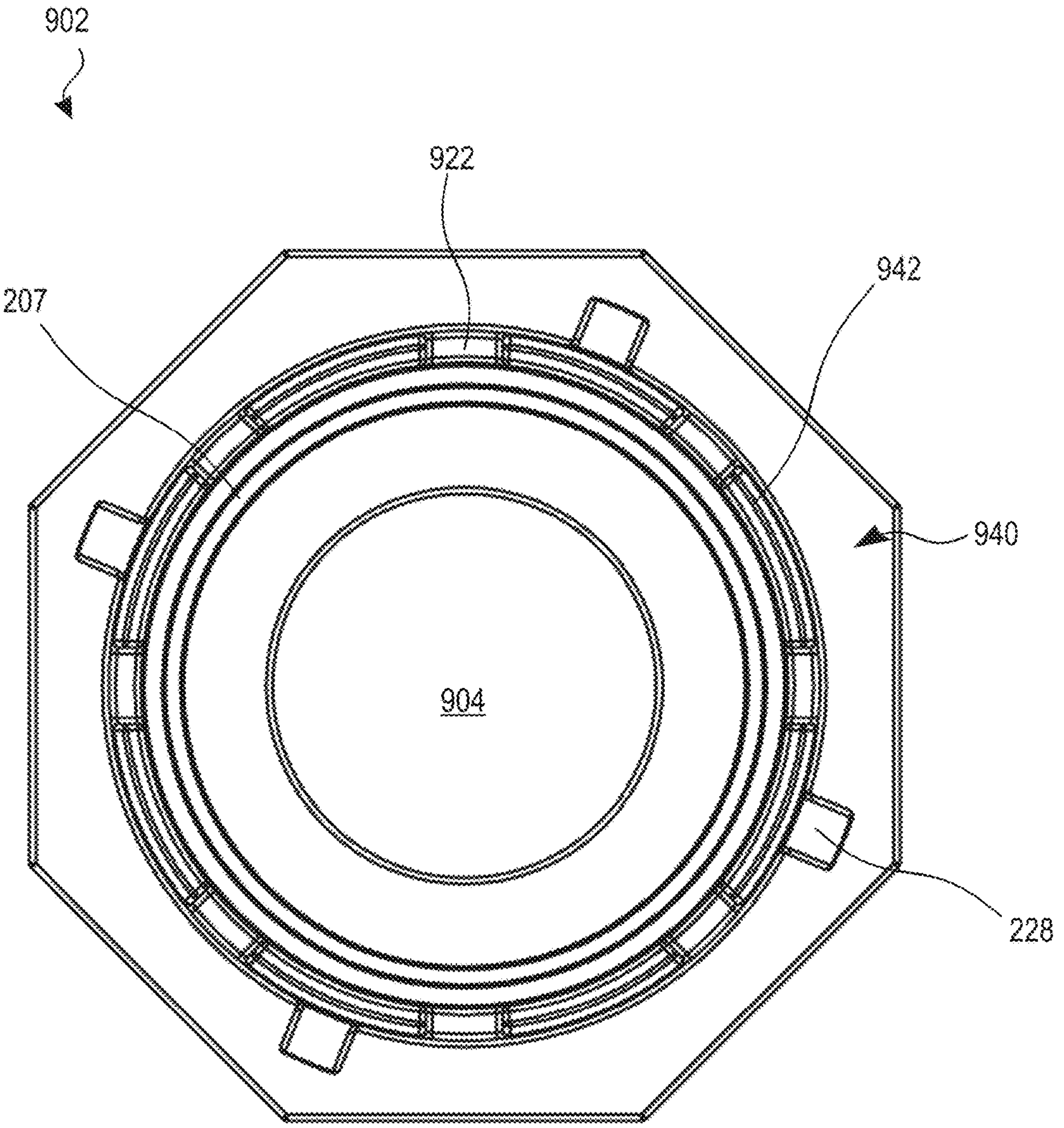
FIG. 69 illustrates a top view of a valve body of the valve arrangement of FIG. 65, according to an example.
Figure 70:
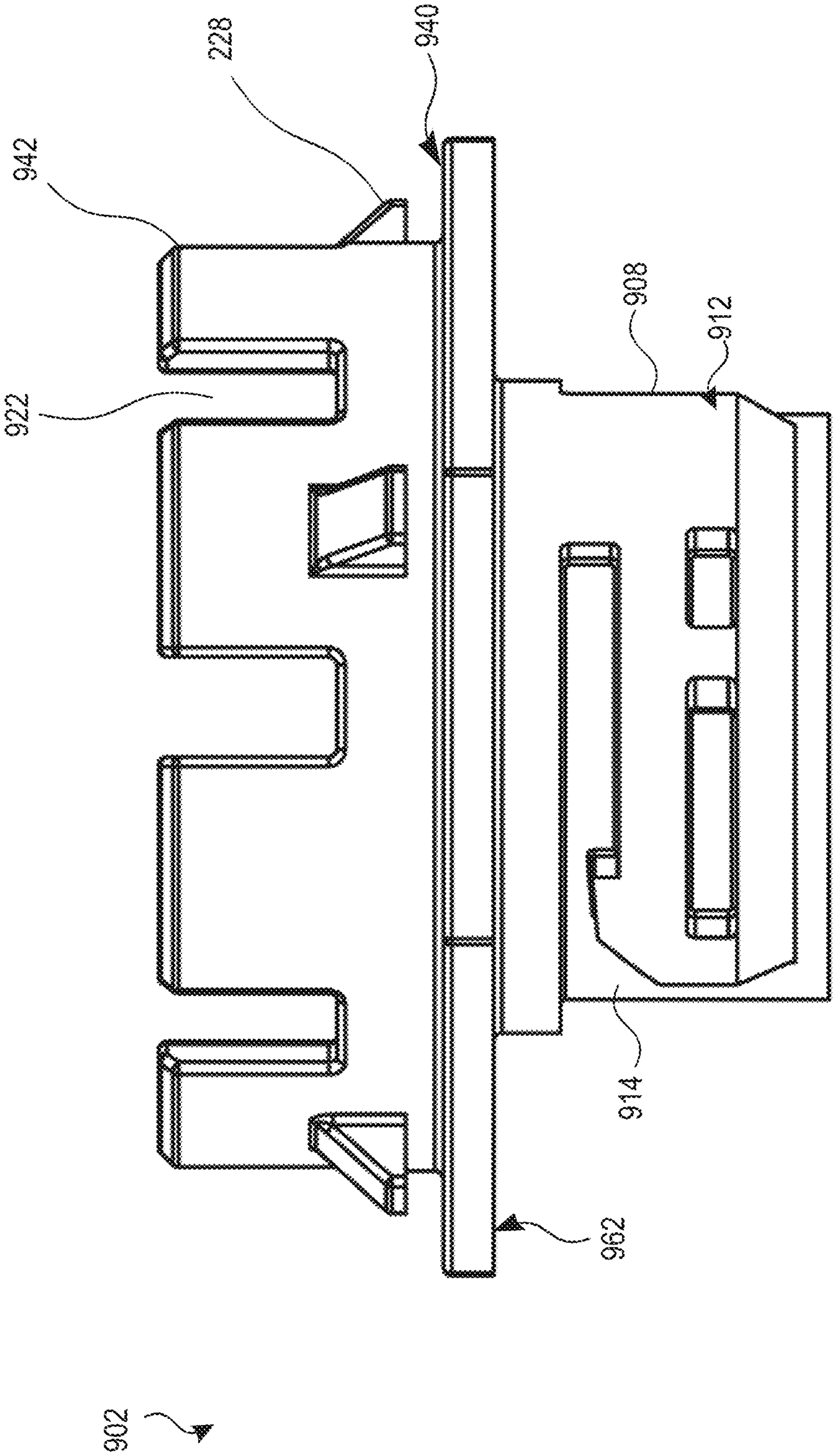
FIG. 70 illustrates a side view of a valve body of the valve arrangement of FIG. 65, according to an example.
Figure 71:
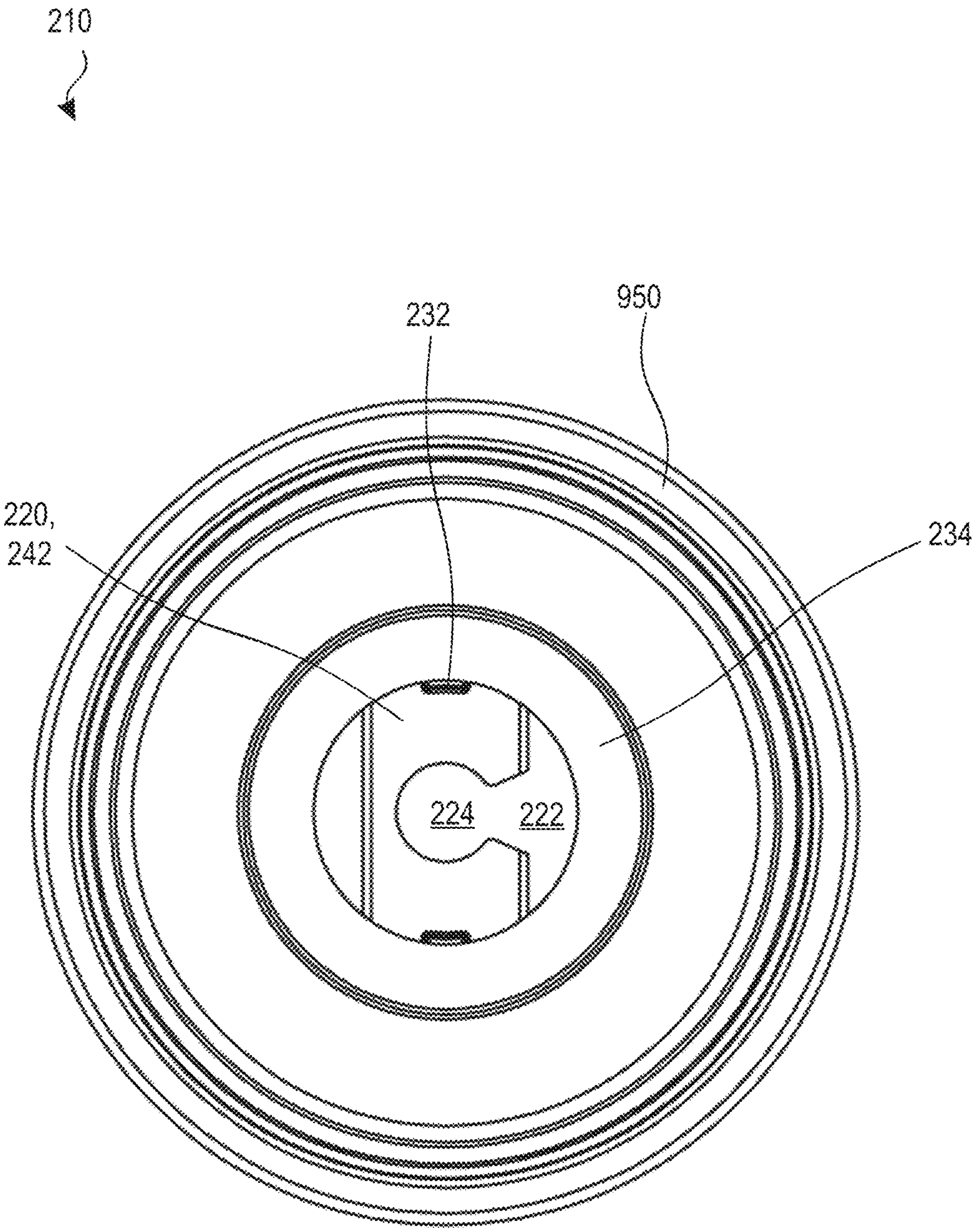
FIG. 71 illustrates a top view of a valve poppet member of the valve arrangement of FIG. 65, according to an example.
Figure 72:
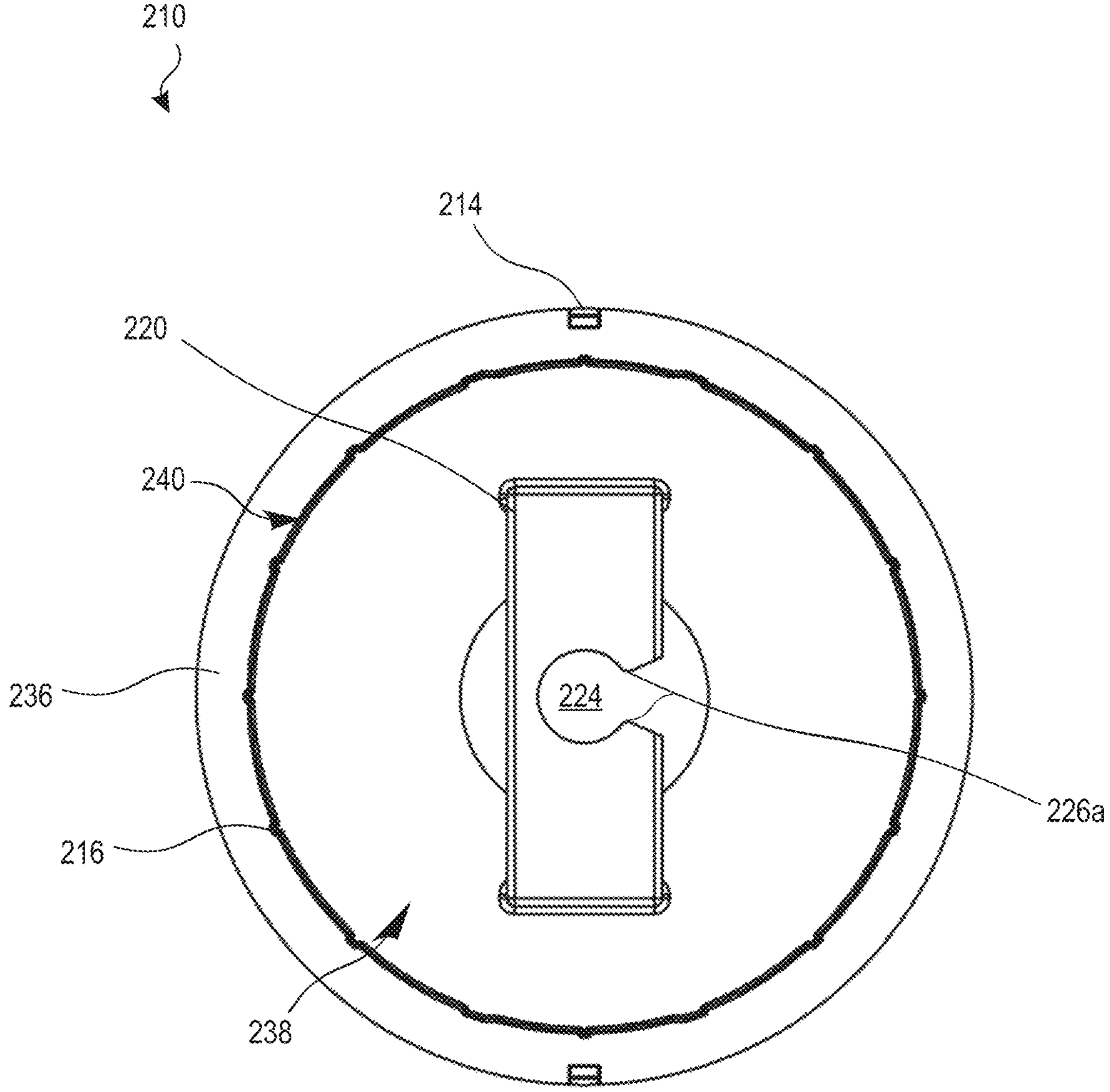
FIG. 72 illustrates a bottom view of a valve poppet member of the valve arrangement of FIG. 65, according to an example.
Figure 73:
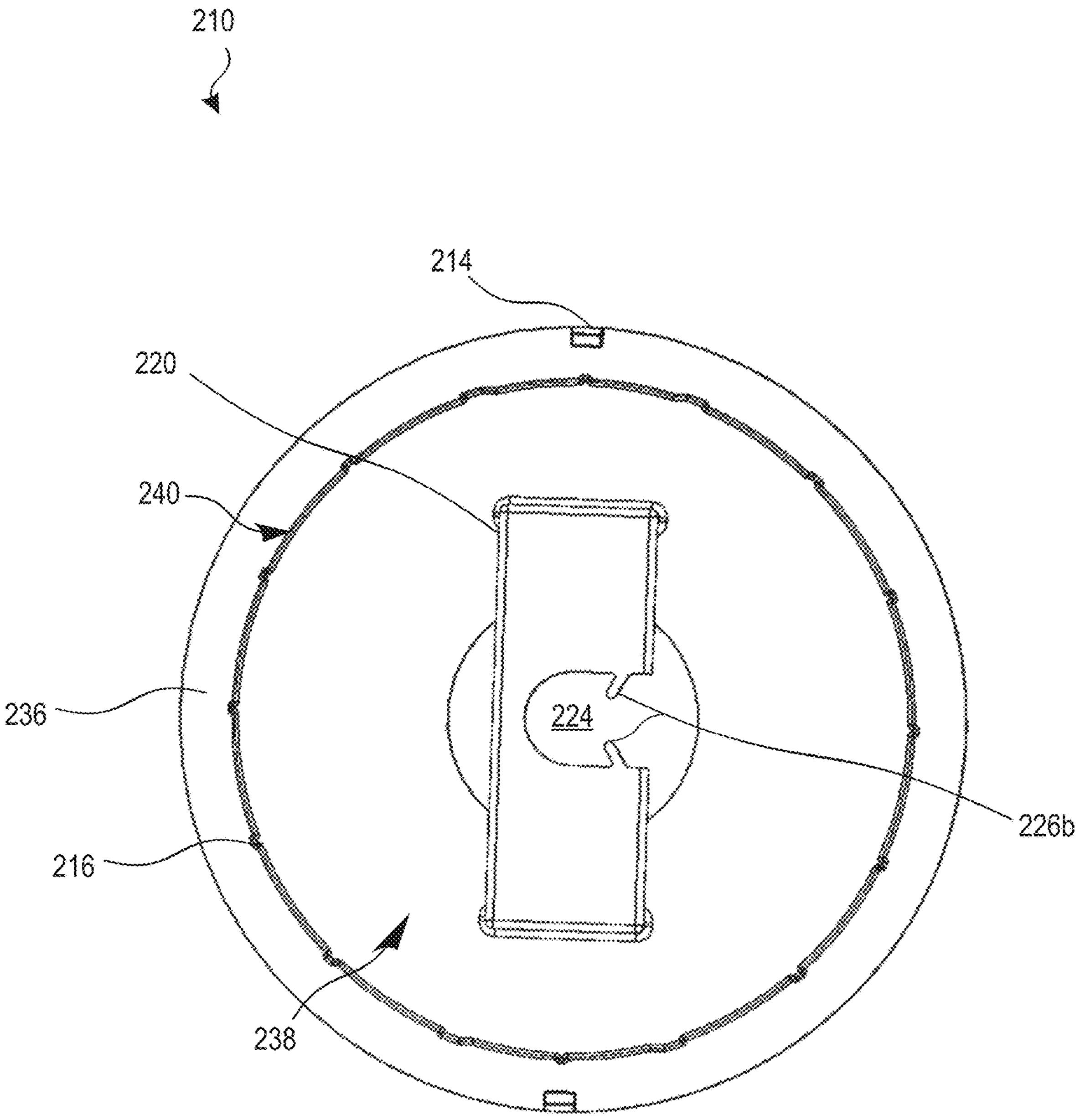
FIG. 73 illustrates another embodiment of a bottom view of a valve poppet member of the valve arrangement of FIG. 65, according to an example.

In reference now to FIGS. 65 and 66, the valve body 902 has a cap-side surface 940 which is substantially perpendicular to a valve axis B (described below), configured to contact a cap 924. Valve body 902 has a vertical ring 942 (FIG. 70) which is positioned concentric to an opening of pressure relief passage 904 (e.g., see FIG. 69). Vertical ring 942 is located between an outer edge of valve body 902 and a sealing bead 207 (described below). Vertical ring 942 extends upward from the cap-side surface 940 of valve body 902 and defines a cylindrical area within itself.

In some examples, vertical ring 942 includes a plurality of ribs 907 which extend to contact an inner face 909 of cap 924, to guide cap 924 to sit on the valve body 902 an equal distance from vertical ring 942 on all sides.

In accordance with principles of this disclosure, valve body 902 of valve 900 includes a valve seat 206 on which a poppet valve member 210 can rest when in a closed position. The valve seat 206 defines the sealing bead 207. The sealing bead 207 provides a surface against which a seal 212 of the poppet valve member 210 can rest when the poppet valve member 210 is in the closed position. In the example embodiment shown, the scaling bead 207 surrounds and is concentric with the pressure relief passage 904. The sealing bead 207 may be a bead formed as integrally molded with the valve body 902. In some examples, the sealing bead 207 may be separately molded and then fastened or otherwise connected to the valve body 902. In some examples, the sealing bead 207 may have a semicircular cross-section, raised above an inner surface of the valve body 902. In some examples, the scaling bead 207 may have a cross-section of a square, rectangular, or other shape, raised above the inner surface of the valve body 902.

In accordance with principles of this disclosure, valve body 902 is adapted for connection to a battery case. Exterior surface 912 of the surrounding wall 908 includes a fastening arrangement 914 adapted to connect or couple to the battery case. A variety of coupling arrangements can be used. In the example shown in the drawings, the fastening arrangement 914 includes a bayonet slot 923 in the exterior surface 912 of the surrounding wall 908. The bayonet slot 923 is shaped to receive a projection from the battery case to releasably and selectively connect the valve body 902 and battery case. In alternative arrangements, the bayonet slot 923 can be on the battery case, while the projection can be on the valve body 902. In other alternative arrangements, the valve body 902 can be connected to a battery case by screwing, popping, or other appropriate connectors or couplers.

In some examples, a connection seal member 960 (for example, an O-ring of round, rectangular, or square cross-section) is included at the upper portion of the surrounding wall 908, where surrounding wall 908 intersects with a case-side surface 962 of valve body 902, to provide a seal in the connection of valve-body 902 with the case. In the example shown, the seal member 960 circumscribes and is against the exterior surface 912 of the surrounding wall 908.

In accordance with principles of this disclosure, the poppet valve member 210 is moveable between a closed position (FIGS. 78 and 79) and an open position (FIG. 80) along a valve axis B relative to the valve body 902. The poppet valve member 210 is configured to seal against the sealing bead 207 to close the pressure relief passage 904 when in a closed position, preventing fluids (e.g., a liquid or gas) from exiting through the pressure relief passage 904.

Figure 74:
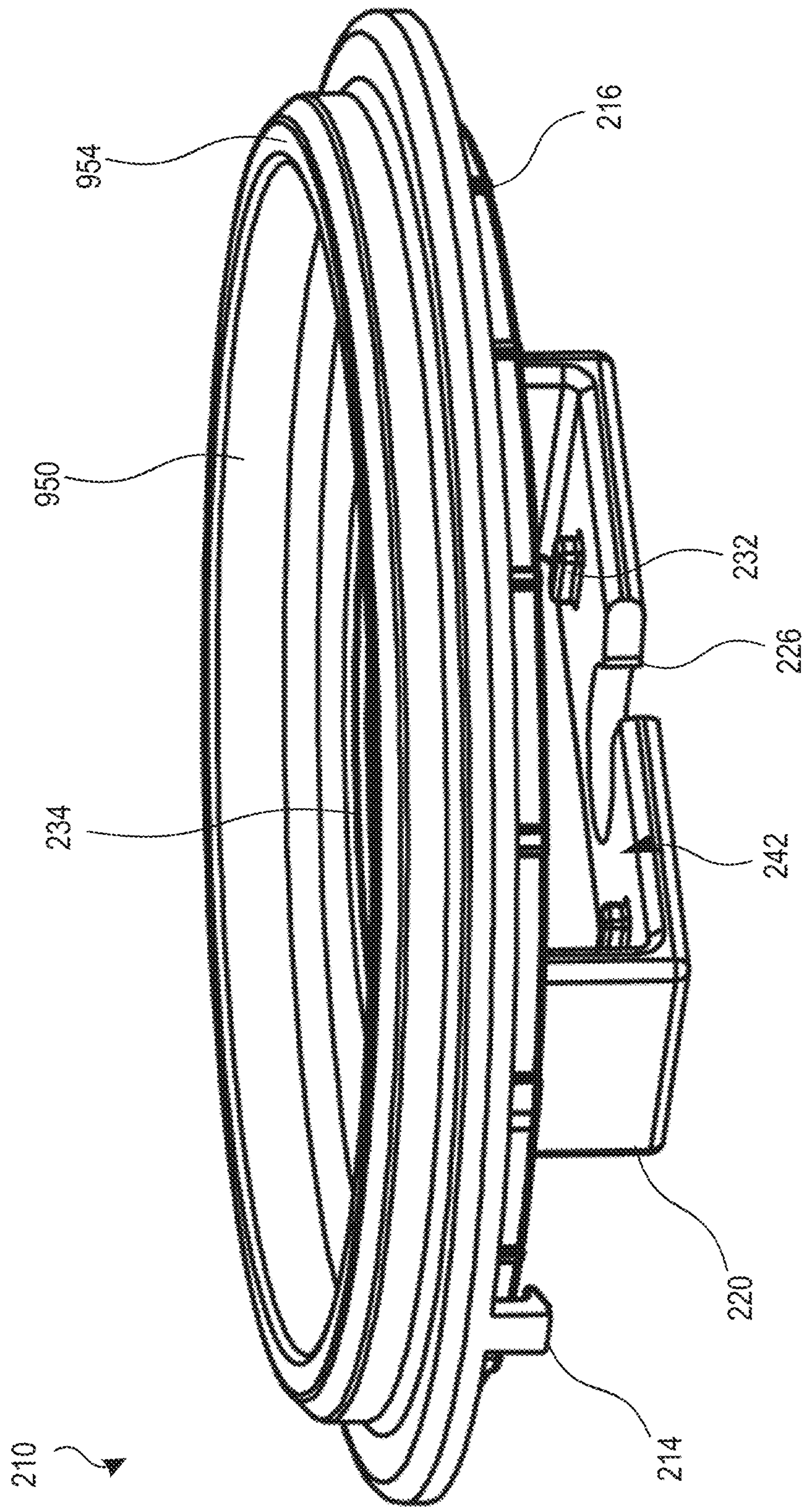
FIG. 74 illustrates a perspective view of a valve poppet member of the valve arrangement of FIG. 65, according to an example.
Figure 75:
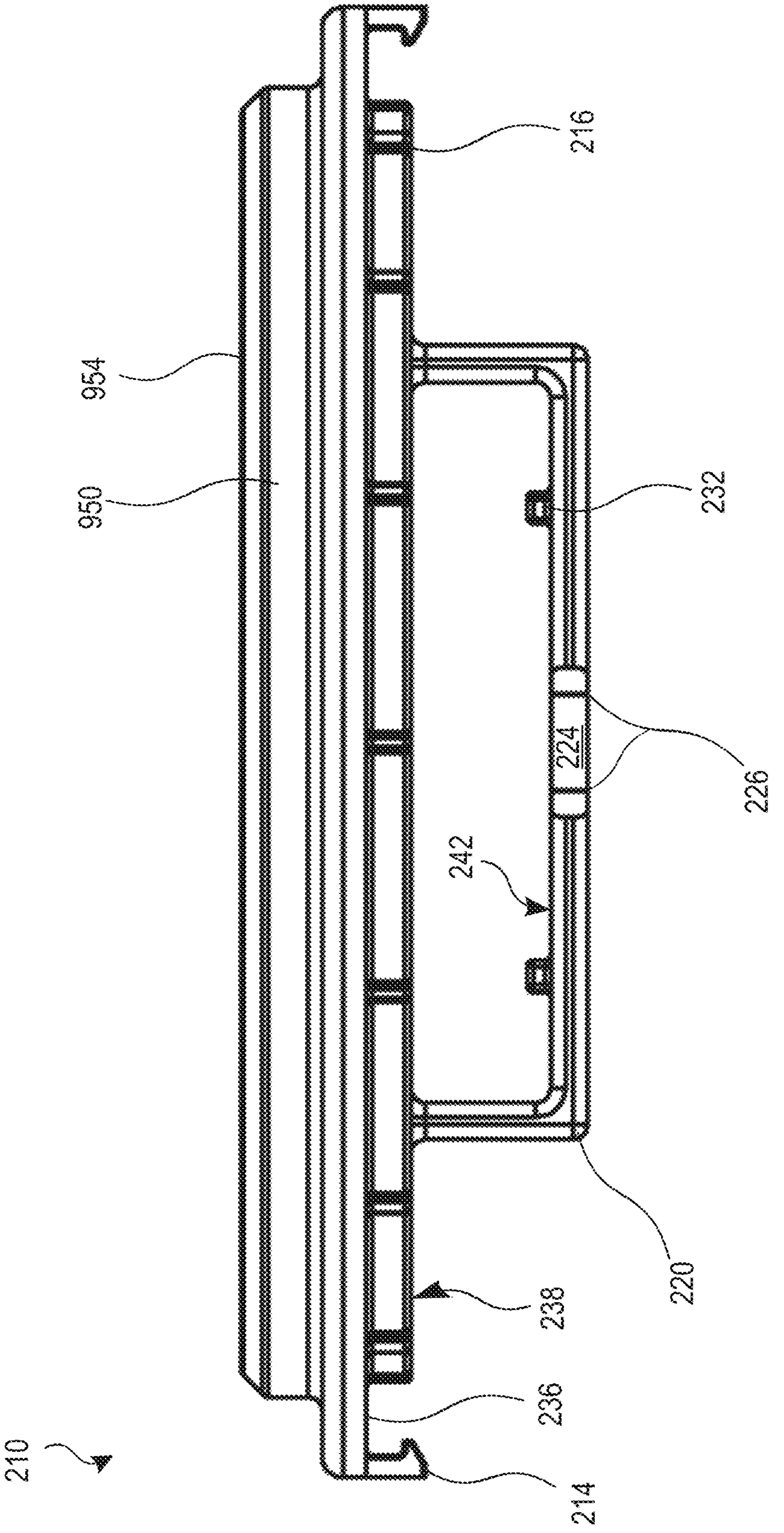
FIG. 75 illustrates a side view of a valve poppet member of the valve arrangement of FIG. 65, according to an example.
Figure 76:
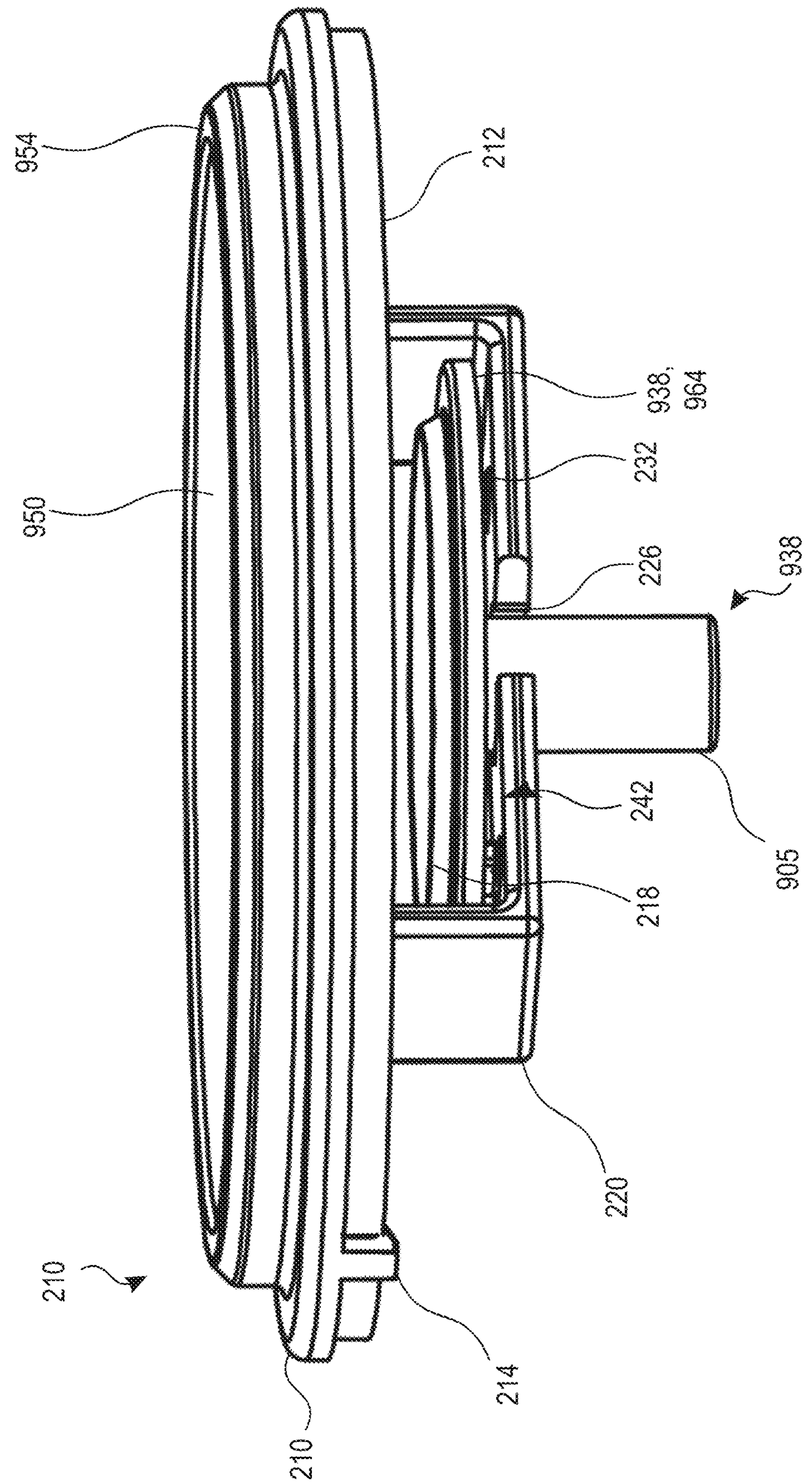
FIG. 76 illustrates a perspective view of a valve poppet member and membrane protective member sub-assembly of the valve arrangement of FIG. 65, according to an example.
Figure 77:
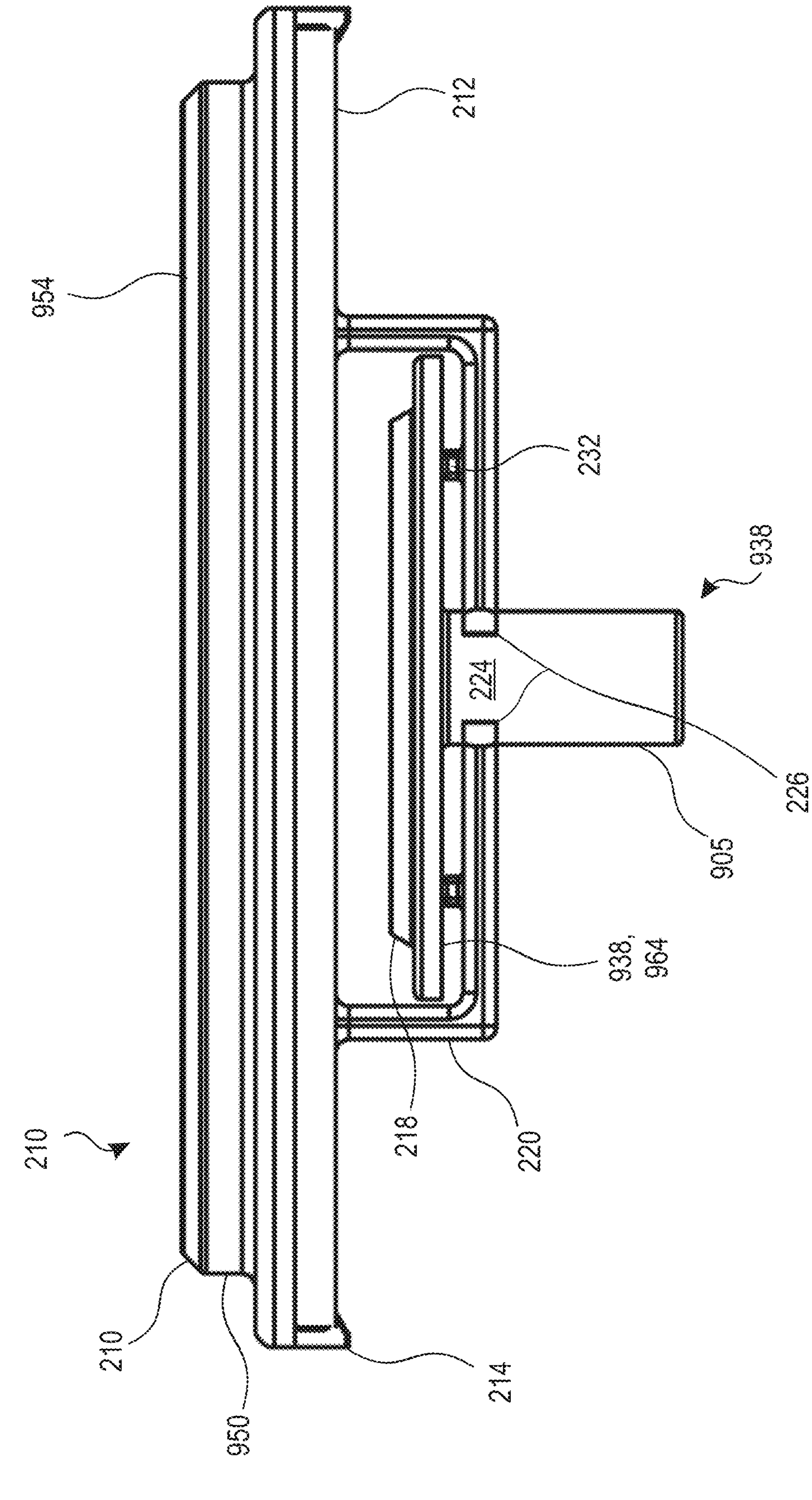
FIG. 77 illustrates a side view of a valve poppet member and membrane protective member sub-assembly of the valve arrangement of FIG. 65, according to an example.

In this example embodiment, poppet valve member 210 defines a seal member recess 236 which circumscribes the pressure relief passage 904 at the outer perimeter of the bottom surface 238 of poppet valve member 210 (see FIGS. 74, 75). A poppet seal member 212 is positioned in the seal member recess 236 (see FIGS. 76 and 77, for example). In some examples, the poppet seal member 212 includes an O-ring. In some examples, the poppet seal member 212 (for example, the O-ring) has a round, square, or rectangular cross-sectional shape. Other shapes are possible.

In some examples, the poppet seal member 212 is held in place in the seal member recess 236 by one or more tabs 214 of poppet valve member 210. In some examples, poppet valve member 210 includes a plurality of engaging ribs 216 (that protrude from a side edge 240 of the valve member 210) that contact the inner perimeter of the poppet seal member 212. The engaging ribs 216 enhance friction between the poppet valve member 210 and the poppet seal member 212 to enhance retention of the poppet seal member 212.

Figure 78:
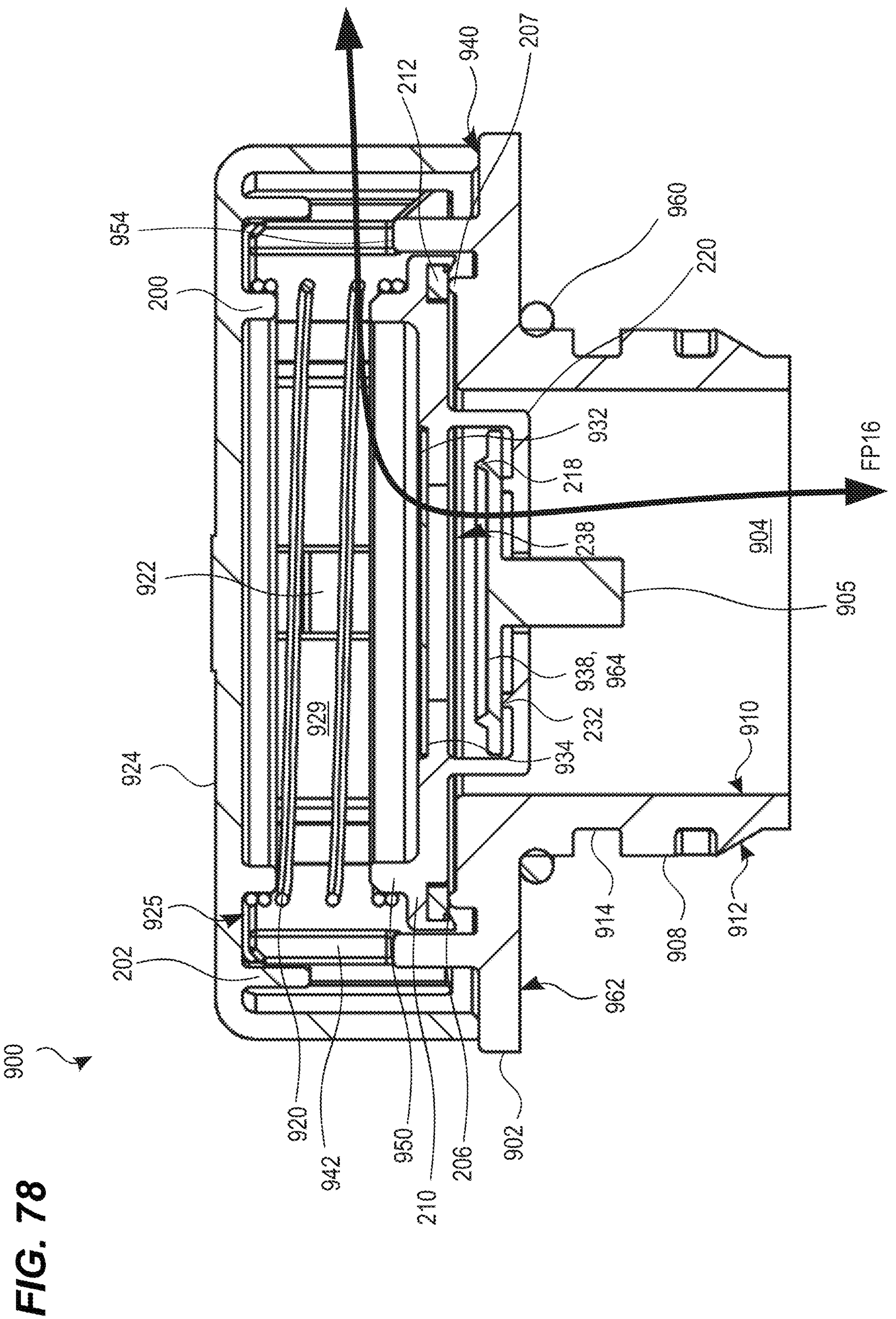
FIG. 78 illustrates a cross-sectional view of the valve arrangement of FIG. 65, showing the valve arrangement in a closed, breathing position, according to an example.

The poppet seal member 212 (at an exposed surface of the poppet seal member 212) engages the molded sealing bead 207 when the poppet valve member 210 is in the closed position (e.g., see FIG. 78). When the poppet valve member 210 is in the open position (not sealed against the valve seat 206), pressure within the battery case can be relieved, as relief fluid can flow along relief flow path FP17 (see FIG. 80) through the pressure relief passage 904. In some examples, the relief fluid is typically gas, such as air, but in some applications, it may be in other forms such as a liquid, two-phase flow, or other flowable material.

In accordance with principles of this disclosure, valve 900 includes a biasing element 920 which biases poppet valve member 210 toward the closed position. In some examples, biasing element 920 is a spring. Biasing element 920 is located inside of the vertical ring 942, so that a first biasing element end 946 is substantially at the same height as the height of vertical ring 942 and so that a second biasing element end 948 contacts poppet valve member 210. Poppet valve member 210 is configured to move from the closed position to the open position against the bias of biasing element 920 when a pressure in the battery case exceeds a predetermined level (a set pressure). The first biasing element end 946 of biasing element 920 engages against an inner surface 925 of cap 924. The second biasing element end 948 of biasing element 920 engages against a poppet valve member 210. In the example shown, the biasing element 920 extends around a perimeter of a guide wall ring 950 of the poppet valve member 210.

In the example embodiment shown, the valve body 902 includes openings, such as the illustrated slots 922 in vertical ring 942. The slots 922 can include, for example, vertical or horizontal vents, holes, or channels for relief fluids to pass through when the poppet valve member 210 is in the open position. In some examples, the slots 922 are circumferentially spaced around the vertical ring 942. In the illustrated example, the slots 922 are evenly spaced around the vertical ring 942.

In accordance with principles of this disclosure, valve 900 includes cap 924, which is adapted for connection to the valve body 902. Cap 924 surrounds, encloses, or partially encloses the valve body 902. Cap 924 includes one or more vents 926. The vents 926 can include, for example, vertical or horizontal vents, holes, windows, or channels configured to allow for relief fluids to pass through when the poppet valve member 210 is in the open position. In some examples, the vents 926 are circumferentially spaced around cap 924. In the illustrated example, vents 926 are evenly spaced around the cap 924.

Cap 924 is positioned to contact the cap-side surface 940 of valve body 902 at or near an outer circumference of the cap-side surface 940. Cap 924 is configured to be of a height to extend over the top of vertical ring 942. In some examples, cap 924 includes a cap guide arrangement 202 that is positioned to help align cap 924 on the valve body 902. In some examples, the cap guide arrangement 202 includes a continuous ring. In other examples, the cap guide arrangement includes circumferentially spaced tabs extending downwardly. In certain examples, the ribs 907 of the valve body ring 942 extend between the tabs 202 and the outer peripheral wall of the cap 924 (e.g., see FIG. 78). In some examples, cap 924 includes a biasing member guide ring 200 that is positioned to assist in maintaining the position of a first biasing element end 946 of biasing element 920. In certain examples, the biasing member guide ring 200 is disposed within the cap guide arrangement 202. In some examples, cap guide arrangement 202 and/or biasing member guide ring 200 are circular and are centered on valve axis 918.

In accordance with principles of this disclosure, poppet valve member 210 of valve 900 includes a guide wall 950. Guide wall ring 950 extends upwards from the poppet valve member 210 and is positioned concentric to the outer circumference of the poppet valve member 210. Guide wall ring 950 is positioned to assist in maintaining the position of a second biasing element end 948 of biasing element 920. In some examples, guide wall ring 950 includes cap-facing edge 954, which faces the cap 924 and sits at a plane substantially perpendicular to valve axis B. In some examples, when the poppet valve member 210 is in the open position and biasing element 920 is compressed, the cap-facing edge 954 of the poppet valve member 916 will contact the biasing member guide ring 200 of cap 924 (e.g., see FIG. 80).

In accordance with principles of this disclosure, valve 900 includes a membrane 932 which allows gas to move in and out of the battery case through the membrane 932 along a vent flow path FP16 when the poppet valve member 210 is in the closed position (see FIG. 78). Preferably, the membrane 932 is carried with the poppet valve member 210. The poppet valve member 210 is configured to support the membrane 932 around at least a perimeter 934 of the membrane 932. The membrane 932 sits within a membrane recess 234 in poppet valve member 210. The poppet valve member 210 includes one or more openings 222 in it beneath membrane 932 to allow for the passage of gas up through the poppet valve member 210 and through membrane 932 while poppet valve member 210 is in the closed position. In some examples, there is a single opening 222 in the center of poppet valve member 210.

In accordance with principles of this disclosure, valve 900 includes a membrane protective member 938 which is configured to prevent/block fluid communication/contact between the membrane 932 and relieving fluid from the battery case during a pressure spike within the battery case (for example, when relief fluid has entered pressure relief passage 904). Membrane protective member 938 is also configured to allow passage of the gas moving in and out of the battery case through the membrane 932 when the poppet valve member 210 is in the closed position. In some examples, the membrane protective member 938 includes a disc 964 with a tail 905. The disc 964 is configured to prevent liquid from contacting a case-facing surface of membrane 932.

In some examples, the poppet valve member 210 includes a cage 220, that, within the area of pressure relief passage 904, extends below the poppet valve member 210 to support the (disc 964 portion of) membrane protective member 938. In certain implementations, the cage 968 supports the membrane protective member 938 and limits travel of the membrane protection member 938 away from the membrane 932. In certain examples, the cage 968 supports the membrane protective member 938 around at least a part of the perimeter of the disc 964.

In some examples, the membrane protective member 938 is supported by a plurality of spacers 232 on an upper surface 242 of cage 220. In some examples, cage 220 includes a cage opening 224 through which the tail of the membrane protective member 938 may be inserted. In certain examples, the cage opening 224 includes one or more side openings and catch features 226 that allow for insertion/installation of the membrane protective member 938 (e.g., see FIGS. 72 and 73). In some examples, cage opening 224 may be substantially circular, although other shapes (including square, rectangular, or other shapes) may be contemplated. In some examples, cage opening 224 may include a cut-out or open space through the cage 220, so that the tail 905 may be inserted (sideways) into the cage opening 224 (e.g., see FIG. 71). In certain implementations, the tail 905 is inserted through the cut-out past one or more catch features 226 into the cage opening 224. After installation, membrane protective member 938 is held in place by the catch features 226. In certain examples, the catch features 226 are configured to allow tail 905 to be easily slid into cage opening 224 and configured to retain tail 905 within cage opening 224 once installed. Once retained, the membrane protective member 938 is free to move upwards and downwards along axis B. In some examples, catch features 226*a* may be configured so that the overall cage opening 224 resembles a keyhole shape, as triangular projections with sloped sides. In an alternative example, catch features 226*b* may be configured as tabs which slope toward the center of cage opening 224.

Figure 79:
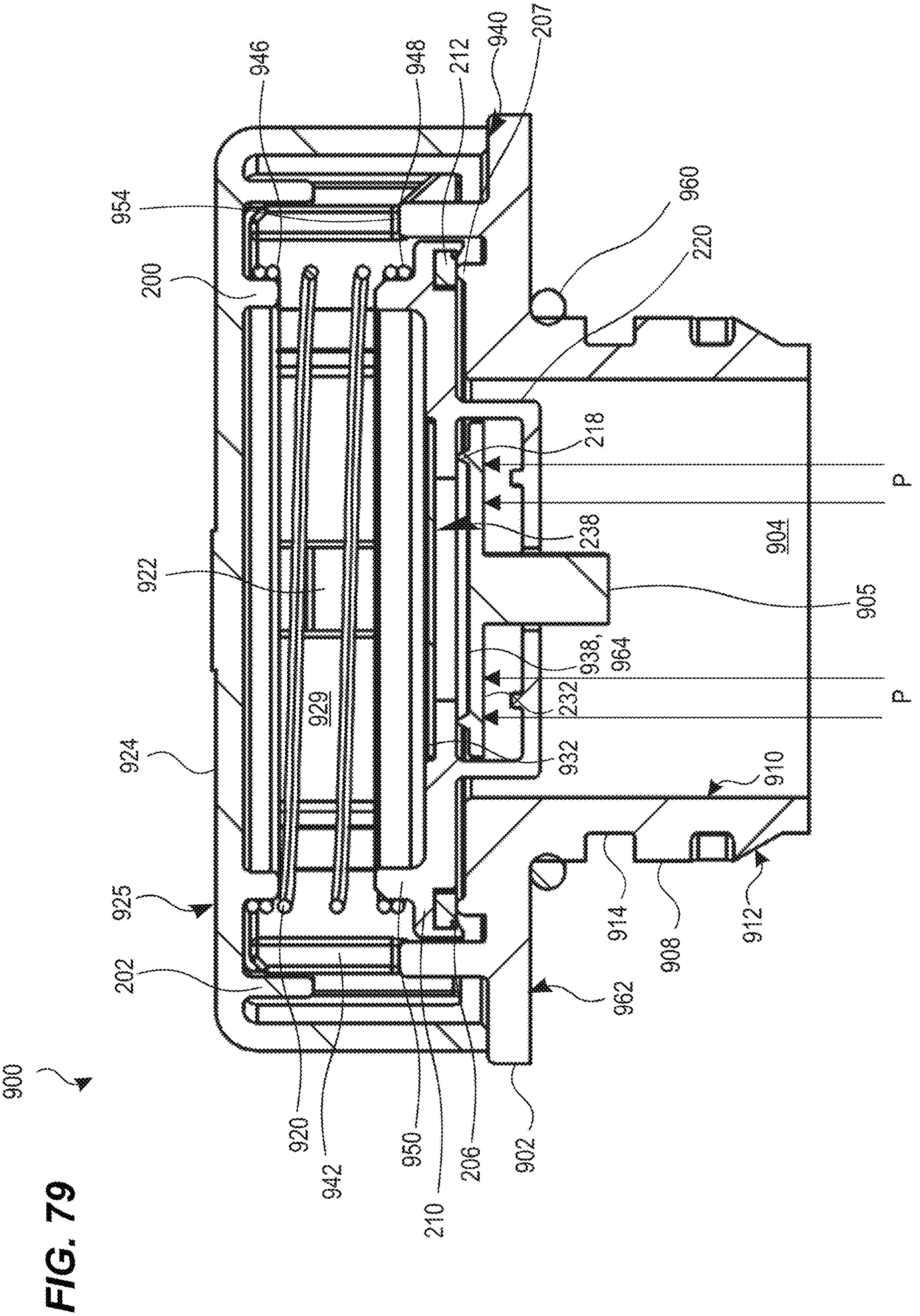
FIG. 79 illustrates a cross-sectional view of the valve arrangement of FIG. 65, showing the valve arrangement in a closed, membrane-sealed position, according to an example.
Figure 80:
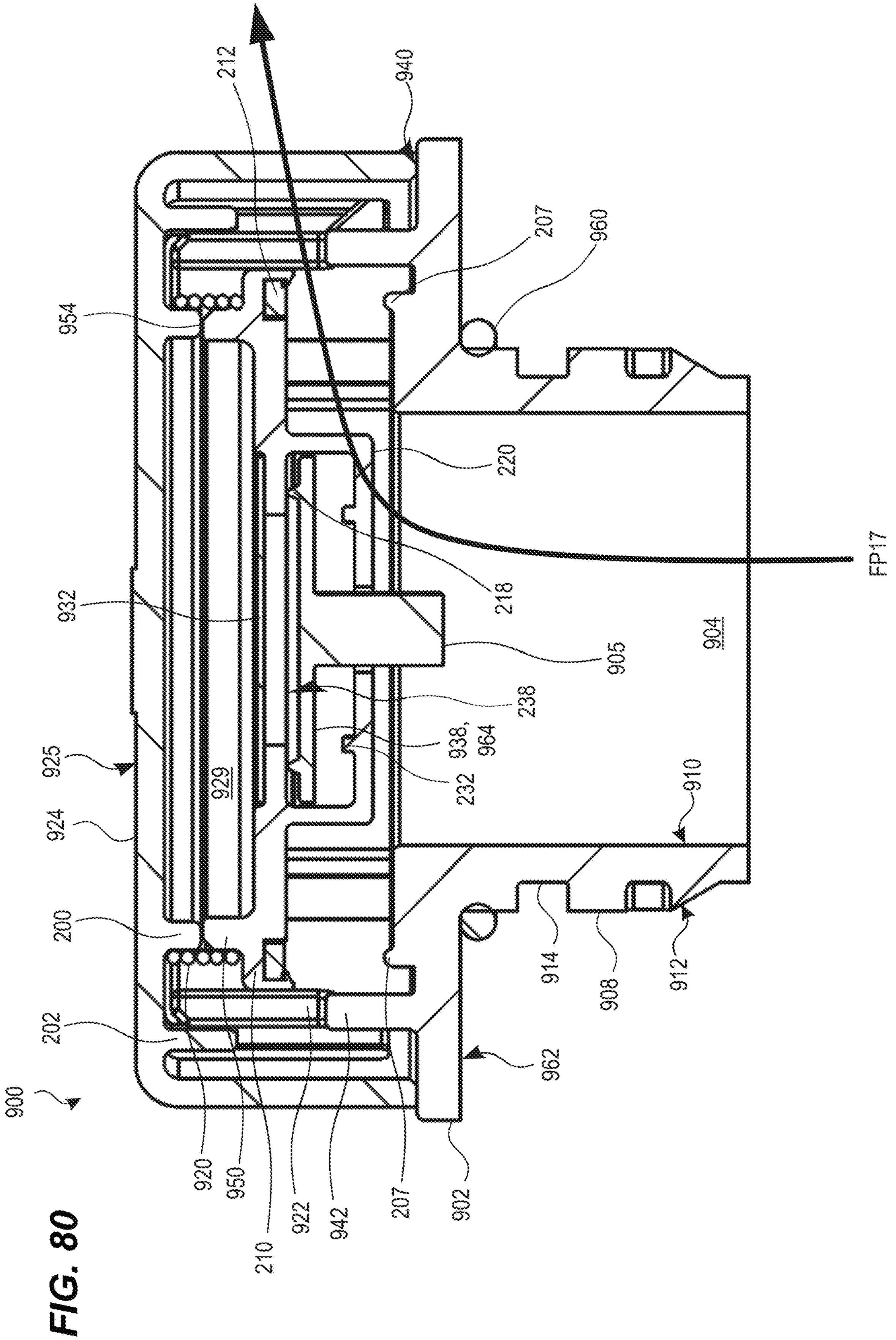
FIG. 80 illustrates a cross-sectional view of the valve arrangement of FIG. 65, showing the valve arrangement in an open position, according to an example.

In some examples, during a pressure spike within the battery case, the membrane protective member 938 is pushed (upward) by the mass of the relieving fluid flow (pressure P) so that a sealing seat 218 of the membrane protective member 938 contacts a sealing surface of the poppet valve member 210 (e.g., see FIGS. 79 and 80). Fluid may flow along relief flow path FP17. In some examples, sealing seat 218 is circular and coaxial with axis B. The contact acts to prevent relieving fluids from contacting the membrane 932. After the pressure within the battery case is relieved to below the predetermined level, the membrane protective member 938 moves away from the sealing seat 218 (e.g., via gravity).

It will be understood that while the membrane protective member 938 is shown above in the context of a two-stage valve arrangement having venting and pressure relief functionality, the membrane protective member 938 could also be used with a three-stage valve arrangement that also included leak check functionality.

Figure 81:
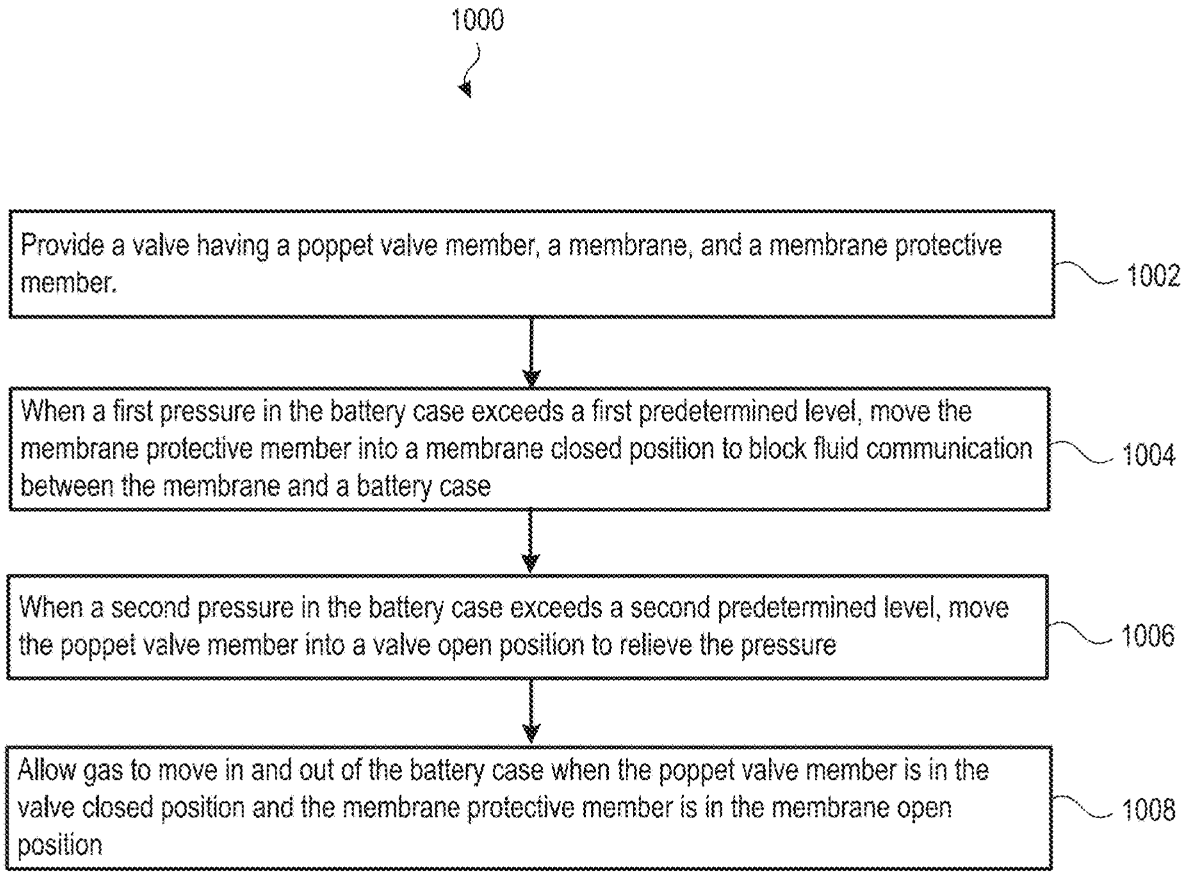
FIG. 81 illustrates a method for managing pressure in a battery case, according to an example.

In accordance with principles of this disclosure, FIG. 81 illustrates an example method 1000 for managing pressure in a battery case. The method 1000 may be performed by one or more of the valve arrangements shown and described herein.

At step 1002, a method for managing pressure in a battery case includes providing a valve having a poppet valve member moveable between a valve closed position and a valve open position wherein the poppet valve member is biased toward the valve closed position, a membrane, and a membrane protective member moveable between a membrane closed position and a membrane open position.

At step 1004, when a first pressure in the battery case exceeds a first predetermined level, the membrane protective member may be moved (for example, pushed by pressure P) into the membrane closed position, thereby blocking fluid communication between the membrane and the battery case.

At step 1006, when a second pressure in the battery case exceeds a second predetermined level, the poppet valve member is moved against the bias to move into the valve open position and relieving the pressure (for example, fluid may exit through flow path 17 FP17).

After the pressure has subsided to below a third predetermined level, the bias pushes the poppet valve member back to its original closed position. At step 1008, when the valve is in the closed position and the membrane protective member is in the membrane open position, gas is allowed to move in and out (e.g., breathe) of the battery case (for example, along flow path 16 FP16). The membrane may be carried with the poppet valve member.

Figure 82:
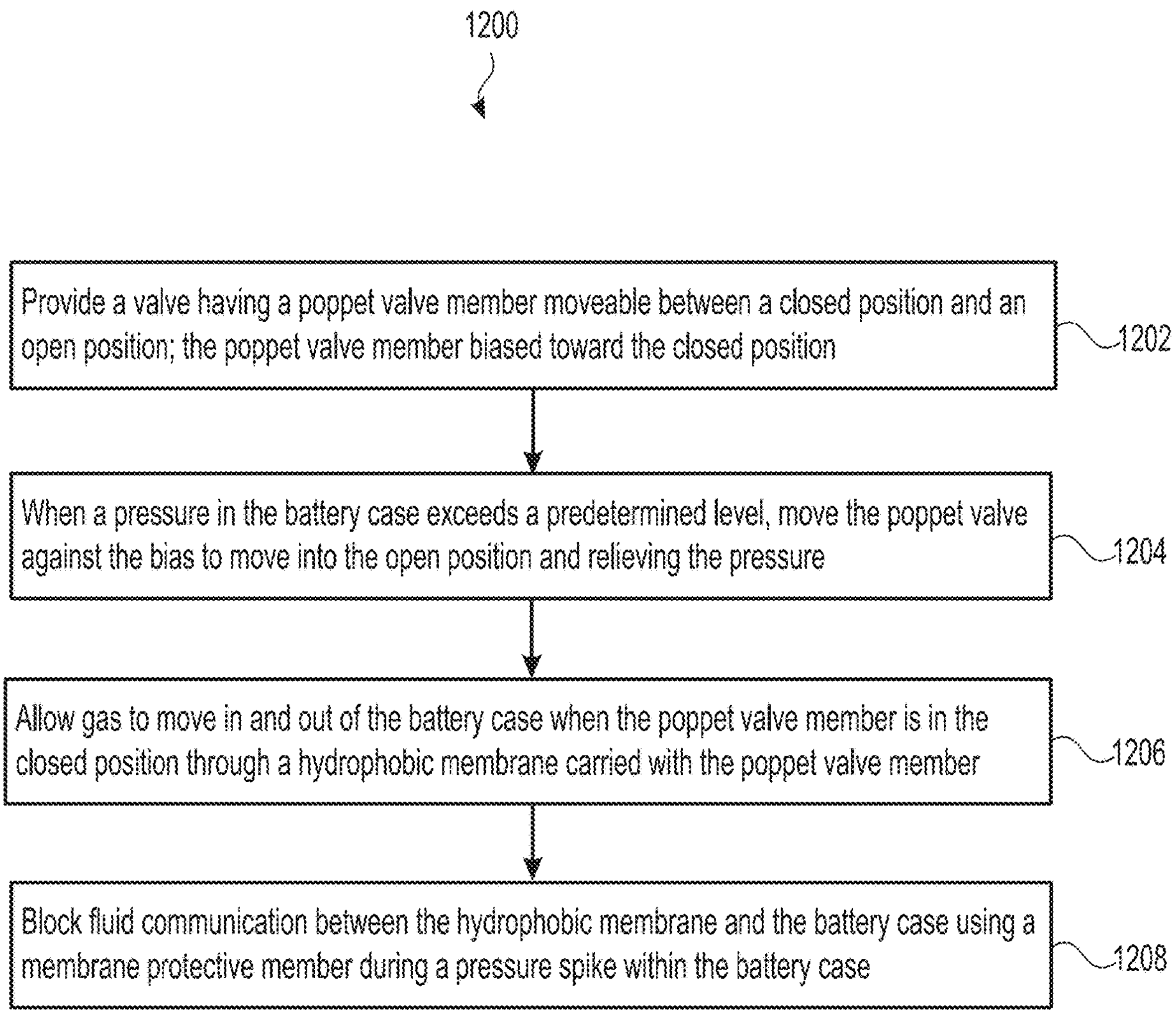
FIG. 82 illustrates a method for managing pressure in a battery case, according to an example.

In accordance with principles of this disclosure, FIG. 82 illustrates an example method for managing pressure in a battery case. The method 1200 may be performed by one or more systems or devices as shown and described herein.

In accordance with principles of this disclosure, method 1200 begins at step 1202, where a valve 900 is provided which has a blocking member, such as poppet valve member 916. The poppet valve member 916 is moveable between a closed position and an open position. The poppet valve member 916 is biased toward the closed position (for example, by a biasing element 920). In an additional step, the valve 900 is connected to a battery case (or, in some examples, another suitable case, enclosure, or container). In some examples, the valve 900 is connected to the battery case by use of a bayonet slot 923 in the outer/surrounding wall 908 of the valve, which can be slid onto a corresponding member of the battery case and twisted to provide a secure connection. In alternative arrangements, the valve 900 is connected to the battery case by screwing, snapping, or other appropriate connection methods.

In accordance with principles of this disclosure, at step 1204, when a pressure in the battery case reaches or exceeds a predetermined level, the poppet valve member 916 is moved against the bias (for example, against the bias of biasing element 920) to so that the poppet valve member 916 is moved into the open position. When poppet valve member 916 is in the open position, pressure within the battery case is relieved as relief fluid exits the valve 900. As relief fluid enters a pressure relief passage 904 of the valve 900, the pressure of the relief fluid pushes upward on the poppet valve member 916. When the pressure reaches or exceeds the downward force of the biasing element 920 biasing the poppet valve member 916 into the closed position, the poppet valve member 916 will be pushed upward (toward cap 924) into the open position.

After a relieving event (after the pressure in the battery case has decreased to a reset pressure below the predetermined level), the poppet valve member 916 is moved via the biasing element 920 to return the poppet valve member 916 into the closed position.

In accordance with principles of this disclosure, at step 1206, gas is allowed to move in and out of the battery case when the poppet valve member 916 is in the closed position through a membrane 932. In some examples, the membrane 932 is hydrophobic, preventing water from entering the battery case from outside of the valve 900. In some examples, the membrane 932 is carried with the poppet valve member 916.

In accordance with principles of this disclosure, when the poppet valve member 916 is in the closed position and gas is moving in and out of the battery case through the membrane 932, the gas is allowed to move in and out of vents 926 of a cap 924, where the cap 924 is adapted for connection to a valve body 902 of the valve 900. The cap 924 encloses all or a part of the valve 900. In some examples, the vents 926 are of any suitable shape of any suitable holes, slots, or grooves. In some examples, during a pressure relief event when the poppet valve member 916 is in the open position (for example, as described in step 1204), pressure relief (relief fluid) passes through the vents 926 of the cap 924.

In accordance with principles of this disclosure, during a relieving event, relief fluids can flow from the battery case through a pressure relief passage 904 in the valve body 902, push upward on the poppet valve member 916, move through slots 922 in a vertical ring 942 of the valve body 902, and move through vents 926 in the cap 924 of the valve 900 to exit into the environment surrounding the valve 900.

In accordance with principles of this disclosure, when the poppet valve member 916 is in a closed position, gasses move from the battery case through openings 952 in the poppet valve member 916, pass through the membrane 932, move through slots 922 in a vertical ring 942 of the valve body 902, and move through vents 926 in the cap 924 of the valve 900 to exit into the environment surrounding the valve 900. In some examples, gas moves in the opposite path, starting in the external environment and moving through the valve arrangement to enter the battery case.

At step 1208, fluid (for example, relief fluid) is blocked (prevented) from fluid communication (contact) between the membrane 932 and the battery case using a membrane protective member 938. During a pressure spike within the battery case, when the poppet valve member 916 is in the open position, the membrane protective member 938 is configured and oriented to allow gas to flow through membrane 932 (move in and out of the battery case) when the poppet valve member 916 is in the closed position.

In some examples, blocking fluid communication between the membrane 932 and the battery case includes moving the membrane protective member 938 against a protective member biasing element 966 (in an example as shown in FIG. 56, a protective member biasing spring 935), to contact a protective sealing surface 996. The pressure within the battery case is then relieved while the poppet valve member 916 is in the open position while the membrane protective member 938 blocks fluid communication between the membrane 932 and the battery case.

In some examples, after the pressure within the battery case is relieved to below the predetermined level, the membrane protective member 938 is moved away from the protective sealing surface 996 by the protective member biasing element 966 to again allow gas to flow through the membrane 932.

Figure 83:
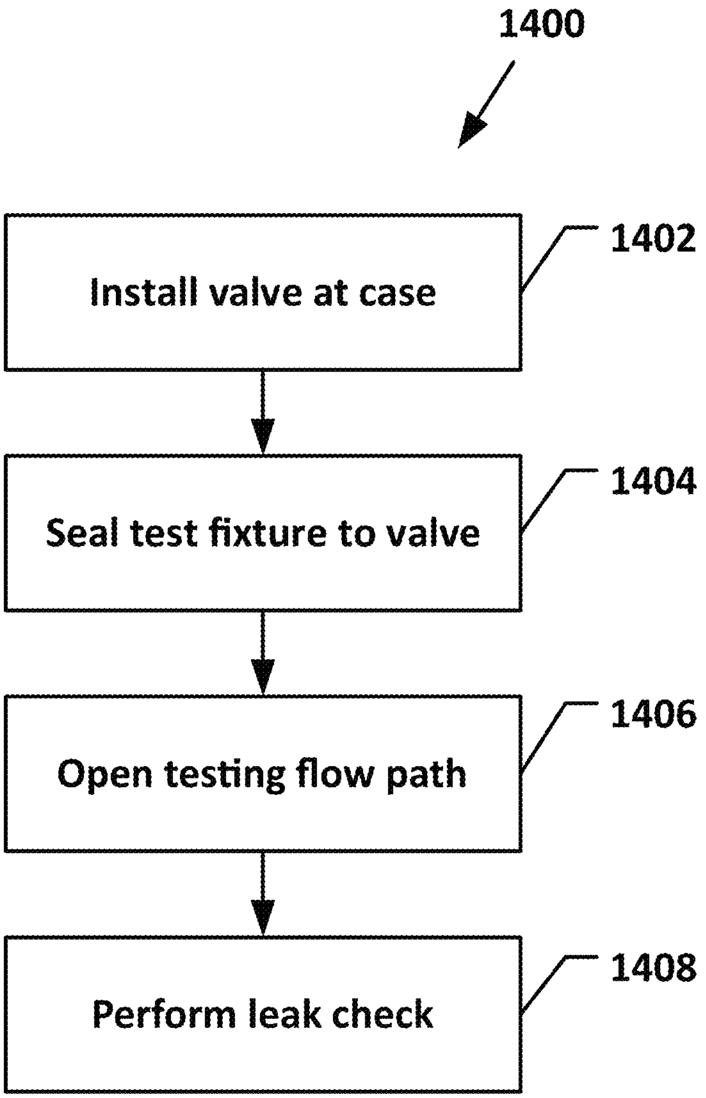
FIG. 83 is a flow chart illustrating an example leak check method for use with the valve arrangements disclosed herein.

FIG. 83 is a flowchart showing an example method 1400 for leak checking a valve arrangement, such as any of valve arrangements 100, 300, 500, 700, 800 described herein. The leak check method 1400 begins at step 1402 in which a valve arrangement, such as valve arrangement 100, 300, 500, 700, or 800, is installed at an enclosure, such as an electrical enclosure or a battery case. In certain implementations, the valve arrangement is installed at an aperture defined in the enclosure so that a sealing interface is disposed between an exterior of the valve arrangement and the enclosure at the aperture. In various examples, the valve arrangement can be attached using threads, a bayonet connection, a snap-fit connection, a friction-fit connection, fasteners, welding, adhesive, or other attachment methods. The valve arrangement is installed so that a first end of the valve arrangement is disposed within the enclosure while an opposite second end is disposed external of the enclosure. The first end defines at least part of the valve passage while the second end defines at least part of a valve interior. The valve passage and valve interior being separated by a gateway member, a blocking member, and/or a porous membrane.

At step 1404, a test fixture, such as test fixture 132, 172, 572, 701, or 721 described herein, is sealed to the second end of the valve arrangement. The test fixture is configured to enclose the second end of the valve arrangement so that any windows or other passages between the valve interior and the exterior of the valve are enclosed within the test fixture. In various implementations, the test fixture can be using threads, a bayonet connection, a snap-fit connection, a friction-fit connection, fasteners, or other attachment methods. In certain implementations, the test fixture does not cover the sealing interface between the valve arrangement and the enclosure. Accordingly, the test fixture allows a user to check for leaks through the sealing interface as well as along the rest of the enclosure.

At step 1406, the testing flow path, such as testing flow paths FP3, FP6, FP7, FP8, FP9, FP10, FP13, is opened by moving a blocking member, such as blocking member 108, 305, 636, 726, 746, 766, or 814, against a biasing force to an unblocking position. In some implementations, the blocking member 726, 746, 814 can be moved by fluid pressure being input into and pulled from the valve by a test fixture. In other implementations, the blocking member 108, 305, 636, 766, 814 can be pushed to the unblocking position when a valve cap is depressed.

In step 1408, a leak check is performed through the valve arrangement 100, 300, 500, 700, 800 using the test fixture 132, 172, 572, 701, 721. In some implementations, the test fixture 701 draws a vacuum from within the enclosure and senses a pressure change over a predetermined amount of time. If the test fixture 701 determines the vacuum is not maintained, then a leak is likely present. If the test fixture 701 determines the vacuum is maintained, then the enclosure does not leak. In other implementations, the test fixture 701 supplies fluid flow into the battery case to pressurize the battery case at a low pressure (i.e., a pressure sufficiently low to not overcome the bias of the gateway member). If the test fixture determines that the pressure decreases over a predetermined period of time, then a leak is likely present. If the pressure is maintained, then the enclosure does not leak.

In accordance with principles of this disclosure, materials of construction for valve(s) and valve parts and all other components as described herein include materials which are compatible with the environment and use of the valve(s).

For the purposes of this application, terms such as "upper," "lower," "upward," and "downward" are intended to be descriptive with reference to and in relation to the orientation shown in the Figures for clarity, but the examples as practiced and included in the scope of the claims may include examples where the systems and devices are in a different orientation.

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above. This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or operations are disclosed only as illustrative aspects. The scope of the technology is defined by the following claims and any equivalents therein. Examples of the disclosure may be described according to the following aspects.

Aspect 1. A valve for a case comprising:

valve body defining a surrounding wall and a pressure relief passage to the case;

a valve test poppet member movably coupled to the valve body, the valve test poppet member including a disc section carrying a membrane; and a valve relief disc member movably coupled to the valve body, the valve relief disc member carrying a seal and defining a restricted passage;

the valve being configured to transition between a testing state, an operating state, and a pressure relief state, wherein when the valve is in the operating state, the valve defines a first flow path between the surrounding wall and the passage, the first flow path passing through the restricted passage of the valve relief disc member and then through the membrane of the valve test poppet member, wherein when the valve is in the testing state, the valve defines a second flow path between the surrounding wall and the passage, the second flow path passing through the restricted passage and then passing through a gap extending between the valve test poppet member and the valve body, and wherein when the valve is in the pressure relief state, the valve defines a third flow path extending between the surrounding wall and the passage, the third flow path bypassing the restricted passage and passing through the gap.

Aspect 2. A valve for a case comprising:

valve body defining a surrounding wall and a passage to the case;

a valve test poppet member movably coupled to the valve body, the valve test poppet member including a disc section carrying a membrane; and a valve relief disc member movably coupled to the valve body, the valve relief disc member carrying a seal and defining a bypass passage;

the valve being configured to transition between a testing state, an operating state, and a pressure relief state, wherein when the valve is in the operating state, the valve defines a first flow path between the surrounding wall and the passage, the first flow path passing through the bypass passage of the valve relief disc member and through the membrane of the valve test poppet member, wherein when the valve is in the testing state, the valve defines a second flow path between the surrounding wall and the passage, the second flow path passing through the bypass passage and passing through a gap extending between the valve test poppet member and the valve body, and wherein when the valve is in the pressure relief state, the valve defines a third flow path extending between the surrounding wall and the passage, the third flow path passing between the gap and not passing through the bypass passage.

Aspect 3. A valve for a case comprising:

a valve body adapted for connection to the case, the valve body includes an outer wall defining an interior, the outer wall being permeable to fluid, the valve body defining a port leading to the interior, the valve body defining a flow path between the port and the outer wall, the valve body including a valve seat surrounding the port;

a valve relief disc member moveable along a valve axis relative to the valve body between a first closed position and a first open position, the valve relief disc member being configured to seal against the valve seat to restrict the flow path when in the first closed position, wherein moving the valve relief disc member to the first open position enlarges the flow path between the port and the outer wall;

a valve test poppet member moveable along the valve axis relative to the valve body between a second closed position and a second open position, the valve test poppet member defining a poppet seat configured to seal against the valve relief disc member when the valve test poppet member is disposed in the second closed position and the valve relief disc member is disposed in the first closed position, the valve test poppet further restricting the flow path when sealed against the valve relief disc member; and a biasing element disposed within the valve body to bias at least one of the valve relief disc member to the first closed position and the valve test poppet member to the second closed position.

Aspect 4. A method for managing pressure in a case; the method comprising:

(a) providing a valve having a valve relief disc member moveable between a first closed position and a first open position and a valve test poppet member moveable between a second closed position and a second open position; wherein the valve relief disc member is biased toward the first closed position;

(b) connecting the valve to the case;

(c) when a pressure in the case exceeds a predetermined level, moving the valve relief disc member against the bias to move into the first open position and relieving the pressure; and (d) allowing gas to move in and out of the case when the valve relief disc member is in the first closed position and the valve test poppet member is in the second closed position, the gas moving through a membrane carried with the vale test poppet member.

Aspect 5. A method for leak testing a case to which a vent valve is mounted, the vent valve including a valve body adapted for connection to the case and a valve relief disc member, the valve relief disc member defining a passage, a valve test poppet member moveable along the valve axis relative to the valve body between a closed position and an open position, the valve test poppet member defining a poppet seat surrounding the passage, the poppet seat being configured to seal against the valve relief disc member when in the closed position, the passage being open when the valve test poppet member is in the open position such that gas can move through the passage, the valve test poppet member being biased toward the closed position by a biasing member, the method comprising:

initially testing seal integrity between the valve relief disc member and the poppet seat and between the membrane and the poppet valve member;

installing the vent valve to the case after the initial testing of seal integrity;

after installing the vent valve to the case, leak testing the case by moving the valve test poppet member to the open position, sealing against an exterior of the valve body with a test fixture, and using the test fixture to pressurize an interior of the case through the passage while the valve test poppet member is in the open position to perform leak testing of the case.

Aspect 6. A valve for a case comprising:

valve body defining a surrounding wall and a pressure relief passage to the case;

a valve test poppet member movably coupled to the valve body, the valve test poppet member including a porous element and defining a restricted passage;

a valve relief disc member movably coupled to the valve body, the valve relief disc member carrying at least one seal;

the valve being configured to transition between a testing state, an operating state, and a pressure relief state, wherein when the valve is in the operating state, the valve defines a first flow path between the surrounding wall and the passage, the first flow path passing through the restricted passage of the valve test poppet member and then through the porous element of the valve test poppet member, wherein when the valve is in the testing state, the valve defines a second flow path between the surrounding wall and the passage, the second flow path passing through the through the porous element and through the restricted passage, and wherein when the valve is in the pressure relief state, the valve defines a third flow path extending between the surrounding wall and the passage, the third flow path bypassing the restricted passage and passing through the gap.

Aspect 7. A valve for a case comprising:

a valve body defining a surrounding wall and a passage to the case;

a valve test poppet member movably coupled to the valve body, the valve test poppet member including a disc section, carrying a porous element, and defining a restricted passage; and a valve relief disc member movably coupled to the valve body, the valve relief disc member carrying at least one seal;

the valve being configured to transition between a testing state, an operating state, and a pressure relief state, wherein when the valve is in the operating state, the valve defines a first flow path between the surrounding wall and the passage, the first flow path passing through the restricted passage of the valve test poppet member and through the porous element of the valve test poppet member, wherein when the valve is in the testing state, the valve defines a second flow path between the surrounding wall and the passage, the second flow path passing through the porous element and through the restricted passage, and wherein when the valve is in the pressure relief state, the valve defines a third flow path extending between the surrounding wall and the passage, the third flow path passing through the gap and passing through the restricted passage.

Aspect 8. A valve for a case comprising:

a valve body adapted for connection to the case, the valve body including an outer wall defining an interior, the outer wall being permeable to fluid, the valve body defining a port leading to the interior, the valve body defining a flow path between the port and the outer wall, the valve body including a valve seat surrounding the port;

a valve relief disc member moveable along a valve axis relative to the valve body between a first closed position and a first open position, the valve relief disc member being configured to seal against the valve seat to restrict the flow path when in the first closed position, wherein moving the valve relief disc member to the first open position enlarges the flow path between the port and the outer wall;

a valve test poppet member moveable along the valve axis relative to the valve body between a second closed position and a second open position, the valve test poppet member defining at least one poppet seat configured to seal against the valve relief disc member when the valve test poppet member is disposed in the second closed position and the valve relief disc member is disposed in the first closed position, the valve test poppet further restricting the flow path when sealed against the valve relief disc member; and a biasing element disposed within the valve body to bias at least one of the valve relief disc member to the first closed position and the valve test poppet member to the second closed position.

Aspect 9. A valve for a case comprising:

a valve body adapted for connection to the case, the valve body including an outer wall defining an interior, the outer wall being permeable to fluid, the valve body defining a port leading to the interior, the valve body defining a flow path between the port and the outer wall, the valve body including a valve seat surrounding the port;

a valve relief disc member moveable along a valve axis relative to the valve body between a first closed position and a first open position, the valve relief disc member being configured to seal against the valve seat to restrict the flow path when in the first closed position, wherein moving the valve relief disc member to the first open position releases the seal between the valve seat and the valve relief disc member;

a valve test poppet member moveable along the valve axis relative to the valve body between a second closed position and a second open position, the valve test poppet member defining at least one poppet seat configured to seal against the valve relief disc member when the valve test poppet member is disposed in the second closed position and the valve relief disc member is disposed in the first closed position, the valve test poppet providing a restricted flow path through the valve test poppet member and the valve relief disc member;

a biasing element disposed within the valve body to bias the valve relief disc member to the first closed position and the valve test poppet member to the second closed position; and a porous membrane carried by the valve test poppet member so that the restricted flow path passes through the porous membrane.

Aspect 10. A manifold arrangement for a case comprising:

a manifold body defining a connector station and a valve station, the manifold body configured to secure to the case;

a valve arrangement mounted to the manifold body at the valve station, the valve arrangement being adapted to vent a first amount of fluid from an interior of the case when disposed in a first configuration, and the valve arrangement being adapted to vent a second, larger amount of fluid from the interior of the case when disposed in a second configuration; and a connector mounted to the manifold body at the connection station.

Aspect 11. A manifold arrangement for a case comprising:

a manifold body defining a first port and a second port each extending between opposite first and second sides of the manifold body;

a first seal surrounding the first port at the second side of the manifold body;

a second seal surrounding the second port at the second side of the manifold body;

a first raised wall extending outwardly from the first side of the manifold body around the first port, the first raised wall defining a plurality of apertures circumferentially spaced along the first raised wall, the first raised wall being disposed radially outwardly from the port to define a shelf or ledge around the port; and a second raised wall extending outwardly from the first side of the manifold body around the second port, the second raised wall having a different configuration from the first raised wall.

Aspect 12. A valve arrangement for a case comprising:

a cap including a cover and a first stem extending from the cover along an axis;

a valve test poppet member including a disc section and a second stem, the second stem being configured to fixedly couple to the first stem to secure the valve test poppet member to the cap at a fixed position along the axis, the disc section defining a plurality of first apertures;

a valve relief disc member disposed along the axis between the cap and the disc section of the valve test poppet member, the valve relief disc member being movable along the axis relative to the valve test poppet member, the valve relief disc member defining a plurality of second apertures, the valve relief disc member being configured to selectively seal to the disc section of the valve test poppet member; and a biasing element disposed between the cap and the valve relief disc member.

Aspect 13. A method for leak checking an enclosure comprising:

mounting a sealing cap over a first valve installed at the enclosure to close any apertures through the first valve, the sealing cap not covering a sealing interface between the first valve and the enclosure; and performing a leak check of the enclosure via a test fixture.

Aspect 14. A leak check system comprising:

a pressure compensation device including:

a housing defining an interior that is separated into a first region and a second region by a porous membrane, the porous membrane providing a first fluid pathway for passive venting, the housing defining a gas opening leading to the first region from an exterior of the housing, the housing also defining a window leading from the second region to the exterior of the housing;

a bypass opening extending between the first and second regions separate from the porous membrane to provide a second fluid pathway therebetween; and a gateway member disposed within the housing and movable between closed and open positions, the gateway member extending across the bypass opening to block the second fluid pathway when disposed in the closed position, the gateway member extending into the second region to unblock the bypass opening and open the second fluid pathway when in the open position; and an adapter including:

an adapter body defining an interior accessible through an open end, the adapter body being sized to mount over at least a portion of the housing of the pressure compensation device so that the interior of the adapter body is continuous with the second region of the housing via the window;

a conduit leading to the adapter body separate from the open end; and a pressure sensor disposed within the adapter body.

Aspect 15. A method to leak check an enclosure, the method comprising:

mounting a pressure compensation device at a port of the enclosure so that a gas opening faces into the enclosure and a window faces external of the enclosure, the gas opening leading to a first interior region of the pressure compensation device and the window leading to a second interior region of the pressure compensation device, the pressure compensation device including a porous membrane providing a first fluid pathway between the first and second interior regions, the pressure compensation device also including a bypass opening separate from the porous membrane, the bypass opening extending between the first and second interior regions, and the pressure compensation device including a gateway member configured to selectively cover the bypass opening;

sealingly mounting an adapter around a portion of a body of the pressure compensation device so that the adapter surrounds the window;

applying a negative pressure to an interior of the enclosure through the pressure compensation device so that gas within the interior of the enclosure pushes open the gateway member and passes through the bypass opening towards the adapter; and monitoring a pressure within the adapter for vacuum decay.

Aspect 16. A pressure compensation device comprising:

a housing defining a gas opening leading between an exterior of the housing and a first interior region, the housing also defining a window leading between the exterior of the housing and a second interior region;

a porous membrane providing a demarcation between the first and second interior regions, the porous membrane defining a first fluid pathway between the first and second interior regions;

a bypass opening extending between the first and second interior regions to define a second fluid pathway, the bypass opening being separate from the porous membrane;

a gateway member disposed within the housing, the gateway member being configured to flex or deform between an open position and a closed position, the gateway member being biased to the close position where the gateway member blocks the bypass opening to close the second fluid pathway, the gateway member being movable to the open position in response to pressure applied at the gas opening;

a third fluid pathway connecting the first and second interior regions, the third fluid pathway being separate from the first and second fluid pathways;

a valve disposed within the housing, the valve being configured to move between respective open and closed positions, the valve being biased to the closed position, the valve blocking the third fluid pathway when disposed in the closed position, the valve opening the third fluid pathway when disposed in the open position, and the valve being movable to the open position even when the second fluid pathway remains closed.

Aspect 17. A method to leak check an enclosure, the method comprising:

mounting a pressure compensation device at a port of the enclosure so that a gas opening of the pressure compensation device faces into the enclosure and a window of the pressure compensation device faces external of the enclosure, the gas opening leading to a first interior region of the pressure compensation device and the window leading to a second interior region of the pressure compensation device, the pressure compensation device defining first, second, and third separate fluid pathways extending between the first and second interior regions, the first fluid pathway being continuously open, the second and third fluid pathways allowing greater fluid flow than the first fluid pathway, the second and third fluid pathways being biased closed;

sealingly mounting an adapter around a portion of a body of the pressure compensation device so that the adapter surrounds the window;

applying a positive pressure to an interior of the enclosure through the pressure compensation device along the third fluid pathway without opening the second fluid pathway; and monitoring a pressure within the adapter for pressure decay.

Aspect 18. An adapter for use in performing a leak check on an enclosure through a pressure compensation device, the adapter comprising:

an adapter body defining an interior accessible through an open end;

an inner seal disposed at the open end;

a hose extending away from the adapter body, the hose being in communication with the interior of the adapter body via a valve; and a pressure sensor arrangement disposed within the adapter body.

Aspect 19. A valve arrangement comprising:

a valve body defining a through-passage extending along an axis of the valve body between opposite first and second ends of the valve body;

a gate disposed within the valve body, the gate being coupled to the valve body to move relative to the valve body between a closed position and an open position, the gate extending across the through-passage and being sealed to the valve body when disposed in the closed position, the gate opening a first flow path along the through-passage between the valve body and the gate when the gate is disposed in the open position, the gate defining an opening therethrough; and a door including a support body and a membrane, the support body being coupled to the gate to move relative to the gate between a closed position and an open position, the support body being sealed to the gate and the membrane being aligned with the opening defined by the gate when the door is disposed in the closed position, and the gate opening a second flow path along the through-passage between the door and the gate when the door is disposed in the open position.

Aspect 20. A valve for a battery case comprising:

a valve body adapted for connection to the battery case, the valve body defining pressure relief passage and a valve seat surrounding the pressure relief passage;

a poppet valve member moveable along a valve axis relative to the valve body between a closed position and an open position, the poppet valve member being configured to seal against the valve seat to close the pressure relief passage when in the closed position, the pressure relief passage being open when the poppet valve member is in the open position such that pressure within the battery case can be relieved through the pressure relief passage;

a biasing element for biasing the poppet valve member toward the closed position, wherein the poppet valve member is configured to move from the closed position to the open position against the bias of the biasing element when a pressure in the battery case exceeds a predetermined level;

a membrane carried with the poppet valve member for allowing gas to move in and out of the battery case when the poppet valve member is in the closed position; and a membrane protective member for blocking fluid communication between the membrane and the battery case during a pressure spike within the battery case.

Aspect 21. A method for managing pressure in a battery case; the method comprising:

(a) providing a valve having a poppet valve member moveable between a closed position and an open position; wherein the poppet valve member is biased toward the closed position;

(b) when a pressure in the battery case exceeds a predetermined level, moving the poppet valve member against the bias to move into the open position and relieving the pressure;

(c) allowing gas to move in and out of the battery case when the poppet valve member is in the closed position through a membrane carried with the poppet valve member; and (d) blocking fluid communication between the membrane and the battery case using a membrane protective member during a pressure spike within the battery case.

Aspect 22. A valve for a battery case comprising:

a valve body adapted for connection to the battery case, the valve body defining pressure relief passage and a valve seat surrounding the pressure relief passage;

a poppet valve member moveable along a valve axis relative to the valve body between a closed position and an open position, the poppet valve member valve being configured to seal against the valve seat to close the pressure relief passage when in the closed position, the pressure relief passage being open when the poppet valve member is in the open position such that pressure within the battery case can be relieved through the pressure relief passage;

a biasing element for biasing the poppet valve toward the closed position, wherein the poppet valve member is configured to move from the closed position to the open position against the bias of the biasing element when a pressure in the battery case exceeds a predetermined level;

a membrane carried with the poppet valve member for allowing gas to move in and out of the battery case when the poppet valve member is in the closed position; and a membrane protective member for blocking fluid communication between the membrane and the battery case during a pressure spike within the battery case, the membrane protective member being carried with a cage of the poppet valve member, wherein the cage includes an opening for insertion of the membrane protective member.

Aspect 23. A method for managing pressure in a battery case; the method comprising:

(a) providing a valve having:

a poppet valve member moveable between a valve closed position and a valve open position wherein the poppet valve member is biased toward the valve closed position, a membrane, and a membrane protective member moveable between a membrane closed position and a membrane open position;

(b) when a first pressure in the battery case exceeds a first predetermined level, moving the membrane protective member into the membrane closed position and blocking fluid communication between the membrane and the battery case;

(c) when a second pressure in the battery case exceeds a second predetermined level, moving the poppet valve member against the bias to move into the valve open position and relieving the pressure; and (d) allowing gas to move in and out of the battery case when the poppet valve member is in the valve closed position and the membrane protective member is in the membrane open position, wherein the membrane is carried with the poppet valve member.

Aspect 24. A valve for a case comprising:

a valve body defining an interior accessible through a valve passage, the valve body being configured to mount to the case so that the valve passage leads into an interior of the case;

a gateway member disposed within the valve body, the gateway member being movable relative to the valve body between a sealing position and an open position, the gateway member blocking a first fluid pathway between the interior and the valve passage when disposed in the sealing position, the gateway member opening the first fluid flow path between the interior and the valve passage when disposed in the open position; and a blocking member disposed within the valve body, the blocking member being movable relative to the gateway member between a blocking position and an unblocking position, the blocking member opening a second fluid pathway between the interior and the valve passage when disposed in the unblocking position, the second fluid pathway being different from the first fluid pathway, the blocking member cooperating with the gateway member to block fluid flow along both the first and second fluid pathways when the blocking member is disposed in the blocking position and the gateway member is disposed in the scaling position.

Aspect 25. The valve of aspect 24, further comprising a hydrophobic membrane disposed within the valve body, the hydrophobic membrane providing a third fluid pathway between the interior and the valve passage independent of the positions of the gateway member and the blocking member, the third fluid pathway being restricted compared to the first and second fluid pathways, wherein the valve is configured to transition between a testing state, an operating state, and a pressure relief state, wherein only the third fluid pathway is open when the valve is in the operating state, wherein the first fluid pathway is open when the valve is in the pressure relief state, and wherein the second fluid pathway is open and the first fluid pathway is closed when the valve is in the testing state.

Aspect 26. The valve of aspect 24, further comprising a valve cap mounted to the valve body, the valve cap being movable between an undepressed position and a depressed position, valve being in the testing state when the valve cap is disposed in the depressed position, the valve being in either the operating state or the pressure relief state when the valve cap is disposed in the undepressed position, the valve cap being biased to the undepressed position.

Aspect 27. The valve of aspect 26, wherein the gateway member includes a valve relief disc member movably coupled to the valve body, the valve relief disc member being configured to seal to the valve body, the valve relief disc member being biased away from the valve cap; and wherein the blocking member includes a valve test poppet carrying the hydrophobic membrane.

Aspect 28. The valve of aspect 27, wherein the hydrophobic membrane has a tubular shape and is carried by a stem of the valve test poppet; or wherein the hydrophobic membrane has a disc shape and is carried by a disc section of the valve test poppet.

Aspect 29. The valve of any of aspects 27-28, wherein the valve relief disc member is biased away from the valve cap by a first biasing member; and wherein the valve test poppet is biased to the blocking position by a second biasing member that is different from the first biasing member.

Aspect 30. A manifold arrangement for a case comprising:

a manifold body; and the valve arrangement of any of aspects 24-29.

Aspect 31. The manifold arrangement of aspect 30, wherein the manifold body defines a connector station and a valve station, wherein the valve arrangement is mounted to the manifold body at the valve station; and wherein an electrical connector is mounted to the manifold body at the connector station.

Aspect 32. The manifold arrangement of aspect 31, wherein the manifold body defines a plurality of valve stations, the valve arrangement being mounted to the manifold body at one of the valve stations; and wherein a single-stage valve arrangement is disposed at another of the valve stations.

Aspect 33. A method for leak testing a case to which a valve is mounted, the valve including a valve body adapted for connection to the case, the valve body defining a valve passage, the valve including a blocking member that is disposed within the valve body and is movable relative to the valve body between a blocking position and an unblocking position, the method comprising:

installing the valve to the case, wherein the blocking member blocks a first flow path through the valve when disposed in the blocking position and opens the first flow path when disposed in the unblocking position, the valve being installed while the blocking member is disposed in the blocking position;

after installing the valve to the case, sealing a leak check fixture against an exterior of the valve body;

after sealing the leak check fixture, opening the first flow path by moving the blocking member to the unblocking position; and after opening the first flow path, using the test fixture to perform a leak check of the case through the valve.

Aspect 34. The method of aspect 33, wherein the valve is a first valve; and wherein a second valve also is mounted to the case, the method further comprising: prior to leak testing the case, mounting a sealing cap over the second valve to close any apertures through the second valve, the sealing cap not covering a sealing interface between the second valve and the case.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A valve arrangement for a battery case, comprising:

a valve body adapted for connection to the battery case;

a valve member moveable along a valve axis relative to the valve body;

a membrane carried with the valve member for allowing gas to move in and out of the battery case when the valve member is in a closed position; and a cap adapted to be mounted to the valve body to inhibit fluid flow.

2. The valve arrangement of claim 1, wherein the cap inhibits any fluid from escaping from the battery case via the valve body unless the valve body has not been sufficiently sealed to the battery case.

3. The valve arrangement of claim 1, wherein the valve body comprises a pressure relief passage, wherein the valve member is configured to seal the pressure relief passage when in the closed position, the valve member configured to open the pressure relief passage such that pressure within the battery case is relieved when in an open position.

4. The valve arrangement of claim 1, further comprising a gasket adapted to seal between the valve body and the battery case.

5. The valve arrangement of claim 1, wherein the membrane is hydrophobic.

6. The valve arrangement of claim 1, further comprising:

a biasing element for biasing the valve member toward the closed position.

7. The valve arrangement of claim 1, wherein the valve member extends a distance into the valve body.

8. A method for leak testing a battery case to which a first valve and a second valve are mounted, the first valve including a first valve body adapted for connection to the case, the first valve body defining a valve passage, the first valve including a blocking member that is disposed within the first valve body and is movable relative to the first valve body between a blocking position and an unblocking position, the second valve including a second valve body adapted for connection to the battery case; a valve member moveable along a valve axis relative to the second valve body; a membrane carried with the valve member for allowing gas to move in and out of the battery case when the valve member is in a closed position; and a cap adapted to be mounted to the second valve body to inhibit fluid flow, the method comprising:

installing the first valve to the battery case, wherein the blocking member blocks a first flow path through the first valve when disposed in the blocking position and opens the first flow path when disposed in the unblocking position, the first valve being installed while the blocking member is disposed in the blocking position;

after installing the first valve to the battery case, sealing a leak check fixture against an exterior of the first valve body;

after sealing the leak check fixture, opening the first flow path by moving the blocking member to the unblocking position; and after opening the first flow path, using the leak check fixture to perform a leak check of the case through the first valve.

9. The method of claim 8, the method further comprising:

prior to leak testing the case, mounting the cap to the second valve body to close any apertures through the second valve, the cap not covering a sealing interface between the second valve and the case.

10. The method of claim 8, wherein opening the first flow path includes using the leak check fixture to depress a valve cap of the first valve, which moves the blocking member to the unblocking position.

11. The method of claim 8, wherein opening the first flow path includes drawing a vacuum through the first valve.

12. The method of claim 8, wherein opening the first flow path includes directing pressurized fluid into the battery case, the pressurized fluid moving the blocking member to the unblocking position.

13. The method of claim 8, wherein the first valve includes a gateway member disposed within a vent of the first valve, the gateway member being configured to provide thermal runaway relief.

14. The method of claim 8, wherein the first valve is a vent valve that includes a hydrophobic membrane that provides a venting flow path therethrough; wherein the first flow path bypasses the hydrophobic membrane.

15. A valve arrangement for a battery case, comprising:

a valve body adapted for connection to the battery case;

a valve member moveable along a valve axis relative to the valve body;

a membrane carried with the valve member for allowing gas to move in and out of the battery case when the valve member is in a closed position; and a means for inhibiting fluid escape during a leak test.

16. The valve arrangement of claim 15, wherein the means for inhibiting fluid escape during the leak test comprises a cap adapted to be mounted to the valve body to inhibit fluid flow.

17. The valve arrangement of claim 15, wherein the valve body comprises a pressure relief passage.

18. The valve arrangement of claim 17, wherein the valve member is configured to seal the pressure relief passage when in the closed position, the valve member configured to open the pressure relief passage such that pressure within the battery case is relieved when in an open position.

19. The valve arrangement of claim 15, wherein the means for inhibiting fluid escape during the leak test blocks fluid communication through the membrane during a pressure variation within the battery case.

20. The valve arrangement of claim 19, wherein the means for inhibiting fluid escape during the leak test comprises a membrane protective member.

* * * * *